US010938001B2

(12) United States Patent
Motoyama et al.

(10) Patent No.: US 10,938,001 B2
(45) **Date of Patent: *Mar. 2, 2021**

(54) BATTERY AND CONNECTION APPARATUS

(71) Applicant: Sony Corporation, Tokyo (JP)

(72) Inventors: Shigeki Motoyama, Kanagawa (JP); Atsushi Mitani, Kanagawa (JP); Atsuhiro Kumagai, Kanagawa (JP); Yukio Tsuchiya, Kanagawa (JP); Nobutaka Saitoh, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/783,356

(22) Filed: Feb. 6, 2020

(65) Prior Publication Data

US 2020/0194748 A1 Jun. 18, 2020

Related U.S. Application Data

(63) Continuation of application No. 15/598,823, filed on May 18, 2017, now Pat. No. 10,615,384.

(30) Foreign Application Priority Data

Feb. 10, 2017 (JP) ................................ 2017-023422
Apr. 3, 2017 (JP) ................................ 2017-073560

(51) Int. Cl.
*H01M 2/10* (2006.01)
*H01M 10/42* (2006.01)
*H01M 2/30* (2006.01)

(52) U.S. Cl.
CPC .......... *H01M 2/1055* (2013.01); *H01M 2/30* (2013.01); *H01M 10/42* (2013.01); *H01M 10/4221* (2013.01); *H01M 2220/30* (2013.01)

(58) Field of Classification Search
CPC ............... H01M 2/1055; H01M 10/42; H01M 10/4221; H01M 2/30; H01M 2220/30
See application file for complete search history.

(56) References Cited

U.S. PATENT DOCUMENTS 5,672,441 A * 9/1997 Aoki .................. H01M 2/1055 429/123
6,329,788 B1 * 12/2001 Bailey, Jr. ................ B25F 5/02 307/43

(Continued)

FOREIGN PATENT DOCUMENTS

EP 1 306 957 A1 5/2003
EP 1 895 611 A1 3/2008

(Continued)

OTHER PUBLICATIONS

International Search Report dated Nov. 7, 2017 for corresponding International Application No. PCT/JP2017/036369.

(Continued)

*Primary Examiner* — Michael L Dignan
(74) *Attorney, Agent, or Firm* — Michael Best & Friedrich LLP

(57) ABSTRACT

Disclosed is a battery including a casing including cells housed therein and a terminal part including a connection terminal connected to an electrode terminal of a connection apparatus, in which in the casing, a functional groove having a predetermined function in which a longitudinal direction coincides with a connection direction of the connection terminal and the electrode terminal is formed, and the functional groove includes a plurality of functional units having different lengths which are continuously formed. Accordingly, since there is no part that divides a functional unit between a plurality of functional units having different lengths, a size of the functional groove in a direction in which the functional units are continuous is a sum of sizes (Continued)

of a plurality of functional units, and thus it is possible to reduce the size of the battery while securing high functionality.

7 Claims, 70 Drawing Sheets

(56) References Cited

U.S. PATENT DOCUMENTS

| | | | | |
|---|---|---|---|---|
| 6,521,370 | B1 | 2/2003 | Takeshita | |
| 7,117,906 | B2 | 10/2006 | Adams | |
| 9,318,729 | B2 * | 4/2016 | Ogura | H01M 2/20 |
| 9,917,285 | B1 | 3/2018 | Motoyama | |
| 9,972,812 | B1 * | 5/2018 | Motoyama | H01M 2/202 |
| 2007/0154800 | A1 * | 7/2007 | Takeshita | H01M 2/30 429/179 |
| 2007/0247112 | A1 * | 10/2007 | Yu | H02J 7/0024 320/112 |
| 2010/0248004 | A1 * | 9/2010 | Takeshita | H01M 2/1055 429/156 |
| 2015/0188101 | A1 | 7/2015 | Zhang | |

FOREIGN PATENT DOCUMENTS

| | | | |
|---|---|---|---|
| JP | 2000-243361 | A | 9/2000 |
| JP | 2005-190943 | A | 7/2005 |
| JP | 2007-325499 | A | 12/2007 |
| JP | 2016-149369 | A | 8/2016 |
| JP | 6191795 | | 8/2017 |
| JP | 6191796 | | 8/2017 |

OTHER PUBLICATIONS

Extended European Search Report dated Dec. 20, 2017 for corresponding European Application No. 17179024.9.

* cited by examiner

| BATTERY \ CONNECTION APPARATUS | | LOW POWER CAMERA | MIDDLE POWER CAMERA | HIGH POWER CAMERA | CHARGER |
| --- | --- | --- | --- | --- | --- |
| | |  |  |  |  |
| LARGE CAPACITY BATTERY |  | Y | Y | Y | Y |
| MIDDLE CAPACITY BATTERY |  | Y | Y | N | Y |
| SMALL CAPACITY BATTERY |  | Y | N | N | Y |

BATTERY AND CONNECTION APPARATUS

CROSS REFERENCE TO RELATED APPLICATIONS

This is a Continuation application of U.S. patent application Ser. No. 15/598,823, filed on May 18, 2017, which claims the benefit of Japanese Priority Patent Application JP 2017-073560 filed on Apr. 3, 2017, and JP 2017-023422 filed on Feb. 10, 2017, the entire contents of which are incorporated herein by reference.

TECHNICAL FIELD

The present technology relates to a technical field of a battery in which a functional groove is formed in a casing housing a cell inside and a connection apparatus to which the battery is connected.

BACKGROUND ART

Among various electronic apparatuses including imaging apparatuses such as a still camera and a camcorder, there are electronic apparatuses that can be operated by the power of a battery. A battery is charged, for example, by being mounted in a charger and is mounted in a battery mounting unit of an electronic apparatus in a charged state. Such a charger or an electronic apparatus functions as a connection apparatus so as to be connected to the battery.

In the battery described as above, a connector including connection terminals is arranged, and electrode terminals of a charger or electrode terminals arranged in a battery mounting unit are connected to the connection terminals, and charging of the battery or the supply of power from the battery to an electronic apparatus is performed (for example, see PTL 1).

The battery described in PTL 1 includes a casing having a substantially rectangular parallelepiped shape, cells housed inside the casing, and a connector electrically connected to cells, and an identification groove (a discrimination concave part) is formed on a lower end portion of the casing as a functional groove having a predetermined function.

The battery is slid and mounted in a connection apparatus such as a charger, so that the connector and the electrode terminal are connected. When the battery is mounted in the connection apparatus, an identification protruding portion formed in the connection apparatus can be inserted into the identification groove, and a type of battery is identified on the basis of a state in which the identification protruding portion is inserted into the identification groove.

CITATION LIST

Patent Literature

[PTL 1]
JP 2015-92511 A

SUMMARY

Technical Problem

Meanwhile, the battery is used by being mounted in a charger or a battery mounting unit. Thus, in a case where the size of the battery is large, the size of a connection apparatus such as a charger or an electronic apparatus becomes large. In addition, the battery is frequently carried, and, in a case where the size thereof is large, the portability is degraded, and there is a concern that the handling of the battery becomes inconvenient.

Meanwhile, in a case where a type or the like of battery is identified on the basis of a plurality of indicators (identification protruding portions), it is possible to improve identification performance, but identification grooves corresponding to the number of indicators are necessary, and as the number of identification grooves increases, an area occupied by the identification grooves in the casing increases, leading to an increase in battery size.

In this regard, the present technology was made to solve the above problems, and it is desirable to secure high functionality and implement size reduction.

Solution to Problem

First, a battery according to an embodiment of the present technology includes a casing including cells housed therein and a terminal part including a connection terminal connected to an electrode terminal of a connection apparatus, in which in the casing, a functional groove having a predetermined function in which a longitudinal direction coincides with a connection direction of the connection terminal and the electrode terminal is formed, and the functional groove includes a plurality of functional units having different lengths which are continuously formed.

Accordingly, there is no part that divides the functional unit between a plurality of functional units having different lengths.

Second, in the battery according to an embodiment of the present technology, preferably, a first functional unit and a second functional unit are formed as the functional unit.

Accordingly, a size of the functional groove in a direction in which the functional units are continuous is a sum of sizes of the first functional unit and the second functional unit.

Third, in the battery according to an embodiment of the present technology, preferably, the plurality of functional units are formed continuously in a widthwise direction.

Accordingly, the size of the functional groove in the widthwise direction is a sum of sizes of the plurality of functional units.

Fourth, in the battery according to an embodiment of the present technology, preferably, widths of the plurality of functional units decrease in an ascending order of lengths.

Accordingly, the size of the functional groove in the widthwise direction is smaller than a total width in a case where the functional units of the same width are formed.

Fifth, in the battery according to an embodiment of the present technology, preferably, the plurality of functional units are continuously formed in a depth direction.

Accordingly, the size of the functional groove in the depth direction is a sum of sizes of the plurality of functional units.

Sixth, in the battery according to an embodiment of the present technology, preferably, depths of the plurality of functional units decrease in an ascending order of lengths.

Accordingly, the size of the functional groove in the depth direction is smaller than a total depth in a case where functional units of the same depth are formed.

Seventh, in the battery according to an embodiment of the present technology, preferably, the functional groove is formed on both sides of the terminal part in a widthwise direction.

Accordingly, it is possible to identify the connection apparatus using both of the functional grooves.

Eighth, in the battery according to an embodiment of the present technology, the casing includes a front face and a rear face which are positioned on opposite sides in the longitudinal direction and a top face and a bottom face which are positioned between the front face and the rear face in a height direction orthogonal to the longitudinal direction, an arrangement concave part which is opened to at least the front face is formed in the casing, a connector arranged in the arrangement concave part is formed as the terminal part, and a face positioned to be closest to the top face side among faces forming the functional groove is positioned on a further bottom face side than a face positioned to be closest to the top face side among faces forming the arrangement concave part. Accordingly, a face positioned to be closest to the top face side among faces forming the functional groove is positioned on a further bottom face side than a face positioned to be closest to the top face side among faces forming the arrangement concave part.

Ninth, in the battery according to an embodiment of the present technology, preferably, the casing includes a top face and a bottom face which are positioned on opposite sides in a height direction, a terminal arrangement groove in which the connection terminal is arranged is formed in the casing, and a face positioned to be closest to the top face side among faces forming the functional groove is positioned on a further bottom face side than a face positioned to be closest to the top face side among faces forming the terminal arrangement groove.

Accordingly, a face positioned to be closest to the top face side among faces forming the functional groove is positioned on a further bottom face side than a face positioned to be closest to the top face side among faces forming the terminal arrangement groove.

Tenth, in the battery according to an embodiment of the present technology, preferably, the casing includes two side faces which are positioned on opposite sides in a widthwise direction and a top face and a bottom face which are positioned between the two side faces in a height direction orthogonal to a widthwise direction, a notch is formed in the casing by a level difference face which is continuous to the side face and a groove forming face which is continuous to the bottom face, and a face positioned to be closest to the top face side among faces forming the functional groove is positioned on a further bottom face side than the level difference face.

In such a case, a face that is positioned on the most top face side among faces forming the functional groove is positioned on a further bottom face side than the level difference face.

Eleventh, in the battery according to an embodiment of the present technology, preferably, a guided groove which is opened to the groove forming face is formed in the casing, and a face positioned to be closest to the top face side among faces forming the functional groove is positioned on a further bottom face side than an end edge of the guided groove which is positioned to be closest to the top face side.

Accordingly, a face positioned to be closest to the top face side among faces forming the functional groove is positioned on a further bottom face side than an end edge of the guided groove which is positioned to be closest to the top face side.

Twelfth, in the battery according to an embodiment of the present technology, preferably, a guided groove which is opened to the groove forming face is formed in the casing, and a face positioned to be closest to the top face side among faces forming the functional groove is positioned on a further top face side than an end edge of the guided groove which is positioned to be closest to the bottom face side.

Accordingly, a face positioned to be closest to the top face side among faces forming the functional groove is positioned on a further top face side than an end edge of the guided groove which is positioned to be closest to the bottom face side.

Thirteenth, in the battery according to an embodiment of the present technology, preferably, the casing includes a front face and a rear face which are positioned on opposite sides in the longitudinal direction, an arrangement concave part which is opened to at least the front face is formed in the casing, a connector arranged in the arrangement concave part is formed as the terminal part, and a face positioned to be closest to the rear face side among faces forming the functional groove is positioned on a further front face side than a face positioned to be closest to the rear face side among faces forming the arrangement concave part.

Accordingly, a face positioned to be closest to the rear face side among faces forming the functional groove is positioned on a further front face side than a face positioned to be closest to the rear face side among faces forming the arrangement concave part.

Fourteenth, in the battery according to an embodiment of the present technology, preferably, a face positioned to be closest to the rear face side among faces forming the functional groove is positioned on a further rear face side than a face of the connector which is positioned to be closest to the front face side.

Accordingly, a face positioned to be closest to the rear face side among faces forming the functional groove is positioned on a further rear face side than a face of the connector which is positioned to be closest to the front face side.

Fifteenth, in the battery according to an embodiment of the present technology, preferably, the casing includes a front face and a rear face which are positioned on opposite sides in the longitudinal direction, a terminal arrangement groove in which the connection terminal is arranged is formed in the casing, and a face positioned to be closest to the rear face side among faces forming the functional groove is positioned on a further front face side than a face positioned to be closest to the rear face side among faces forming the terminal arrangement groove.

Accordingly, a face positioned to be closest to the rear face side among faces forming the functional groove is positioned on a further front face side than a face positioned to be closest to the rear face side among faces forming the terminal arrangement groove.

Sixteenth, in the battery according to an embodiment of the present technology, preferably, the casing includes a front face and a rear face which are positioned on opposite sides in the longitudinal direction, two side faces which are positioned between the front face and the rear face in a widthwise direction orthogonal to the longitudinal direction, and a top face and a bottom face which are positioned between the front face and the rear face and between the two side faces in a height direction orthogonal to both the longitudinal direction and the widthwise direction, a notch is formed in the casing by a level difference face which is continuous to the side face and a groove forming face which is continuous to the bottom face, a guided groove which is opened to the groove forming face and the front face is formed in the casing, and a face positioned to be closest to the rear face side among faces forming the functional groove is positioned on a further front face side than a face of the guided groove which is positioned to be closest to the rear face side.

Accordingly, a face positioned to be closest to the rear face side among faces forming the functional groove is positioned on a further front face side than a face of the guided groove which is positioned to be closest to the rear face side.

Seventeenth, in the battery according to an embodiment of the present technology, preferably, the casing includes two side faces which are positioned between the front face and the rear face in a widthwise direction orthogonal to the longitudinal direction and a top face and a bottom face which are positioned between the front face and the rear face and between the two side faces in a height direction orthogonal to both the longitudinal direction and the widthwise direction, the first functional unit and the second functional unit are continuously formed in a widthwise direction, and the first functional unit is positioned on a further center side in the widthwise direction than the second functional unit, and a face of the second functional unit continuous to the first functional unit in the widthwise direction is formed as an inclining face which is displaced to the bottom face side as the face approaches the side face positioned on an opposite side to the first functional unit.

Accordingly, the width of the portion between the inclining face and the side face in the casing is large.

Eighteenth, in the battery according to an embodiment of the present technology, preferably, the predetermined function is an identifying function for identifying a type of the connection apparatus.

Accordingly, the type of the connection apparatus is identified by the functional groove.

Nineteenth, a connection apparatus according to an embodiment of the present technology includes a portion in which a battery including a casing including cells housed therein and a terminal part including a connection terminal connected to an electrode terminal of the connection apparatus is mountable, in which a functional groove having a predetermined function in which a longitudinal direction coincides with a connection direction of the connection terminal and the electrode terminal is formed in the casing of the battery, and the functional groove includes a plurality of functional units having different lengths which are continuously formed.

Accordingly, a battery having no part that divides the functional unit between a plurality of functional units having different lengths is mounted and removed.

Advantageous Effects of Invention

According to an embodiment of the present technology, since there is no part that divides the functional unit between a plurality of functional units having different lengths, the size of the functional groove in the direction in which the functional units are continuous is a sum of sizes of a plurality of functional units, and it is possible to implement size reduction while securing high functionality.

In addition, the effects described here are merely examples but are not for the purpose of limiting the effects, and any other effect may be acquired.

BRIEF DESCRIPTION OF DRAWINGS

FIG. 62 is a perspective view illustrating another charger, a power supply, or the like.

FIG. 102 is a diagram for describing a mounting possibility of a charger such as a battery in an imaging apparatus, or the like.

DESCRIPTION OF EMBODIMENTS

Figure 1:
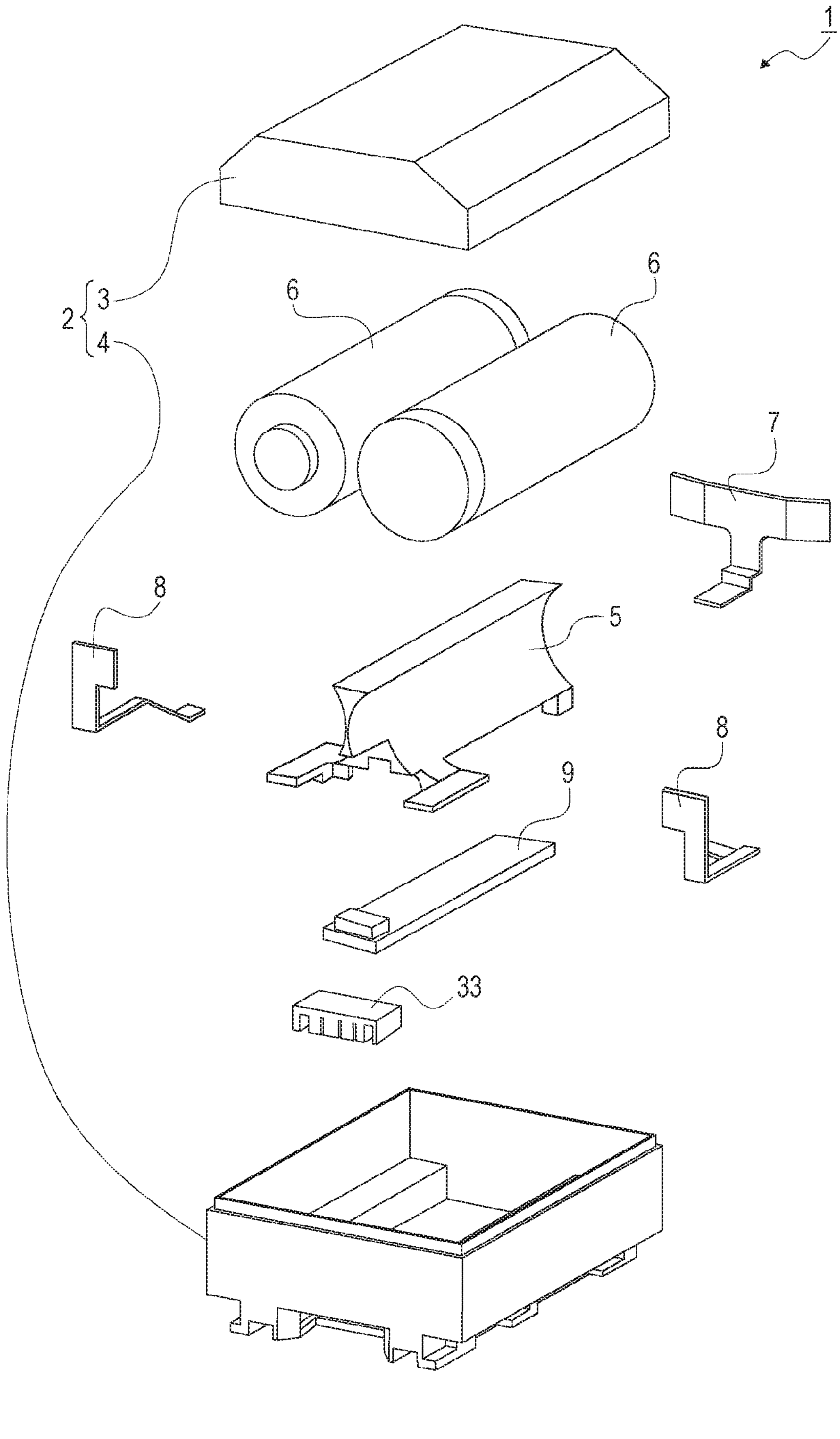
FIG. 1 illustrates a battery and a connection apparatus according to embodiments of the present technology together with FIGS. 2 to 102 and is an exploded perspective view representing the battery.
Figure 2:
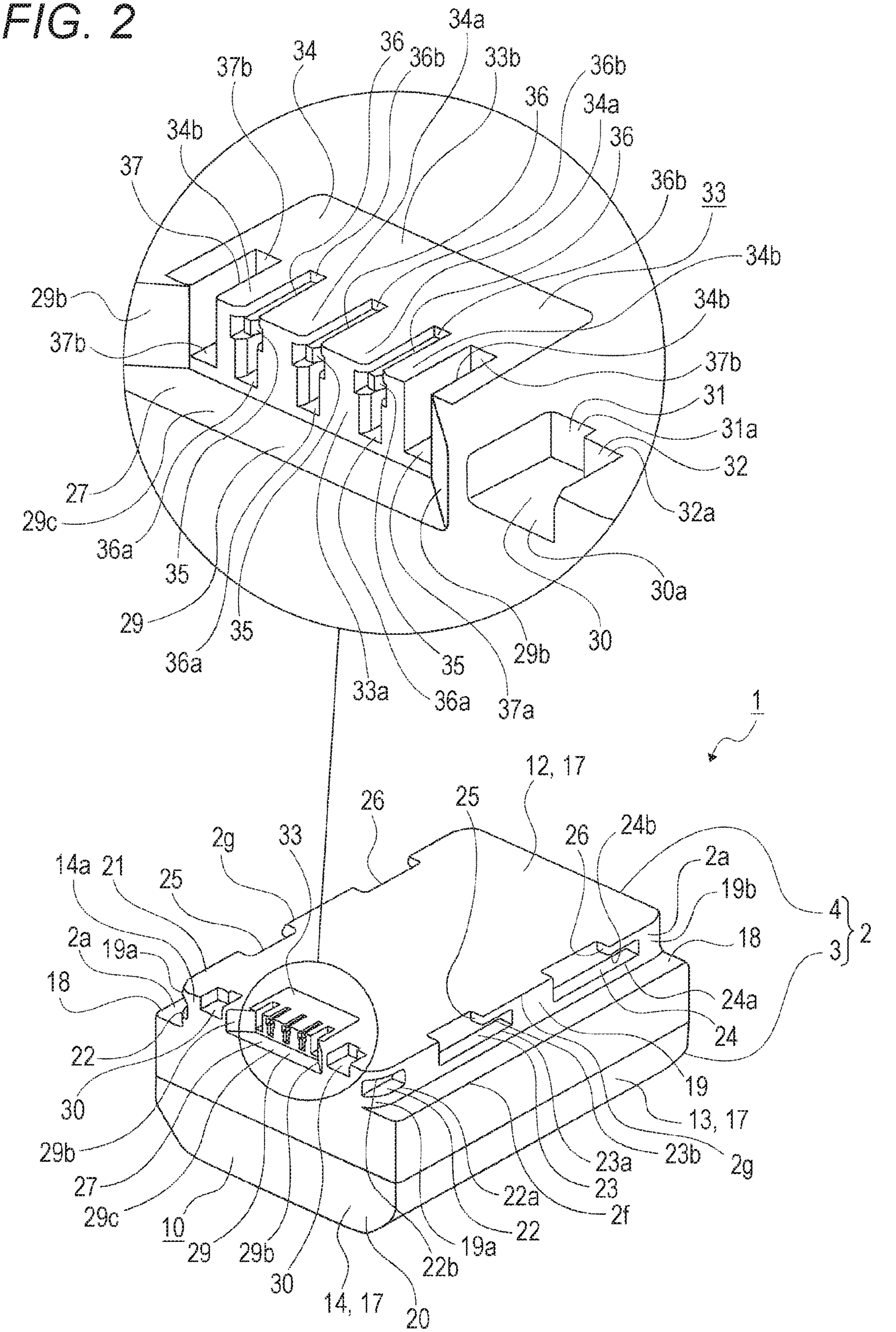
FIG. 2 is a perspective view of the battery.
Figure 3:
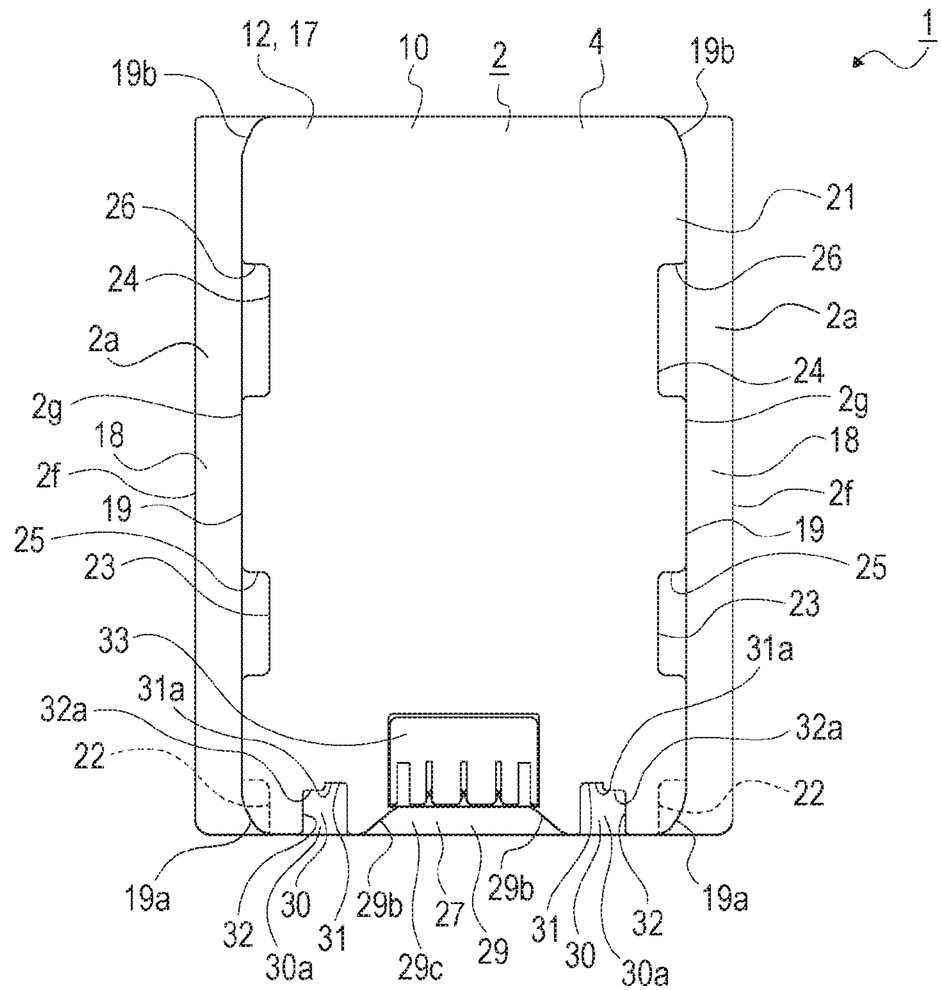
FIG. 3 is a bottom view of the battery.
Figure 4:
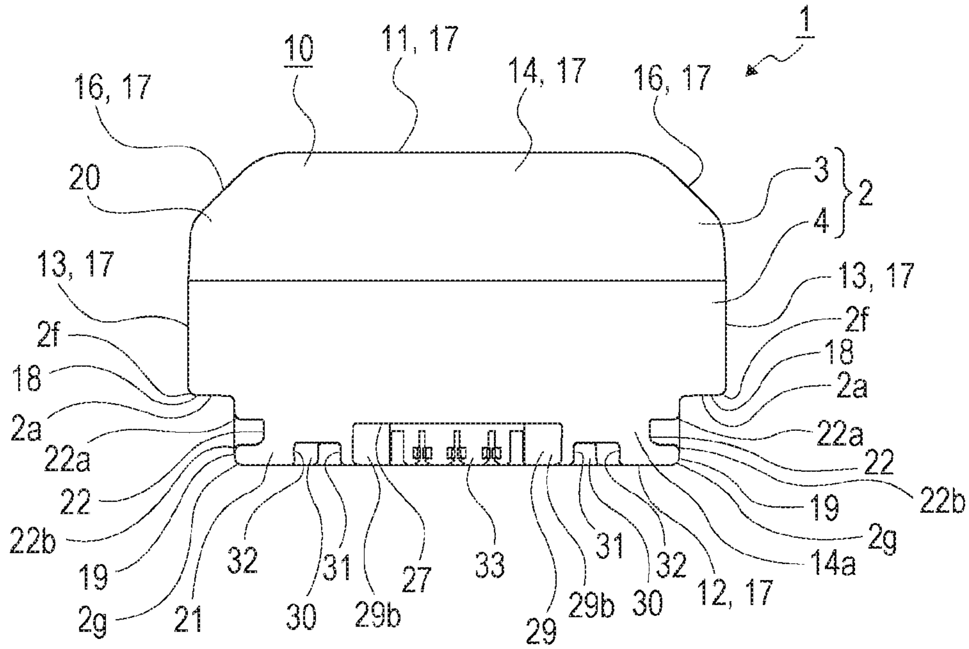
FIG. 4 is a front view of the battery.
Figure 5:
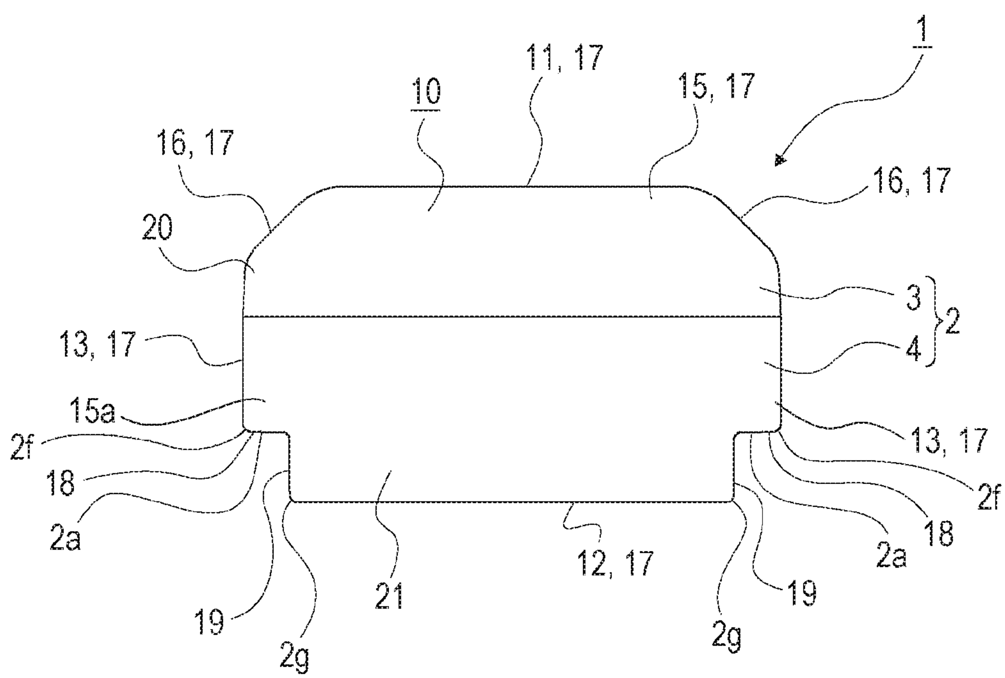
FIG. 5 is a rear view of the battery.
Figure 6:
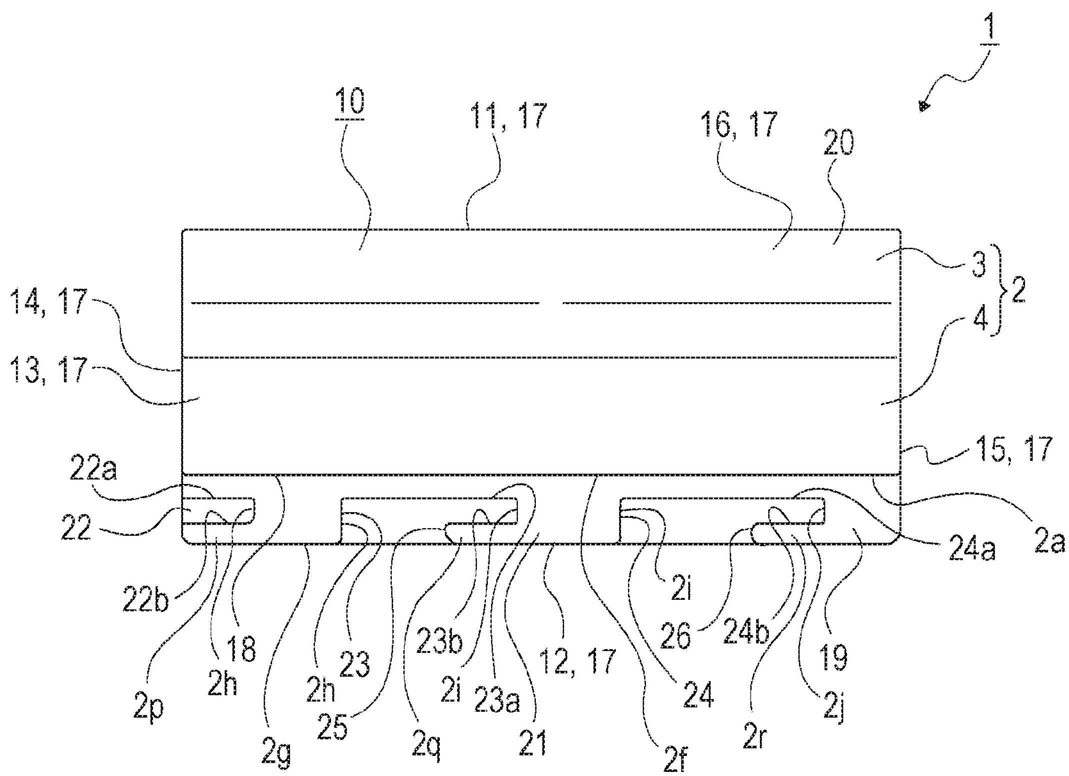
FIG. 6 is a side view of the battery.

Hereinafter, embodiments of a battery and a connection apparatus according to an embodiment of the present technology will be described with reference to the attached drawings.

A battery is formed in an approximate rectangular parallelepiped shape and, in description presented below, the outer faces will be referred to as a top face (upper face), a bottom face (lower face), side faces (horizontal both side faces), and a front face and a rear face so as to represent front, rear, upper, lower, left, and right directions. A vertical direction connecting a top face side (upper face side) and a bottom face side (lower face side) on which the top face (upper face) and the bottom face (lower face) are present will be also referred to as a height direction, a horizontal direction connecting a left side face side and a right side face side on which both the left and right side faces are present will be also referred to as a widthwise direction, and a forward/backward direction connecting a front face side and a rear face side on which the front face and the rear face are present will be also referred to as a longitudinal direction. In addition, a portion of an upper end side including the top face will be referred to as a top portion, a portion of a lower end side including the bottom face will be referred to as a bottom portion, portions of both the left and right end sides including the side faces will be referred to as side portions (a left portion and a right portion), a portion of a front end side including the front face will be referred to as a front portion, and a portion of a rear end side including the rear face will be referred to as a rear portion. In addition, the outer faces of the top portion, the bottom portion, the side portions, the front portion, and the rear portion are not limited to planar faces, but at least parts thereof may be formed as curved faces. Further, as an example of a connection apparatus to which the battery is connected, a still camera that is an imaging apparatus will be represented, and, in description of the still camera, the front, rear, upper, lower, left, and right directions will be represented in a direction seen from a photographer at the time of photographing using the still camera. Thus, an object side is the front side, and the image face side is the rear side.

In addition, hereinafter, as another example of a connection apparatus to which the battery is connected, a charger is also represented. In description of the charger, the front, rear, upper, lower, left, and right directions are represented in a state in which the charger is placed in a base such as a desk or a table. In the charger, an insertion concave part in which the battery is inserted is formed. In the charger, the front, rear, upper, lower, left, and right directions will be represented with a direction in which the battery is inserted set as the lower side and a direction in which the battery is slid and mounted set as the front side. In addition, the front, rear, upper, lower, left, and right directions represented below are for the convenience of the description, and, an embodiment of the present technology is not limited to such directions.

<Configuration of Battery>

First, the configuration of a battery 1 will be described (see FIGS. 1 to 7).

The battery 1 has a configuration in which necessary units are arranged inside/outside a casing 2.

The casing 2 is formed in an approximate rectangular parallelepiped shape and is formed by vertically combining a case cover (upper case) 3 and a housing case (lower case) 4. The case cover 3 is formed in a box shape that is open to the lower side (see FIGS. 1 to 6). The housing case 4 is formed in a box shape that is open to the upper side. In a state in which the casing 2 is configured by vertically combining the case cover 3 and the housing case 4, the internal space of the casing 2 is formed as a housing space.

In the housing space of the casing 2, a separator 5, cells 6 and 6, connecting sheet metals 7, 8, and 8, and a circuit substrate 9 are arranged (see FIG. 1). The separator 5 is mounted in the housing case 4. The cells 6 and 6 are arranged in a state in which the cells are horizontally divided by the separator 5. The connecting sheet metal 7 is connected to one terminal of each of the cells 6 and 6 and has a lower end portion connected to an electrode terminal, which is not illustrated in the drawing, formed on the lower face of the circuit substrate 9. The connecting sheet metals 8 and 8 are connected to the other terminals of the cells 6 and 6 and have lower end portions connected to electrode terminals, which are not illustrated in the drawing, formed on the lower face of the circuit substrate 9. The circuit substrate 9 is mounted in the housing case 4 and is in a state covered with the separator 5 from the upper side except for a portion.

The casing 2 includes a top face 11, a bottom face 12, side faces 13 and 13, a front face 14, and a rear face 15 as outer faces 10. The casing 2 has a front/rear direction (longitudinal direction) size larger than a left/right direction (widthwise direction) size and has a horizontal direction (widthwise direction) size larger than a vertical direction (height direction) size (see FIGS. 1 to 6). In the casing 2, inclining faces 16 and 16 are formed between the top face 11 and the side faces 13 and 13. The inclining faces 16 and 16 are displaced to the lower side as approaching the side faces 13 and 13 from the top face 11.

All the top face 11, the bottom face 12, the side faces 13 and 13, the front face 14, the rear face 15, and the inclining faces 16 and 16 are formed as outer faces 17, 17, . . . .

On the horizontal both side portions of the lower end portion of the casing 2, notches **2*a* and 2*a* are formed. The notch 2*a* is open to the side face (the left side or the right side), the lower side, the front side, and the rear side and is formed by a level difference face 18 extending to the front/rear sides facing the lower side and a groove forming face 19 extending to the front/rear sides facing the lateral side. The outer edge of the level difference face 18 is continuous from the lower edge of the side face 13. The upper edge of the groove forming face 19 is continuous from the inner edge of the level difference face 18, and the lower edge thereof is continuous from the side edge of the bottom face 12. The level difference face 18 and the groove forming face 19 are formed to be continuous over the front face 14 to the rear face 15**.

The level difference face 18 and the bottom face 12 are formed as flat faces that are approximately parallel to each other, and a middle portion of the groove forming face 19 in the front/rear direction except for the front/rear both end portions and the side face 13 are formed as faces that are approximately parallel to each other. Front end portions of the groove forming faces 19 and 19 are formed as curved faces **19*a* and 19*a*, which are convex toward the outer side, displacing in a direction approaching each other as approaching the front face 14, and rear end portions of the groove forming faces 19 and 19 are formed as curved faces 19***b* and 19*b*, which are convex toward the outer side, displacing in a direction approaching each other as approaching the rear face 15. The casing 2 may be regarded as being configured by a main body part 20 that is a portion disposed on a further upper side than a virtual plane including the level difference faces 18 and 18 and a bottom part 21 that is a portion disposed on a further lower side than the virtual plane. In addition, the level difference faces 18 and 18 are included in the main body part 20.

As described above, in the battery 1, since the front/rear both end portions of the groove forming faces 19 and 19 are formed as curved faces 19*a*, 19*a*, 19*b*, and 19*b*, it is difficult for stress concentration to occur, and, in case of falling or the like, it is difficult for the battery 1 to be in contact with a ground surface or the like, the impact is mitigated, and the occurrence of damage can be reduced.

The casing 2, as described above, a portion that is disposed on the upper side including the level difference faces 18 and 18 with reference to the virtual plane including the level difference faces 18 and 18 is arranged as the main body part 20 and a portion disposed on a further lower side than the main body part 20 is arranged as the bottom part 21. The horizontal width of the bottom part 21 is smaller than that of the main body part 20, a distance between the side faces 13 and 13 in the horizontal direction is longer than a distance between the groove forming faces 19 and 19, and grooves having respective functions and the like are formed in the bottom part 21.

In the horizontal both side portions of the bottom part 21, in order from the front side, first guided grooves 22 and 22, second guided grooves 23 and 23, and third guided grooves 24 and 24 are formed to be spaced apart from each other. Any one of the first guided groove 22, the second guided groove 23, and the third guided groove 24 is open to the groove forming face 19.

Figure 8:
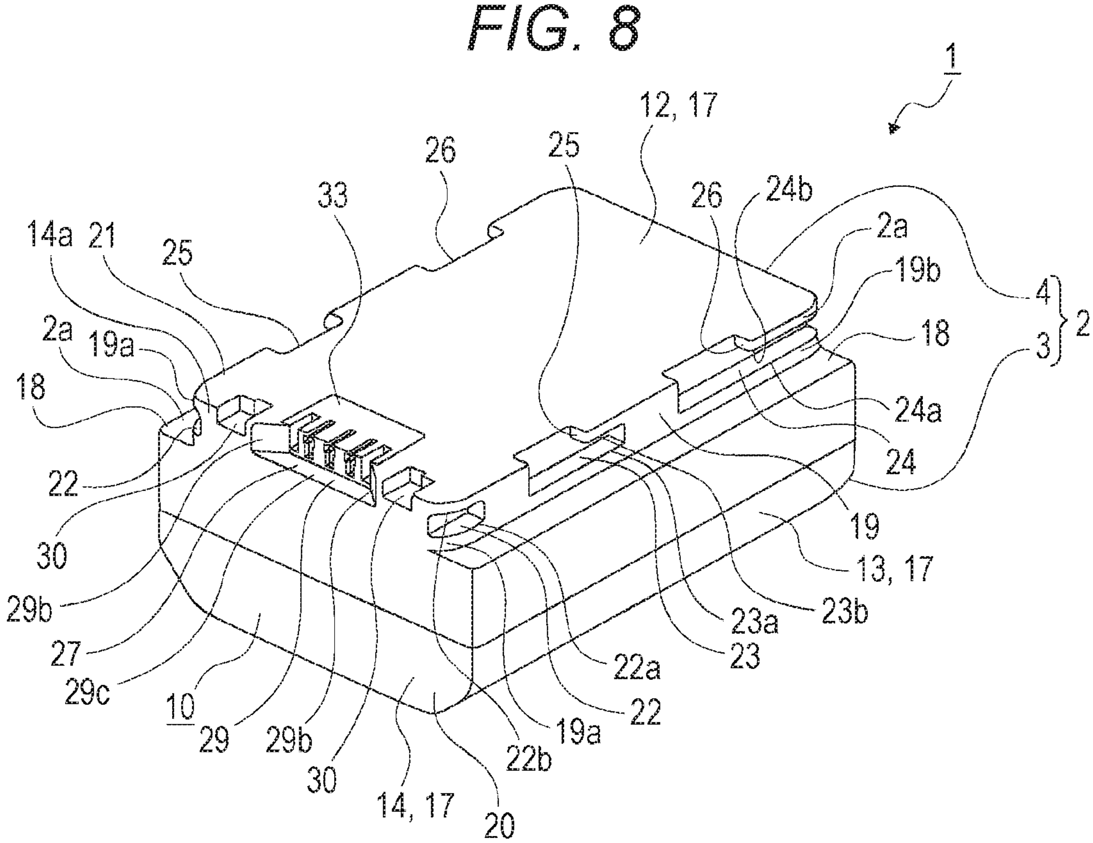
FIG. 8 is a perspective view of a battery that has a different configuration of a guide groove.

The first guided groove 22 is formed in a front end portion of the bottom part 21 and is open to the lateral side and the front side. The second guided groove 23 extends to the front and rear sides and is open to the lateral side. Here, in the casing 2, the second guided groove 23 may not be formed. In such a case, a portion in which the second guided groove 23 is formed is formed by a part of the groove forming face 19 and a part of the bottom face 12. The third guided groove 24 extends to the front and rear sides and is open to the lateral side. Here, the third guided groove 24 may have a shape that is also open to the rear side (see FIG. 8).

In the horizontal both side portions of the bottom part 21, in order from the front side, insertion grooves 25 and 25 and insertion grooves 26 and 26 are formed to be spaced apart from each other. Any one of the insertion grooves 25 and the insertion grooves 26 is open to the groove forming face 19. The insertion groove 25 is open to the lateral side, the upper side, and the lower side, and an upper-side opening communicates with an approximately half portion of the front side of the second guided groove 23. The insertion groove 26 is open to the lateral side, the upper side, and the lower side, and an upper-side opening communicates with an approximately half portion of the front side of the third guided groove 24.

Portions of the casing 2 between the lower edges 22*b* and 22*b* of the first guided grooves 22 and 22 and the bottom face 12 are arranged as first engagement claw parts 2*p* and 2*p*, portions of the casing 2 between the lower edges 23*b* and 23*b* of the second guided grooves 23 and 23 and the bottom face 12 are arranged as second engagement claw parts 2*q* and 2*q*, and portions of the casing 2 between the lower edges 24*b* and 24*b* of the third guided grooves 24 and 24 and the bottom face 12 are arranged as third engagement claw parts 2*r* and 2*r*. Any one of the first engagement claw parts 2*p* and the second engagement claw parts 2*q* is positioned on a further front face 14 side than the center in the front/rear directions of the casing 2, and the third engagement claw parts 2*r* are positioned on a further rear face 15 side than the center in the front/rear directions of the casing 2 or in an area of the rearmost side among areas acquired by equally dividing the casing 2 into three parts.

Figure 9:
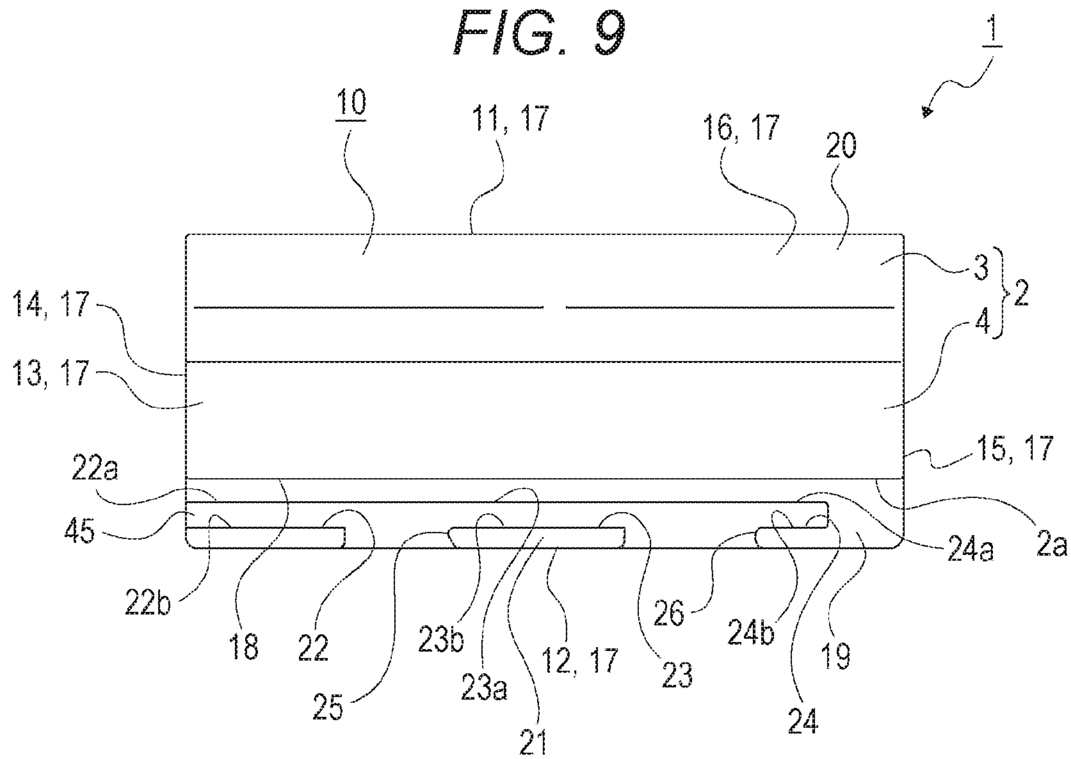
FIG. 9 is a side view of a battery that has a different configuration of a guide groove.
Figure 10:
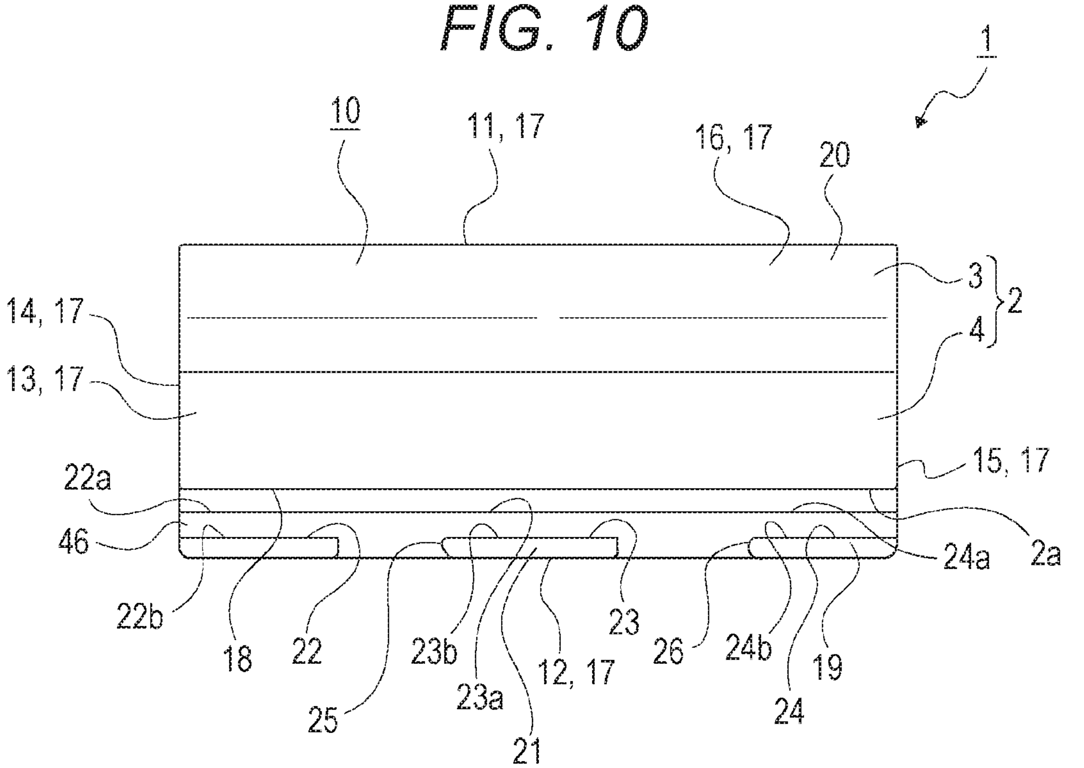
FIG. 10 is a side view of another battery that has a different configuration of a guide groove.

In addition, in the description presented above, while an example has been illustrated in which the first guided groove 22, the second guided groove 23, and the third guided groove 24 are formed to be spaced apart from each other to the front and rear sides, the first guided groove 22, the second guided groove 23, and the third guided groove 24 may be formed as one guide groove 45 (see FIG. 9). The guide groove 45 is formed from the front end to a position near the rear end in the groove forming face 19. Here, the first guided groove 22, the second guided groove 23, and the third guided groove 24 may be formed as one guide groove 46 (see FIG. 10). The guide groove 46 is formed over the front end to the rear end of the groove forming face 19.

In addition, in the description presented above, while an example has been illustrated in which the first guided groove 22, the second guided groove 23, and the third guided groove 24 are formed in each of the horizontal both sides of the casing 2, at least one of the first guided groove 22, the second guided groove 23, and the third guided groove 24 may be formed in each of the horizontal both sides of the casing 2.

Figure 11:
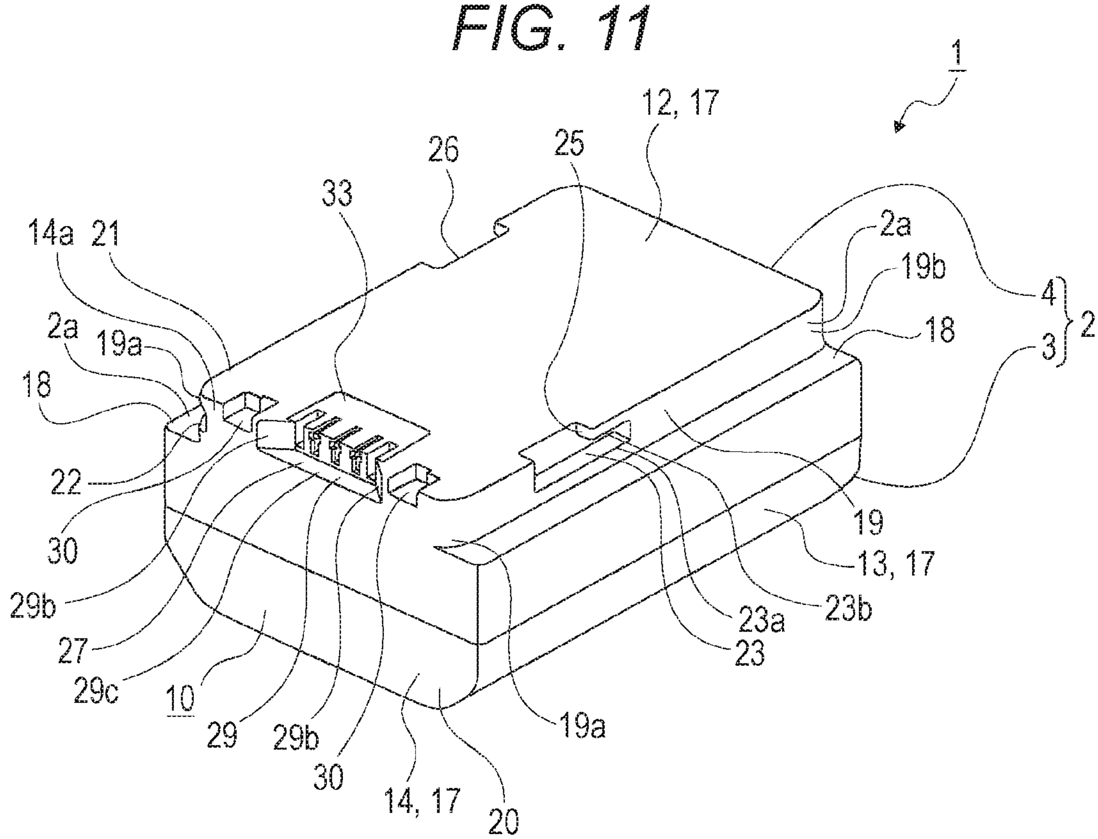
FIG. 11 is a perspective view of a battery that has a different configuration of a guide groove.
Figure 12:
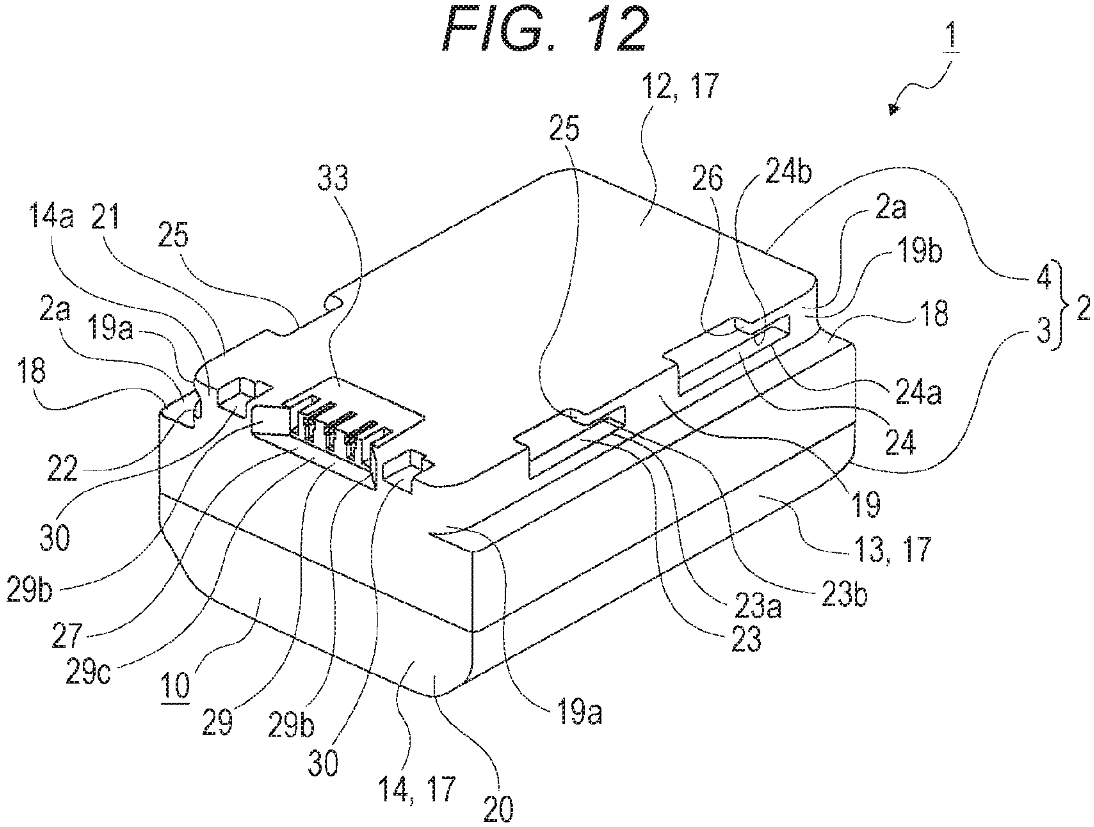
FIG. 12 is a perspective view of another battery that has a different configuration of a guide groove.
Figure 13:
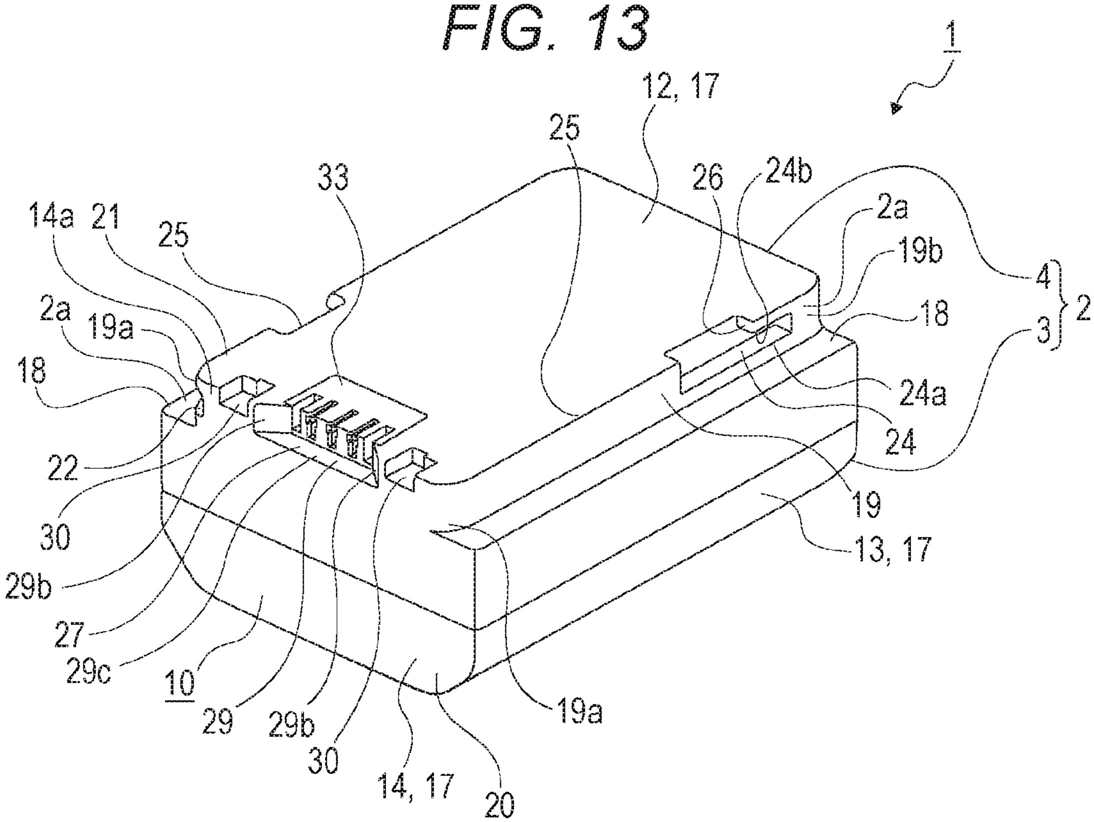
FIG. 13 is a perspective view of further another battery that has a different configuration of a guide groove.

For example, it may be configured such that only the first guided groove 22 and the third guided groove 24 are formed on one of the left and right sides, and only the second guided groove 23 is formed on the other of the left and right sides (see FIG. 11). In addition, for example, it may be configured such that only the first guided groove 22 and the second guided groove 23 are formed on one of the left and right sides, and only the second guided groove 23 and the third guided groove 24 are formed on the other of the left and right sides (see FIG. 12). Furthermore, for example, it may be configured such that only the first guided groove 22 and the second guided groove 23 are formed on one of the left and right sides, and only the third guided groove 24 is formed on the other of the left and right sides (see FIG. 13).

In addition, as examples of such a configuration, including the examples (see FIGS. 11 to 13) described above, there is an example in which only one guide groove among the first guided groove 22, the second guided groove 23, and the third guided groove 24 is formed on one of the left and right sides, and one, two, or three guide grooves among the first guided groove 22, the second guided groove 23, and the third guided groove 24 are formed on the other of the left and right sides. Furthermore, there is an example in which only any two guide grooves among the first guided groove 22, the second guided groove 23, and the third guided groove 24 are formed on one of the left and right sides, and only two or three guide grooves among the first guided groove 22, the second guided groove 23, and the third guided groove 24 are formed on the other of the left and right sides.

Figure 7:
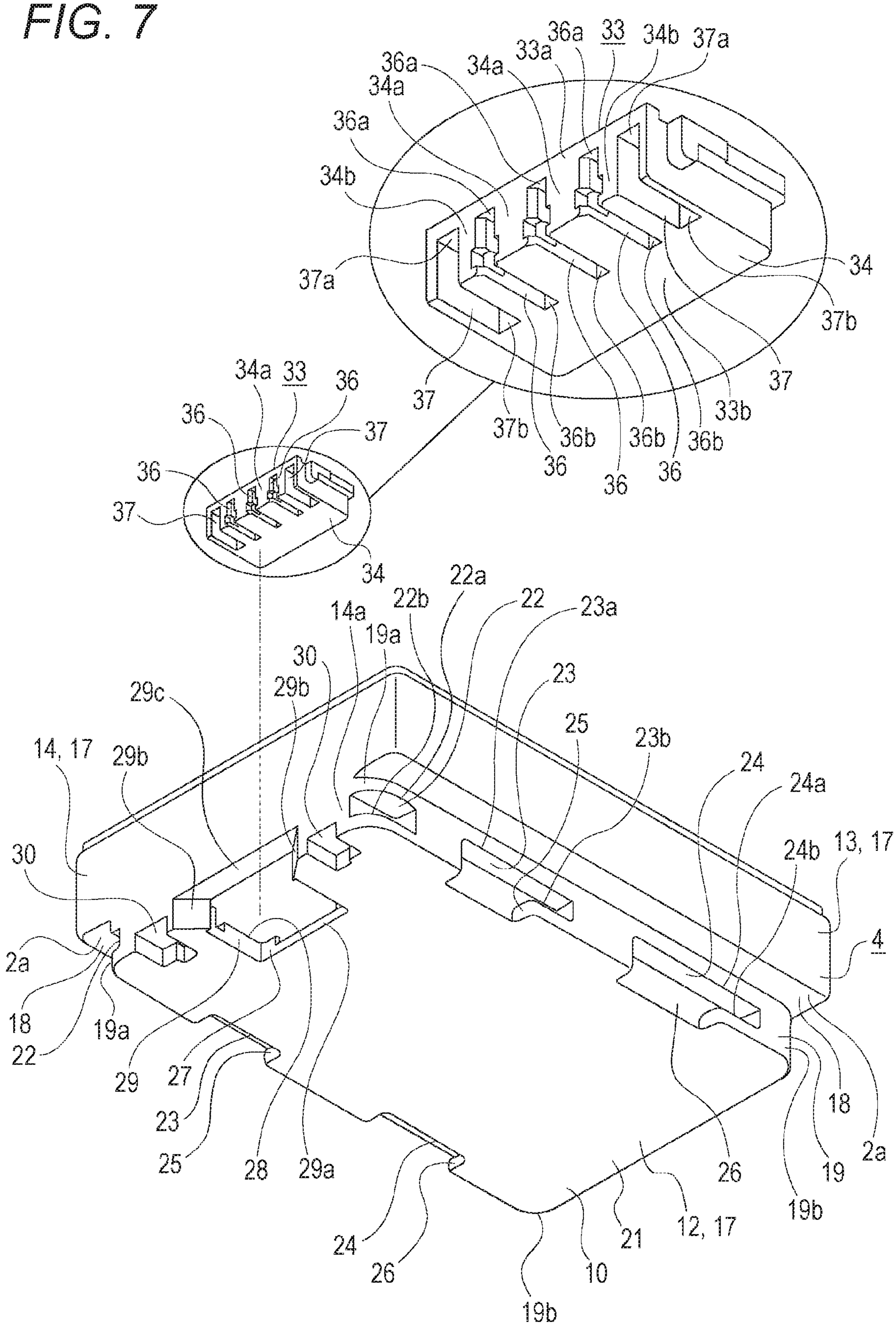
FIG. 7 is an exploded perspective view that illustrates a housing case and connectors of the battery.

In a front end portion of the bottom part 21, an arrangement concave part 27 is formed (see FIG. 7). The arrangement concave part 27 is formed at approximately center in the horizontal direction and is open to the front side and the lower side. In the casing 2, an arrangement hole 28 that communicates with portions other than the front end portion of the arrangement concave part 27 and allows vertical passing through is formed. Any one of the upper edge 22*a* of the first guided groove 22, the upper edge 23*a* of the second guided groove 23, and the upper edge 24*a* of the third guided groove 24 is positioned on a further lower side than the level difference face 18, and, between the first guided groove 22 and the level difference face 18, between the second guided groove 23 and the level difference face 18, and between the third guided groove 24 and the level difference face 18, a part of the groove forming face 19 is present in any one thereof (see FIGS. 2 to 7). Accordingly, any one of a distance from the lower end of the groove forming face 19 to the upper edge 22*a* of the first guided groove 22, a distance from the lower end of the groove forming face 19 to the upper edge 23*a* of the second guided groove 23, and a distance from the lower end of the groove forming face 19 to the upper edge 24*a* of the third guided groove 24 is shorter than a distance from the upper end to the lower end of the groove forming face 19. In addition, a vertical distance (groove width) of each of the first guided groove 22, the second guided groove 23, and the third guided groove 24 may be longer or smaller than a distance from the upper end of the groove forming face 19 to each of the upper edges 22*a*, 23*a*, and 24*a*, and the vertical distance of each of the first guided groove 22, the second guided groove 23, and the third guided groove 24 may be the same as a distance from the upper end of the groove forming face 19 to each of the upper edges 22*a*, 23*a*, and 24*a*. All of the lower edge 22*b* of the first guided groove 22, the lower edge 23*b* of the second guided groove 23, and the lower edge 24*b* of the third guided groove 24 are positioned above the lower edge of the groove forming face 19 and positioned at the same level in the vertical direction. In addition, corner portions 2*f* at which the level difference face 18 and the side face 13 intersect with each other may be chamfered, and the corner portions 2*f* extend in a direction from the front face 14 to the rear face 15 and may be of a length that is the same as or about ½ or ⅓ of the length of the casing 2. Furthermore, one corner portion 2*f* may be chamfered, or both corner portions 2*f* and 2*f* may be chamfered. The size of the chamfered width of each corner portion 2*f* may be the same as the size of the width of the level difference face 18 or may be smaller than the width of the level difference face 18.

In addition, a corner portion 2*g* at which the groove forming face 19 and the bottom face 12 intersect with each other may be chamfered. Furthermore, any or all of corner portions 2*h* and 2*h* between the first guided groove 22 and the second guided groove 23, corner portions 2*i* and 2*i* between the second guided groove 23 and the third guided groove 24, and a corner portion 2*j* between the third guided groove 24 and the rear face 15 may be chamfered. In such a case, one of the left and right sides of the casing 2 or the corner portions 2*g*, 2*h*, 2*i*, and 2*j* of left and right both sides may be chamfered.

The arrangement concave part 27 is formed by concave part forming faces 29. The concave part forming faces 29 are formed by a base portion 29*a*, wall portions 29*b* and 29*b*, and a middle portion 29*c*.

The base portion 29*a* is formed in the shape of "Π" open to the front side and is in a state facing the horizontal direction. The wall portions 29*b* and 29*b* are continuous from the front end of the base portion 29*a* and are formed as inclining faces spaced apart from each other in the left/right directions toward the front side. In other words, the wall portion 29*b* disposed on the left side is formed as an inclining face that further approaches the side face 13 disposed on the left side toward the front side, and the wall portion 29*b* disposed on the right side of wall portion 29*b* is formed as an inclining face further approaching the side face 13 disposed on the right side toward the front side. In addition, in the wall portions 29*b* and 29*b*, it may be configured such that one wall portion 29*b* is formed as an inclining face, and the other wall portion 29*b* is formed as a face toward the left side or the right side without inclining. The middle portion 29*c* is formed between the upper edges of the wall portions 29*b* and 29*b* facing the lower side. The wall portions 29*b* and 29*b*, for example, incline by 45 degrees with respect to faces facing the left and right directions. The middle portion 29*c* is positioned on a further lower side than the level difference face 18 and is positioned at an approximately same height as that of the upper edges 22*a*, 23*a*, and 24*a* of the first guided groove 22, the second guided groove 23, and the third guided groove 24 or is positioned on a further slightly lower side than the upper edges 22*a*, 23*a*, and 24*a*. In addition, the middle portion 29*c* may be positioned on a further upper side than the upper edges 22*a*, 23*a*, and 24*a*. In the front end portion of the bottom part 21, identification grooves 30 and 30 are formed to be spaced apart from each other to the left and right sides. The identification grooves 30 have a role as functional grooves having a predetermined function and, for example, are used for identifying the type of a charger or the like, which will be described later, functioning as a connection apparatus. Here, the functional grooves are not limited to the identification grooves 30, but, as the functional grooves, for example, grooves having functions other than an identifying function such as positioning grooves positioning the charger or the like or detection grooves detecting the connection state or the like of a charger or the like may be formed instead of the identification grooves 30.

Here, by configuring the predetermined function to be an identifying function identifying the type of connection apparatus, the type of connection apparatus is identified using the functional grooves, and, as a battery is mounted in a connection apparatus, or as a battery is in a state not mounted in the connection apparatus, the type of connection apparatus to which the battery is connected can be easily identified.

In addition, the predetermined function may be a function for identifying the type of battery.

The identification grooves 30 and 30 are formed on opposite sides having the arrangement concave part 27 interposed therebetween. The identification groove 30 is formed by continuously forming a first identification part 31 and a second identification part 32, which have different front/rear lengths, in the left/right directions.

The first identification part 31 and the second identification part 32 have roles as a first functional unit and a second functional unit.

Among faces forming the identification groove 30, a face, which is positioned on the upper side, facing the lower side is formed as an inner bottom face 30*a*. The inner bottom face 30*a* is positioned on a further lower side than the middle portion 29*c*, which is positioned on the upper side, facing the lower side among the concave part forming faces 29. Accordingly, a depth of the identification groove 30 in the vertical direction is smaller than the depth of the arrangement concave part 27 in the vertical direction. In addition, the inner bottom face 30*a* is positioned on a further lower side than the upper edges 22*a*, 23*a*, and 24*a* of the first guided groove 22, the second guided groove 23, and the third guided groove 24 and the level difference face 18. Furthermore, the inner bottom face 30*a* is positioned on a further upper side than the lower edges 22*b*, 23*b*, and 24*b* of the first guided groove 22, the second guided groove 23, and the third guided groove 24. However, the inner bottom face 30*a* may be positioned on a further lower side than the lower edges 22*b*, 23*b*, and 24*b* and may be positioned at a same height as that of the lower edges 22*b*, 23*b*, and 24*b*.

Among the faces forming the identification groove 30, a face, which is positioned on the rear side of the first identification part 31, facing the front side is formed as an inner bottom face 31*a*, and a face, which is positioned on the rear side of the second identification part 32, facing the front side is formed as an inner bottom face 32*a*. The inner bottom faces 31*a* and 32*a* are positioned on a further front side than a face, which is positioned on the rearmost side of the base portion 29*a*, facing the front side among the concave part forming faces 29 and is positioned on a further rear side than the front face of a connector 33. In addition, the inner bottom faces 31*a* and 32*a* are positioned on a further front side than an inner bottom face 36*a* of a terminal arrangement groove 36 and an inner bottom face 37*a* of the positioning groove 37. Furthermore, the inner bottom faces 31*a* and 32*a* are positioned on a further front side than the rear end edge of the first guided groove 22. Here, the inner bottom faces 31*a* and 32*a* may be positioned on a further rear side than the rear end edge of the first guided groove 22 and may be positioned at a same position as that of the rear end edge of the first guided groove 22 in the front/rear directions.

The first identification part 31 has a front/rear length longer than the second identification part 32, the inner bottom face 31*a* is positioned on a further rear side than the inner bottom face 32*a*, and the first identification part 31 is positioned on a further arrangement concave part 27 side than the second identification part 32. It can be stated that the second identification part 32 is positioned on a further side face 13 side than the first identification part 31. The second identification part 32 has a width in the horizontal direction that is smaller than the width of the first identification part 31 in the horizontal direction.

In the arrangement concave part 27 of the casing 2, the connector 33 is arranged. The connector 33 is a part that is connected to an electrode terminal of a charger, which will be described later, functioning as a connection apparatus or the like, functions as a terminal part and at least includes a positive electrode terminal and a negative electrode terminal.

The connector 33 includes a housing 34 formed using a non-conductive material and connection terminals 35, 35, and 35 formed using a conductive material, and at least parts of the connection terminals 35, 35, and 35 are held in the housing 34 in a state being arranged in the terminal arrangement grooves 36, 36, and 36 formed in the housing 34. The connection terminal 35 has one pair of contact parts in which one end portion of a metal piece horizontally branches at a predetermined portion, and the one pair of contact parts has elasticity in a direction in which tip end portions thereof contact each other and is arranged in the terminal arrangement groove 36 in a contacting state or an approaching state.

The connection terminals 35, 35, and 35 respectively function as a positive electrode terminal, a negative electrode terminal, and an information terminal and has an arrangement in which the positive electrode terminal, the information terminal, and the negative electrode terminal are aligned in order from the left side or an arrangement in which the positive electrode terminal, the information terminal, and the negative electrode terminal are aligned in order from the right side.

The information terminal is used not only for a connection apparatus to be described later to recognize the internal temperature of the battery 1 but also for the connection apparatus to recognize various kinds of information of the battery 1 such as a charge residual amount or degradation information of the battery 1.

In addition, in the connector 33, two terminal arrangement grooves 36 and 36 and two connection terminals 35 and 35 may be disposed. In a case where two connection terminals 35 and 35 are disposed, the two connection terminals 35 and 35 respectively function as a positive electrode terminal and a negative electrode terminal and have an arrangement in which the positive electrode terminal and the negative electrode terminal are aligned in order from the left side or an arrangement in which the positive electrode terminal and the negative electrode terminal are aligned from the right side. Furthermore, in the connector 33, four terminal arrangement grooves 36, 36, . . . and four connection terminals 35, 35, . . . may be disposed. In a case where four connection terminals 35 and 35 are disposed, the four connection terminals 35, 35, . . . respectively function as a positive electrode terminal, a negative electrode terminal, an information terminal, and a communication terminal and have an arrangement in which the positive electrode terminal, the information terminal, the communication terminal, and the negative electrode terminal are aligned in order from the left side, an arrangement in which the positive electrode terminal, the information terminal, the communication terminal, and the negative electrode terminal are aligned in order from the right side, an arrangement in which the positive electrode terminal, the communication terminal, the information terminal, and the negative electrode terminal are aligned in order from the left side, or an arrangement in which the positive electrode terminal, the communication terminal, the information terminal, and the negative electrode terminal are aligned in order from the right side. The communication terminal is used for a connection apparatus to recognize various kinds of information of the battery 1 such as a charge residual amount and degradation information of the battery 1, and, in such a case, the information terminal is used only for informing the connection apparatus of temperature information.

The terminal arrangement grooves 36, 36, and 36 are open to the front side and the lower side and are formed to be horizontally spaced apart from each other. In the housing 34, on the outer side of the terminal arrangement grooves 36, 36, and 36 in the horizontal direction, positioning grooves 37 and 37 that are open to the front side and the lower side are formed.

Portions of the connector 33 between the terminal arrangement grooves 36, 36, and 36 in the housing 34 are disposed as terminal separation ribs 34*a* and 34*a*, and portions between the terminal arrangement grooves 36 and 36 and the positioning grooves 37 and 37 in the housing 34 are disposed as inter-groove ribs 34*b* and 34*b*. A horizontal width of the terminal separation rib 34*a* is configured to be larger than a horizontal width of the inter-groove rib 34*b* such that a contact between the connection terminals 35, 35, and 35 can be prevented. A face positioned on the most top face 11 side of the terminal arrangement groove 36 and a face positioned on the most top face 11 side of the positioning groove 37 are respectively formed as inner bottom faces 36*a* and 37*a*, and the inner bottom faces 36*a* and 37*a* have vertical positions that are approximately the same. The inner bottom faces 36*a* and 37*a* are positioned on a further lower side than the level difference face 18. In addition, the inner bottom faces 36*a* and 37*a* are positioned on a further lower side than the upper edge 22*a* of the first guided groove 22, the upper edge 23*a* of the second guided groove 23, and the upper edge 24*a* of the third guided groove 24 and is positioned on a further upper side than the lower edge 22*b* of the first guided groove 22, the lower edge 23*b* of the second guided groove 23, and the lower edge 24*b* of the third guided groove 24. The connection terminal 35 can be elastically transformed in an approximately horizontal direction and is held in the housing 34 in the state being inserted into the terminal arrangement groove 36.

Figure 14:
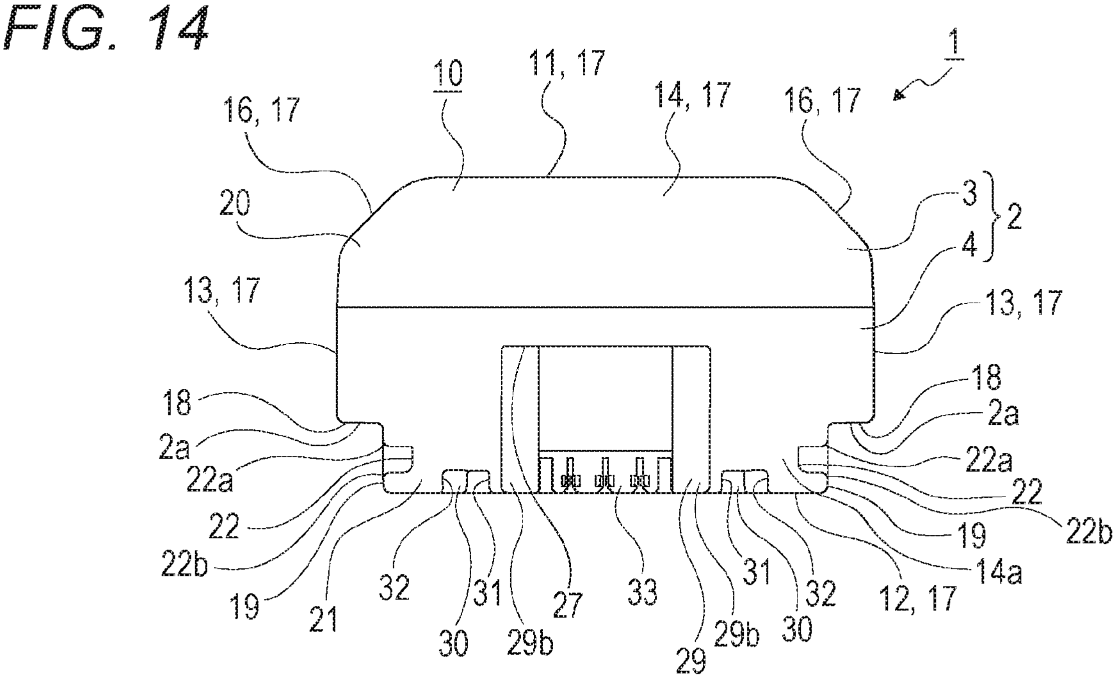
FIG. 14 is a front view of a battery that has a different configuration of an arrangement concave part.

In addition, in the description presented above, while an example is illustrated in which the upper ends of the wall portions 29*b* and 29*b* and the middle portion 29*c* are positioned at a same height as that of the upper end of the housing 34 of the connector 33 on the concave part forming face 29. For example, the upper ends of the wall portions 29*b* and 29*b* and the middle portion 29*c* may be positioned on a further upper side than the upper end of the housing 34 (see FIG. 14). In such a case, the upper ends of the wall portions 29*b* and 29*b* and the middle portion 29*c* may be positioned at arbitrary positions among positions disposed on a further lower side than the upper end of the casing 2.

Figure 15:
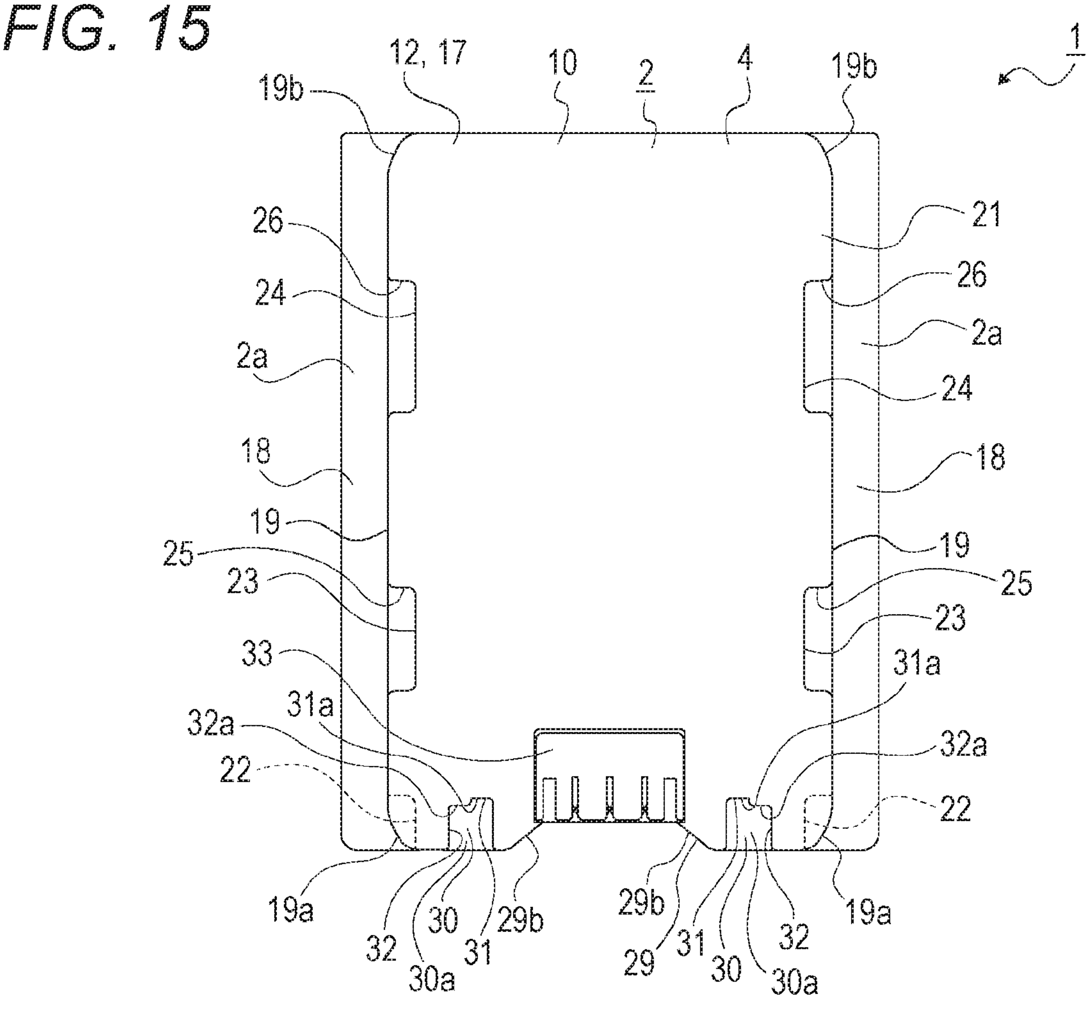
FIG. 15 is a bottom view of another battery that has a different configuration of an arrangement concave part.
Figure 16:
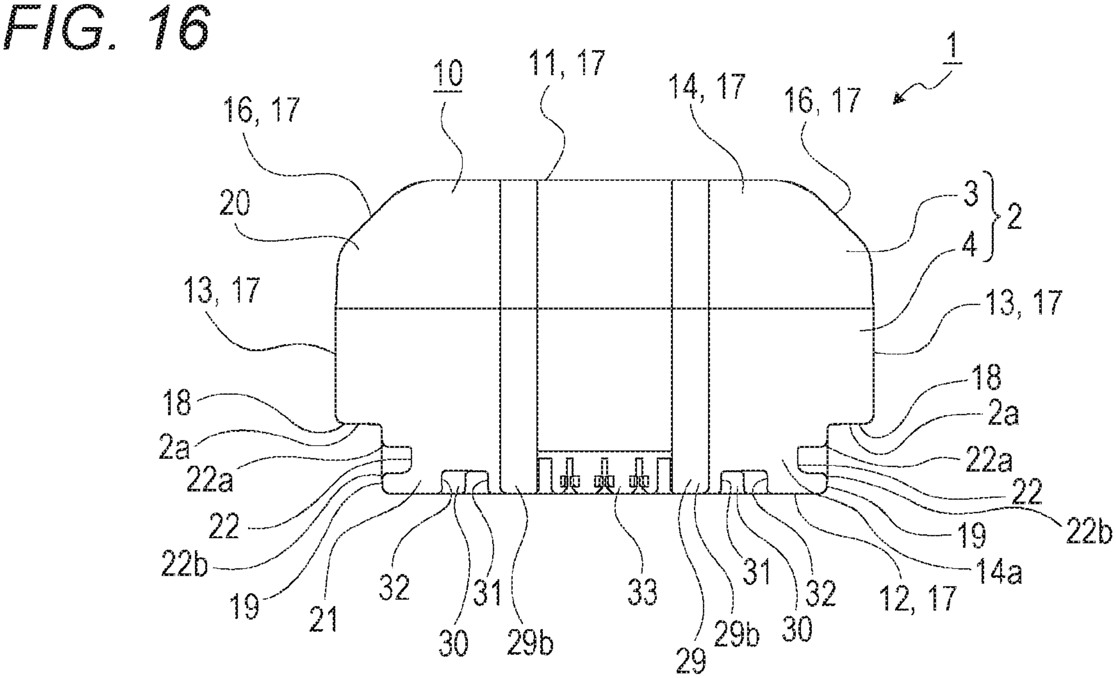
FIG. 16 is a front view of another battery that has a different configuration of an arrangement concave part.
Figure 17:
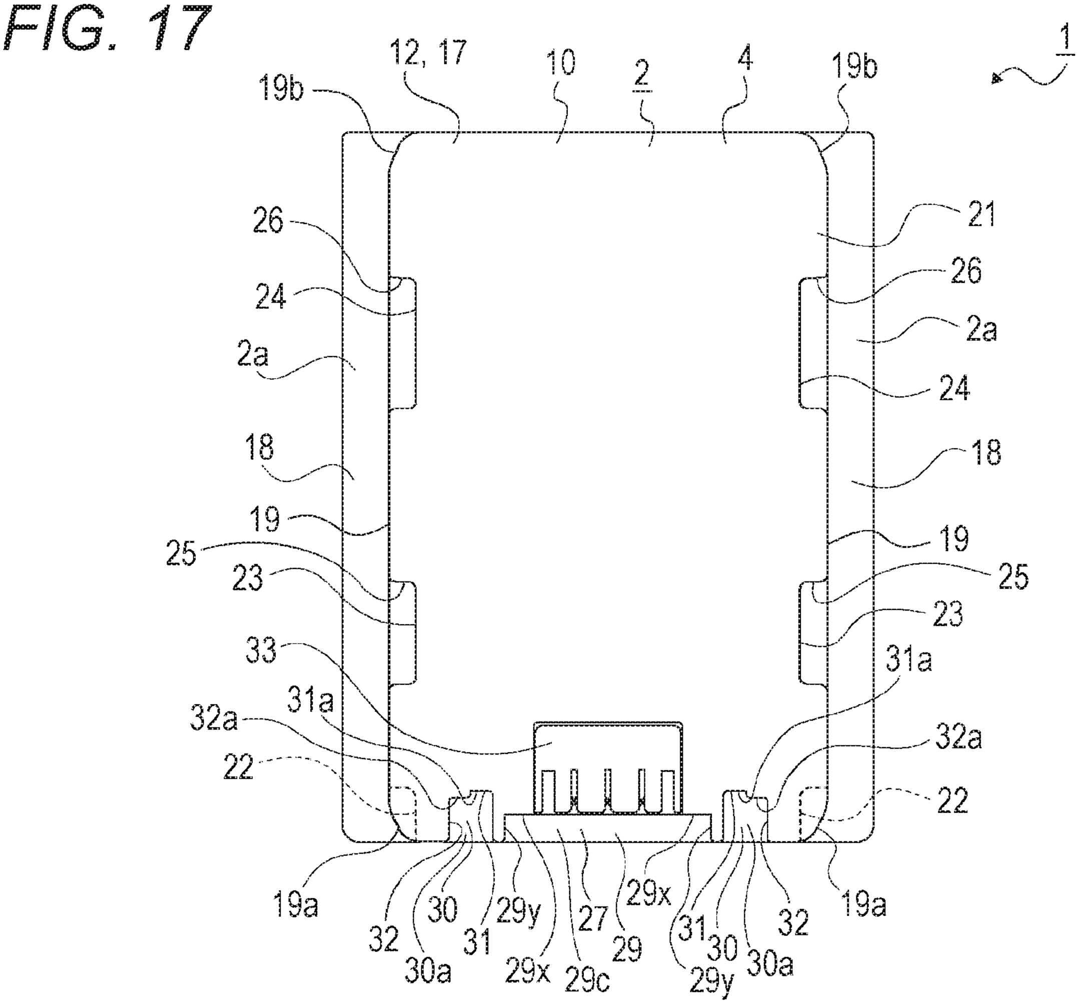
FIG. 17 is a bottom view of further another battery that has a different configuration of an arrangement concave part.
Figure 18:
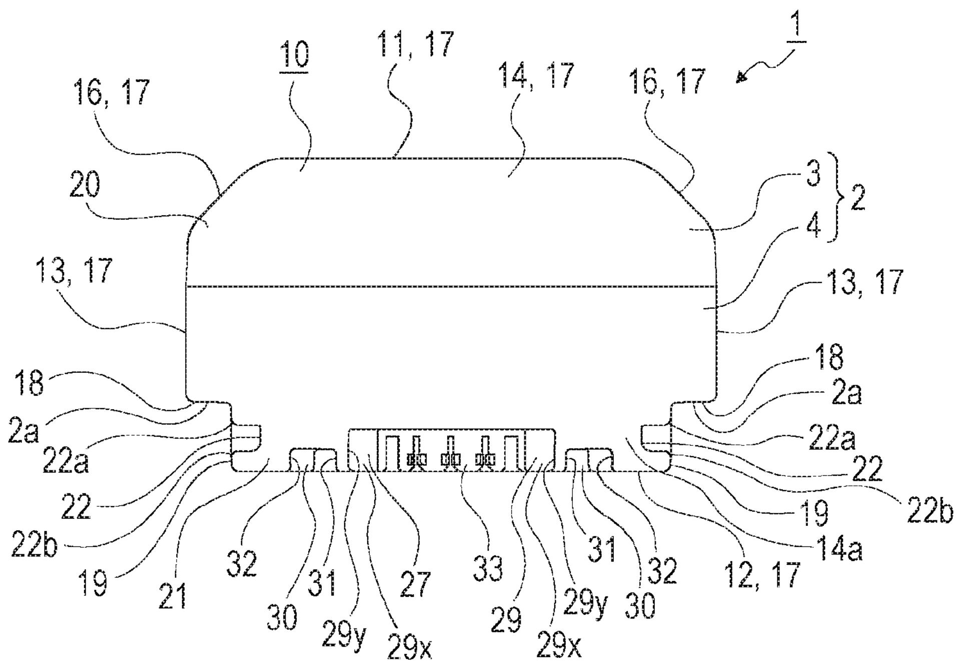
FIG. 18 is a front view of further another battery that has a different configuration of an arrangement concave part.

In addition, on the concave part forming face 29, for example, it may be configured such that the middle portion 29*c* is not present, and the wall portions 29*b* and 29*b* are formed at positions ranging from the upper end to the lower end of the casing 2 (see FIGS. 15 and 16). Furthermore, the wall portions 29*b* and 29*b* inclining to the front, rear, left, right sides may not be formed, but, instead of the wall portions 29*b* and 29*b*, first wall face portions 29*x* and 29*x* facing the front side and second wall face portions 29*y* and 29*y* that are continuous from horizontal outer frames of the first wall face portions 29*x* and 29*x* and face each other in the horizontal direction may be formed (see FIGS. 17 and 18). In addition, the first wall face portions 29*x* and 29*x* and the second wall face portions 29*y* and 29*y* may incline at an arbitrary angle in the horizontal direction, the front/rear direction, or the vertical direction.

The connector 33 is connected to the circuit substrate 9 in which one end portions of the connection terminals 35, 35, and 35 are arranged inside the casing 2 through the arrangement hole 28.

The front face 33*a* is positioned on a further rear side than the front face 14 of the casing 2 in a state in which the connector 33 is arranged in the arrangement concave part 27. The connector 33 is positioned in an area of the arrangement concave part 27 that is surrounded by the base portion 29*a* of the concave part forming face 29 and, on the front side of the connector 33, the wall portions 29*b* and 29*b* and the middle portion 29*c* of the concave part forming face 29 are positioned. The lower face 33*b* is positioned on a same plane as that of the bottom face 12 of the casing 2 in a state in which the connector 33 is arranged in the arrangement concave part 27.

Example of Configuration of Connection Apparatus

Next, as an example of the connection apparatus to which the battery 1 is connected, an imaging apparatus (still camera) 50 will be described (see FIGS. 19 to 21).

Figure 19:
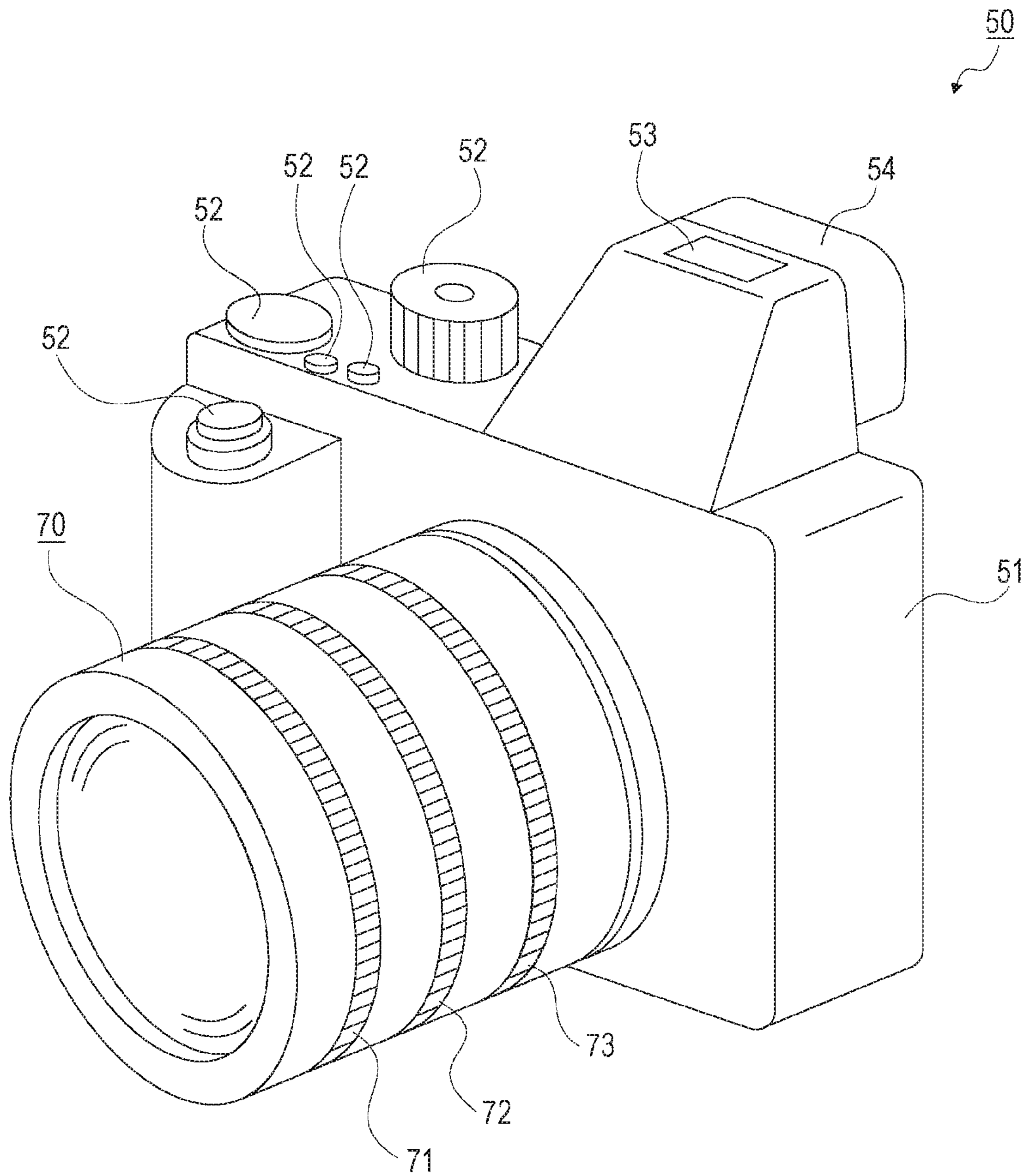
FIG. 19 is a perspective view of an imaging apparatus.

The imaging apparatus 50 is formed, for example, by arranging units necessary for the inside and the outside of a flat external casing 51 that is horizontally long (see FIG. 19). An interchangeable lens 70 and an accessory such as an adaptor not illustrated in the drawing can be detachably attached to the imaging apparatus 50. In the interchangeable lens 70, operation rings 71, 72, and 73 that are operated to rotate are arranged. The operation rings 71, 72, and 73 function as a focus ring used for focusing, a zoom ring used for adjusting a viewing angle, and an iris ring used for adjusting a light intensity.

On an upper face of the external casing 51, various operation units 52, 52, . . . are arranged. As the operation units 52, 52, . . . , for example, a photographing button, a zoom knob, a power button, a mode selection knob, and the like are arranged. In an upper end portion of the external casing 51, a flash 53 that can be taken in or out is arranged.

In the upper end portion of the external casing 51, a finder 54 is arranged on the rear side of the flash 53. On a rear face of the external casing 51, a display 55 and various operation units 52, 52, . . . are arranged (see FIG. 20).

Inside the external casing 51, imaging devices not illustrated in the drawing are arranged. As the imaging device, for example, a charge coupled device (CCD), a complementary metal-oxide semiconductor (CMOS), or the like is used.

Figure 20:
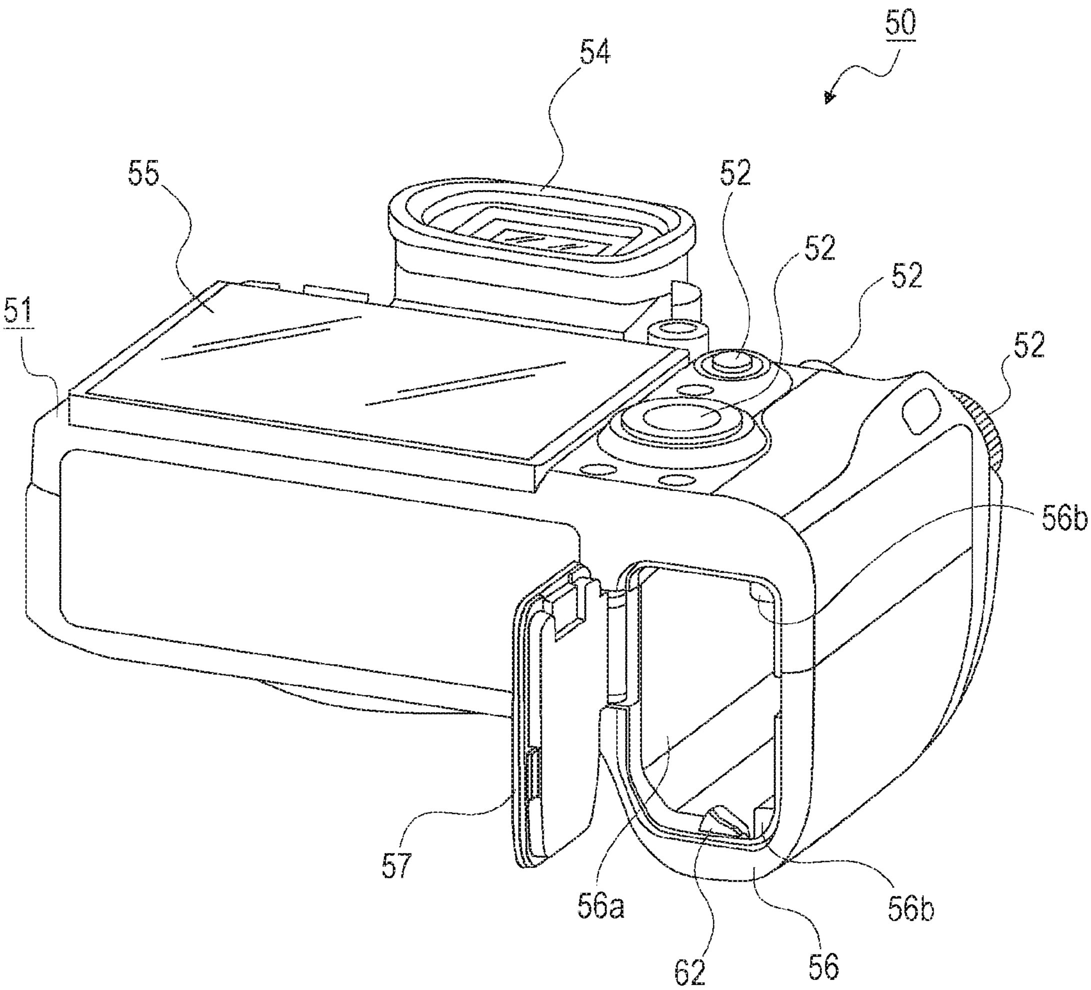
FIG. 20 is a perspective view that illustrates a state of an imaging apparatus in which a mounting space is open.
Figure 21:
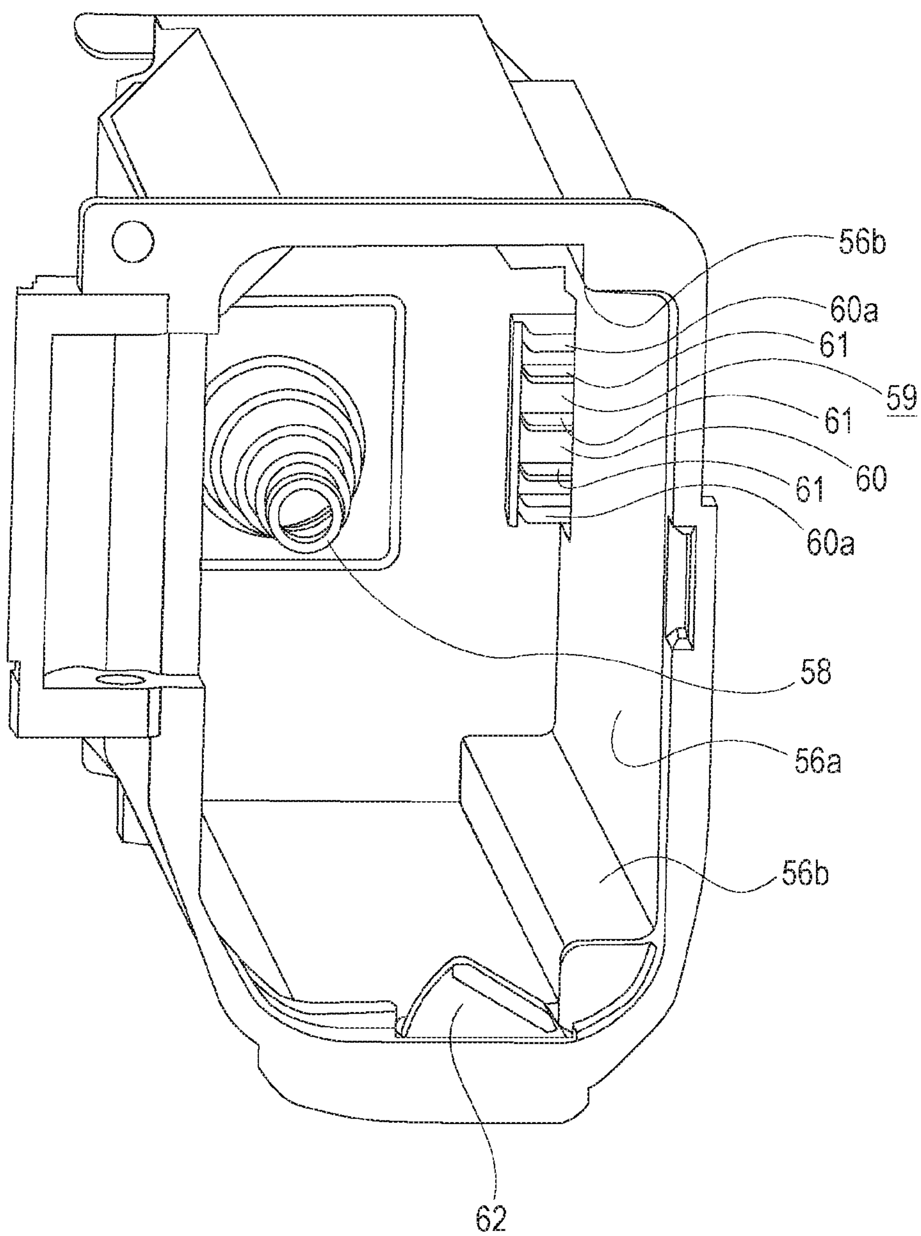
FIG. 21 is a perspective view that illustrates the internal structure of a battery mounting unit.

In a rear portion disposed on a further rear side than a mount (not illustrated in the drawing) to which the interchangeable lens is connected in one end portion of the imaging apparatus 50 in the horizontal direction and the imaging device, a battery mounting unit 56 is arranged (see FIGS. 20 and 21).

The battery mounting unit 56 includes a part of the external casing 51 and a lid body 57 that is rotatable in a lower end portion of the external casing 51. The internal space of the battery mounting unit 56 is formed as a mounting space 56*a*, and the mounting space 56*a* is open to the lower side.

In an inner portion (upper end portion) of the battery mounting unit 56, a biasing spring 58 and a terminal connecting unit 59 are arranged. The terminal connecting unit 59 includes a holding portion 60 formed using a non-conductive material and electrode terminals 61, 61, and 61 formed using a conductive material and is held by the holding portion 60 in a state in which the electrode terminals 61, 61, and 61 are horizontally spaced apart from each other.

In the holding portion 60, positioning protruding portions 60*a* and 60*a* are arranged outside the electrode terminals 61, 61, and 61 in the horizontal direction.

One end portions of the electrode terminals 61, 61, and 61 of the terminal connecting unit 59 are connected to a control substrate, which is not illustrated in the drawing, arranged inside the external casing 51.

In a lower end portion of the battery mounting unit 56, a pressing lever 62 is supported to be rotatable by the opening edge of the mounting space 56*a*. The pressing lever 62 can rotate between a pressing position and a non-pressing position and, for example, is biased by a spring not illustrated in the drawing in a direction from the non-pressing position to the pressing position.

Inside the battery mounting unit 56, erroneous insertion preventing protruding portions 56*b* and 56*b* are arranged. In the battery mounting unit 56, a locking mechanism that locks the lid body 57 in a closed state of the mounting space 56*a* is arranged.

<Battery Mounting for Connection Apparatus (Imaging Apparatus)>

Figure 22:
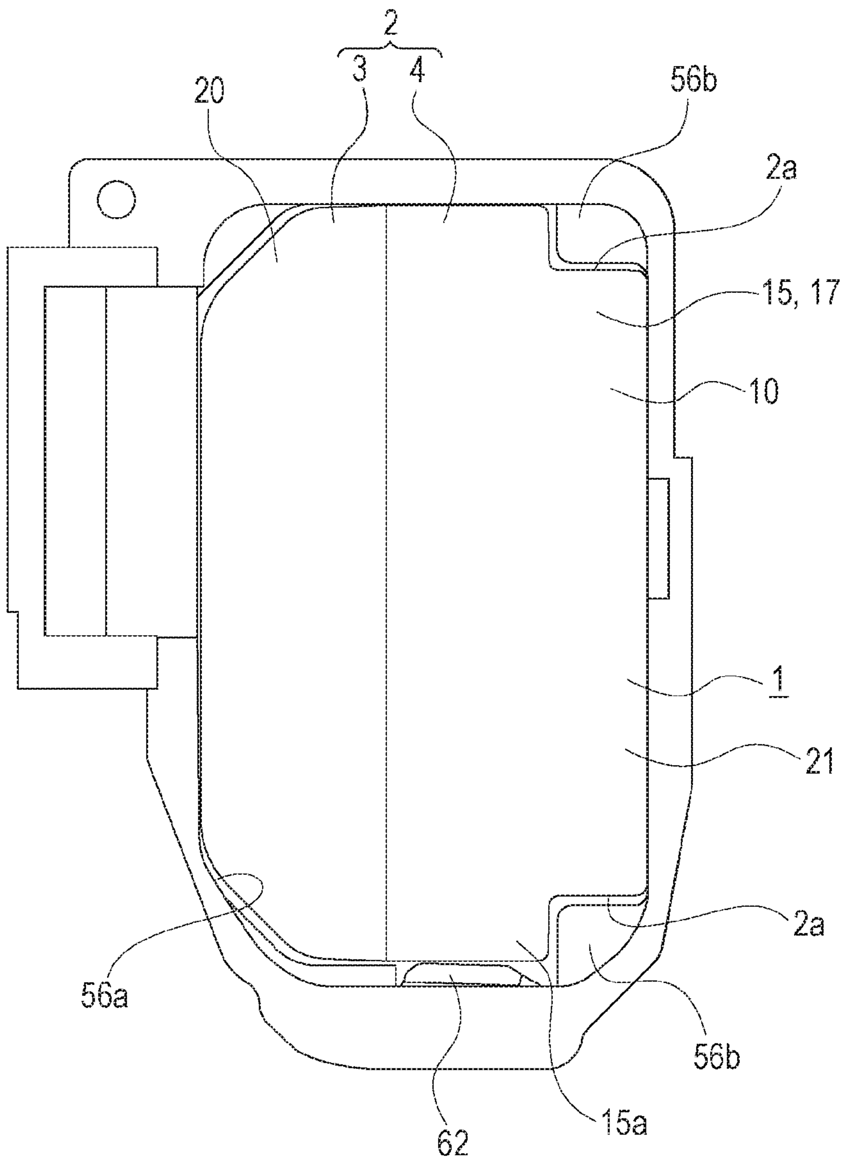
FIG. 22 is a bottom view that illustrates a state in which a battery is inserted into a mounting space of a battery mounting unit.

Hereinafter, the mounting of the battery 1 in the battery mounting unit 56 of the imaging apparatus 50 will be described (see FIGS. 22 to 24).

A user can mount the battery 1 in the battery mounting unit 56 by inserting the battery 1 into the mounting space 56*a* in a state in which the lid body 57 is open. The battery 1 is inserted into the mounting space 56*a* from the front face 14 side (see FIG. 22). At this time, the battery 1 is inserted into the mounting space 56*a* in a direction in which the notches 2*a* and 2*a* match the erroneous insertion preventing protruding portions 56*b* and 56*b*. Accordingly, when the battery 1 is attempted to be inserted into the mounting space 56*a* in a direction in which the notches 2*a* and 2*a* do not match the erroneous insertion preventing protruding portions 56*b* and 56*b*, a part of the casing 2, for example, the inclining face 16 that is a corner portion formed by the top face 11 and the side face 13 is brought into contact with the erroneous insertion preventing protruding portions 56*b* and 56*b*, and erroneous insertion of the battery 1 into the mounting space 56*a* is prevented.

The insertion of the battery 1 into the mounting space 56*a* is performed in a state in which the pressing lever 62 is rotated up to the non-pressing position. When the battery 1 is inserted into the mounting space 56*a*, a state is formed in which the pressing lever 62 is slid to one side face 13 of the battery 1, and the rotation of the pressing lever 62 to the pressing position is regulated.

The connection terminals 35, 35, and 35 of the connector 33 of the battery 1 inserted into the mounting space 56*a* are connected to the electrode terminals 61, 61, and 61 of the terminal connecting unit 59. At this time, the electrode terminal 61 is inserted between one pair of contact portions that branches to the left and right sides of the connection terminal 35 and has elasticity in a contacting direction, and the connection terminal 35 is connected to the electrode terminal 61 in a state in which the one pair of contact portions has the electrode terminal 61 interposed therebetween from both the left and right sides. In addition, at this time, the positioning protruding portions 60*a* and 60*a* of the terminal connecting unit 59 are inserted into the positioning grooves 37 and 37 of the connector 33, whereby the connector 33 is positioned with respect to the terminal connecting unit 59.

Figure 23:
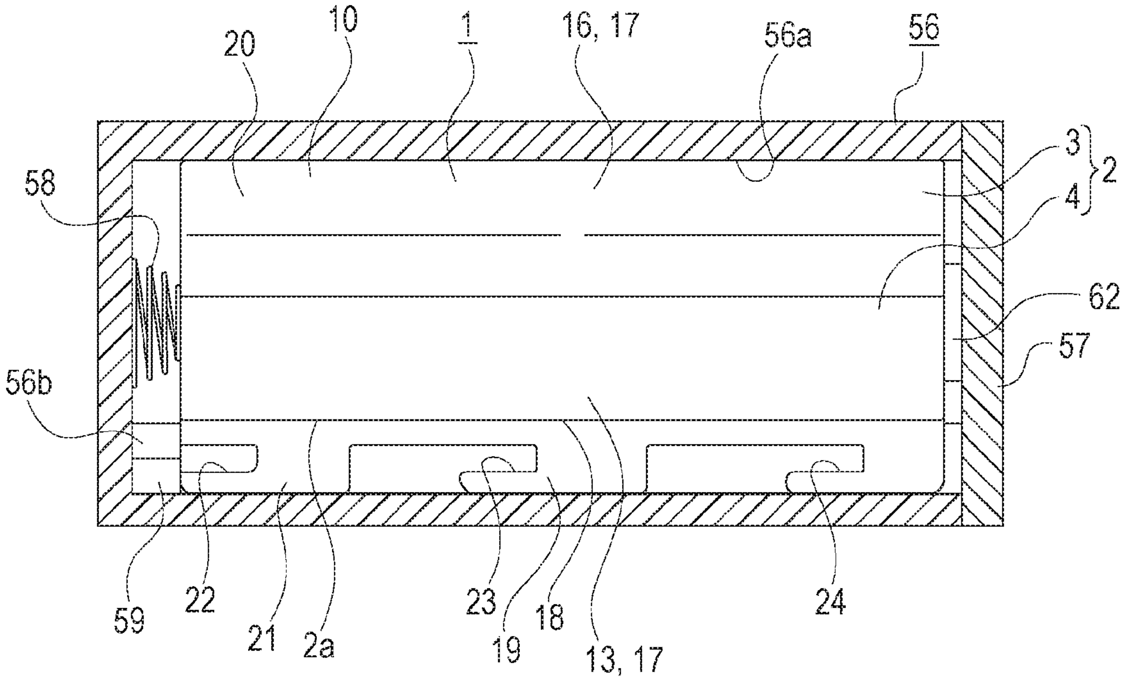
FIG. 23 is a cross-sectional view that illustrates a state in which a battery is mounted in a battery mounting unit.
Figure 24:
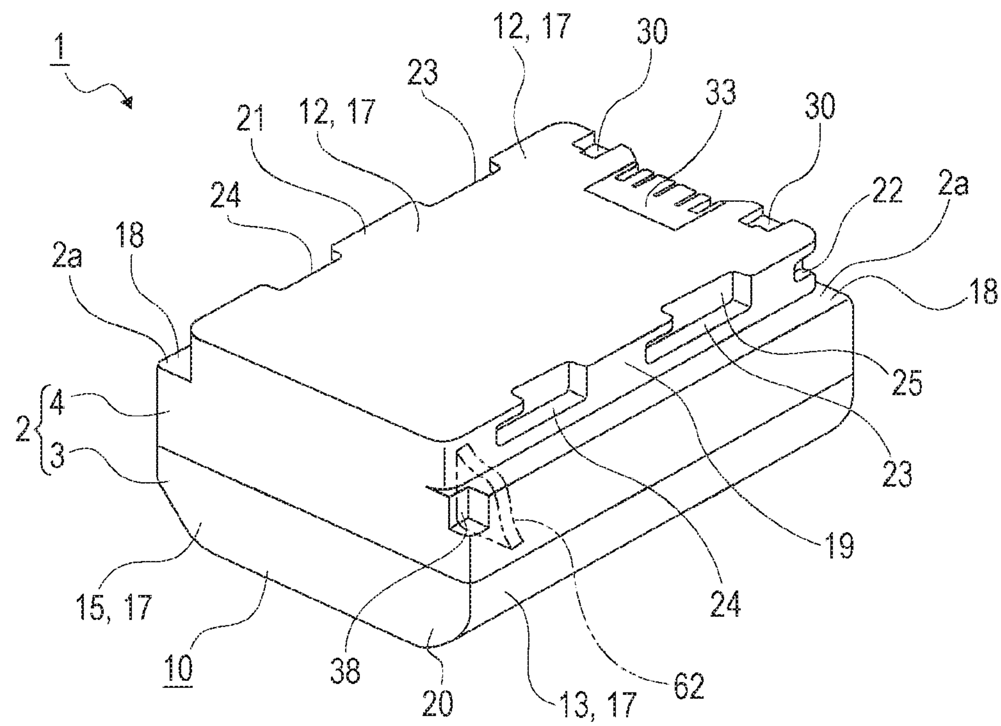
FIG. 24 is a perspective view that illustrates a state in which a concave part pressed to a rear end portion of a battery is formed, and the battery is pressed to a pressing lever.

In a state in which the connection terminals 35, 35, and 35 are respectively connected to the electrode terminals 61, 61, and 61, the rear face 15 is positioned on a further inner side than the pressing lever 62 in the mounting space 56*a*, the pressing lever 62 rotates up to the pressing position in accordance with a biasing force of the spring, and the front face 14 is pressed by the biasing spring 58 to bias the battery 1 to the rear side (see FIG. 23). Accordingly, a pressed portion 15*a* (see FIG. 22) disposed on the rear face 15 is pressed by the pressing lever 62, the battery 1 is regulated not to be dropped out from the mounting space 56*a*. The pressed portion 15*a* is positioned on a further top face 11 side than the notch 2*a*.

As described above, in the state in which the drop-out of the battery 1 from the mounting space 56*a* is regulated by the pressing lever 62, by closing the mounting space 56*a* by using the lid body 57, the battery 1 is mounted in the battery mounting unit 56. At this time, the lid body 57 is locked to the external casing 51 by the locking mechanism.

On the other hand, by opening the mounting space 56*a* by releasing the locking of the lid body 57 with respect to the external casing 51 and rotating the lid body 57 and rotating the pressing lever 62 up to the non-pressing position, the battery 1 can be taken out from the battery mounting unit 56 by drawing out the battery 1 from the mounting space 56*a*.

In addition, in the description presented above, while an example has been illustrated in which the drop-out of the battery 1 from the mounting space 56*a* is regulated by pressing the pressed portion 15*a* of the rear face 15 to the pressing lever 62. For example, a configuration may be employed in which a pressed concave part 38 that is open at least to the rear side is formed in a rear end portion of the battery 1, a part of the pressing lever 62 is inserted into the pressed concave part 38, and the drop-out of the battery 1 from the mounting space 56*a* is regulated (see FIG. 24).

In this way, by forming the pressed concave part 38 into which a part of the pressing lever 62 is inserted in the battery 1, the pressing lever 62 can be positioned on the inside of the mounting space 56*a*, and the size of the imaging apparatus 50 can be decreased by that much.

Another Example of Configuration of Connection Apparatus

Next, as another example of a connection apparatus to which the battery 1 is connected, a charger 80 will be described (see FIGS. 25 to 29). In addition, while the charger 80 is an apparatus that is separate from the imaging apparatus 50 and the like, a connection structure of the charger 80 illustrated below may be integrally arranged in various apparatuses such as an imaging apparatus and the like. Thus, the battery 1 can be connected to an imaging apparatus or the like to which the connection structure of the charger 80 represented below is disposed.

The charger 80 is formed by arranging necessary units inside and outside a casing 81. In the charger 80, the connection structure represented below is arranged.

The casing 81 is formed in an approximately rectangular parallelepiped shape, one approximately half portion in the horizontal direction is arranged as a mechanism arranging unit 82, and the other approximately half portion in the horizontal direction is arranged as a battery mounting unit 83.

Inside the mechanism arranging unit 82, a substrate, a light emitting body such as a light emitting diode, and the like, which are not illustrated in the drawing, are arranged. In an upper face portion of the mechanism arranging unit 82, window portions 82*a* and 82*b* are arranged. Light emitted from a light emitting diode through the window portions 82*a* and 82*b* is emitted toward the outside, the state of a charging operation, the state of a charged amount, and the like can be recognized on the basis of the state of emission through the window portions 82*a* and 82*b*.

In the battery mounting unit 83, a mounting concave part 83*a* that is open to the upper side and the rear side is formed. In both horizontal side portions of the mounting concave part 83*a*, step portions 84 and 84 are arranged, and the step portions 84 and 84 are formed in a shape protruding to the upper side and extending to the front and rear sides. The step portions 84 and 84 include flat faces 84*a* and 84*a* facing the upper side and opposing faces 84*b* and 84*b* that are continuous from the inner edges of the flat faces 84*a* and 84*a* and face each other. In addition, while a battery having a configuration in which only one notch 2*a* is formed in the casing is present, in the case of the battery mounting unit in which such a battery is mounted, one end portion 84 may be arranged.

The mounting concave part 83*a*, in addition to the step portions 84 and 84, includes face portions including a bottom plate face portion 85, which is positioned between the step portions 84 and 84, facing the upper side and a front plate face portion 86 facing the rear side, and the front plate face portion 86 is continuous from the front edges of the step portions 84 and 84 and the front edge of the bottom plate face portion 85. In the step portions 84 and 84, in order from the front side, first guide engaging parts 87 and 87, second guide engaging parts 88 and 88, and third guide engaging parts 89 and 89 are respectively disposed to be spaced apart from each other to the front and rear sides. Each of the first guide engaging parts 87 and 87, the second guide engaging parts 88 and 88, and third guide engaging parts 89 and 89 protrudes from the opposing faces 84*b* and 84*b* in a direction approaching each other.

The first guide engaging part 87 is formed in a protruding shape extending to the front and rear sides, and the front end is continuous from the front plate face portion 86 and protrudes from a middle portion of the opposing face 84*b* in the vertical direction. The second guide engaging part 88 is formed in a protruding shape extending to the front and rear sides and is positioned at a same height as that of the first guide engaging part 87. The third guide engaging part 89 is formed by an engagement portion 89*a* extending to the front and rear sides and a vertical wall portion 89*b* protruding from the front end portion of the engagement portion 89*a* to the lower side, and the lower end of the vertical wall portion 89*b* is continuous from the bottom plate face portion 85.

In addition, in a case where a battery of a type in which guided grooves are formed to be horizontally alternating such that only a first guided groove 22 and a third guided groove 24 are formed on one of the left and right sides, and only a second guided groove 23 is formed on the other of the left and right sides is mounted, only guide engaging parts corresponding to the guided grooves may be arranged. For example, in a case where a battery in which only the first guided groove 22 and the third guided groove 24 are formed on one of the left and right sides, and only the second guided groove 23 is formed on the other of the left and right sides is mounted, it may be configured such that only a first guide engaging part 87 and a third guide engaging part 89 are arranged on one of the left and right sides, and only a second guide engaging part 88 is arranged on the other of the left and right sides.

In the battery mounting unit 83, an identification protruding portion 90 protruding from the front end portion of the bottom plate face portion 85 to the upper side is arranged. In the identification protruding portion 90, a long portion 90*a* and a short portion 90*b* having mutually-different lengths in the front/rear direction are continuously arranged horizontally, and the length of the long portion 90*a* in the front/rear direction is longer than the length of the short portion 90*b* in the front/rear direction. The horizontal width of the long portion 90*a* is smaller than the horizontal width of the short portion 90*b*.

The identification protruding portion 90 has a front end to be continuous from the front plate face portion 86 and is arranged at a position near the first guide engaging part 87 of one of the left and right sides. More specifically, the identification protruding portion 90 is positioned on a further side of the first guide engaging part 87 of the one side than the center of a gap between the center of the bottom plate face portion 85 and the first guide engaging part 87 of the one side in the horizontal direction and is positioned on a further side of the first guide engaging part 87 of the one side than the center of a gap between the terminal connecting unit 93 and the first guide engaging part 87 of the one side. In the identification protruding portion 90, the short portion 90*b* is positioned on a further side of the first guide engaging part 87 of the one side than the long portion 90*a*.

In the front end portion of the battery mounting unit 83, a detection protruding portion 91 that can be moved to the front and rear sides is arranged. The detection protruding portion 91 is biased to the rear side by a spring member not illustrated in the drawing and is arranged at a position near the first guide engaging part 87 of the other side of the left and right sides.

In addition, the detection protruding portion 91 may be arranged at a symmetrical position near the first guide engaging part 87 of the one side with respect to the center of the bottom plate face portion 85 in the horizontal direction. Furthermore, in the description presented above, while an example has been illustrated in which the identification protruding portion 90 and the detection protruding portion 91 are positioned on opposite sides in the horizontal direction with the terminal connecting unit 93 interposed therebetween, both the identification protruding portion 90 and the detection protruding portion 91 may be positioned on the left side or the right side of the terminal connecting unit 93. In such a case, the terminal connecting unit 93 and the detection protruding portion 91 are positioned on opposite sides in the horizontal direction with the identification protruding portion 90 interposed therebetween.

A part of the bottom plate face portion 85 is arranged as an engagement holding portion 92. The engagement holding portion 92 is a portion of the inner side of a slit of a "Π" shape formed in a part of the bottom plate face portion 85 and can be elastically transformed approximately vertically using the front end portion as a supporting point. An engagement protruding portion 92*a* protruding to the upper side is arranged in a rear end portion of the engagement holding portion 92.

In the front end portion of the battery mounting unit 83, the terminal connecting unit 93 is arranged. The terminal connecting unit 93 includes a holding portion 94 formed using a non-conductive material and electrode terminals 95, 95, and 95 formed using a conductive material and is held by the holding portion 94 in a state in which the electrode terminals 95, 95, and 95 are horizontally spaced apart from each other.

In the holding portion 94, positioning protruding portions 94*a* and 94*a* are arranged on the outer side of the electrode terminals 95, 95, and 95 in the horizontal direction. The size of the horizontal width of the positioning protruding portions 94*a* and 94*a* is larger than the size of the horizontal width of the electrode terminals 95, 95, and 95.

One ends of the electrode terminals 95, 95, and 95 of the terminal connecting unit 93 are connected to a substrate arranged inside the casing 81.

<Mounting Battery in Connection Apparatus (Charger)>

Hereinafter, the mounting of the battery 1 in the battery mounting unit 83 of the charger 80 will be described (see FIGS. 29 to 31).

A user can mount the battery 1 in the battery mounting unit 83 by inserting a part of the battery 1 in the mounting concave part 83*a*.

Figure 29:
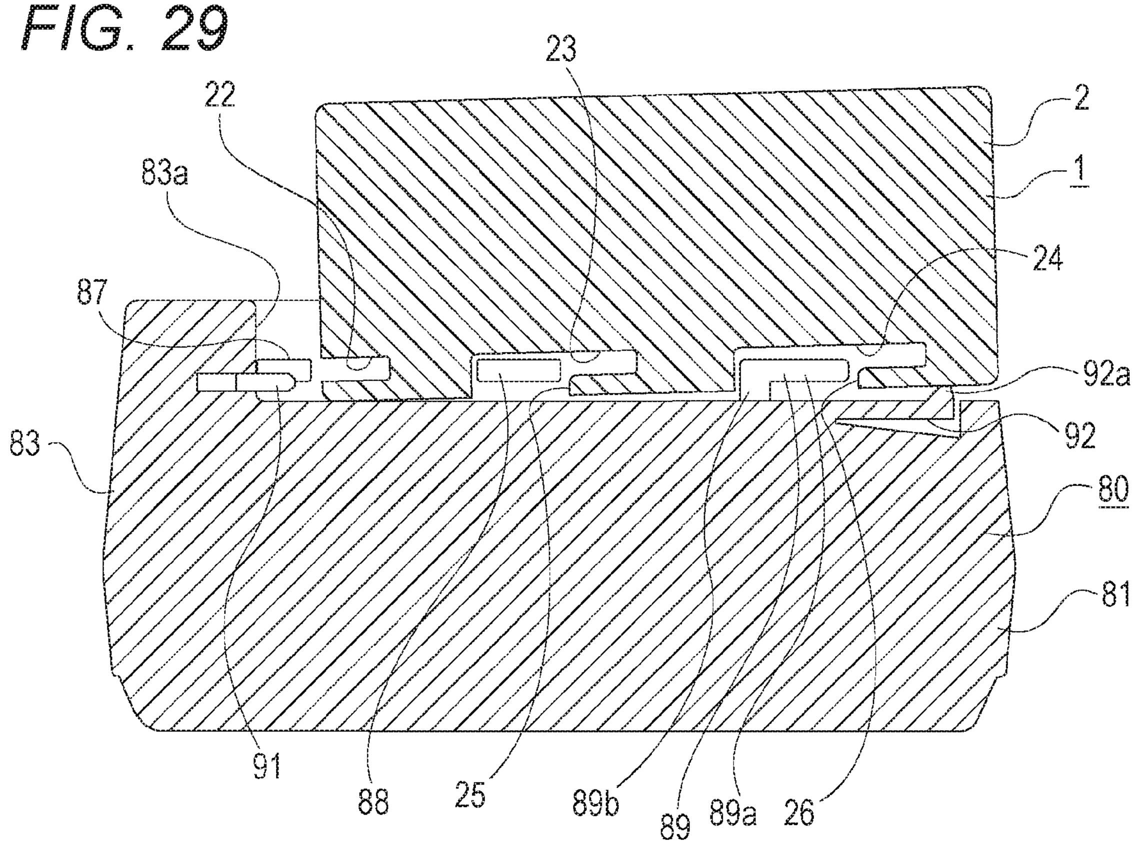
FIG. 29 is a cross-sectional view that illustrates a state in which a battery is inserted into a mounting concave part of a charger.

The battery 1 is inserted into the mounting concave part 83*a* from the upper side (see FIG. 29). At this time, the second guide engaging parts 88 and 88 are inserted into the second guided grooves 23 and 23 through the insertion grooves 25 and 25, and the engagement portions 89*a* and 89*a* of the third guide engaging parts 89 and 89 are inserted into the third guided grooves 24 and 24 through the insertion grooves 26 and 26. Thus, the step portions 84 and 84 of the charger 80 are respectively inserted into the notches 2*a* and 2*a* of the battery 1, the level difference faces 18 and 18 are positioned to face the flat faces 84*a* and 84*a* in the vertical direction, and the groove forming faces 19 and 19 are positioned to face the opposing faces 84*b* and 84*b* in the horizontal direction. At this time, since the battery 1 is arranged in the bottom plate face portion 85, the engagement protruding portion 92*a* is pressed to the lower side, and accordingly, the engagement holding portion 92 is elastically transformed.

On the other hand, when the battery 1 is attempted to be inserted into the mounting concave part 83*a* in a direction in which the step portions 84 and 84 are not inserted into the notches 2*a* and 2*a*, a part of the casing 2 is brought into contact with the step portions 84 and 84, and erroneous insertion of the battery 1 into the mounting concave part 83*a* is prevented.

Figure 30:
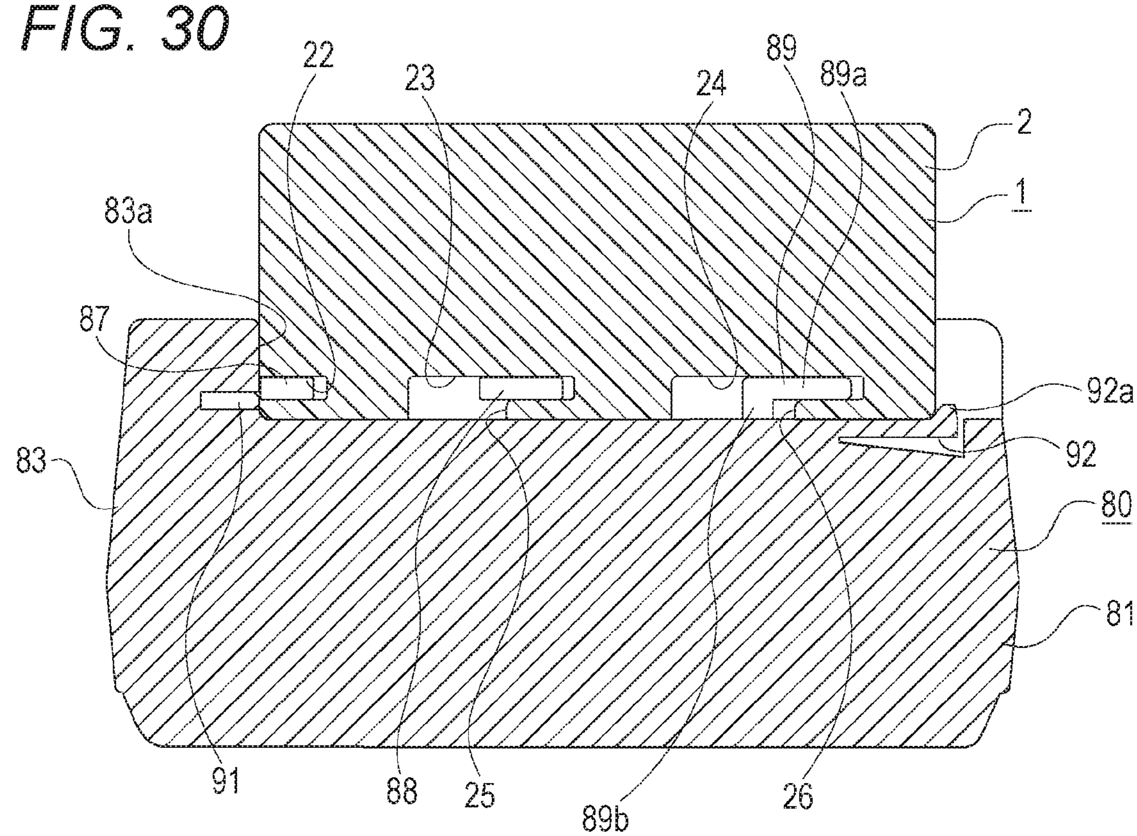
FIG. 30 is a cross-sectional view that illustrates a state in which a battery is mounted in a battery mounting unit of a charger.

Next, the battery 1 is slid to the front side with respect to the charger 80 (see FIG. 30). When the battery 1 is slid to the front side, the first guided grooves 22 and 22 are respectively guided to the first guide engaging parts 87 and 87, the second guided grooves 23 and 23 are respectively guided to the second guide engaging parts 88 and 88, and the third guided grooves 24 and 24 are respectively guided to the engagement portions 89*a* and 89*a* of the third guide engaging parts 89 and 89. The battery 1 is slid to the front side up to a movement end at which the rear opening edges of the third guided grooves 24 and 24 are respectively brought into contact with the regulation portions 89*b* and 89*b* of the third guide engaging parts 89 and 89.

In the state in which the battery 1 is slid to the front side up to the movement end, the opening edges of the first guided grooves 22 and 22 are respectively engaged with the first guide engaging parts 87 and 87, the opening edges of the second guided grooves 23 and 23 are respectively engaged with the second guide engaging parts 88 and 88, and the opening edges of the third guided grooves 24 and 24 are respectively engaged with the engagement portions 89*a* and 89*a* of the third guide engaging parts 89 and 89. Accordingly, the upper edge of the first engagement claw part 2*p* is engaged at least with a part of the lower edge of the first guide engaging part 87, the upper edge of the second engagement claw part 2*q* is engaged at least with a part of the lower edge of the second guide engaging part 88, and the upper edge of the third engagement claw part 2*r* is engaged at least with a part of the lower edge of the third guide engaging part 89.

At this time, the rear end edge of the battery 1 is positioned to the front side of the engagement protruding portion 92*a* of the engagement holding portion 92, the engagement protruding portion 92*a* is engaged with the lower end portion of the lower end edge of the battery 1 in accordance with elastic return of the engagement holding portion 92, whereby the battery 1 is mounted in the battery mounting unit 83.

When the battery 1 is mounted in the battery mounting unit 83, the detection protruding portion 91 of the charger 80 is pressed and operated by a pressed portion 14*a* for detection that is arranged on the front face 14 of the battery 1. As the detection protruding portion 91 is moved to the front side, and the detection protruding portion 91 is moved to the front side, it is detected by a detection unit not illustrated in the drawing that the battery 1 is mounted in the battery mounting unit 83.

In a case where it is detected that the battery 1 is mounted in the battery mounting unit 83, in a state in which the charger 80 is connected to a power supply, light is emitted from a light emitting diode, and the light is emitted to the upper side through the window portions 82*a* and 82*b*. Accordingly, by visually recognizing the state of the light emitted through the window portions 82*a* and 82*b*, a chargeable state/non-chargeable state and the charged amount of the battery 1 can be recognized by a user.

Figure 31:
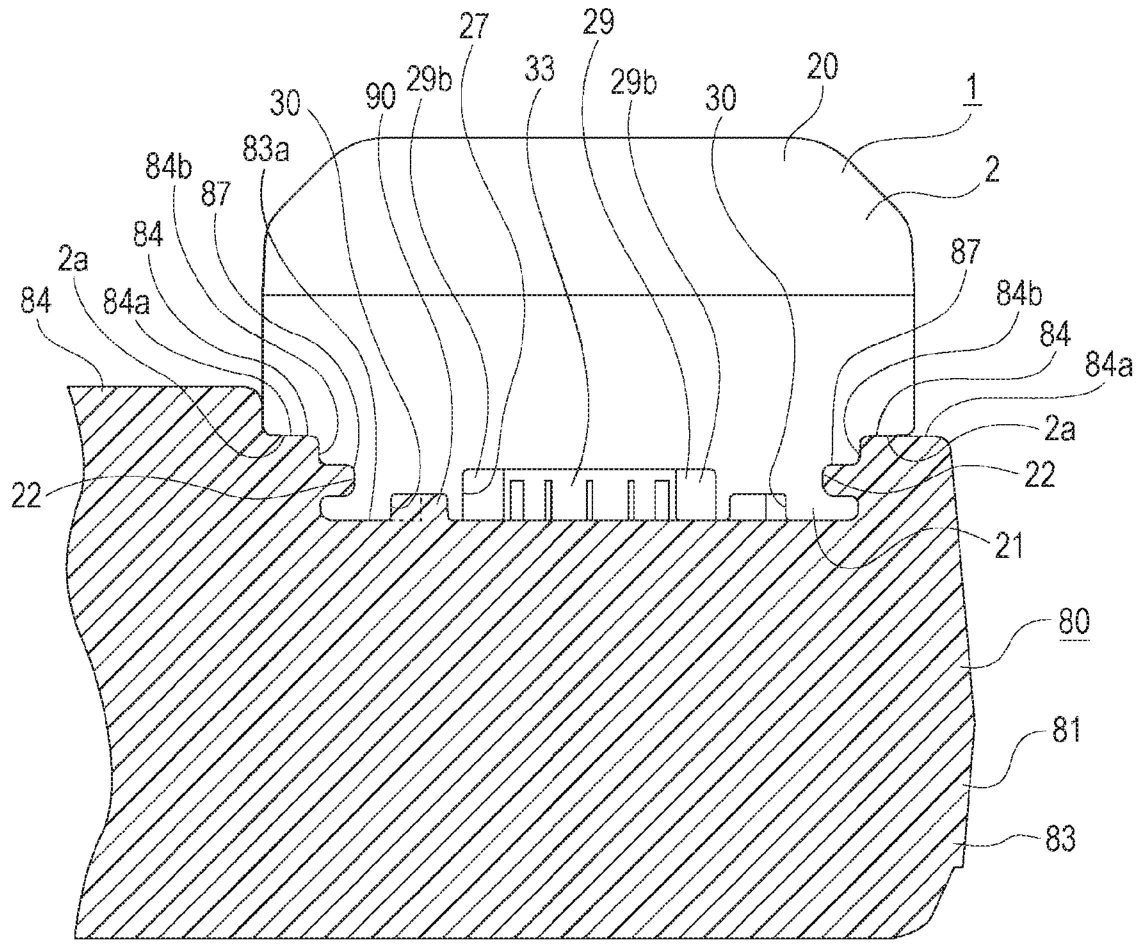
FIG. 31 is a cross-sectional view that illustrates a state in which a battery is mounted in a battery mounting unit of a charger.

In addition, when the battery 1 is mounted in the battery mounting unit 83, the identification protruding portion 90 of the charger 80 is inserted into the identification groove 30 of one side of the battery 1 (see FIG. 31).

The identification protruding portion 90 has the long portion 90*a* inserted into the first identification part 31 and the short portion 90*b* inserted into the second identification parts 32.

As the identification protruding portion 90 is inserted into the identification groove 30, it is identified that the battery 1 mounted in the battery mounting unit 83 is of a type that can be charged by the charger 80. The battery 1, for example, is of a type having a medium chargeable power capacity.

Figure 32:
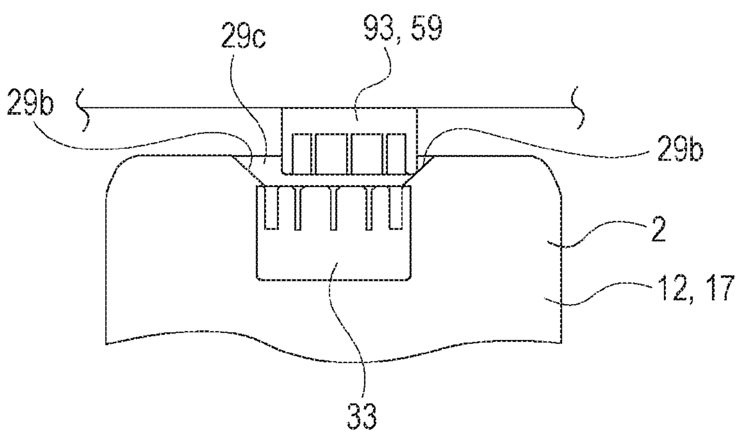
FIG. 32 is a conceptual diagram that illustrates a state in which a battery is guided to a terminal connecting unit when the battery is mounted in a charger.

In addition, when the battery 1 is mounted in the battery mounting unit 83, the terminal connecting unit 93 of the charger 80 is inserted between the wall portions 29*b* and 29*b* of the battery 1. At this time, since there are a gap, a dimensional tolerance, and the like used for securing smooth insertion of the battery 1 into the battery mounting unit 83 between the battery 1 and the charger 80, there is a possibility that the battery 1 is inserted into the battery mounting unit 83 in a state inclining to the left or right side or a displaced state with respect to the charger 80 (see FIG. 32).

Figure 33:
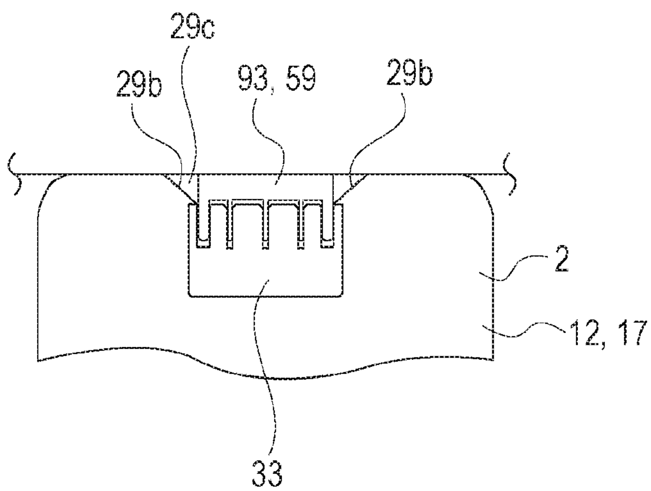
FIG. 33 is a conceptual diagram that illustrates a state in which a battery is mounted in a charger, and a terminal connecting unit and a connector are connected.

Also in a case where the battery 1 is inserted into the charger 80 in the inclining state or the displaced state, since the wall portions 29*b* and 29*b* are formed as inclining faces that are spaced apart from each other in the horizontal direction as the wall portions advance to a further front side, the terminal connecting unit 93 is guided to the wall portions 29*b* and 29*b* to become closer to the connector 33. Accordingly, the connection terminals 35, 35, and 35 of the connector 33 of the battery 1 are reliably connected to the electrode terminals 95, 95, and 95 of the terminal connecting unit 93 (see FIG. 33). At this time, the positioning protruding portions 94*a* and 94*a* of the terminal connecting unit 93 are respectively inserted into the positioning grooves 37 and 37 of the connector 33, and the positioning of the connector 33 with respect to the terminal connecting unit 93 is performed.

On the other hand, by releasing the engagement of the engagement protruding portion 92*a* with the rear end edge and releasing the engagement of the first guide engaging parts 87 and 87, the second guide engaging parts 88 and 88, and the third guide engaging parts 89 and 89 by sliding the battery 1 to the rear side and taking out the battery 1 from the mounting concave part 83*a* to the upper side, the battery 1 can be taken out from the battery mounting unit 83.

<Summary>

As described above, in the battery 1, a face forming the arrangement concave part 27 of the casing 2 is formed as the concave part forming face 29, and the middle portion 29*c* that is a part of the concave part forming face 29 is present between the front face 14 of the outer face 10 and the connector 33.

Accordingly, since the front face 33*a* of the connector 33 is positioned on a further inner side in the casing 2 than the front face 14 of the casing 2, the occurrence of damage and a scratch in the connector 33 at the time of falling or the like is reduced, and an excellent state of a connection of the connection terminal 35 with the electrode terminals 61 and 95 can be secured.

Particularly, since it is difficult for an impact force to be transmitted to the connector 33 in accordance with a falling impact, it is difficult for a crack in solder used for connecting the connection terminal 35 to the circuit substrate 9 to occur, and the occurrence of an electrical connection defect can be reduced.

In addition, since the occurrence of damage or a scratch in the connector 33 is reduced, it is difficult for the connection terminal 35 to be exposed from the housing 34, and a high quality of the connector 33 can be secured.

Figure 34:
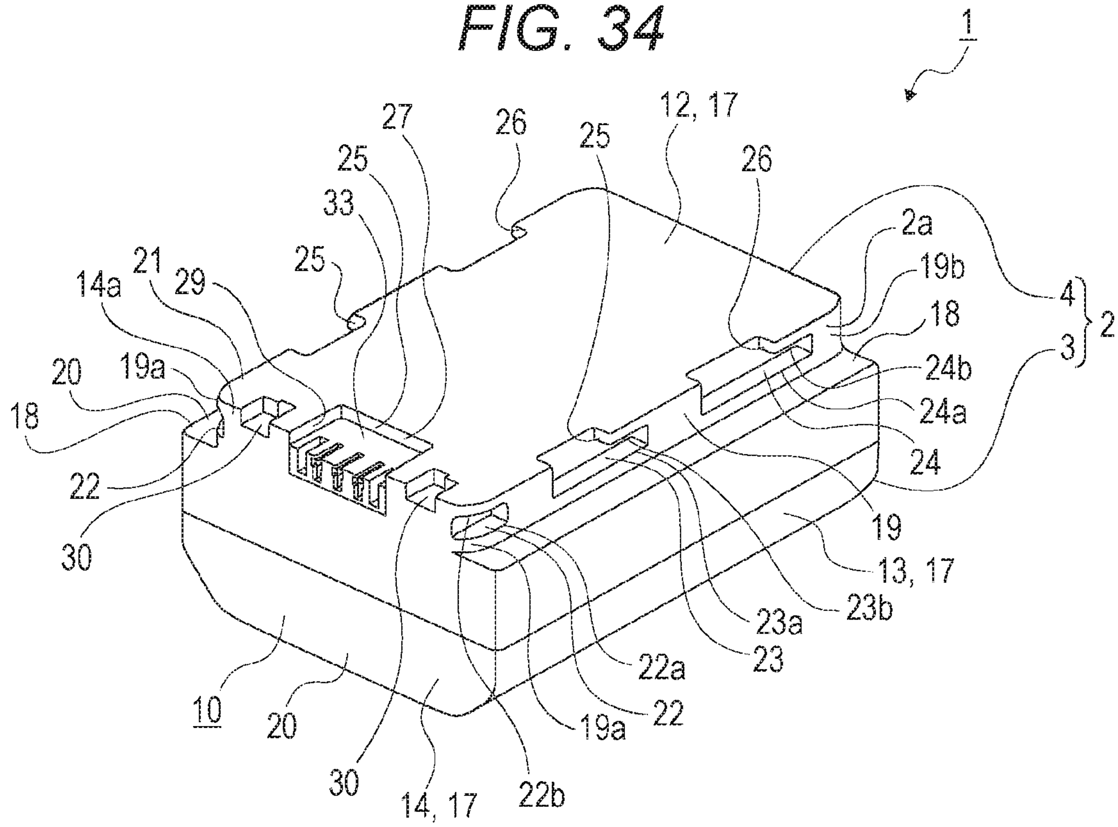
FIG. 34 is a perspective view that illustrates an example in which a connector is positioned on a further upper side than the bottom face.

In addition, in the description presented above, while an example has been illustrated in which the front face 33*a* of the connector 33 is positioned on a further inner side in the casing 2 than the front face 14 of the casing 2, for example, the lower face 33*b* of the connector 33 may be positioned on a further inner side in the casing 2 than the bottom face 12 of the casing 2 (see FIG. 34).

In this way, also in a case where the lower face 33*b* of the connector 33 is positioned on a further inner side in the casing 2 than the bottom face 12 of the casing 2, the occurrence of damage and a scratch in the connector 33 at the time of falling or the like is reduced, and an excellent state of a connection of the connection terminal 35 with the electrode terminals 61 and 95 can be secured.

Figure 35:
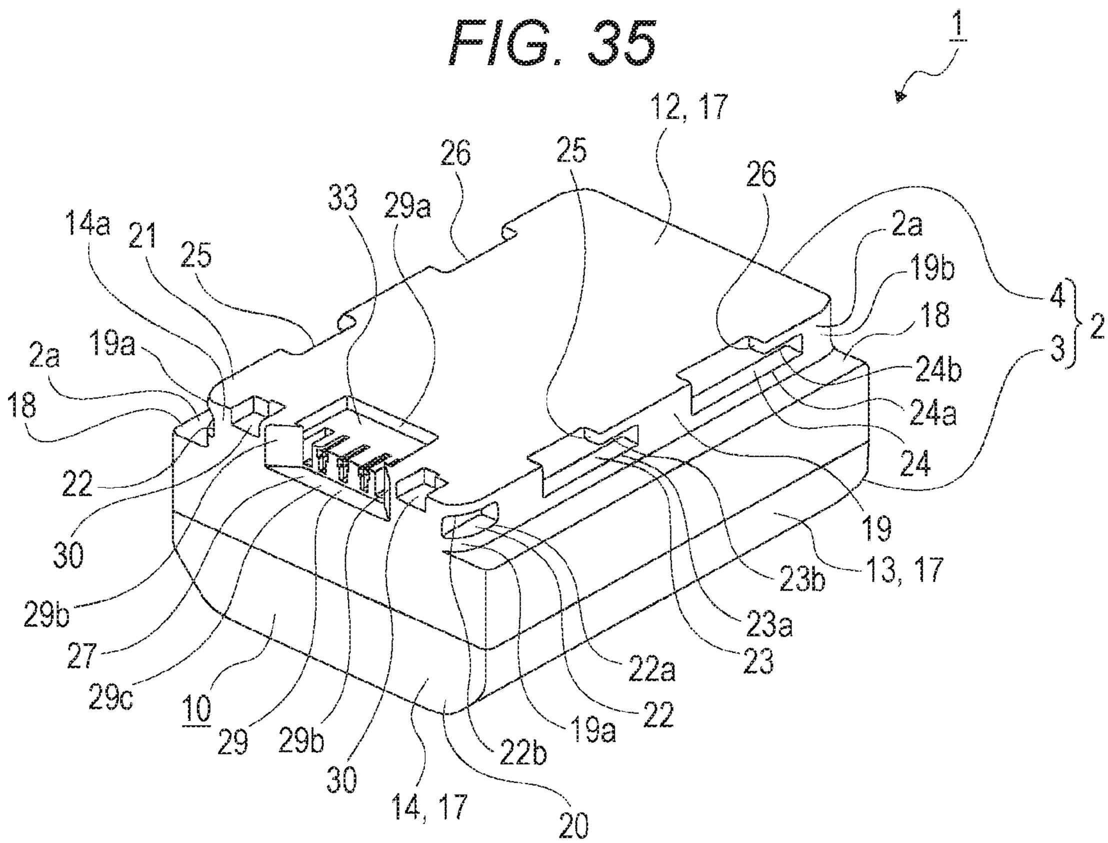
FIG. 35 is a perspective view that illustrates an example in which a connector is positioned on a further rear side than a front face and on a further upper side than the bottom face.

In addition, for example, it may be configured such that the front face 33*a* of the connector 33 is positioned on a further inner side in the casing 2 than the front face 14 of the casing 2, and the lower face 33*b* of the connector 33 is positioned on a further inner side in the casing 2 than the bottom face 12 of the casing 2 (see FIG. 35).

In this way, in a case where the front face 33*a* is positioned on a further inner side in the casing 2 than the front face 14, and the lower face 33*b* is positioned on a further inner side in the casing 2 than the bottom face 12, the whole connector 33 is positioned on the inner side of the casing 2. Accordingly, the occurrence of damage and a scratch in the connector 33 at the time of falling or the like is further reduced, and a more excellent state of a connection of the connection terminal 35 with the electrode terminals 61 and 95 can be secured.

In addition, in the battery 1, the arrangement concave part 27 is open in a direction of the connection of the connection terminal 35 with the electrode terminals 61 and 95, and a middle portion 29*c* that is the concave part forming face 29 is present between the outer face 10 and the connector 33 in the connection direction.

Accordingly, since the connector 33 is positioned on a further inner side in the casing 2 than the outer face 10, the electrode terminals 61 and 95 are inserted up to the inner side of the arrangement concave part 27 at the time of connection, and the size of the connection apparatus (the imaging apparatus 50 or the charger 80) in the connection direction can be decreased.

In addition, a part of the concave part forming face 29 is formed as an inclining face in which the opening area of the arrangement concave part 27 increases as the part is further spaced apart from the connector 33 in the opening direction (connection direction) of the arrangement concave part 27.

Accordingly, since a part of the concave part forming face 29 functions as a guide face at the time of inserting the electrode terminals 61 and 95 into the arrangement concave part 27, an excellent state of the connection between the connection terminal 35 and the electrode terminals 61 and 95 can be secured.

Furthermore, the concave part forming face 29 includes one pair of the wall portions 29*b* and 29*b* positioned to be spaced apart from each other in a direction orthogonal to the connection direction, and the wall portions 29*b* and 29*b* are formed as inclining faces further spaced apart from each other in the connection direction. Accordingly, since the wall portions 29*b* and 29*b* function as guide faces at the time of inserting the electrode terminals 61 and 95 into the arrangement concave part 27, a more excellent state of the connection between the connection terminal 35 and the electrode terminals 61 and 95 can be secured.

Figure 36:
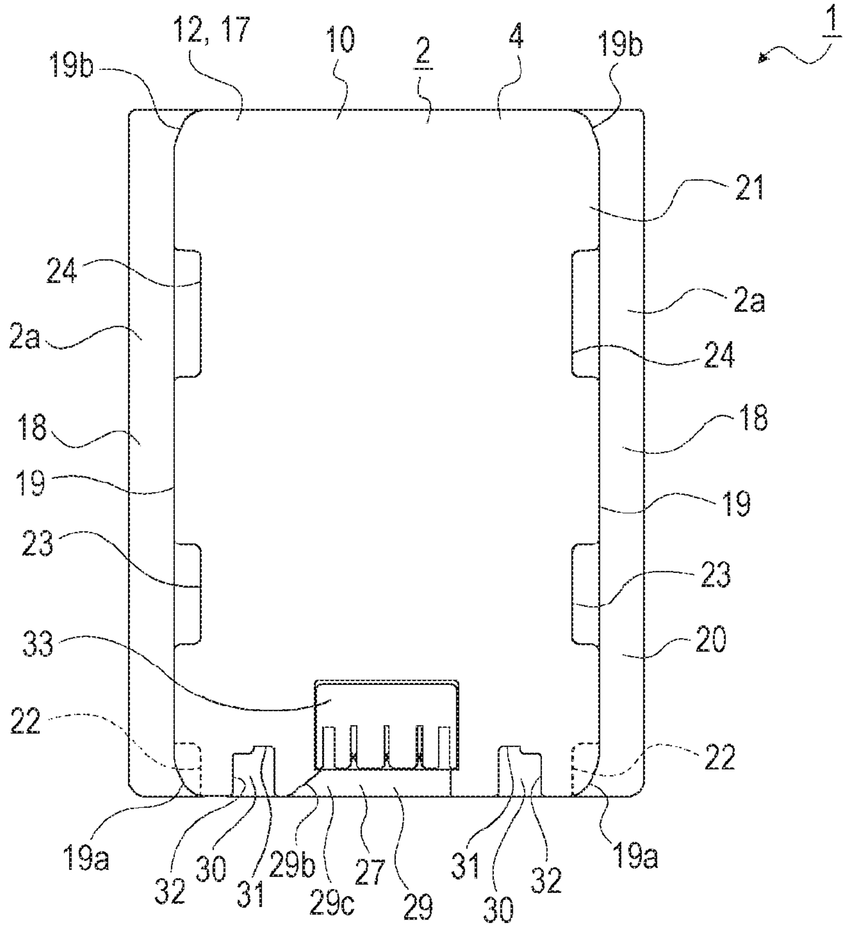
FIG. 36 is a bottom view that illustrates an example in which one of wall portions of a concave part forming face inclines.

In addition, in the description presented above, while an example has been illustrated in which one pair of the wall portions 29*b* and 29*b* is formed as inclining faces spaced apart from each other in the connection direction, for example, one wall portion 29*b* may be formed as an inclining face having an opening area of the arrangement concave part 27 that increases along the connection direction (see FIG. 36).

Figure 37:
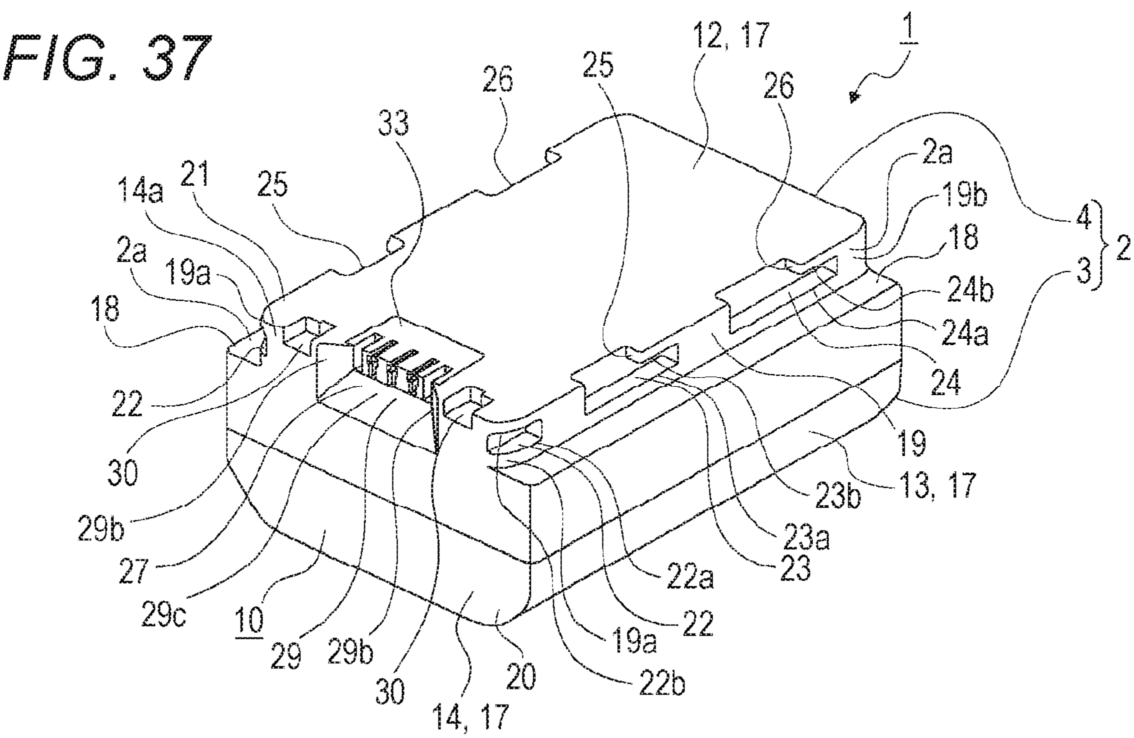
FIG. 37 is a perspective view that illustrates an example in which one pair of wall portions and a middle portion of a concave part forming face incline.

In addition, in the battery 1, the middle portion 29*c* of the concave part forming face 29 may be formed as an inclining face having an opening area of the arrangement concave part 27 that increases as the middle portion is further spaced apart from the connector 33 in the connection direction (see FIG. 37).

In this way, by forming the middle portion 29*c* as the inclining face, the middle portion 29*c* functions as a guide face at the time of inserting the electrode terminals 61 and 95 into the arrangement concave part 27, and accordingly, a more excellent state of the connection between the connection terminal 35 and the electrode terminals 61 and 95 can be secured.

In addition, in such a case, the wall portions 29*b* and 29*b* may be formed as inclining faces in addition to the middle portion 29*c*, one wall portion 29*b* may be formed as an inclining face in addition to the middle portion 29*c*, or only the middle portion 29*c* may be formed as an inclining face.

Here, while the inclination angle of the wall portion 29*b* or the middle portion 29*c* with respect to the connection direction is arbitrary, for example, it is preferable that the inclination angle is larger than 0 degrees and equal to or smaller than 45 degrees.

By configuring the inclination angle of the wall portion 29*b* or the middle portion 29*c* to be larger than 0 degrees and equal to or smaller than 45 degrees, the inclination angle of the concave part forming face 29 functioning as a guide face is an acute angle, and accordingly, the electrode terminals 61 and 95 guided to the guide face can be smoothly inserted into the arrangement concave part 27.

Figure 38:
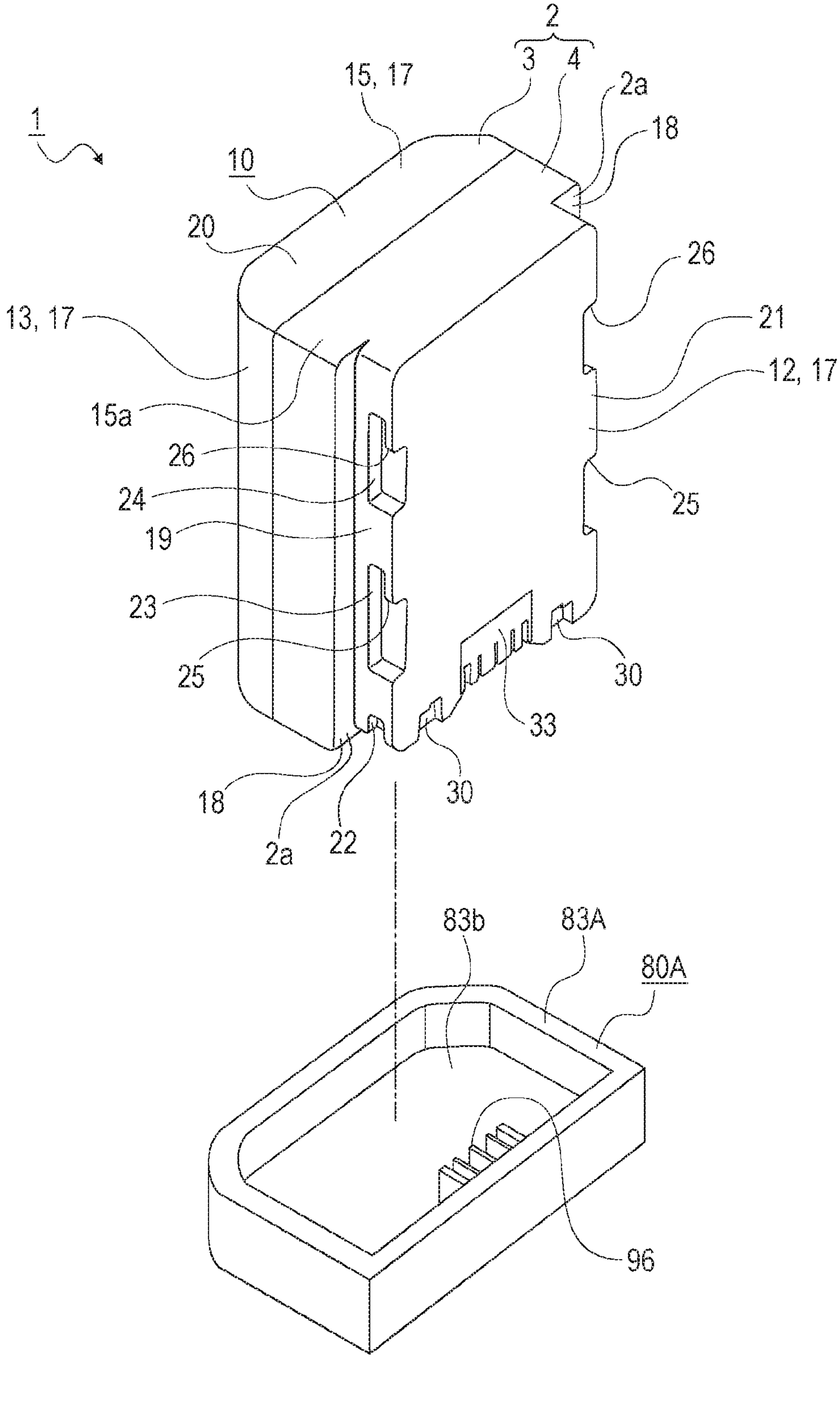
FIG. 38 is a perspective view that illustrates another example of a charger together with a battery.

In addition, in the description presented above, while the charger 80 of a type in which the battery 1 is inserted into the mounting concave part 83*a* from the upper side and then is slid to the front side for mounting has been illustrated as an example, as another type, there is a charger 80A in which the battery 1 is mounted by inserting the battery 1 from the upper side (see FIG. 38).

For example, the whole charger 80A is arranged as a battery mounting unit 83A, and a mounting concave part 83*b* that is open to the upper side is formed in the battery mounting unit 83A. In the battery mounting unit 83A, a terminal connecting unit 96 having electrode terminals is arranged. The battery 1 is inserted into the mounting concave part 83*b* of the charger 80A in a direction in which the front face 14 faces the lower side. In such a case, by forming at least one of the wall portions 29*b* and 29*b* and the middle portion 29*c* of the battery 1 as an inclining face (guide face), the terminal connecting unit 96 is guided to the inclining face in accordance with the own weight of the battery 1 at the time of inserting the battery 1 into the mounting concave part 83*b*.

Accordingly, an easy and excellent connection state of the battery 1 for the charger 80A can be secured.

In the battery 1, in the casing 2, the notch 2*a* is formed according to the level difference face 18 continuous from the side face 13 and the groove forming face 19 continuous from the bottom face 12, the first guided groove 22, the second guided groove 23, and the third guided groove 24 that are open to the groove forming face 19 are formed, and the first guided groove 22, the second guided groove 23, and the third guided groove 24 are positioned on a further bottom face 12 side than the level difference face 18.

Accordingly, the first guided groove 22, the second guided groove 23, the third guided groove 24 and the level difference face 18 are not positioned to be continuous, but a part of the groove forming face 19 is positioned between the first guided groove 22, the second guided groove 23, the third guided groove 24 and the level difference face 18. Therefore, the groove forming face 19 and the level difference face 18 are closer to the cell 6 than a case where the first guided groove 22, the second guided groove 23, the third guided groove 24 and the level difference face 18 are positioned to be continuous, the size of the battery 1 can be decreased. In addition, since the notches 2*a* and 2*a* are formed respectively at positions continuous from the two side faces 13 and 13, the notches 2*a* and 2*a* are present on both sides of the two side faces 13 and 13, and the outer face 10 of the casing 2 is positioned to be close to the cells 6 and 6 at two places, and the size of the battery 1 can be further decreased.

Furthermore, the first guided grooves 22 and 22, the second guided grooves 23 and 23, and the third guided grooves 24 and 24 are formed to be spaced apart from each other in the direction of connecting the connection terminal 35 to the electrode terminals 61 and 95.

Accordingly, portions between the first guided groove 22, the second guided groove 23, and the third guided groove 24 in the casing 2 are formed as protruding portions with respect to the first guided groove 22, the second guided groove 23, and the third guided groove 24, and therefore, the protruding portions function as reinforcing ribs, and the strength of the casing 2 is improved.

Another Configuration Example of Battery

Hereinafter, another configuration example of the battery 1 will be described (see FIGS. 39 to 44).

Figure 39:
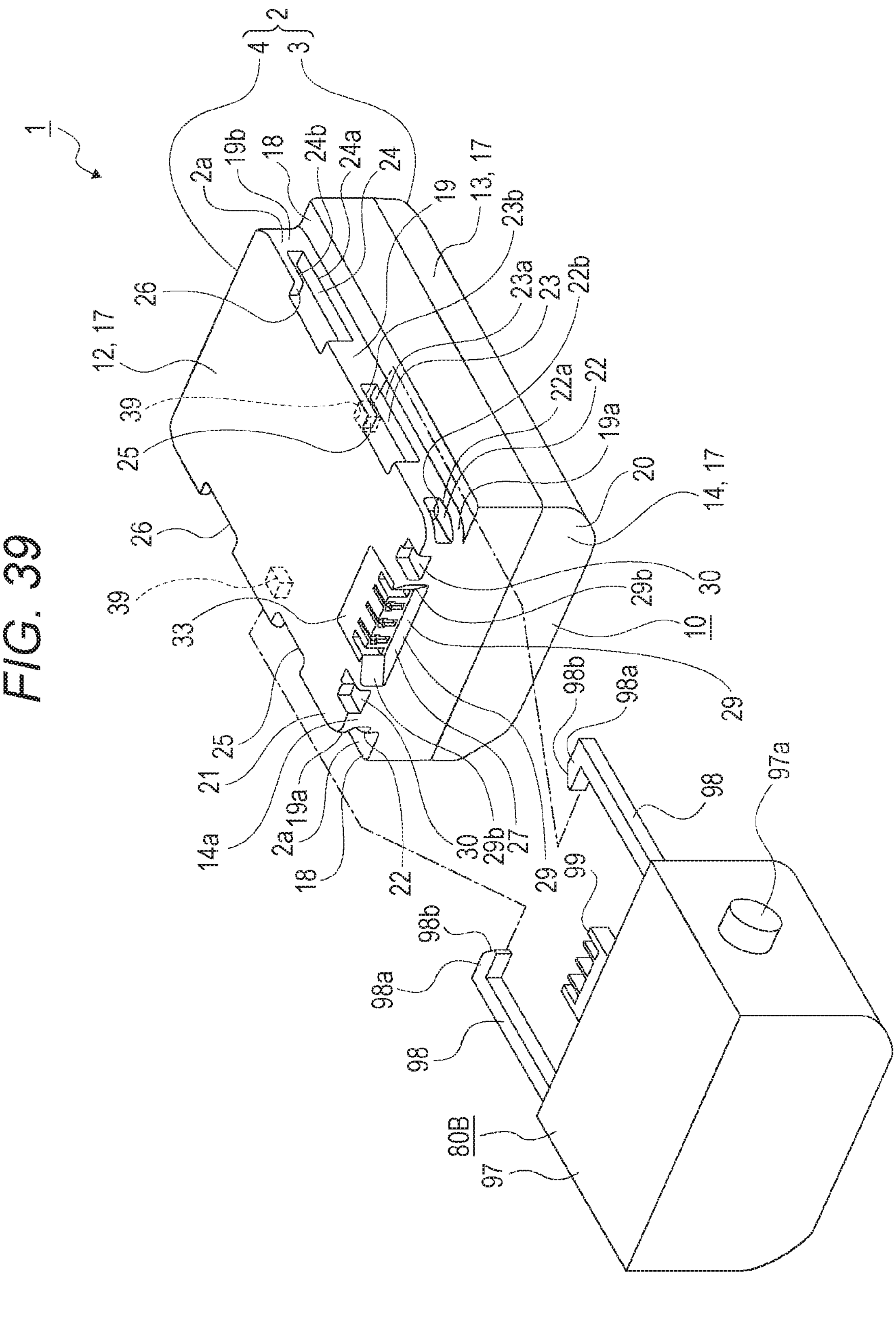
FIG. 39 is a perspective view that illustrates further another example of a charger together with a battery.
Figure 40:
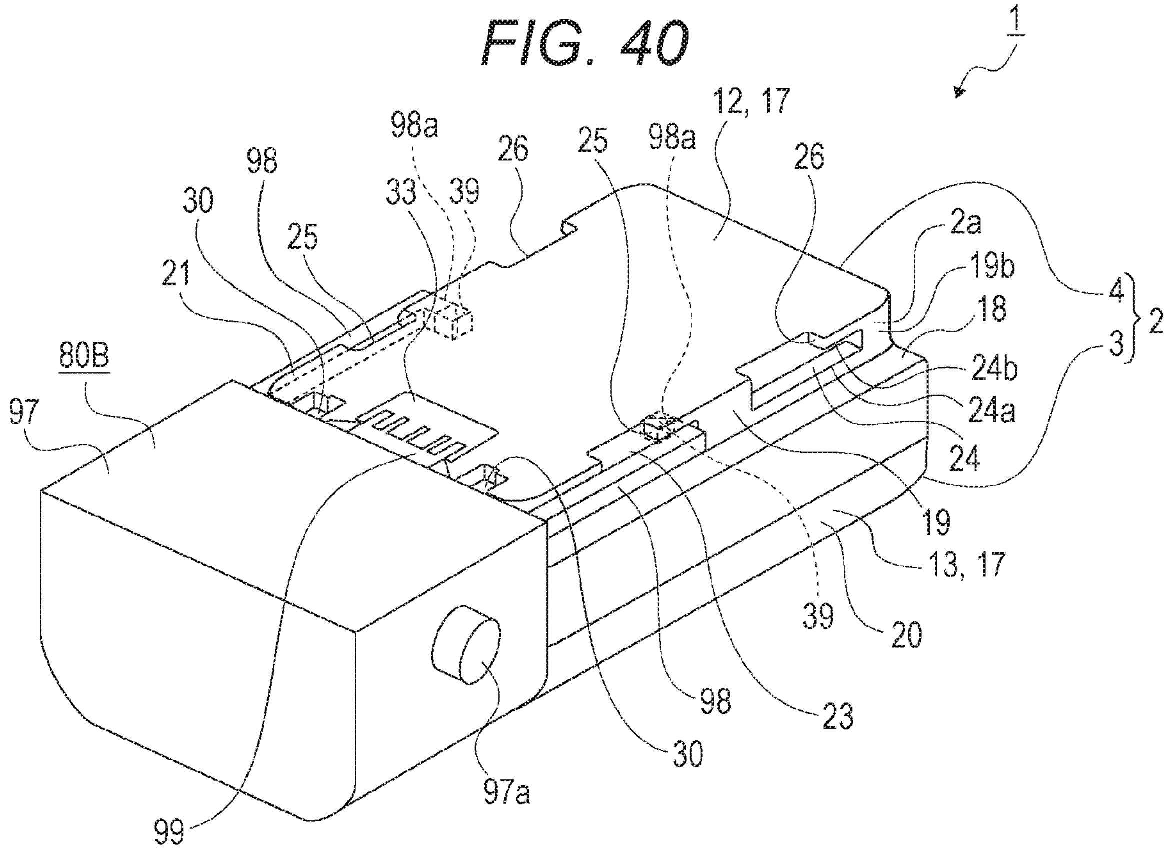
FIG. 40 is a perspective view that illustrates a state in which a battery is held in a charger of the further another example.

At least horizontal both sides of the battery 1, engagement concave parts 39 and 39 may be formed (see FIG. 39). The engagement concave parts 39 and 39, for example, are respectively open to second guided grooves 23 and 23. The battery 1 in which such engagement concave parts 39 and 39 are formed, for example, is connected in a state being held by a charger 80B. The charger 80B includes a main body 97, holding arms 98 and 98 protruding from the main body 97 to the rear side, and a terminal connecting unit 99 including electrode terminals arranged in the main body 97 in the state of protruding to the rear side. In the main body 97, an operation button 97*a* is arranged, and, by operating the operation button 97*a*, the holding arms 98 and 98 operate in a direction of being spaced apart from each other.

The holding arms 98 and 98 are arranged as engagement protruding parts 98*a* and 98*a* bending in directions in which the tip end portions approach each other. In the tip end portions of the holding arms 98 and 98, sliding faces 98*b* and 98*b* inclining in directions approaching each other as approaching the main body 97 are formed. The holding arms 98 and 98 are biased in directions approaching each other by springs, which are not illustrated in the drawings, arranged inside the main body 97.

As the battery 1 is moved to the front side with respect to the charger 80B, the front edge of the battery 1 is slid to sliding faces 98*b* and 98*b* to cause the holding arms 98 and 98 to move in directions being spaced apart from each other against the biasing forces of the springs, and the holding arms 98 and 98 are respectively inserted into the first guided grooves 22 and 22. The holding arms 98 and 98 are relatively moved respectively from the first guided grooves 22 and 22 toward the second guided grooves 23 and 23 and are temporarily placed on the groove forming faces 19 and 19 from the first guided grooves 22 and 22 and moved again in the directions approaching each other to be inserted into the second guided grooves 23 and 23, and the engagement protruding parts 98*a* and 98*a* are respectively engaged with the engagement concave parts 39 and 39 (see FIG. 40).

The engagement protruding parts 98*a* and 98*a* of the charger 80B are engaged with the engagement concave parts 39 and 39 and are in a state of pinching the battery 1 from horizontal both sides, whereby the battery 1 is held by the charger 80B. When the engagement protruding parts 98*a* and 98*a* are respectively engaged with the engagement concave parts 39 and 39, simultaneously, the connector 33 is connected to the terminal connecting unit 99.

In a case where the holding of the battery 1 in the charger 80B is released, the releasing operation can be performed by moving the holding arms 98 and 98 in the directions spaced apart from each other by operating the operation button 97*a* to release the engagement state of the engagement protruding parts 98*a* and 98*a* with the engagement concave parts 39 and 39 and pulling the battery 1 and the charger 80B away from each other.

In addition, in the description presented above, while an example has been illustrated in which the engagement concave parts 39 and 39 are respectively open to the second guided grooves 23 and 23, the engagement concave parts 39 and 39 may be respectively open to insertion grooves 24 and 24. However, in a case where the engagement concave parts 39 and 39 are open to the guided grooves 23 and 23, the engagement protruding parts 98*a* and 98*a* of the charger 80B are inserted into the guided grooves 23 and 23 and guided, and accordingly, the engagement protruding parts 98*a* and 98*a* can be reliably engaged with the engagement concave parts 39 and 39.

As described above, by forming the engagement concave parts 39 and 39 with which the engagement protruding parts 98*a* and 98*a* that are respectively open in opposite directions in the casing 2 are engaged, the battery 1 can be held by engaging the engagement protruding parts 98*a* and 98*a* with the engagement concave parts 39 and 39 from the opposite sides, and accordingly, the battery 1 can be easily held in a stable state.

Figure 41:
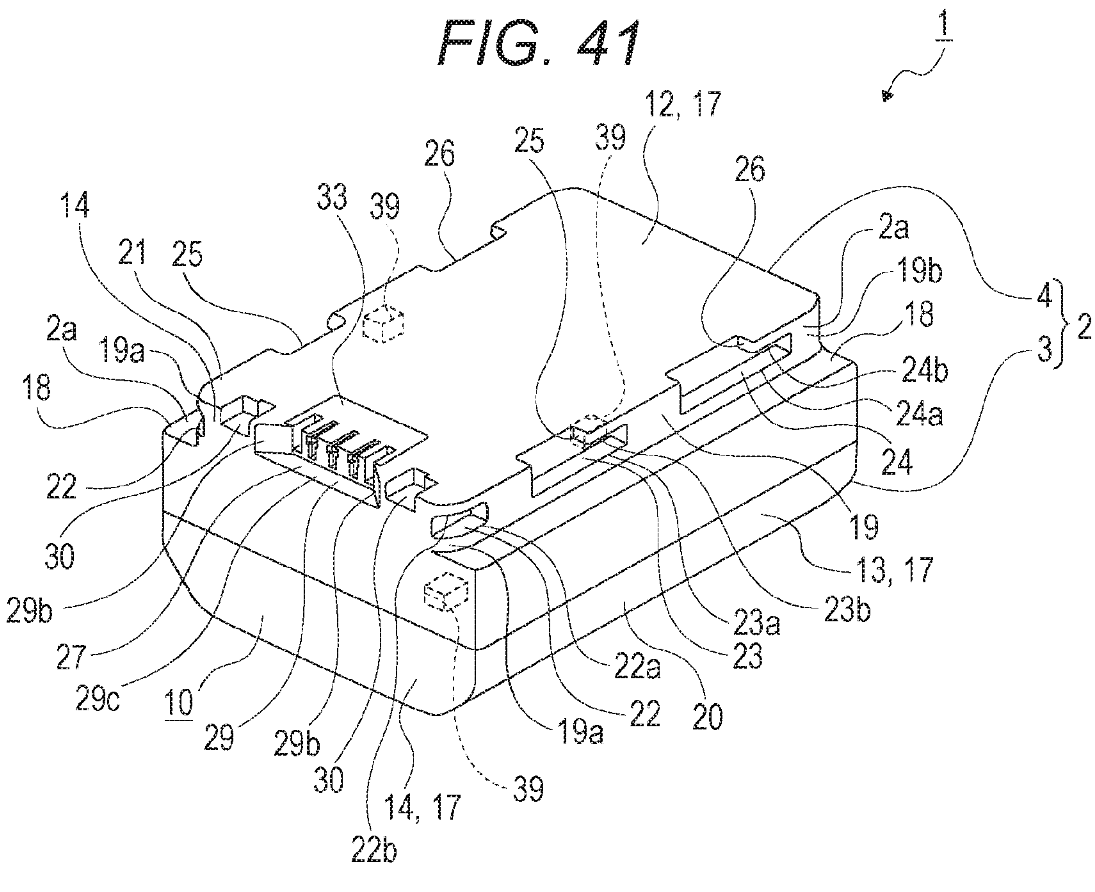
FIG. 41 is a perspective view that illustrates an example of a battery in which three engagement concave parts are formed.
Figure 42:
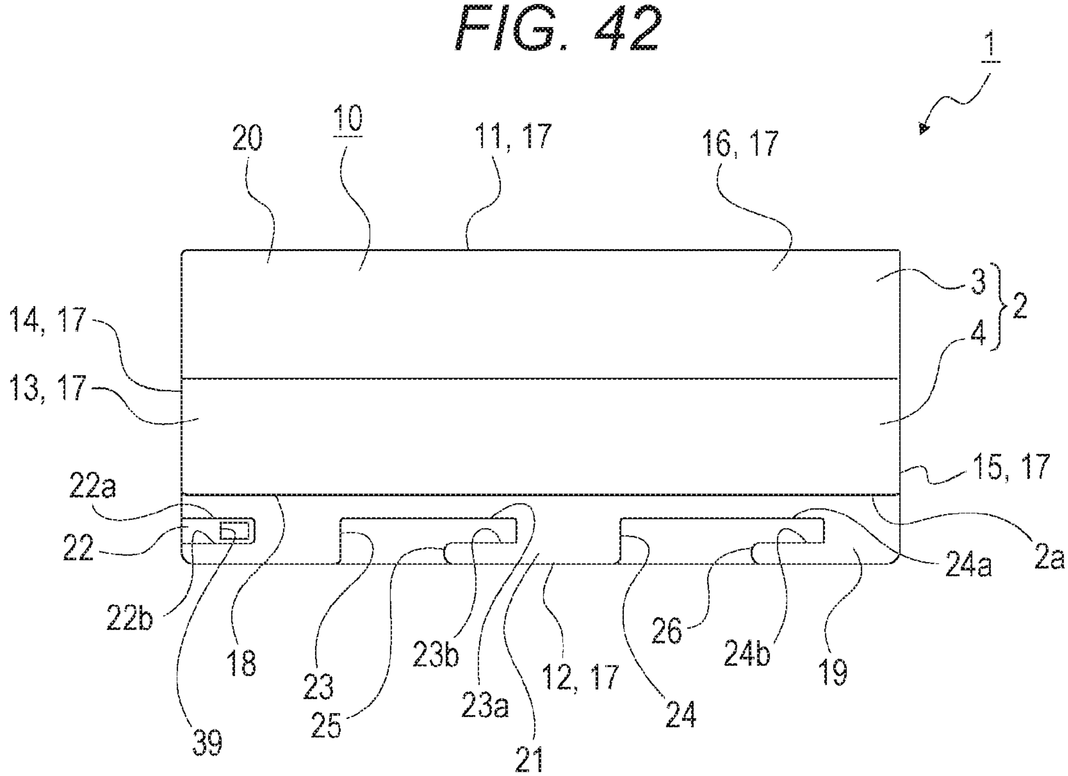
FIG. 42 is a side view that illustrates an example of a battery in which an engagement concave part is formed to open to a guided groove disposed on the foremost side.

In addition, in the description presented above, while an example has been illustrated in which the engagement concave parts 39 and 39 are formed on the horizontal both sides of the battery 1, for example, in addition to the engagement concave parts 39 and 39 of the horizontal both sides, an engagement concave part 39 that is open to at least one of the top face 11 or the bottom face 12 may be formed (see FIG. 41).

In this way, by forming the engagement concave part 39 that is open to the top face 11 or the bottom face 12 orthogonal to the faces of the horizontal both sides facing the opposite sides, the battery 1 can be held by engaging the engagement protruding parts 98*a*, 98*a*, and 98*a* with the engagement concave parts 39, 39, and 39 from opposite sides and a side orthogonal to the opposite sides, and accordingly, the battery 1 can be held in a more stable state.

In addition, since the engagement concave part 39 is formed in an area in which the second guided groove 23 is present, the engagement protruding part 98*a* is guided by the second guided groove 23 to be engaged with the engagement concave part 39, and accordingly, the engagement of the engagement protruding part 98*a* with the engagement concave part 39 can be performed easily and reliably.

Figure 43:
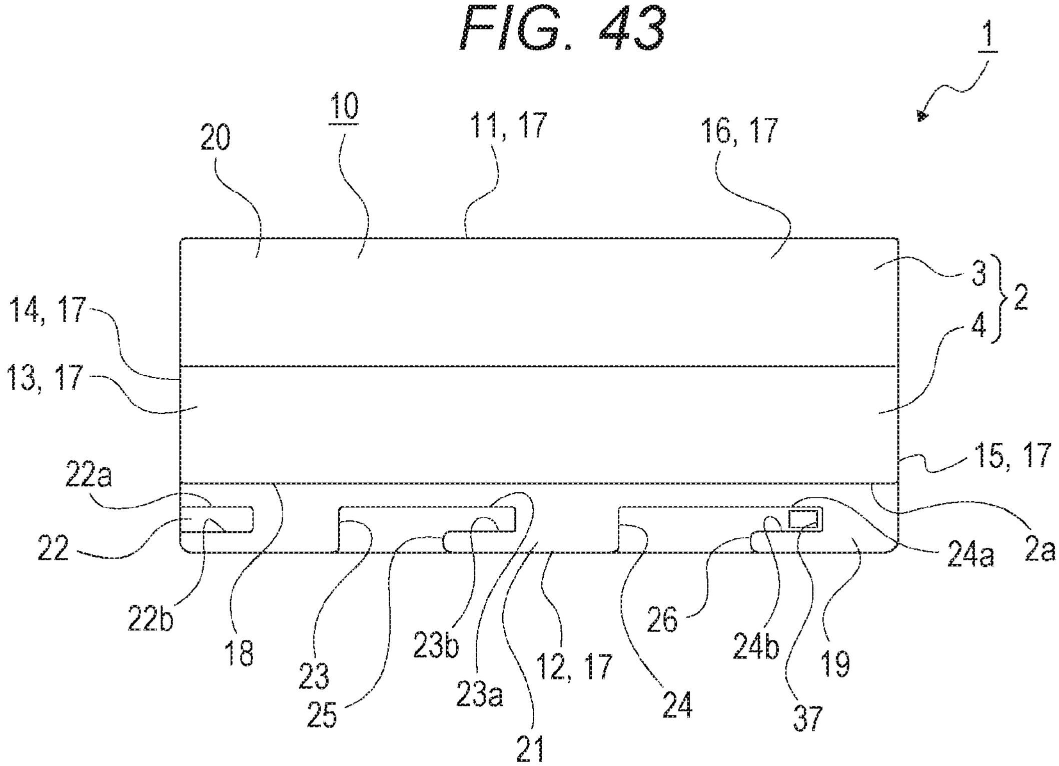
FIG. 43 is a side view that illustrates an example of a battery in which an engagement concave part is formed to open to a guided groove disposed on the rearmost side.
Figure 44:
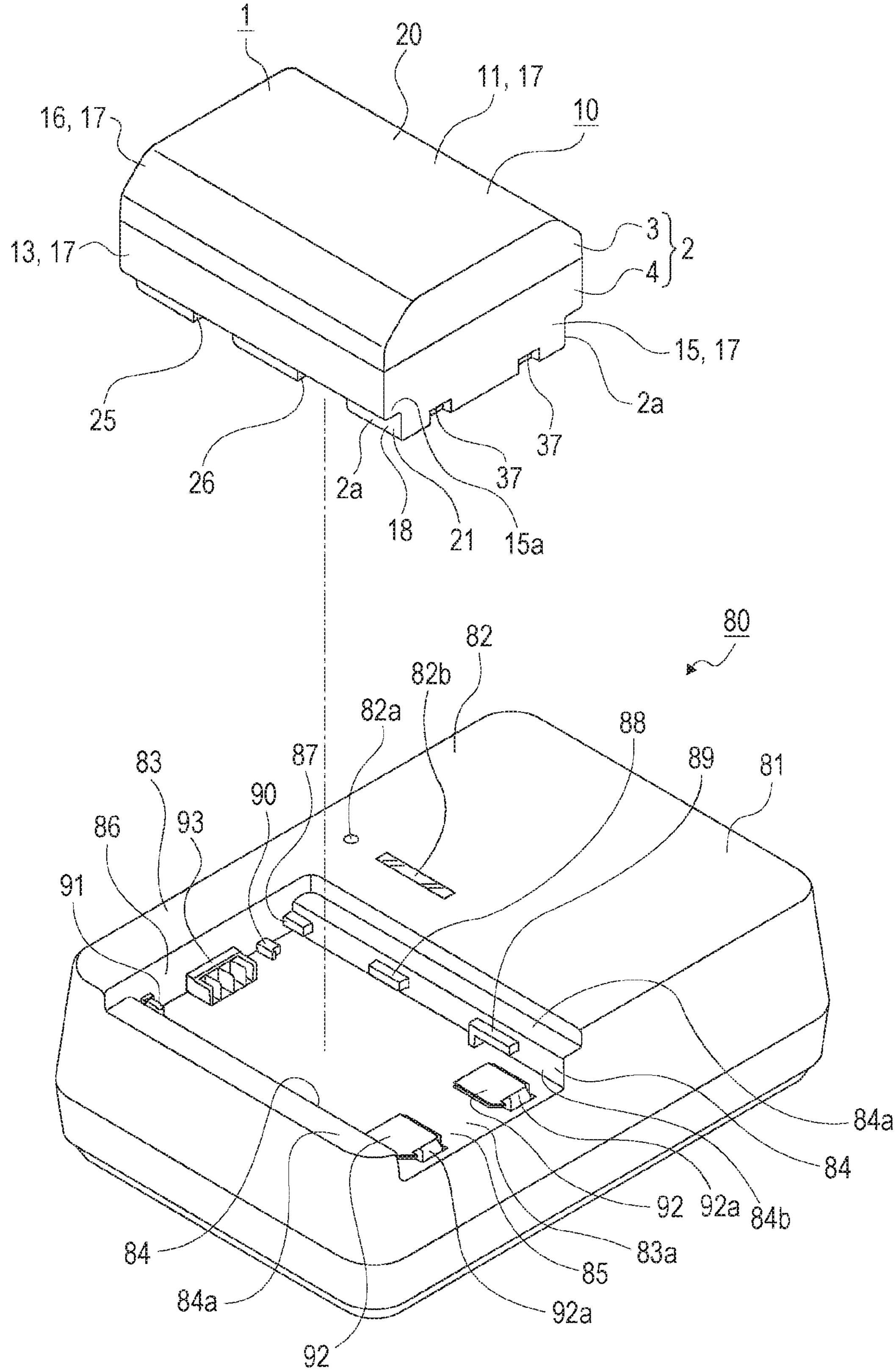
FIG. 44 is a perspective view that illustrates an example of a battery in which an engagement concave part is formed in a lower end portion of a rear end portion.

Furthermore, the engagement concave part 39 may be formed in an area in which the first guided groove 22 is present (see FIG. 42) instead of the area in which the second guided groove 23 is present or may be formed in an area in which the third guided groove 24 is present (see FIG. 43).

Particularly, in a case where the engagement concave part 39 is formed in the area in which the first guided groove 22 is present, the engagement concave part 39 is present in an area in which the first guided groove 22 positioned on the front end side in the connection direction. Accordingly, when the battery 1 is mounted in the charger 80B, it is not necessary for the engagement protruding part 98*a* to go over the groove forming face 19, and the engagement of the engagement protruding part 98*a* with the engagement concave part 39 can be easily performed in a speedy manner.

In addition, when the engagement protruding part 98*a* is engaged with the engagement concave part 39, the electrode terminals of the terminal connecting unit 99 are connected to the connection terminals 35 of the connector 33.

Accordingly, since the engagement of the engagement protruding part 98*a* with the engagement concave part 39 and the connection of the electrode terminals to the connection terminals 35 are simultaneously performed, it is not necessary to individually perform the operation of engaging the engagement protruding part 98*a* with the engagement concave part 39 and the operation of connecting the electrode terminals to the connection terminals 35, and the operability can be improved.

In addition, the engagement concave part 39 may be formed in an area other than the area in which the first guided groove 22, the second guided groove 23 or the third guided groove 24 is present and may be formed in a state being open to the groove forming face 19. For example, in lower end portions of the rear end portions of the groove forming faces 19 and 19, engagement concave parts 39 and 39 that are open at least to the lower side and the rear side may be formed (see FIG. 44).

By configuring the engagement concave parts 39 and 39 to be respectively formed in the lower end portions of the rear end portions of the groove forming faces 19 and 19, the battery 1 can be held by the charger 80 or the like, for example, by arranging two engagement holding portions 92 and 92 in the charger 80 or the like and locking the locking protruding portions 92*a* and 92*a* of the engagement holding portions 92 and 92 into the opening edges of the engagement concave parts 39 and 39.

In such a case, since the engagement concave parts 39 and 39 are positioned on a further front side than the rear face 15 of the battery 1, the locking protruding portions 92*a* and 92*a* are positioned also on the front side to that extend, and the length of the charger 80 or the like in the front/rear direction is shortened, whereby the size of the charger 80 or the like can be decreased.

<Configuration and the Like of Identification Groove>

Next, the configuration and the like of the identification groove 30 will be described (see FIGS. 45 to 56).

Figure 45:
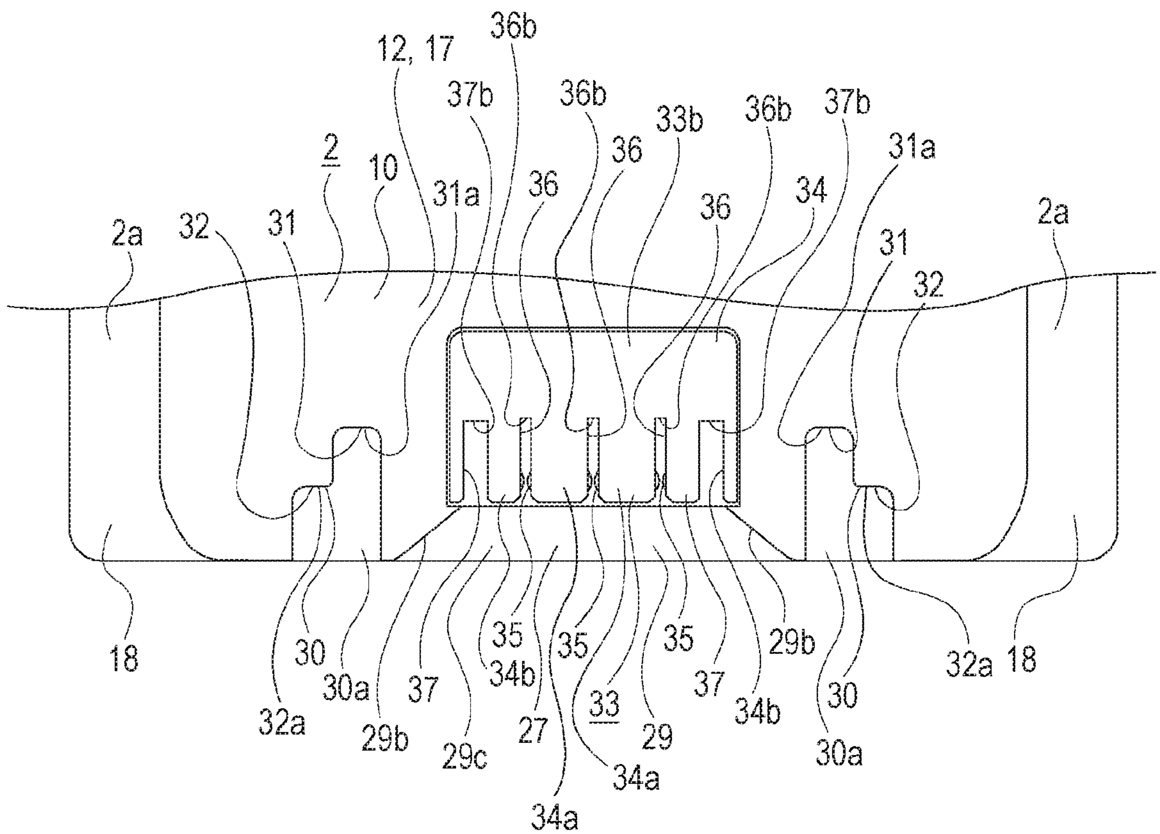
FIG. 45 is an enlarged bottom view that illustrates a front end portion of a battery.
Figure 46:
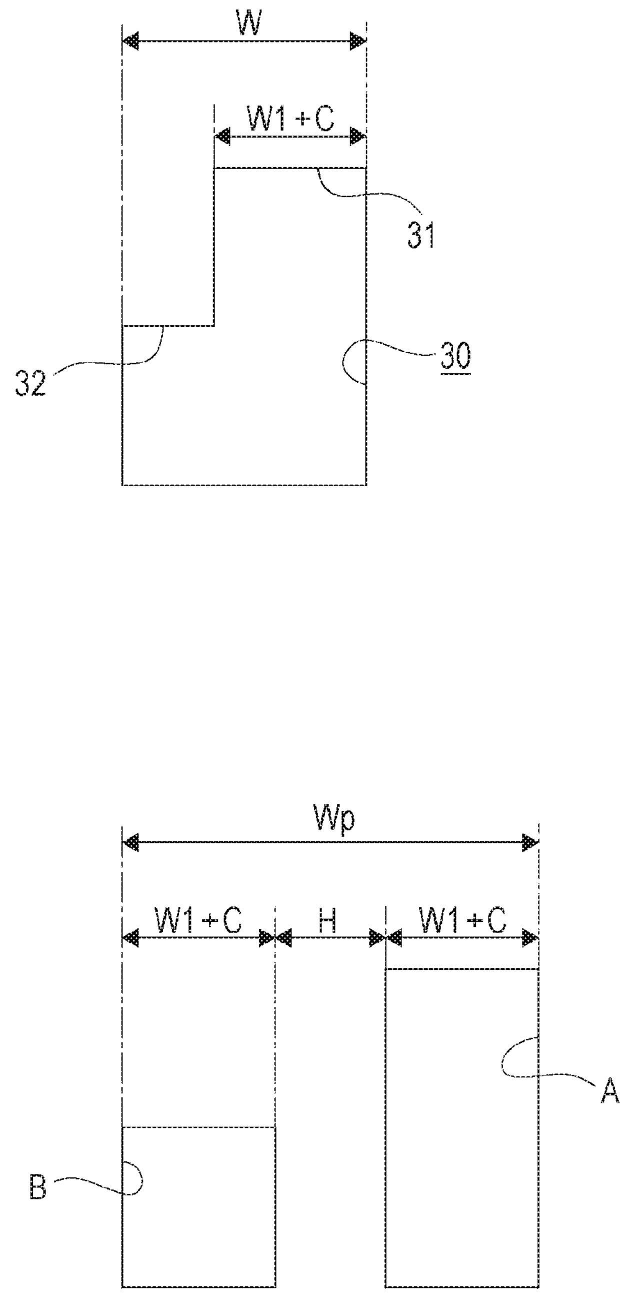
FIG. 46 is a conceptual diagram that illustrates the dimension and the like of an identification groove.

The identification groove 30, as described above, is configured by a first identification part 31 and a second identification parts 32 having mutually different lengths in the front/rear direction, and the first identification part 31 and the second identification parts 32 are continuous in the horizontal direction (see FIG. 45 and an upper stage of FIG. 46). Each of the first identification part 31 and the second identification parts 32 has discernment.

Meanwhile, in a battery of related art, a first identification groove A corresponding to the first identification part 31 and a second identification groove B corresponding to the second identification parts 32 are formed having a predetermined gap therebetween to be spaced apart from each other in the horizontal direction (see a lower stage of FIG. 46).

Generally, the horizontal width of the identification groove is determined on the basis of the fluidity of a resin at the time of molding a casing, the grade of flame retardance, and the like.

In addition, the width of the identification groove is formed in a size for securing the strength of an identification protruding portion to be inserted into the identification groove. More specifically, in a case where the width of the identification groove is small, it is necessary to configure the width of the inserted identification protruding portion to be small. However, in a case where the width of the identification protruding portion is small, the strength of the identification protruding portion is lowered, and there is a high possibility that damage or a crack occurs. Accordingly, in order to secure the strength of the identification protruding portion to be predetermined strength or more, it is necessary to configure the width to be a predetermined width or more, and it is necessary to configure the width of the identification groove to be a predetermined width or more.

On the other hand, the horizontal width of the mounting concave part 83*a* of the charger 80 is larger than the horizontal width of the battery 1 by an amount corresponding to a margin (looseness) used for securing smooth insertion of the battery 1 into the mounting concave part 83*a*. Accordingly, as the width of the identification groove, a dimension corresponding to a margin used for reliably insertion of the identification protruding portion is necessary. In addition, the width of the identification groove is formed in a size considering a dimensional tolerance or an assembly tolerance of each portion, and the width of the identification groove is set to include such a margin. Furthermore, in a battery of related art, a predetermined gap H is formed between the first identification groove A and the second identification groove B, and a width of a predetermined dimension or more is necessary for securing the strength of the gap H to be predetermined strength or more.

Thus, when the width of the identification protruding portion to be inserted into each of the first identification groove A and the second identification groove B is W1 in a battery of related art, the width of each of the first identification groove A and the second identification groove B is "W1+C" in which a margin (looseness+dimensional tolerance) is C. In addition, since a gap H between the first identification groove A and the second identification groove B is necessary, a horizontal dimension Wp that is necessary for the casing for forming the first identification groove A and the second identification groove B is "2W1+2C+H". Meanwhile, in the battery 1, the first identification part 31 corresponding to the first identification groove A and the second identification parts 32 corresponding to the second identification groove B are continuously formed in the horizontal direction (see an upper stage of FIG. 46). Accordingly, since the gap H is not necessary, a horizontal dimension W that is necessary in the casing 2 so as to form the identification groove 30 configured by the first identification part 31 and the second identification parts 32 is a dimension of "2W1+2C" or less.

In addition, in the identification groove 30, since the first identification part 31 and the second identification parts 32 are continuously formed in the horizontal direction, one margin C out of the margin 2C is not necessary for the dimension W, and the dimension W is a dimension of "2W1+C" or less.

Furthermore, since the identification protruding portion to be inserted into the second identification parts 32 having a shorter length may be partly inserted into the first identification part 31, the width of the second identification parts 32 can be configured to be less than the width W1, and, when the dimension that can be decreased is α, the dimension W is "2W1−α+C". Accordingly, the horizontal dimension W that is necessary for the casing 2 to form the identification groove 30 is decreased from the horizontal dimension Wp that is necessary in the casing of a battery of related art by "C+H+α", and the size of the battery 1 can be decreased by that amount.

Figure 47:
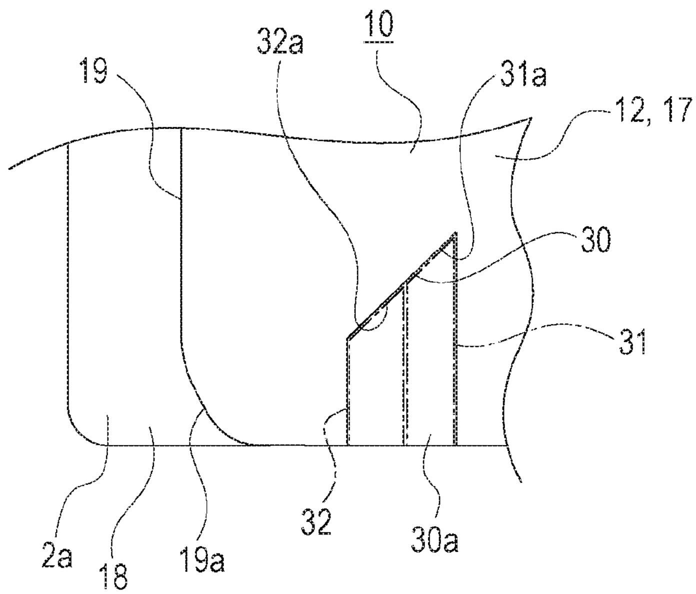
FIG. 47 is a conceptual diagram that illustrates an example of another shape of an identification groove.

In addition, in the description presented above, while an example has been illustrated in which the identification groove 30 is configured by the first identification part 31 and the second identification parts 32 each having a rectangular shape, the identification groove 30, for example, may be formed in a shape in which the inner bottom faces 31*a* and 32*a* incline (see FIG. 47). In the identification groove 30 having the shape in which the inner bottom faces 31*a* and 32*a* incline, a portion of one of the left and right sides is configured as the first identification part 31, and a portion of the other side is configured as the second identification parts 32. Since a level difference is not present in the identification groove 30 in which the inner bottom faces 31*a* and 32*a* incline, the identification groove 30 can be easily formed in the casing 2.

Figure 48:
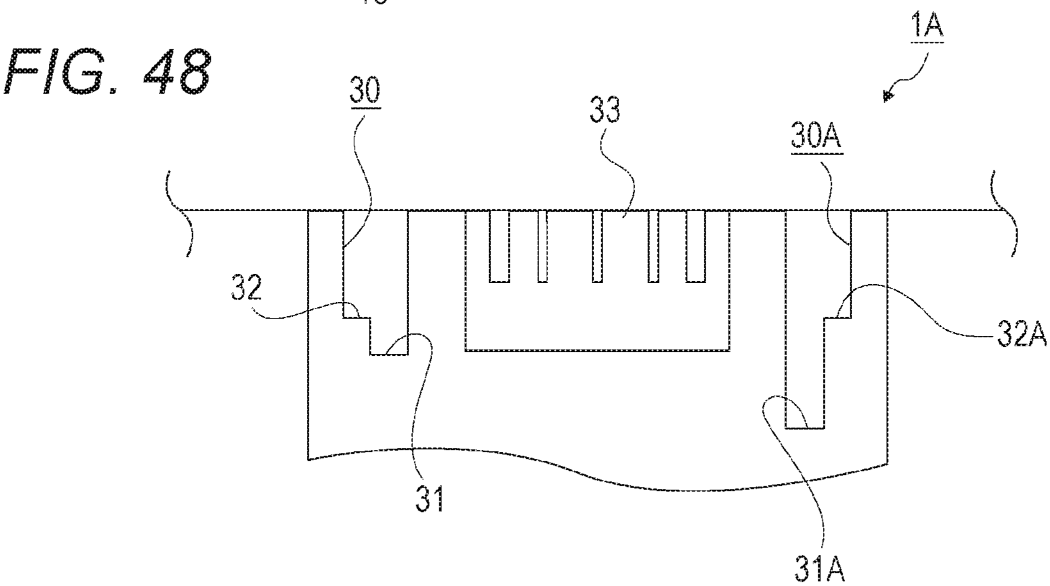
FIG. 48 is a bottom view that illustrates an identification groove and the like of a battery of a large capacity type.
Figure 49:
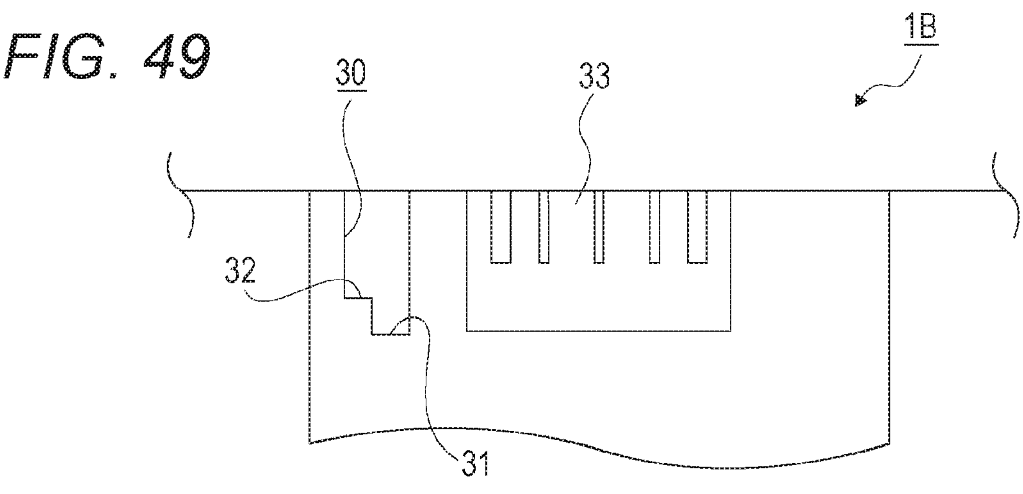
FIG. 49 is a bottom view that illustrates an identification groove and the like of a battery of a small capacity type.

Next, examples of batteries 1A and 1B having identification grooves different from those of the battery 1 will be described (see FIGS. 48 and 49).

As described above, in the battery 1, two identification grooves 30 and 30 are horizontally formed to be spaced apart from each other. For example, the battery 1 is a middle capacity type of which the maximum charging capacity is standard.

The battery 1A, for example, is a large capacity type of which the maximum charging capacity is larger than that of the battery 1. In the battery 1A, one identification groove 30 and one identification groove 30A are formed (see FIG. 48). The identification groove 30A is configured by a first identification part 31A longer than the first identification part 31 in the front/rear direction and the second identification parts 32.

The battery 1B, for example, is a small capacity type of which the maximum charging capacity is smaller than that of the battery 1. In the battery 1B, one identification groove 30 is formed (see FIG. 49).

Next, configuration examples of the battery mounting unit of a connection apparatus to which the battery 1, the battery 1A or the battery 1B is mounted will be described (see FIGS. 50 to 53).

As the connection apparatuses, for example, there are a low power camera that can be driven by low power, a middle power camera that can be driven by power higher than that of the low power camera, a high power camera that can be driven by power higher than that of the middle power camera, and a charger 80.

Figure 50:
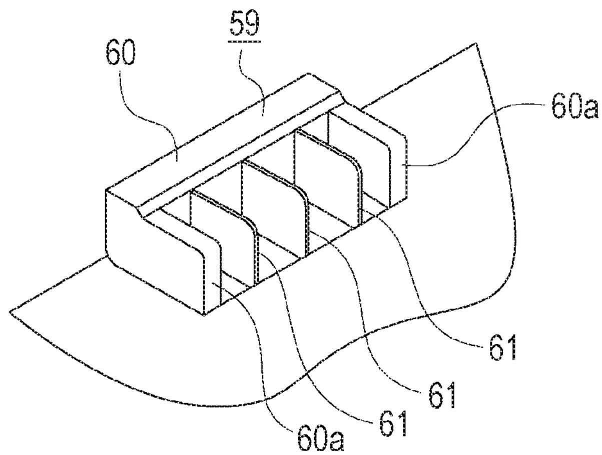
FIG. 50 is a perspective view that illustrates the configuration of a battery mounting unit of a low-power camera.

In a battery mounting unit of the low power camera, the terminal connecting unit 59 is arranged, but an identification protruding portion inserted into the identification groove 30 or the like is not arranged (see FIG. 50).

Figure 51:
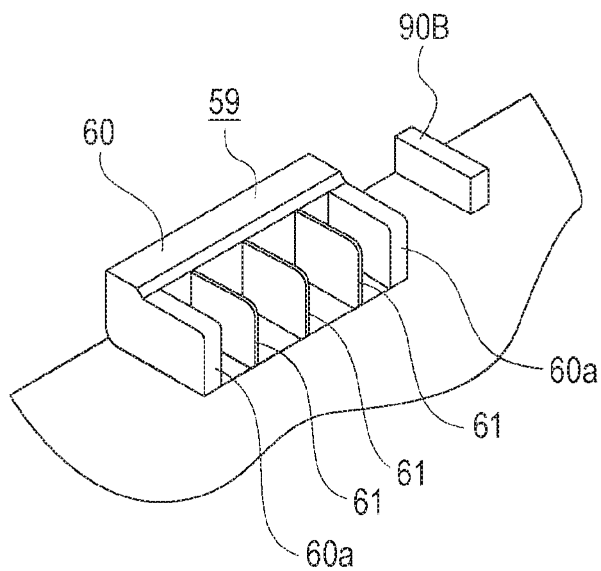
FIG. 51 is a perspective view that illustrates the configuration of a battery mounting unit of a middle-power camera.

In a battery mounting unit of the middle power camera, the terminal connecting unit 59 is arranged, and an identification protruding portion 90B is arranged on the lateral side of the terminal connecting unit 59 (see FIG. 51). The identification protruding portion 90B has such a length that the whole identification protruding portion 90B can be inserted into the first identification part 31 or the first identification part 31A.

Figure 52:
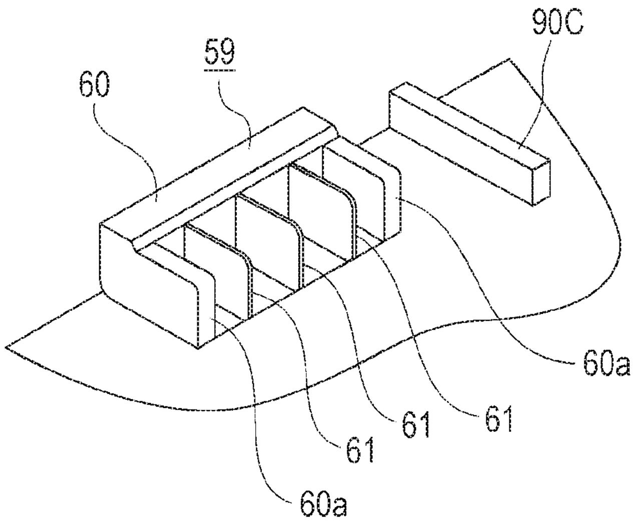
FIG. 52 is a perspective view that illustrates the configuration of a battery mounting unit of a high-power camera.

In a battery mounting unit of the high power camera, the terminal connecting unit 59 is arranged, and an identification protruding portion 90C is arranged on the lateral side of the terminal connecting unit 59 (see FIG. 52). The identification protruding portion 90C has a length longer than the identification protruding portion 90B and has such a length that the whole identification protruding portion 90C is not inserted into the first identification part 31, but the whole identification protruding portion can be inserted into the first identification part 31A.

Figure 53:
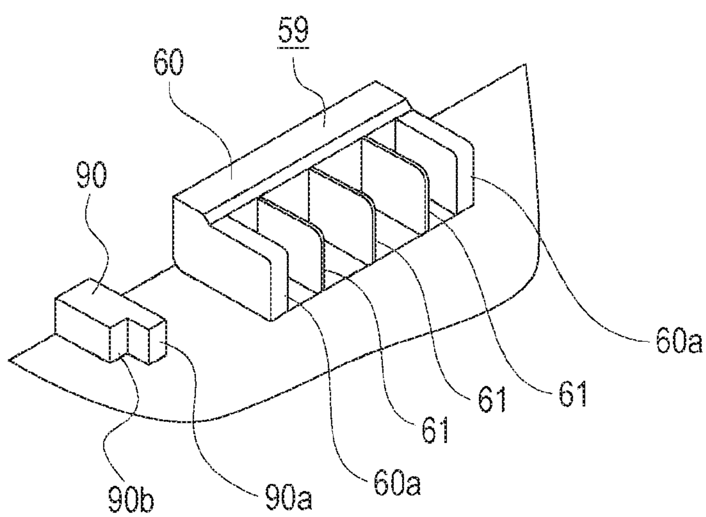
FIG. 53 is a perspective view that illustrates the configuration of a battery mounting unit of a charger.

In the battery mounting unit 83 of the charger 80, as described above, the terminal connecting unit 93 is arranged, and the identification protruding portion 90 is arranged on the lateral side of the terminal connecting unit 93 (see FIG. 53). The identification protruding portion 90 is configured by the long portion 90*a* and a short portion 90*b*.

Next, an example of the discriminability of the identification grooves 30 and 30A described above will be described (see FIG. 54).

Figure 54:
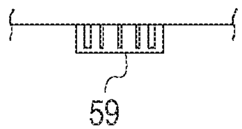
FIG. 54 is a diagram that illustrates the identity of an identification groove.
Figure 54:
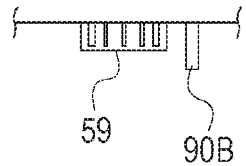
Figure 54:
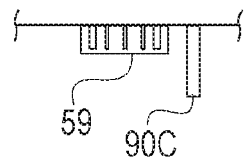
Figure 54:
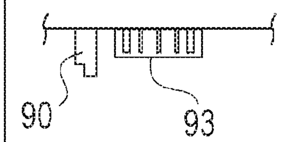
Figure 54:
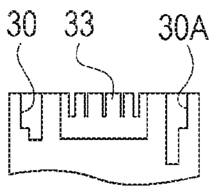
Figure 54:
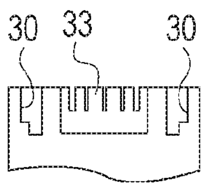
Figure 54:
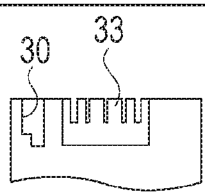

Hereinafter, as an example, the discriminability of the battery 1, the battery 1A, and the battery 1B for the low power camera, the middle power camera, the high power camera, and the charger 80 will be described. In FIG. 54, "Y" represents that the battery is mountable in a camera or a charger, and "N" represents that the battery is not mountable in a camera or a charger.

The battery 1A of the large capacity type includes an identification groove 30 positioned on the left side and an identification groove 30A positioned on the right side.

The battery 1 of the middle capacity type includes identification grooves 30 and 30 positioned to be spaced apart from each other on the left and right sides. The battery 1B of the small capacity type includes one identification groove 30 positioned on the left side.

The low power camera does not include an identification protruding portion in the battery mounting unit, and accordingly, portions to be inserted into the identification grooves 30 and 30A are not present. Accordingly, in the battery mounting unit of the low power camera, any one of the battery 1, the battery 1A, and the battery 1B can be installed, it is identified that any one of the battery 1, the battery 1A, and the battery 1B is a battery usable for the low power camera. The middle power camera includes the identification protruding portion 90C positioned on the right side in the battery mounting unit, and the identification protruding portion 90C can be inserted into any one of the first identification part 31 of the identification groove 30 and the first identification part 31A of the identification groove 30A. The identification protruding portion 90C is inserted into the first identification part 31 of the identification groove 30 positioned on the right side of the battery 1 and is inserted into the first identification part 31A of the identification groove 30A positioned on the right side of the battery 1A. On the other hand, since an identification groove is not formed on the right side of the battery 1B, the identification protruding portion 90C interferes with the battery 1B.

Accordingly, in the battery mounting unit of the middle power camera, while any one of the battery 1A and the battery 1 is mountable, the battery 1B is not mountable. Thus, it is identified that any one of the battery 1A and the battery 1 is a battery usable for the middle power camera, and it is identified that the battery 1B is a battery unusable for the middle power camera.

The high power camera includes the identification protruding portion 90B positioned on the right side of the battery mounting unit, and the identification protruding portion 90B can be inserted into the first identification part 31A of the identification groove 30A. The identification protruding portion 90B is inserted into the first identification part 31A of the identification groove 30A positioned on the right side of the battery 1A. However, while the identification protruding portion 90B can be inserted into the first identification part 31 of the identification groove 30 positioned on the right side of the battery 1 only up to the middle, and the electrode terminal 95 is not connected to the connection terminal 35 of the connector 33 of the battery 1. In addition, since an identification groove is not formed on the right side of the battery 1B, the identification protruding portion 90B interferes with the battery 1B.

Accordingly, in the battery mounting unit of the high power camera, while the battery 1A is mountable, the battery 1 and the battery 1B are not mountable. Thus, it is identified that the battery 1A is a battery usable for the high power camera, and it is identified that the battery 1 and the battery 1B are batteries that are not usable for the high power camera.

The charger 80 includes an identification protruding portion 90 positioned on the left side of the battery mounting unit 83, and the identification protruding portion 90 can be inserted into the identification groove 30. The identification protruding portion 90 is inserted into the identification groove 30 positioned on the left side of any one of the battery 1, the battery 1A, and the battery 1B.

Accordingly, in the battery mounting unit 83 of the charger 80, any one of the battery 1, the battery 1A, and the battery 1B is mountable, and it is identified that any one of the battery 1, the battery 1A, and the battery 1B is a battery usable for the charger 80.

In addition, in the description presented above, while an example relating to identification of a battery using a difference in the charging capacity is illustrated, the identification using the identification groove 30 and the like is not limited to the identification using a difference in the charging capacity but, for example, may be applied also to identification using any other difference such as a difference between a chargeable type and a non-chargeable type or a difference in charging speed or the like.

Further, in the description presented above, while an example of the identification groove 30 configured by two portions including the first identification part 31 and the second identification parts 32 having mutually-different lengths is illustrated, the identification groove 30 may be configured by three or more identification parts having mutually-different lengths. As described above, in the battery 1 (the batteries 1A and 1B), the identification groove 30 used for identifying a connection apparatus is formed in the casing 2, and, in the identification groove 30, a plurality of identification parts having mutually-different lengths are continuously formed.

Thus, since portions dividing the plurality of identification parts having mutually-different lengths is not present, the size of the identification groove 30 in a direction in which the identification parts are continuous is the size acquired by summing the sizes of the plurality of identification parts, and the size of the battery 1 can be decreased while high discriminability is secured.

In addition, since the first identification part 31 and the second identification parts 32 are formed as identification parts, the size of the identification groove 30 in a direction in which the identification parts are continuous is a size acquired by summing the sizes of the first identification part 31 and the second identification parts 32, and the size of the battery 1 can be decreased while the discriminability is improved. Furthermore, since, in the identification groove 30, a plurality of identification parts are continuously formed in the widthwise direction, the size of the identification groove 30 in the widthwise direction is a size acquired by summing the sizes of the plurality of identification parts. Thus, the size of the battery 1 in the widthwise direction can be smaller than that of a case where the plurality of identification grooves are formed to be spaced apart from each other in the widthwise direction while the discriminability is improved.

In addition, the widths of the plurality of identification parts are configured to be smaller in order of the shortest to longest length. For example, for the first identification part 31 and the second identification parts 32, the width of the second identification parts 32 having a smaller length is configured to be smaller than the width of the first identification part 31 having a larger length. Accordingly, the size of the identification groove 30 in the widthwise direction is smaller than a width acquired by summing the widths of a case where identification parts of a same width are formed. Therefore, the size of the battery 1 in the widthwise direction can be further decreased while the discriminability is improved.

In addition, since the two identification grooves 30 and 30 are formed to be spaced apart from each other in the widthwise direction, a connection apparatus can be identified using the two identification grooves 30 and 30, and accordingly, the number of types of connection apparatus that can be identified can be increased. Furthermore, in such a case, the shapes or the sizes of the two identification grooves 30 and 30 may be formed to be different from each other.

Figure 55:
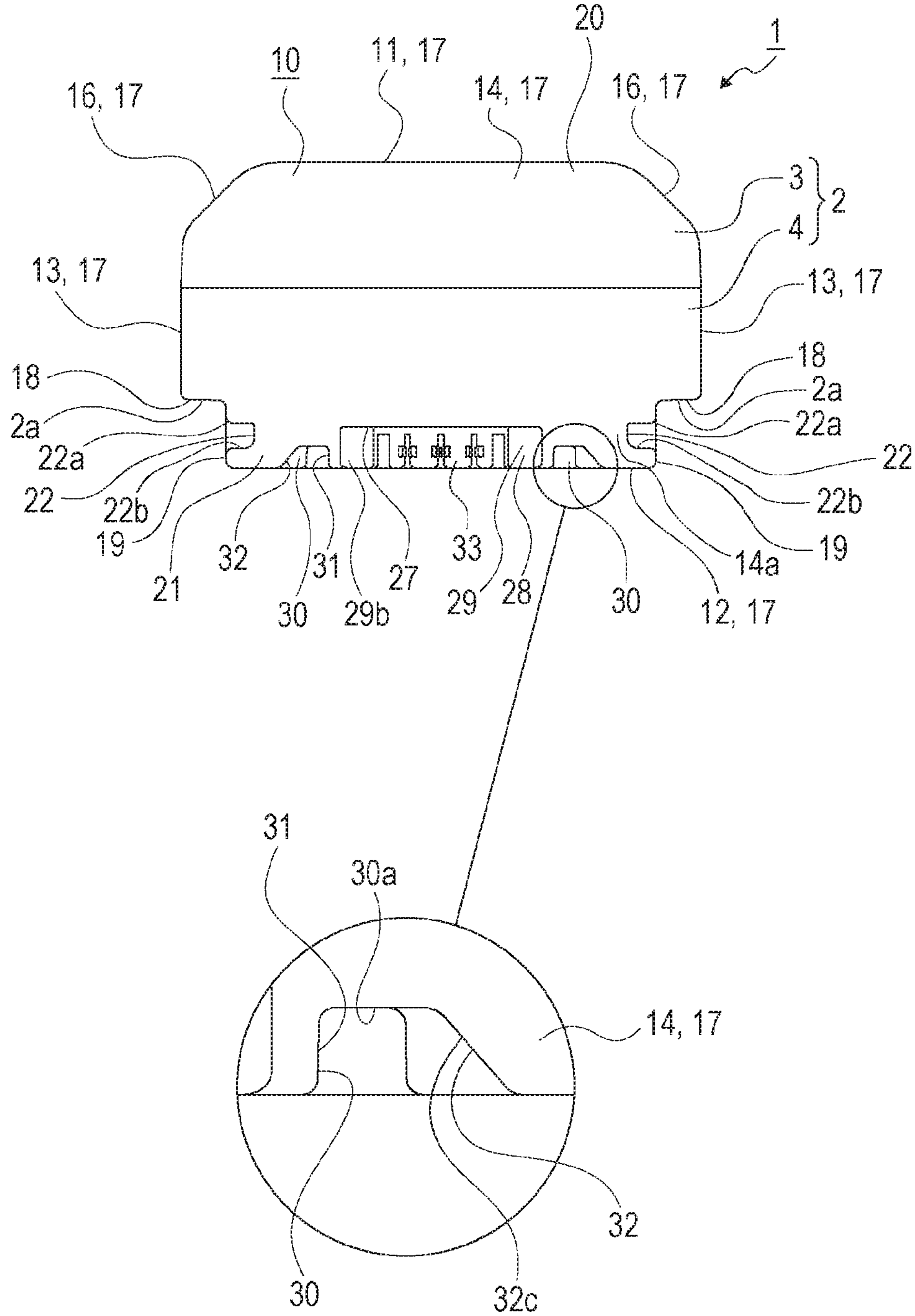
FIG. 55 is an enlarged front view that illustrates an example in which a second portion of an identification groove is formed in a different shape.

In addition, in the identification groove 30, the first identification part 31 and the second identification parts 32 may be formed in mutually-different shapes (see FIG. 55). In the identification groove 30, for example, the second identification parts 32 may be formed in a space of an approximately triangular prism shape. By forming the identification groove 30 in such a shape, a portion of the area of the second identification parts 32 in the inner bottom face 30*a* of the identification groove 30 is formed as an inclining face 32*c*. The inclining face 32*c* inclines to be displaced to the bottom face 12 side as approaching the side face 13 positioned on an opposite side of the first identification part 31 that is continuous in the horizontal direction.

The identification groove 30 is a portion formed near the first guided groove 22, and, by forming the identification groove 30 in such a shape, the thickness (width) of a portion between the first guided groove 22 of the casing 2 and the identification groove 30 is increased, and the peripheral portion of the first guided groove 22 can be reinforced.

Figure 56:
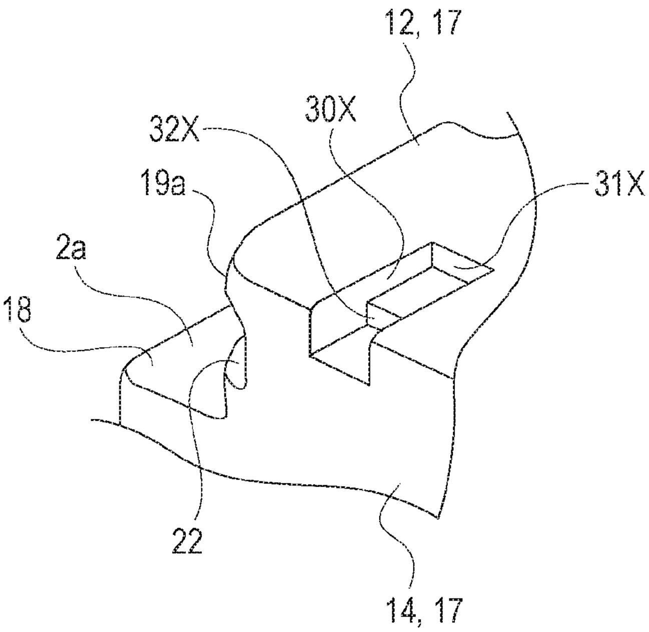
FIG. 56 is an enlarged perspective view that illustrates an example of an identification groove in which a first portion and a second portion are formed to be continuous in the vertical direction.

Further, in the description presented above, while the identification groove 30 in which the first identification part 31 and the second identification parts 32 having mutually-different lengths are continuous in the widthwise direction has been illustrated as an example, instead of the identification groove 30, an identification groove 30X may be formed (see FIG. 56). The identification groove 30X has a configuration in which a first identification part 31X and a second identification parts 32X having mutually-different sizes in the vertical direction (depth direction) are continuous, and, for example, the length of the first identification part 31X is larger than that of the second identification parts 32X, and the first identification part 31 is continuously formed on the lower side of the second identification parts 32.

In addition, similarly to the identification groove 30, the identification groove 30X may be configured by three or more identification parts having mutually-different lengths.

In this way, by forming a plurality of identification parts to be continuous in the depth direction, the size of the identification groove 30X in the depth direction is a size acquired by summing the sizes of the plurality of identification parts. Thus, the size of the battery 1 in the depth direction (vertical direction) can be smaller than that of a case where the plurality of identification grooves are formed to be spaced apart from each other in the depth direction while the discriminability is improved.

In addition, the depths of the plurality of identification parts of the identification groove 30X may be configured to be smaller in order of the shortest to longest length.

Accordingly, by configuring the identification groove 30X as such, the size of the identification groove 30X in the depth direction is smaller than a depth acquired by summing the depths of a case where identification parts of a same depth are formed. Therefore, the size of the battery 1 in the depth direction can be further decreased while the discriminability is improved.

Modified Example

Hereinafter, modified examples of each portion of the battery 1 will be described (see FIGS. 57 to 59).

Figure 57:
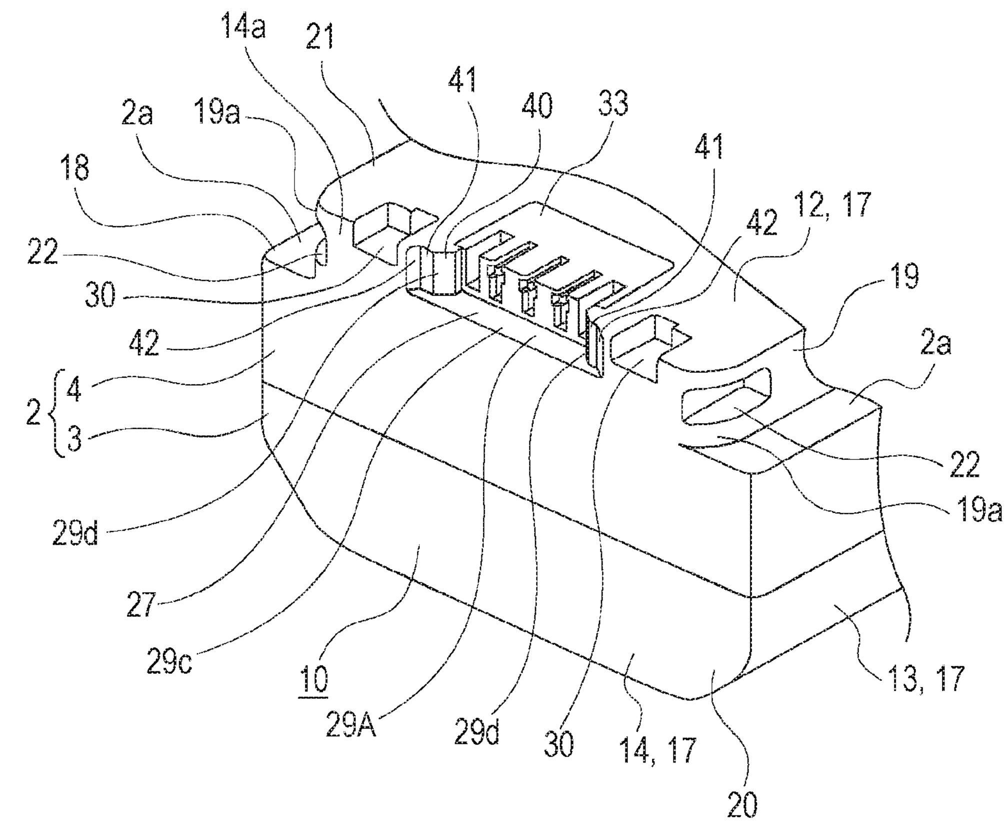
FIG. 57 is a perspective view that illustrates a different shape of a wall portion of a concave part forming face.
Figure 58:
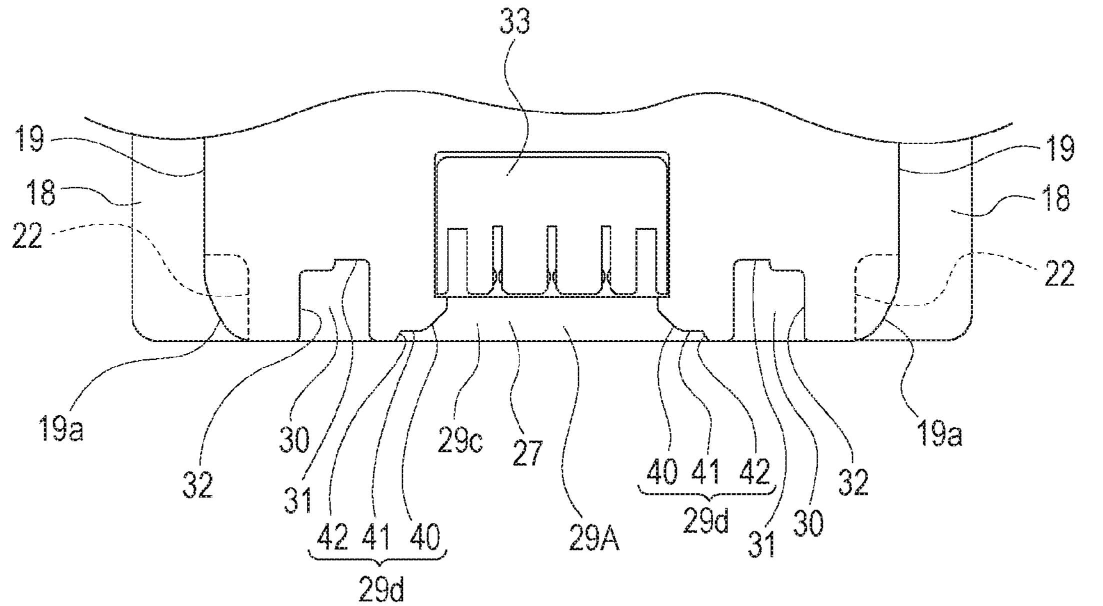
FIG. 58 is a bottom view that illustrates a different shape of a wall portion of a concave part forming face.

A first modified example is a modified example of the concave part forming face (see FIGS. 57 and 58). A concave part forming face 29A according to the first modified example includes wall portions 29*d* and 29*d*. The wall portions 29*d* and 29*d* are formed by first inclining faces 40 and 40 that are continuous from the base portion 29*a*, middle faces 41 and 41 that are continuous from the first inclining faces 40 and 40, and second inclining faces 42 and 42 that are continuous from the middle faces 41 and 41.

The first inclining faces 40 and 40 are continuous from the front end of the base portion 29*a* and incline in directions being spaced apart from each other in the horizontal direction toward the front side. The middle faces 41 and 41 are formed as faces that are continuous from the front ends of the first inclining faces 40 and 40 and face the front side. The second inclining faces 42 and 42 are continuous from the outer ends of the middle faces 41 and 41 in the horizontal direction and incline in directions being spaced apart from each other in the horizontal direction toward the front side.

The inclination angle of the first inclining face 40 with respect to the middle face 41 is larger than the inclination angle of the second inclining face 42 with respect to the middle face 41. However, the inclination angle of the first inclining face 40 with respect to the middle face 41 may be configured to be smaller than the inclination angle of the second inclining face 42 with respect to the middle face 41 or may be the same as the inclination angle of the second inclining face 42 with respect to the middle face 41.

In addition, the width of the first inclining face 40 in the inclining direction is larger than the width of the second inclining face 42 in the inclining direction. However, the width of the first inclining face 40 in the inclining direction may be configured to be smaller than the width of the second inclining face 42 in the inclining direction or may be the same as the width of the second inclining face 42 in the inclining direction. By forming the concave part forming face 29A including the wall portions 29*d* and 29*d* described above, the front/rear depth of a portion disposed on the rear side of the wall portions 29*d* and 29*d* in the casing 2 is increased, whereby the strength of the casing 2 can be improved.

Figure 59:
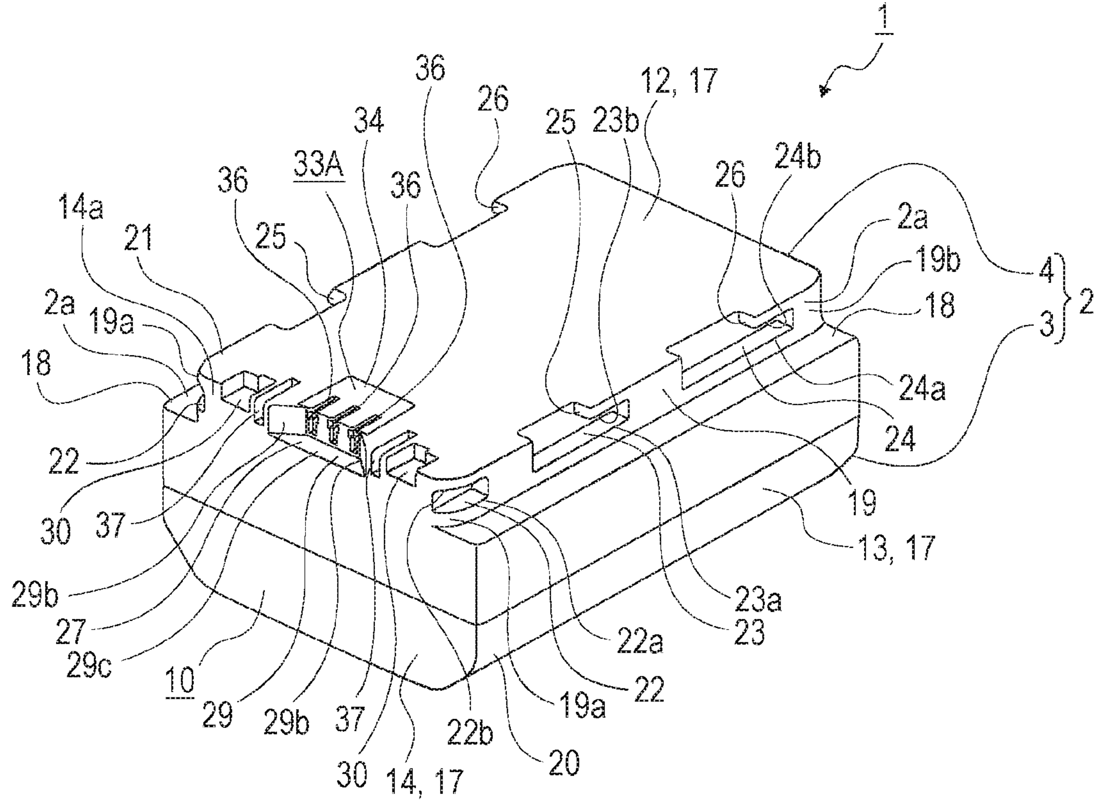
FIG. 59 is a perspective view that illustrates an example of a battery in which a positioning groove is formed in a casing.

A second modified example is a modified example of the connector (see FIG. 59). A connector 33A according to the second modified example includes a housing 34 formed using a non-conductive material and connection terminals 35, 35, and 35 formed using a conductive material. In the housing 34, while terminal arrangement grooves 36, 36, and 36 in which the connection terminals 35, 35, and 35 are arranged are formed, the positioning grooves 37 and 37 are not formed.

In each of the terminal arrangement grooves 36, 36, and 36, connection terminals 35, 35, and 35 functioning as a positive electrode terminal, a negative electrode terminal, and information terminals, respectively, are arranged. In addition, in the connector 33A, two terminal arrangement grooves 36 and 36 or four terminal arrangement grooves 36, 36, . . . may be formed. In a case where two terminal arrangement grooves 36 and 36 are formed in the connector 33A, a positive electrode terminal and a negative electrode terminal are arranged in the two terminal arrangement grooves 36 and 36, respectively. In a case where four terminal arrangement grooves 36, 36, . . . are formed in the connector 33A, a positive electrode terminal, a negative electrode terminal, an information terminal, and a communication terminal are arranged in the four terminal arrangement grooves 36, 36, . . . , respectively.

In a case where the connector 33A is used, positioning grooves 37 and 37 are formed on both left and right sides of the connector 33A in the casing 2.

By using the connector 33A as described above, the widths of portions disposed on both sides of the arrangement concave part 27 in the casing 2 in the horizontal direction are increased, whereby the strength of the casing 2 can be improved.

<Configuration of Another Battery>

The configuration of a battery 1C other than the battery 1 will be described (see FIGS. 60 and 61).

In addition, the battery 1C represented below is different from the battery 1 described above in that only the connector is not present, and the configurations of the other portions and a positional relation between the portions, and the sizes of the portions are similar to those of the battery 1. Thus, hereinafter, only portions different from those of the battery 1 will be described in detail, and same reference numerals assigned to similar portions of the battery 1 will be assigned to the other portions, and description thereof will not be presented.

Figure 60:
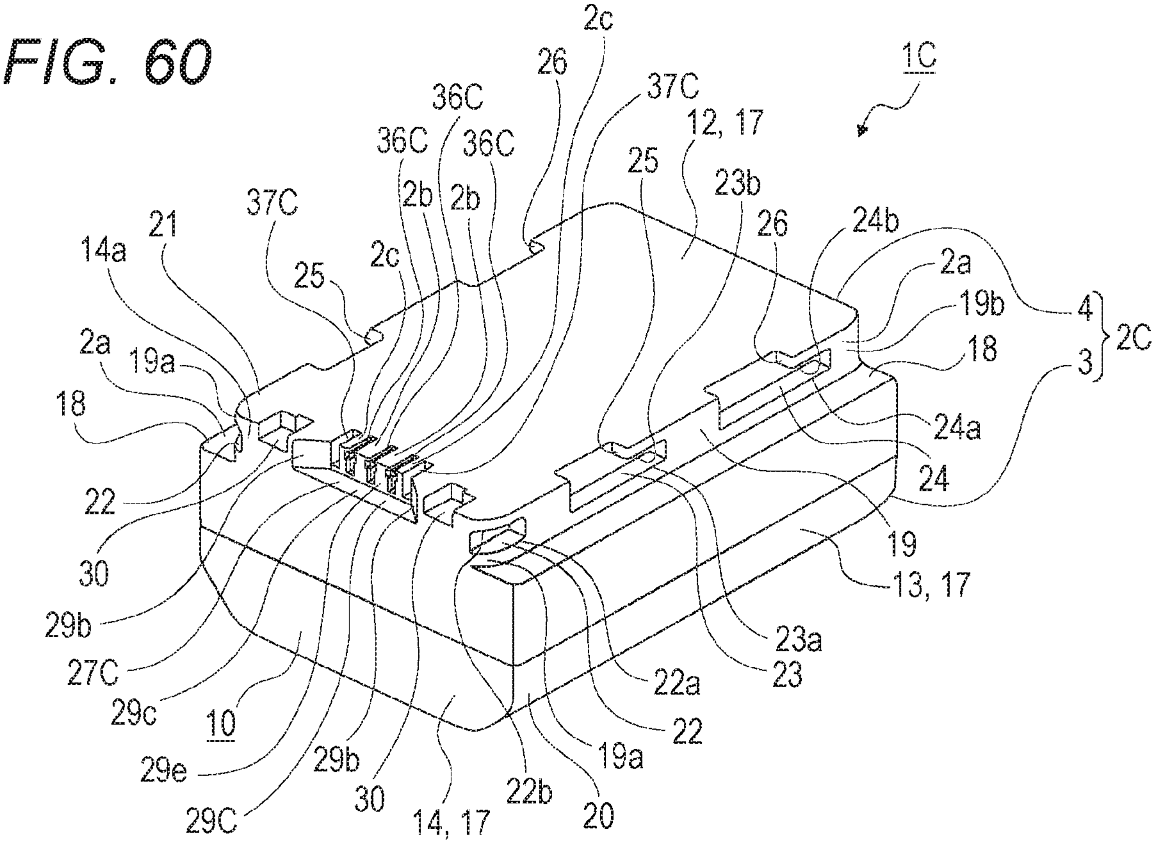
FIG. 60 is a perspective view that illustrates an example of a battery in which a terminal arrangement groove and a positioning groove are formed in a casing.

In the front end portion of a bottom part 21, a concave part 27C is formed (see FIG. 60). The concave part 27C is formed at approximate center in the horizontal direction and is open to the front side and the lower side.

The concave part 27C is formed by a concave part forming face 29C. The concave part forming face 29C is formed by a base portion 29*e*, wall portions 29*b* and 29*b*, and a middle portion 29*c*.

The base portion 29*e* is formed in a state facing the front side. The wall portions 29*b* and 29*b* are continuous from left and right both ends of the base portion 29*e* and are formed as inclining faces spaced apart from each other in the horizontal direction toward the front side. The middle portion 29*c* is formed between the lower edges of the wall portions 29*b* and 29*b* facing the lower side. In a portion continuous from the rear side of the concave part 27C in the casing 2C, terminal arrangement grooves 36C, 36C, and 36C are formed to be spaced apart from each other to the left and right sides. An opening, which is open to the lower side and the front side, of the front side of the terminal arrangement groove 36C is formed in the base portion 29*e*. The connection terminals 35, 35, and 35 are held by the casing 2C in a state in which at least parts thereof are arranged in the terminal arrangement grooves 36C, 36C, and 36C. In the battery 1C, a connector is not arranged, but the connection terminals 35, 35, and 35 are configured as terminal portions.

In the casing 2C, positioning grooves 37C and 37C that are open to the front side and the lower side are formed on the outer side of the terminal arrangement grooves 36C, 36C, and 36C in the horizontal direction.

In the casing 2C, portions between the terminal arrangement grooves 36C, 36C, and 36C are arranged as terminal separation ribs 2*b* and 2*b*, and portions between the terminal arrangement grooves 36C and 36C and the positioning grooves 37C and 37C in the casing 2C are arranged as inter-groove ribs 2*c* and 2*c*. The horizontal width of the terminal separation rib 2*b* is configured to be larger than the horizontal width of the inter-groove rib 2*c* so as to prevent a contact among the connection terminals 35, 35, and 35.

Figure 61:
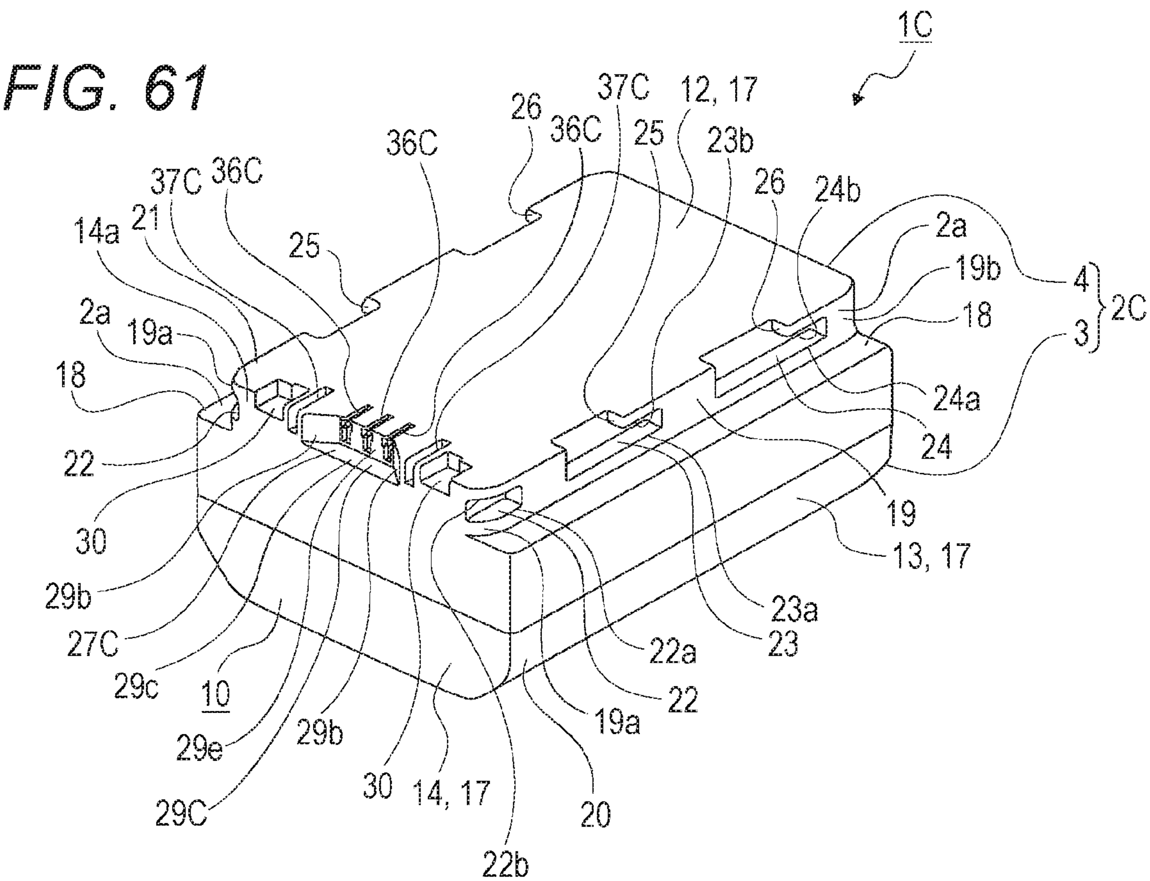
FIG. 61 is a perspective view that illustrates another example of a battery in which a terminal arrangement groove and a positioning groove are formed in a casing.

In addition, in the description presented above, while an example has been illustrated in which the positioning grooves 37C and 37C are formed at positions continuous from the concave part 27C, the positioning grooves 37C and 37C may be formed on left and right both sides of the concave part 27C in the casing 2C (see FIG. 61).

In addition, in the battery 1C, similarly to the battery 1, two terminal arrangement grooves 36C and 36C or four terminal arrangement grooves 36C, 36C, . . . may be formed. As described above, in the battery 1C, since a connector is not arranged, and the terminal arrangement groove 36C and the positioning groove 37C are formed in the casing 2C, the manufacturing cost can be reduced according to the simplification of the structure and a decrease in the number of components.

Configuration Example of Another Connection Apparatus

A charger 110 will be described below as another example of a connection apparatus to which a plurality of batteries 1, 1, . . . (1A, 1B, and 1C) are connected (see FIG. 62). A plurality of batteries, for example, four batteries 1, 1, . . . can be mounted in the charger 110. The charger 110 has a casing 111. The casing 111 includes a top plate part 112 and bottom plate part 113 which are disposed at upper and lower positions and a partition plate part 114 positioned between the top plate part 112 and the bottom plate part 113. Concave battery mounting units 115, 115, . . . which are partitioned in the front, rear, right, and left directions are formed in the charger 110.

Figure 25:
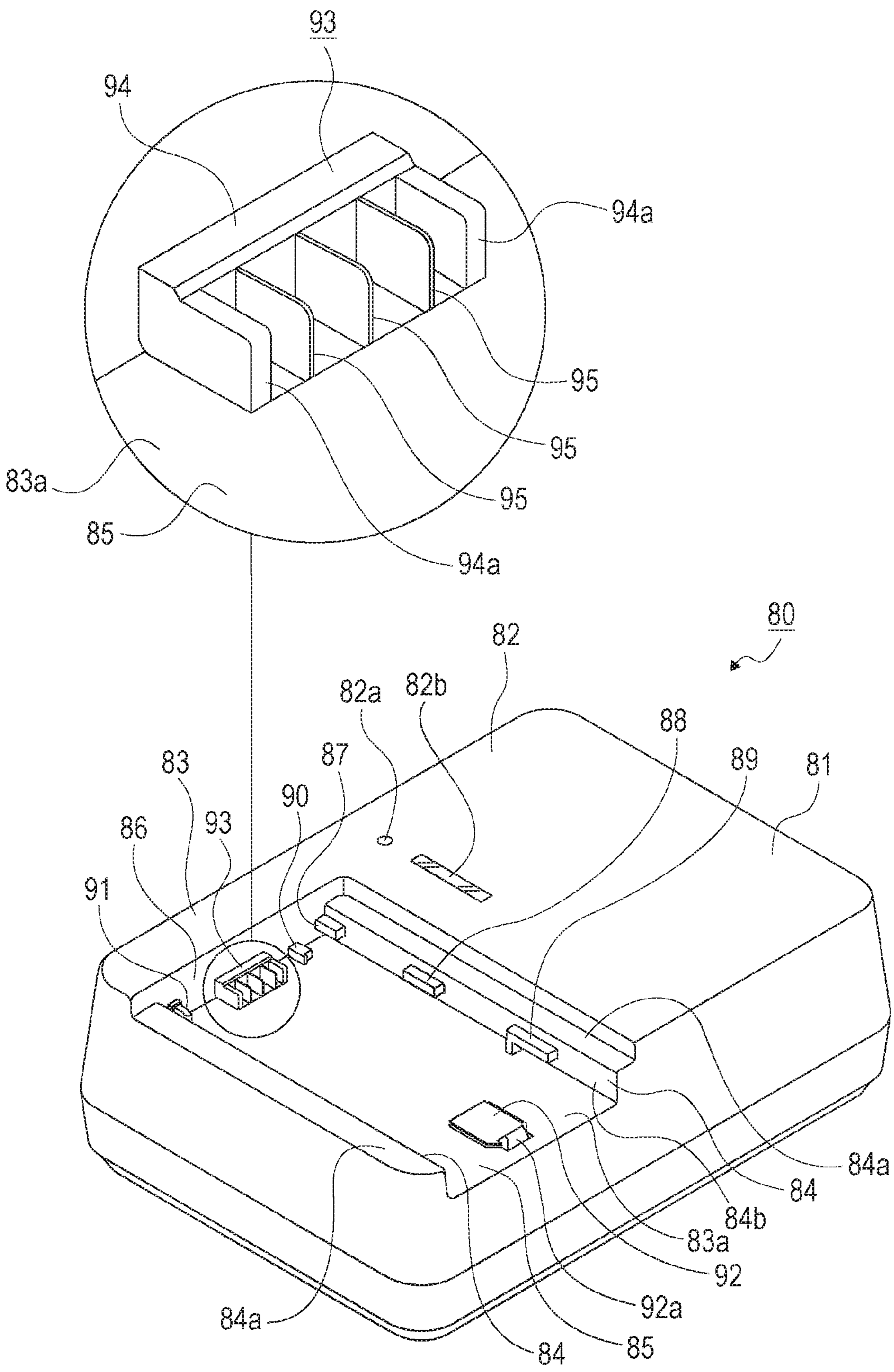
FIG. 25 is a perspective view of a charger.
Figure 26:
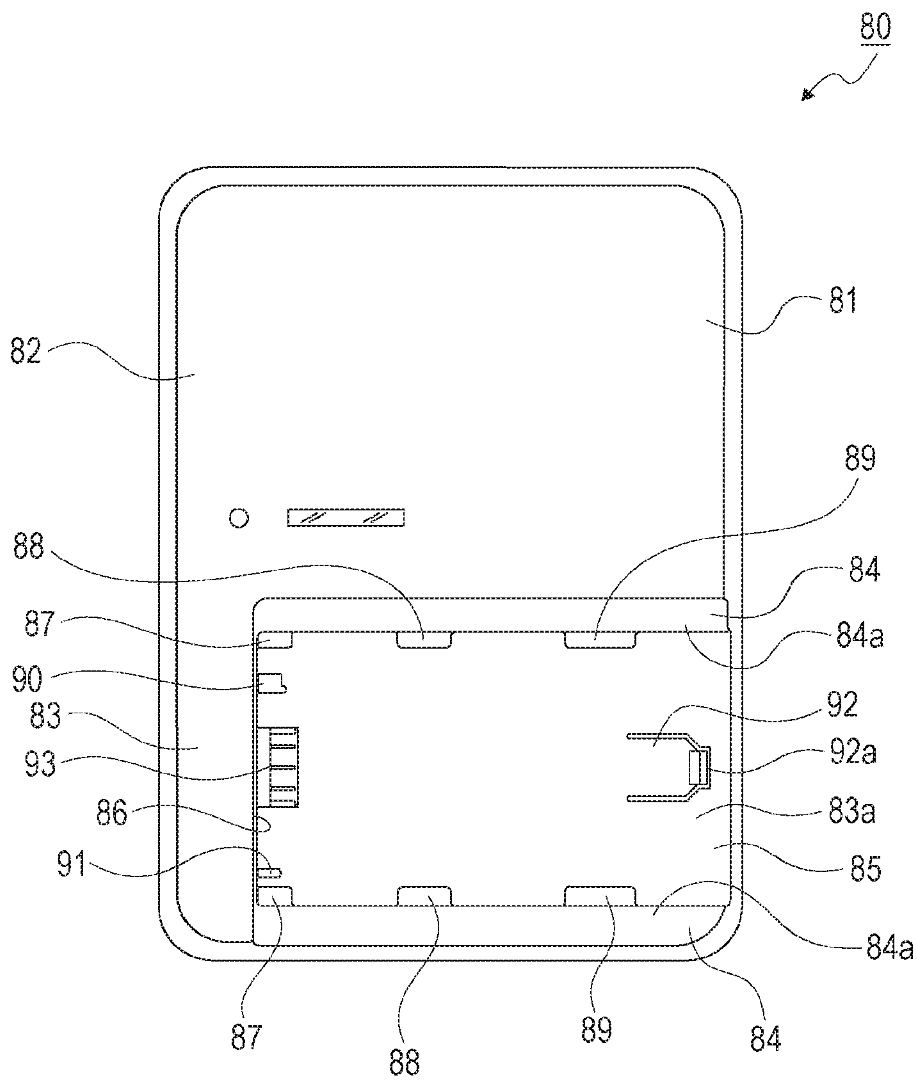
FIG. 26 is a plan view of a charger.
Figure 27:
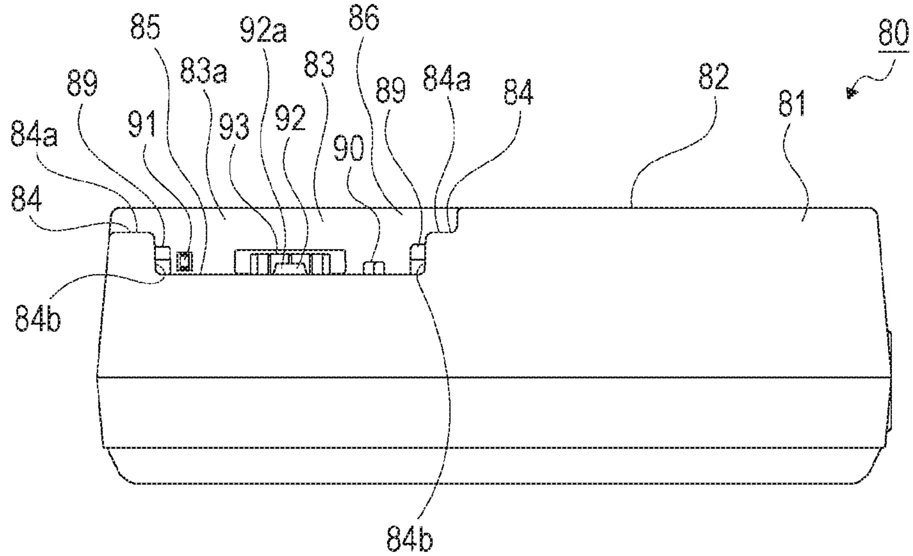
FIG. 27 is a side view of a charger.
Figure 28:
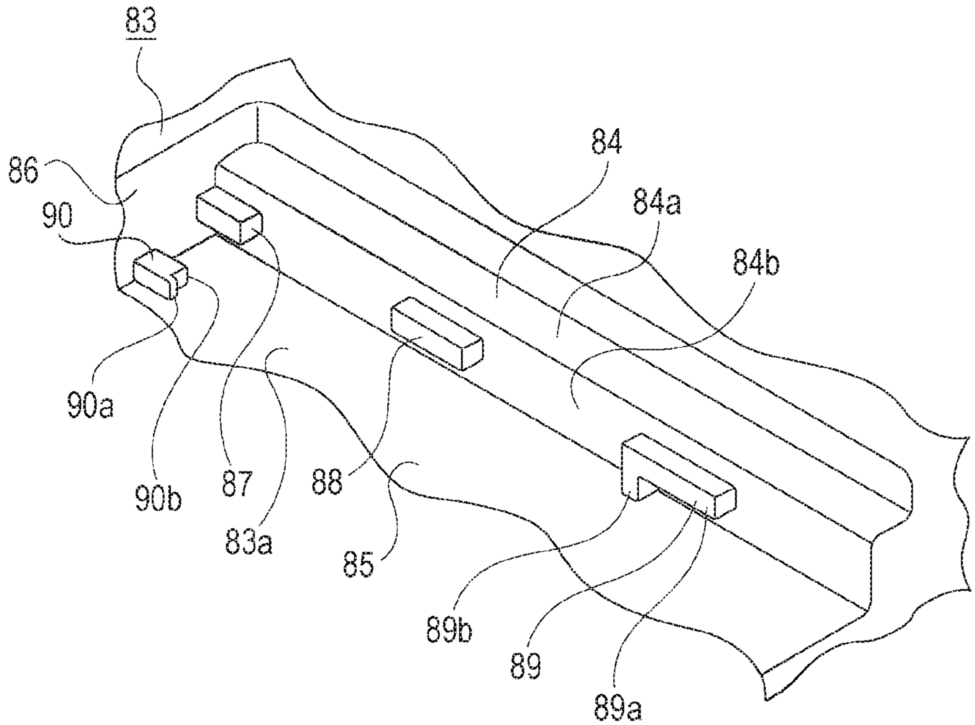
FIG. 28 is an enlarged perspective view that illustrates a guide engaging part and the like of a charger.

The battery mounting unit 115 has a similar configuration to the battery mounting unit 83 of the charger 80 (see FIG. 25 or the like). The batteries 1, 1, . . . are detachably mounted in the battery mounting units 115, 115, . . . , respectively, and all the batteries 1, 1, . . . can be charged at the same time by mounting the batteries 1, 1, . . . in the battery mounting units 115, 115, . . . .

A power cable (not illustrated) can be connected to the charger 110, and it is possible to charge the batteries 1, 1, . . . through a commercial power supply by connecting the power cable to the charger 110. Further, the batteries 1A, 1B, and 1C can also be mounted in the battery mounting unit 115 of the charger 110.

Configuration Example of Power Supply

Next, a power supply 116 which is connectable to the charger 110 will be described (see FIGS. 62 to 68).

Figure 62:
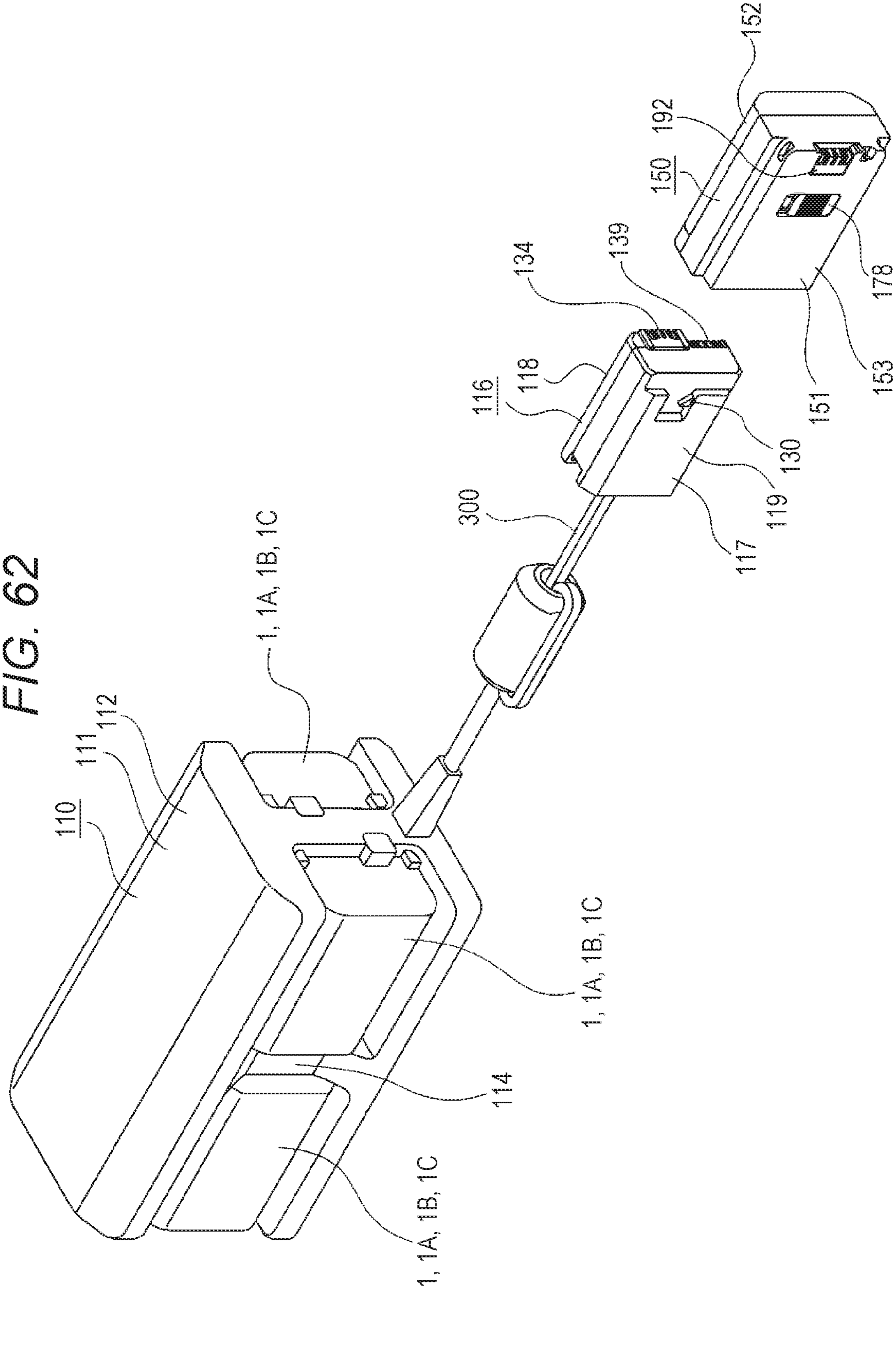
Figure 63:
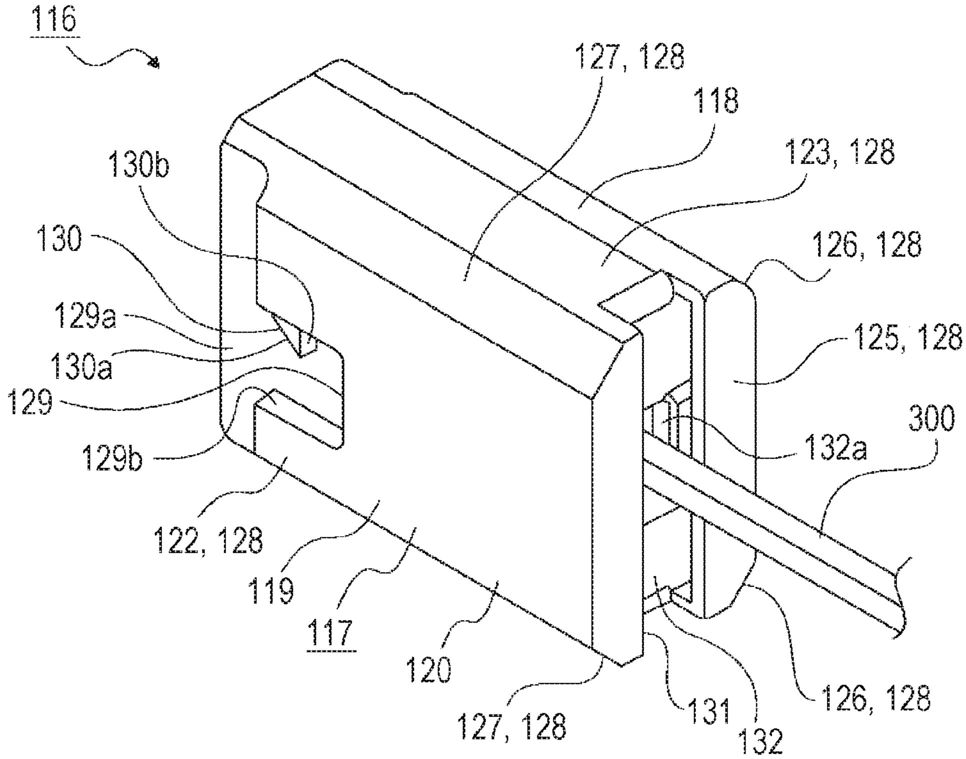
FIG. 63 is a perspective view of a power supply.
Figure 64:
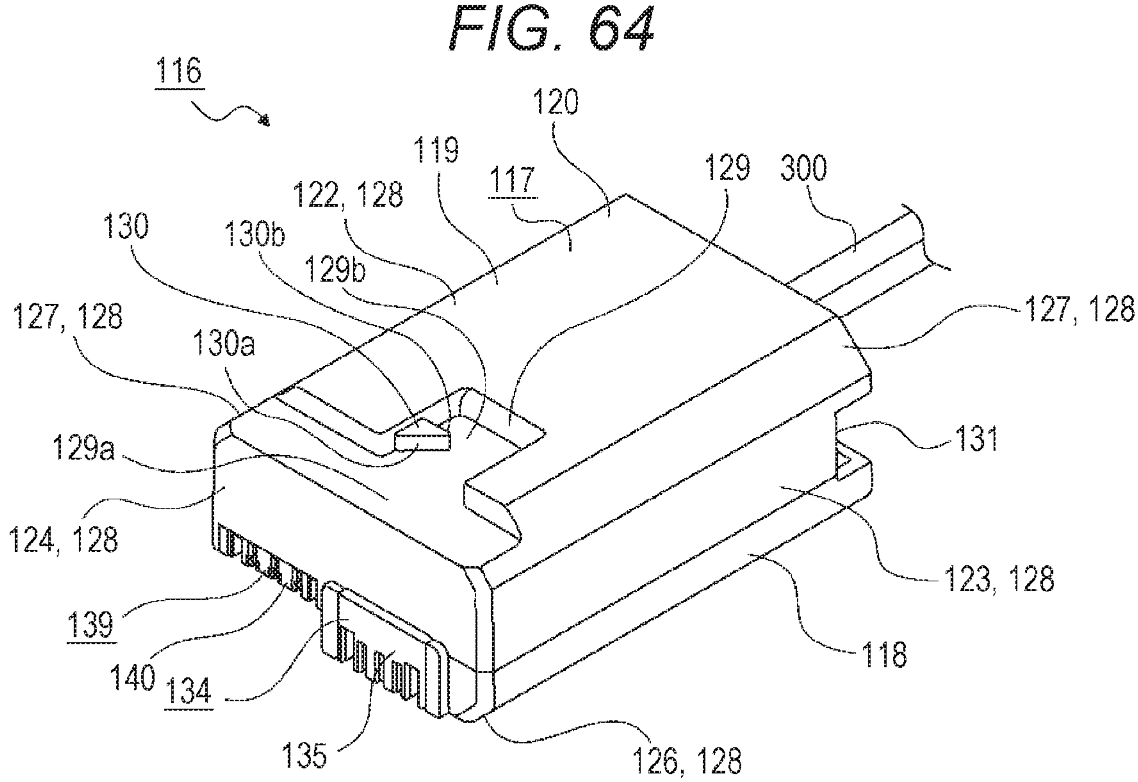
FIG. 64 is a perspective view illustrating the power supply in a state viewed in a direction different from that in FIG. 63.
Figure 65:
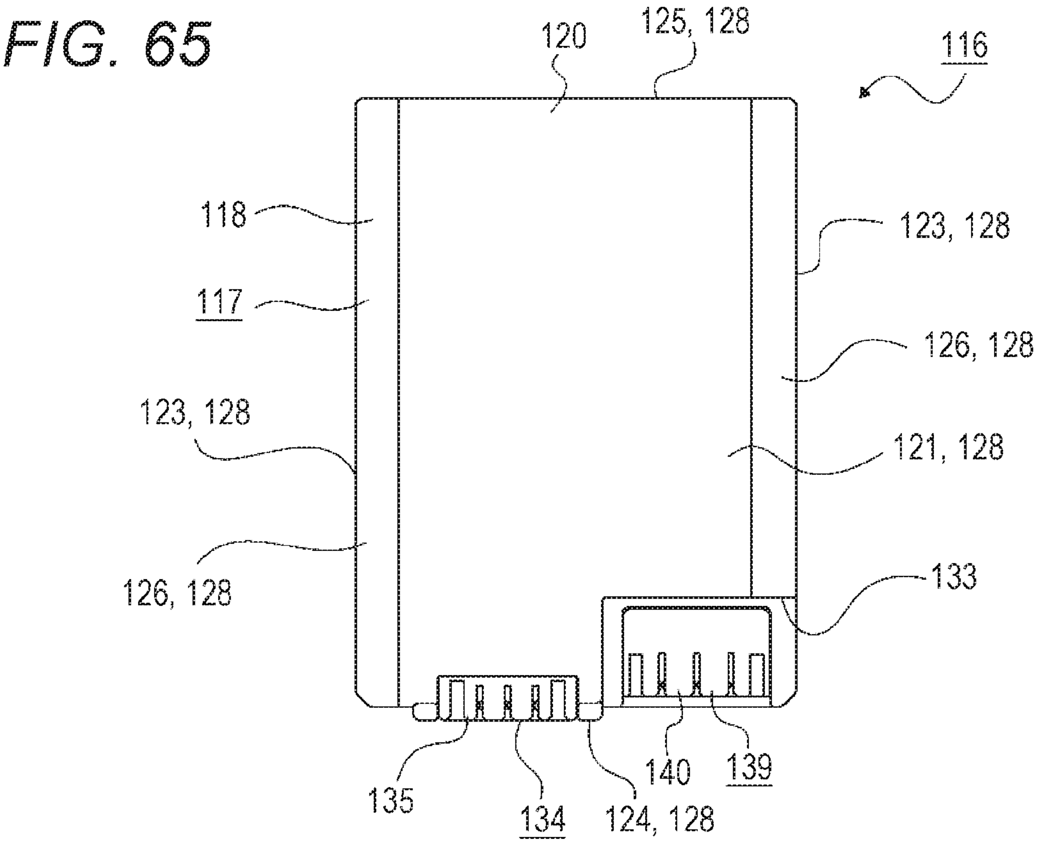
FIG. 65 is a plan view of the power supply.
Figure 66:
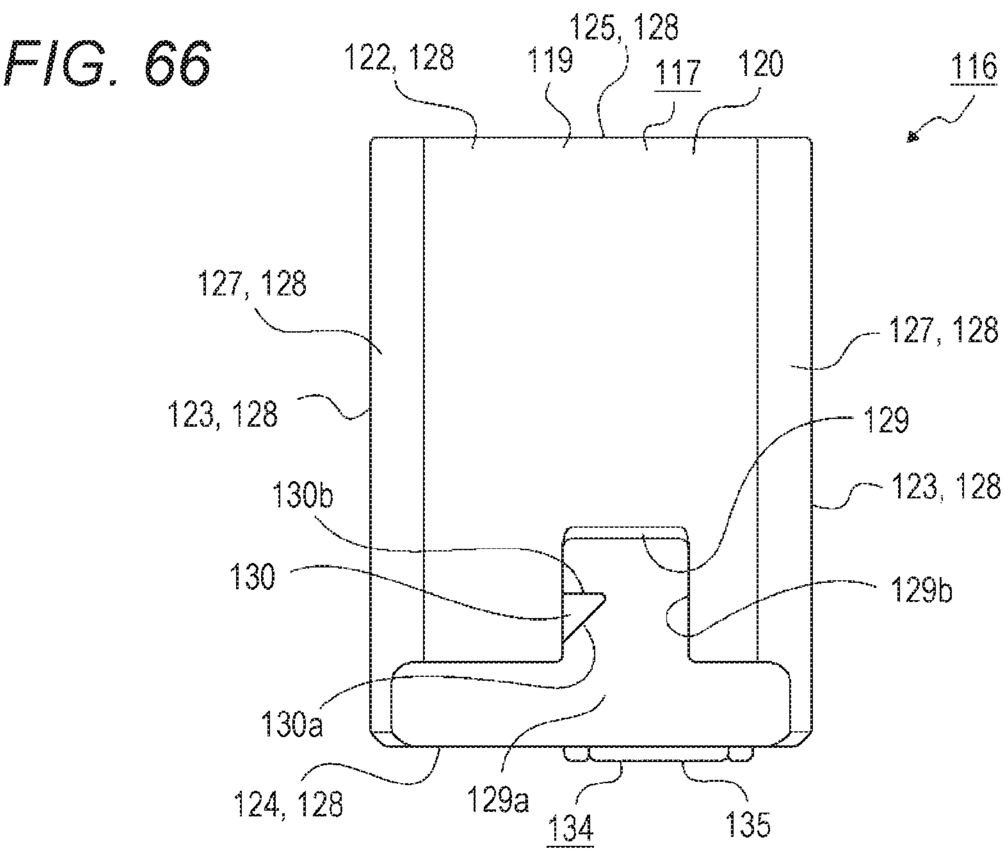
FIG. 66 is a bottom view of the power supply.
Figure 67:
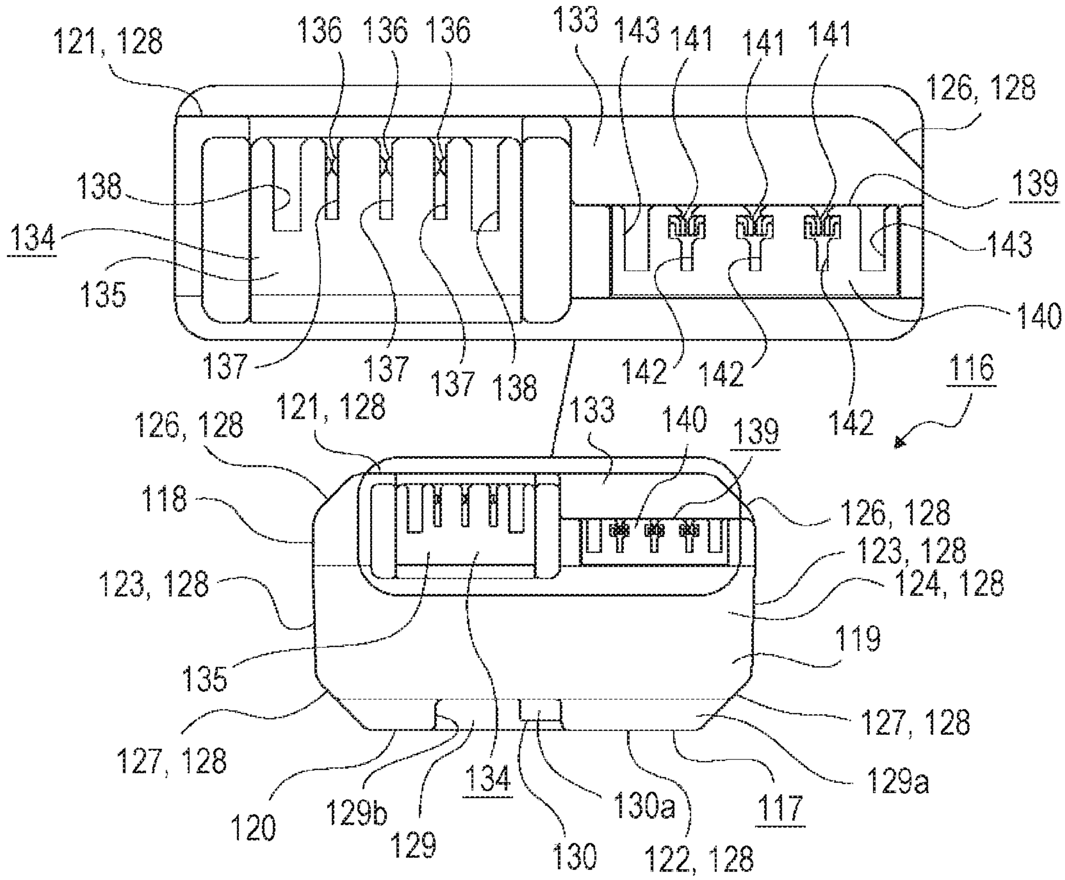
FIG. 67 is a front view of the power supply.
Figure 68:
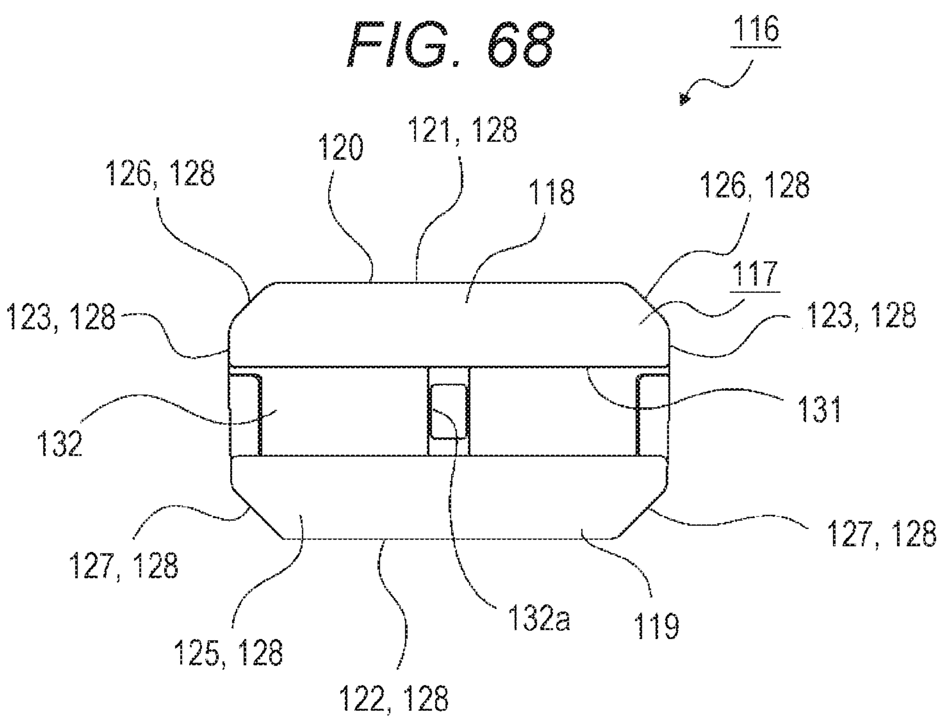
FIG. 68 is a rear view of the power supply.

The power supply 116 can be connected to the charger 110 via a cable 300 (see FIG. 62). The power supply 116 is connected to one end portion of the cable 300.

The power supply 116 is constituted such that necessary parts are arranged inside and outside a casing 117 (see FIGS. 63 to 68). An outer shape of the power supply 116 is smaller than the outer shape of the batteries 1, 1A, 1B, and 1C.

The casing 117 is formed in a substantially rectangular parallelepiped shape such that a case cover (upper case) 118 is coupled with a housing case (lower case) 119 vertically. The case cover 118 is formed in a box shape that is opened downward. The housing case 119 is formed in a box shape that is opened upwards. In the state in which the casing 117 is configured such that the case cover 118 is coupled with the housing case 119 vertically, an internal space of the casing 117 is formed as a housing space.

The casing 117 includes a top face 121, a bottom face 122, side faces 123 and 123, a front face 124, and a rear face 125 as outer faces 120, and the size in the forward/backward direction (longitudinal direction) is larger than the size in the horizontal direction (widthwise direction), and the size in the horizontal direction (widthwise direction) is larger than the size in the vertical direction (height direction). In the casing 117, upper inclining faces 126 and 126 are formed between the top face 121 and the side faces 123 and 123, respectively. The upper inclining faces 126 and 126 are displaced downward as they approach from the top face 121 to the side faces 123 and 123. In the casing 117, lower inclining faces 127 and 127 are formed between the bottom face 122 and the side faces 123 and 123, respectively.

The lower inclining faces 127 and 127 are displaced upward as they approach from the bottom face 122 to the side faces 123 and 123. Both the upper inclining faces 126 and 126 and the lower inclining faces 127 and 127 are formed in a planar shape.

All of the top face 121, the bottom face 122, the side faces 123 and 123, the front face 124, the rear face 125, the upper inclining faces 126 and 126, and the lower inclining faces 127 and 127 are formed as the outer faces 128, 128, . . . .

A lock concave part 129 is formed at a position at the front end side in the lower end portion of the casing 117. The lock concave part 129 is opened downwards, frontwards, and sideward (both rightwards and leftward), and includes a horizontally elongated introduction part 129*a* positioned on the front side and an inserted part 129*b* extending from the rear side of the introduction part 129*a*. The inserted part 129*b* is opened downward and frontward.

The inserted part 129*b* is provided with a locked claw 130 which protrudes sideward. The locked claw 130 includes an inclining face 130*a* which is displaced laterally (in a protrusion direction) as it goes rearward and a regulated face 130*b* that extends from the rear end of the inclining face 130*a* and faces rearward.

A concave part 131 which is opened rearward and sideward (both rightward and leftward) is formed in the rear end part of the casing 117. The concave part 131 is formed at the center of the casing 117 in the vertical direction. A face that forms the concave part 131 and faces rearward is formed as a hole forming face 132. A connection hole 132*a* which is opened at the center of the hole forming face 132 in the horizontal direction is formed in the casing 117, and the cable 300 is inserted into the connection hole 132*a* and connected to the power supply 116.

A concave part 133 is formed in the front end part of the upper end part of the casing 117. The concave part 133 is formed in a substantially half portion in the horizontal direction and is opened upward and sideward. An external connector 134 is arranged in the front end part of the upper end part of the casing 117. The external connector 134 is arranged on the side of the concave part 133. The external connector 134 is a portion which is connected to an electrode terminal of an imaging apparatus or the like to be described later and functions as a terminal part, and includes at least a positive electrode terminal and a negative electrode terminal.

The external connector 134 includes a housing 135 formed of a non-conductive material and connection terminals 136, 136, and 136 formed of a conductive material, and the connection terminals 136, 136, and 136 are held by the housing 135 in a state in which at least parts of the connection terminals 136, 136, and 136 are arranged in terminal arrangement grooves 137, 137, and 137 formed in the housing 135. The connection terminal 136 includes a pair of contact parts in which one end portion of a metal piece is bifurcated to the left and the right from a predetermined portion, and the pair of contact parts has elasticity in a direction in which the tip end portions come into contact with each other and arranged in the terminal arrangement groove 137 in a state in which they come into contact with or are close to each other.

The connection terminals 136, 136, and 136 function as a positive electrode terminal, a negative electrode terminal, and an information terminal, respectively, and the positive electrode terminal, the information terminal, and the negative electrode terminal are arranged side by side in order in the horizontal direction, or the positive electrode terminal, the information terminal, and the negative electrode terminal are arranged side by side in order from the right side.

The information terminal is used not only to enable the imaging apparatus or the like to recognize the internal temperature of the power supply 116 and but also to enable the imaging apparatus or the like to recognize various types of information of the power supply 116 such as a charge residual amount or degradation information of the power supply 116.

Note that, two terminal arrangement grooves 137 and 137 and two connection terminals 136 and 136 may be arranged in the external connector 134. In a case where the two connection terminals 136 and 136 are arranged, the two connection terminals 136 and 136 function as the positive electrode terminal and the negative electrode terminal, respectively, and the positive electrode terminal and the negative electrode terminal are arranged side by side in order from the left side, or the positive electrode terminal and the negative electrode terminal are arranged side by side in order from the right side. Further, four terminal arrangement grooves 137, 137, . . . and four connection terminals 136, 136, . . . may be arranged in the external connector 134. In a case where four connection terminals 136, 136, . . . are arranged, the four connection terminals 136, 136, . . . function as the positive electrode terminal, the negative electrode terminal, the information terminal, and the communication terminal, respectively, and the positive electrode terminal, the information terminal, the communication terminal, and the negative electrode terminal are arranged side by side in order from the left side, the positive electrode terminal, the information terminal, the communication terminal, and the negative electrode terminal are arranged side by side in order from the right side, the positive electrode terminal, the communication terminal, the information terminal, and the negative electrode terminal are arranged side by side in order from the left side, or the positive electrode terminal, the communication terminal, the information terminal, and the negative electrode terminal are arranged side by side in order from the right side. The communication terminal is used to enable the imaging apparatus or the like to recognize various kinds of information of the power supply 116 such as the charge residual amount or the degradation information of the power supply 116, and in this case, the information terminal is used only to notify the imaging apparatus or the like of the temperature information.

The terminal arrangement grooves 137, 137, and 137 are formed to be opened frontward and upward and be apart from each other laterally. In the housing 135, positioning grooves 138 and 138 which are opened frontward and upward respectively are formed outside the terminal arrangement grooves 137, 137, and 137 in the horizontal direction.

In the external connector 134, one end portions of the connection terminals 136, 136, and 136 are connected to a circuit board (not illustrated) arranged inside the casing 117.

An internal connector 139 is arranged in a front end part of a portion of the casing 117 near the upper end. The internal connector 139 is arranged below the concave part 133 and on the side of the external connector 134. The internal connector 139 is a part connected to the connection terminal of the adapter to be described later and functions as a terminal part.

The internal connector 139 includes a housing 140 formed of a non-conductive material and connection terminals 141, 141, and 141 formed of a conductive material, and the connection terminals 141, 141, and 141 are held by the housing 140 in a state in which at least parts of the connection terminals 141, 141, and 141 are arranged in terminal arrangement groove 142, 142, and 142 formed in the housing 140. The connection terminals 141, 141, and 141 are connected to the connection terminals 136, 136, and 136, respectively, of the external connector 134 via a substrate or a wiring (not illustrated).

Note that, as the connection terminals 141 of the internal connector 139, two or four connection terminals 141 may be arranged depending on the number of connection terminals 136 of the external connector 134.

The terminal arrangement grooves 142, 142, and 142 are formed to be opened frontward and upward and spaced apart from each other laterally. In the housing 140, positioning grooves 143 and 143 which are opened frontward and upward are formed outside the terminal arrangement grooves 142, 142, and 142 in the horizontal direction.

The connection terminal 141 is elastically deformable in the substantially horizontal direction and is held by the housing 140 in a state in which it is inserted in the terminal arrangement groove 142.

Figure 69:
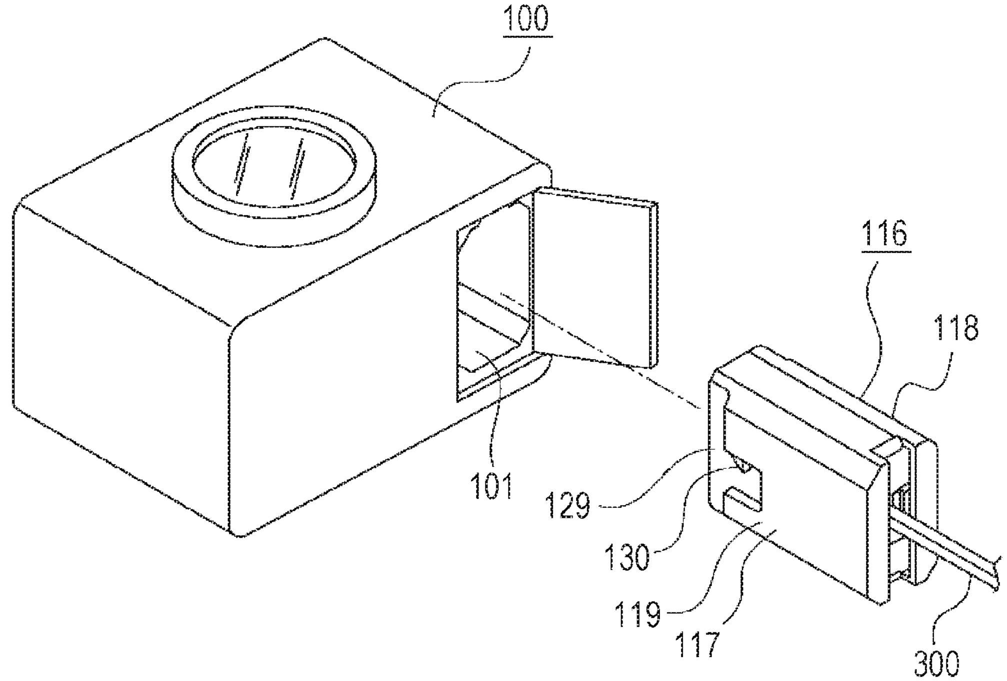
FIG. 69 is a perspective view illustrating a power supply and an imaging apparatus in which a power supply is mounted.
Figure 70:
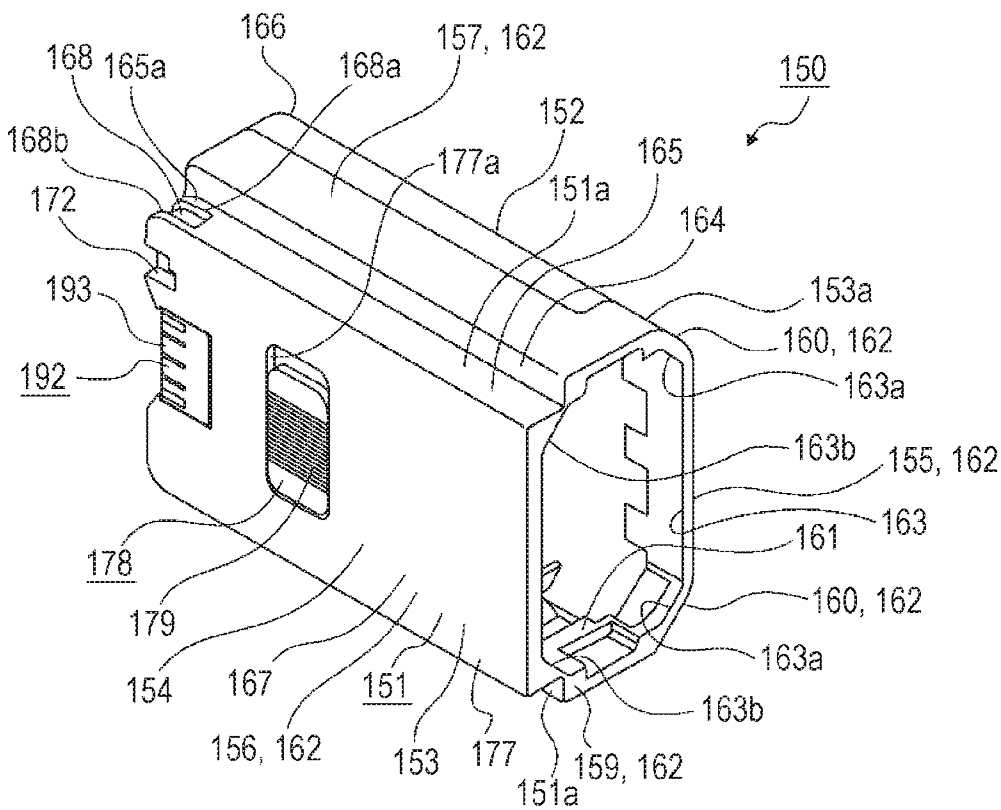
FIG. 70 is a perspective view of an adapter.

The power supply 116 having the above configuration is inserted and mounted in a battery mounting unit 101 formed in an imaging apparatus 100 of a type A (see FIG. 69). Further, the imaging apparatus 100 corresponds to, for example, the low power camera (see FIG. 50).

The power supply 116 can be connected to a commercial power supply via the cable 300 and a connector (not illustrated), and in this case, electric power is supplied to the imaging apparatus 100 via the connector, the cable 300, and the power supply 116.

Further, the power supply 116 can be mounted in the battery mounting unit 101 of the imaging apparatus 100 in a state in which the power supply 116 is connected to the charger 110 to which one or more batteries 1 (1A, 1B, and 1C) are mounted via the cable 300 and supply electric power of one or more batteries 1 (1A, 1B, and 1C) to the imaging apparatus 100. In a case where a plurality of batteries 1 (1A, 1B, and 1C) are mounted in the charger 110, it is possible to increase an amount and a time in which electric power is supplied to the imaging apparatus 100, and thus it is suitable for capturing an image or a moving image for a long time.

<Configuration of Adapter>

Next, a configuration of an adapter 150 will be described (see FIGS. 70 to 79).

The adapter 150 is configured such that necessary parts are arranged inside and outside a casing 151. The adapter 150 includes substantially the same outer shape as the outer shape of the batteries 1, 1A, 1B, and 1C described above.

The casing 151 is formed in a box shape which is opened rearward such that a case cover (upper case) 152 is coupled with a housing case (lower case) 153 vertically. The case cover 152 is formed in a box shape which is opened downward and rearward. In the housing case 153, a rear end part in which a part excluding the rear end part is formed in a box shape which is opened upward is formed as an annular portion 153*a* which is penetrated back and forth. The case cover 152 is coupled with an upward opened portion of the housing case 153 downward. An internal space of the casing 151 is formed as a housing space in a state in which the case cover 152 and the housing case 153 are coupled to constitute the casing 151. The casing 151 includes a top face 155, a bottom face 156, side faces 157 and 157, a front face 158, and a rear face 159 as outer faces 154, and a size in the forward/backward direction (longitudinal direction) is larger than a size in the horizontal direction (widthwise direction), and a size in the horizontal direction (widthwise direction) is larger than a size in the vertical direction (height direction). In the casing 151, inclining faces 160 and 160 are formed between the top face 155 and the side faces 157 and 157, respectively.

The inclining faces 160 and 160 are displaced downward as they approach from the top face 155 to the side faces 157 and 157. On the inner face side of the casing 151, plate support portions 161 and 161 are formed at positions of both left and right side portions near the rear end. The plate support portions 161 and 161 are displaced upward as they approach from the bottom face 156 to the side faces 157 and 157. An opening edge formed on the rear face 159 is formed as a rear opening edge 163.

All of the top face 155, the bottom face 156, the side faces 157 and 157, the front face 158, the rear face 159, and the inclining faces 160 and 160 are formed as outer faces 162, 162, . . . .

In the upper end part of the rear opening edge 163 in the casing 151, upper inclining edges 163*a* and 163*a* are formed to be apart from each other laterally, and in the lower end portion of the rear opening edge 163, lower inclining edges 163*b* and 163*b* are formed to be apart from each other laterally. The upper inclining edges 163*a* and 163*a* are formed at both left and right end portions of the rear opening edge 163 and linearly inclined so that they are displaced upward as they approach each other. The lower inclining edges 163*b* and 163*b* are formed at both left and right end portions of the rear opening edge 163 and linearly inclined so that they are displaced downward as they approach each other.

Notches 151*a* and 151*a* are formed in both left and right side portions of the lower end portion of casing 151. The notch 151*a* is formed by a level difference face 164 which is opened sideward (leftward or rightward), downward, frontward, and rearward and faces downward and extends in the forward/backward direction and a groove forming face 165 that faces sideward and extends in the forward/backward direction. An outer edge of the level difference face 164 is continuous to a lower edge of the side face 157. In the groove forming face 165, an upper edge is continuous to an inner edge of the level difference face 164, and a lower edge is continuous to a side edge of the bottom face 156. The level difference face 164 and the groove forming face 165 are continuously formed from the front face 158 to the rear face 159, respectively.

The level difference face 164 and the bottom face 156 are formed as substantially parallel planes, and a portion of the groove forming face 165 excluding the front end part and the side face 157 are formed as substantially parallel planes. The front end parts of the groove forming faces 165 and 165 are formed as outwardly convex curved faces 165*a* and 165*a* which are displaced in a direction in which they approach each other as they approach the front face 158.

As described above, in the adapter 150, the front end parts of the groove forming faces 165 and 165 are formed as the curved faces 165*a* and 165*a*, and thus stress is hardly concentrated, and the front end parts hardly come into contact with the ground or the like at the time of falling or the like, and thus it is possible to reduce the occurrence of damage.

The casing 2 is configured with a main body part 166 which is a part above a virtual face including the level difference faces 164 and 164, and a bottom part 167 which is a part lower than the virtual face. The level difference faces 164 and 164 are included in the main body part 166. The bottom part 167 is smaller in a lateral width than the main body part 166, and the distance between the side faces 157 and 157 in the horizontal direction is larger than the distance between the groove forming faces 165 and 165.

Guided grooves 168 and 168 are formed in both left and right side portions of the bottom part 167. The guided groove 168 is opened to the groove forming face 165. The guided groove 168 is formed in the front end part of the bottom part 167 and opened sideward and frontward.

An arrangement concave part 169 is formed in the lower end portion of the bottom part 167 in the front end part. The arrangement concave part 169 is formed substantially at the center in the horizontal direction and opened frontward and downward. An arrangement hole 170 which is communicated with a portion of the arrangement concave part 169 excluding the front end part and vertically penetrated is formed in the casing 151.

An upper edge 168*a* of the guided groove 168 is located below the level difference face 164, and a part of the groove forming face 165 exists between the guided groove 168 and the level difference face 164. Therefore, a distance from the lower end of the groove forming face 165 to the upper edge 168*a* of the guided groove 168 is smaller than a distance from the upper end to the lower end of the groove forming face 165. Further, a distance between the top and the bottom of the guided groove 168 (a groove width) may be larger or smaller than the distance from the upper end of the groove forming face 165 to the upper edge 168*a*, and distance between the top and the bottom of the guided groove 168 may be equal to the distance from the upper end of the groove forming face 165 to the upper edge 168*a*. A lower edge 168*b* of the guided groove 168 is located above the lower edge of the groove forming face 165.

Figure 71:
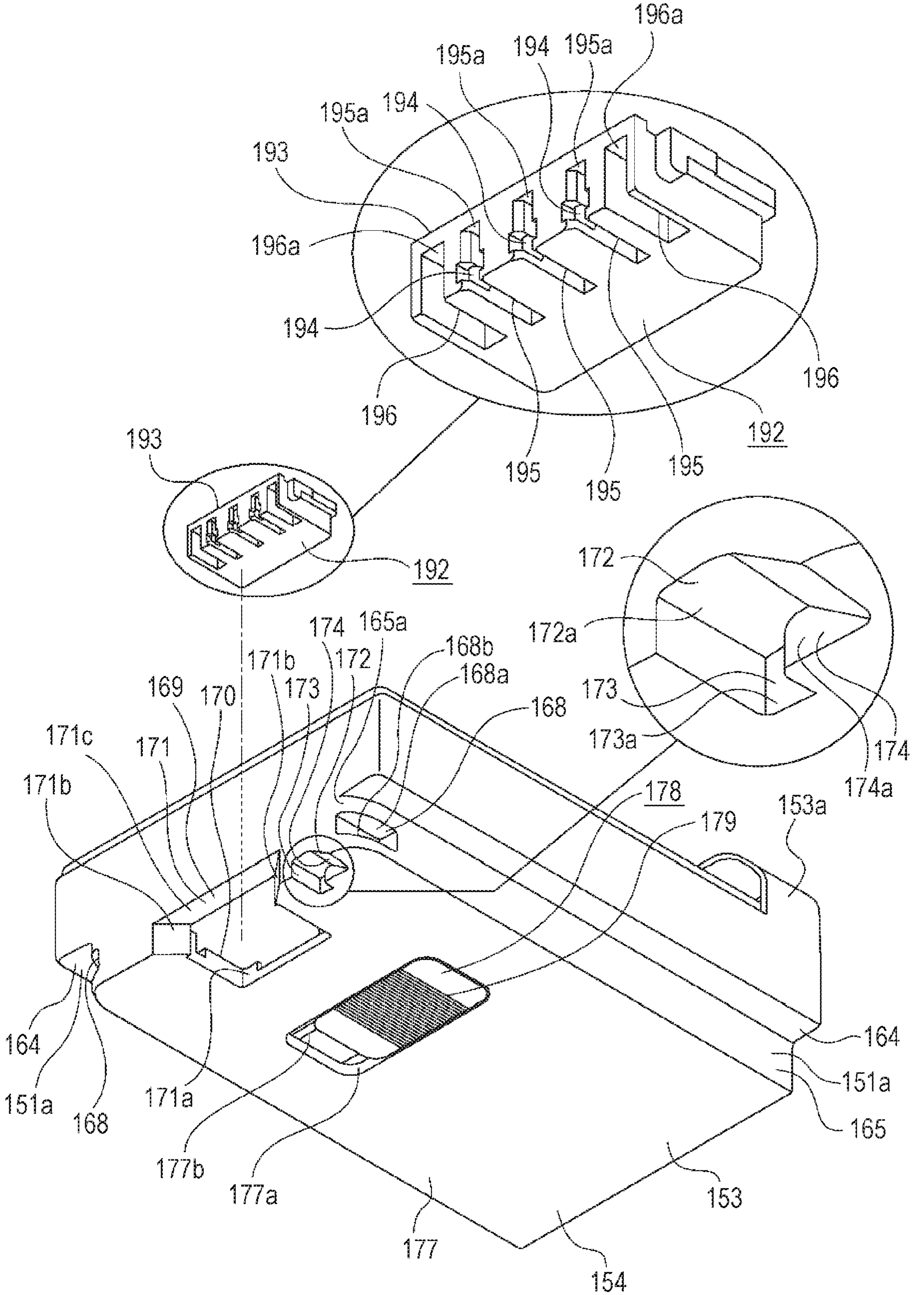
FIG. 71 is a perspective view illustrating the adapter in a state viewed in a direction different from that in FIG. 70.
Figure 72:
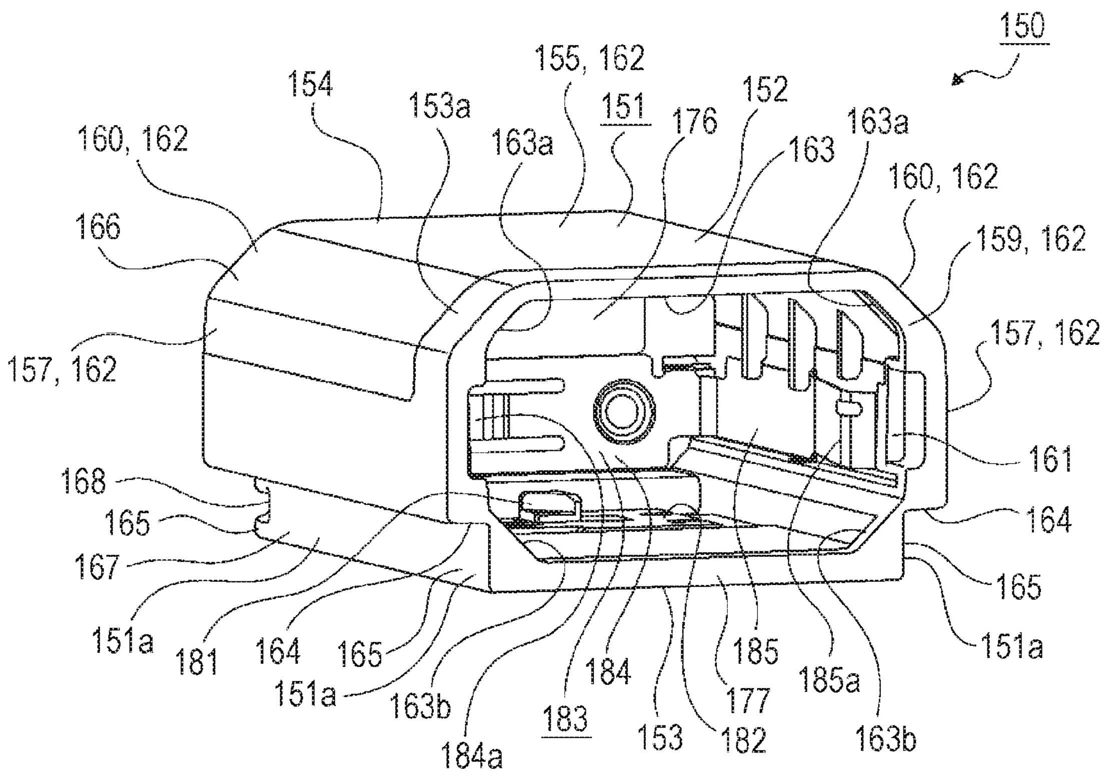
FIG. 72 is a perspective view illustrating the adapter in a state viewed in a direction different from that in FIG. 71.
Figure 73:
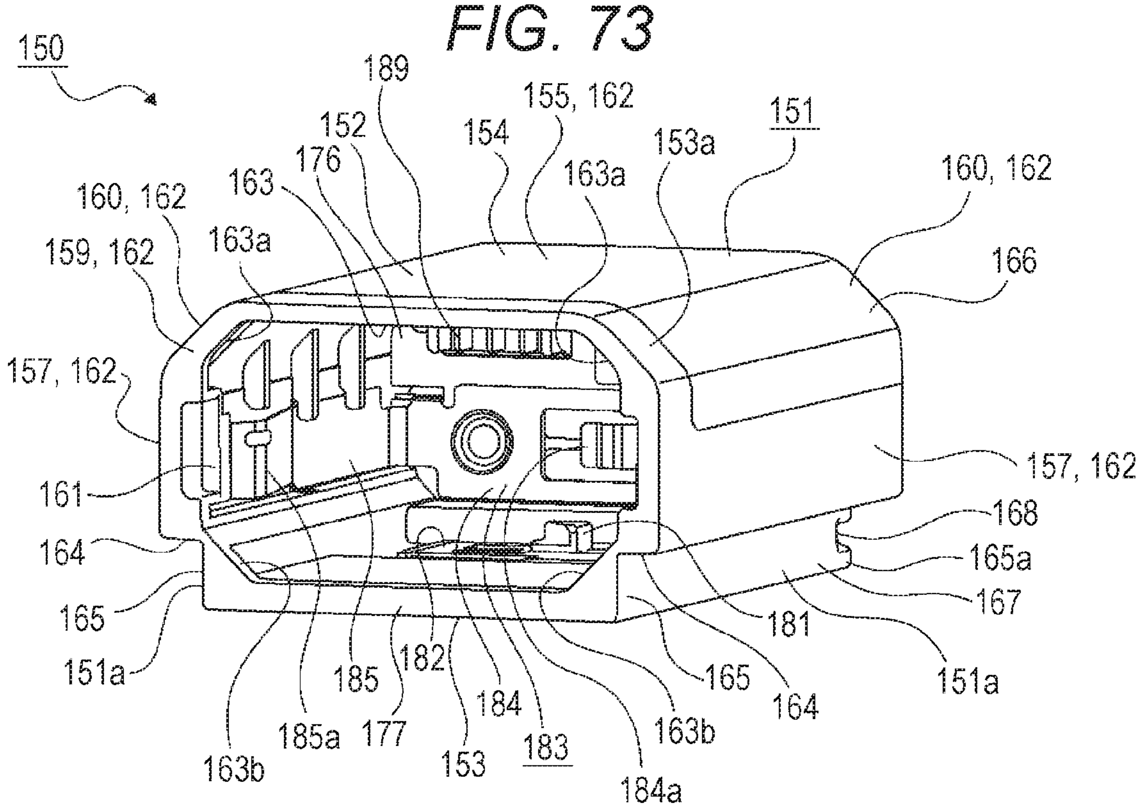
FIG. 73 is a perspective view illustrating the adapter in a state viewed in a direction different from that in FIG. 72.

The arrangement concave part 169 is formed by a concave part forming face 171 (see FIG. 71). The concave part forming face 171 is configured with a base portion 171*a*, wall portions 171*b* and 171*b*, and a middle portion 171*c*. The base portion 171*a* is formed in a laid letter "U" shape which is opened frontward and faces in the horizontal direction. The wall portions 171*b* and 171*b* are continuous to the front end of the base portion 171*a* and are formed as inclining faces which are apart from each other in the horizontal direction as they go forwards. In other words, the left wall portion 171*b* is formed as an inclining face which approaches the left side face 157 as it goes forwards, and the right wall portion 171*b* is formed as an inclining face which approaches the right side face 157 as it goes forwards. Note that, in the wall portions 171*b* and 171*b*, one wall portion 171*b* may be formed as an inclining face, and the other wall portion 171*b* may be formed as a face that faces leftward or rightward without being inclined. The middle portion 171*c* faces downward and is formed between the upper edges of the wall portions 171*b* and 171*b*. The wall portions 171*b* and 171*b* are, for example, 45 degrees inclined with respect to a face that faces in the horizontal direction.

The middle portion 171*c* is positioned on a further lower side than the level difference face 164 at substantially the same height as the guided groove 168 or positioned slightly below the upper edge 168*a*. However, the middle portion 171*c* may be positioned on a further upper side than the upper edge 168*a*.

Note that, similarly to the wall portion 29*d* (see FIGS. 57 and 58) arranged in the concave part forming face 29A described above, the wall portion 171*b* may be formed in a shape configured with a first inclining face, a middle face continuous to the first inclining face, and a second inclining face continuous to the middle face.

Figure 74:
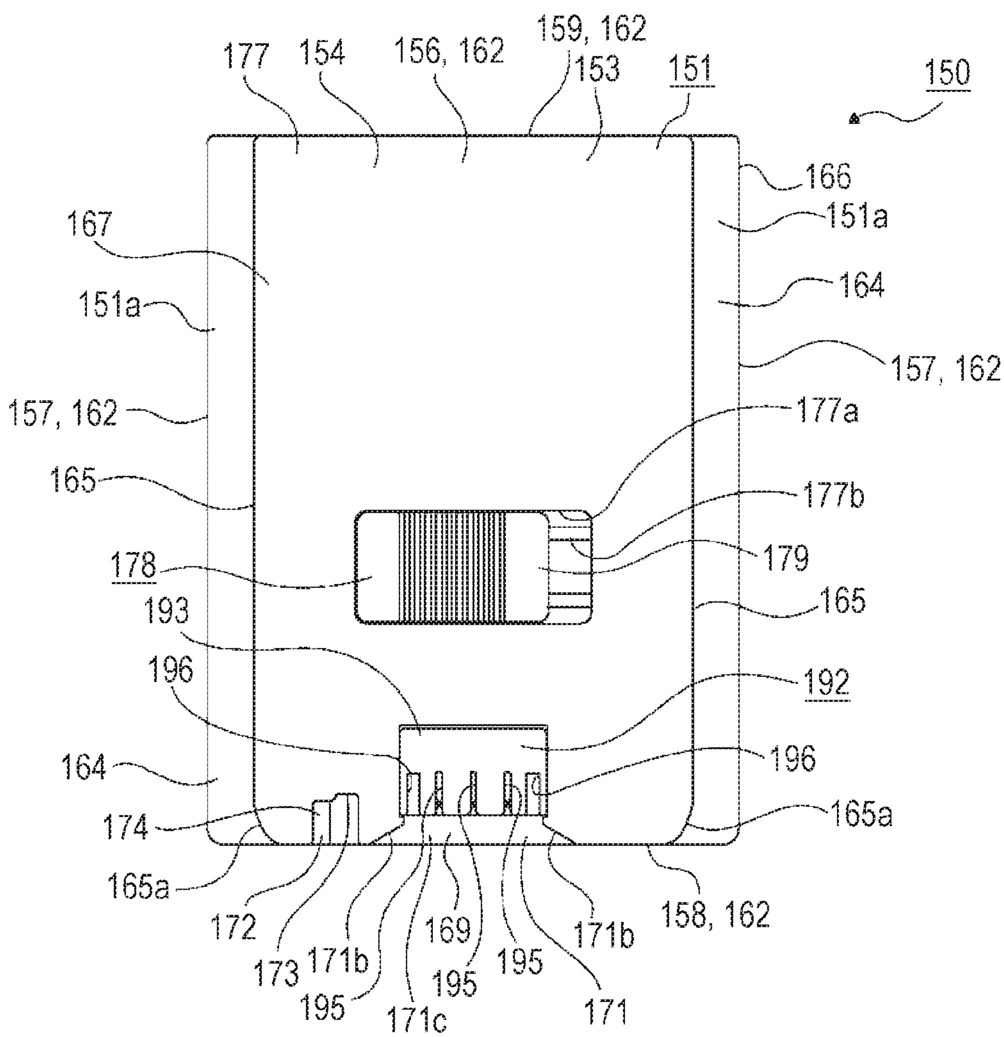
FIG. 74 is a bottom view of the adapter.
Figure 75:
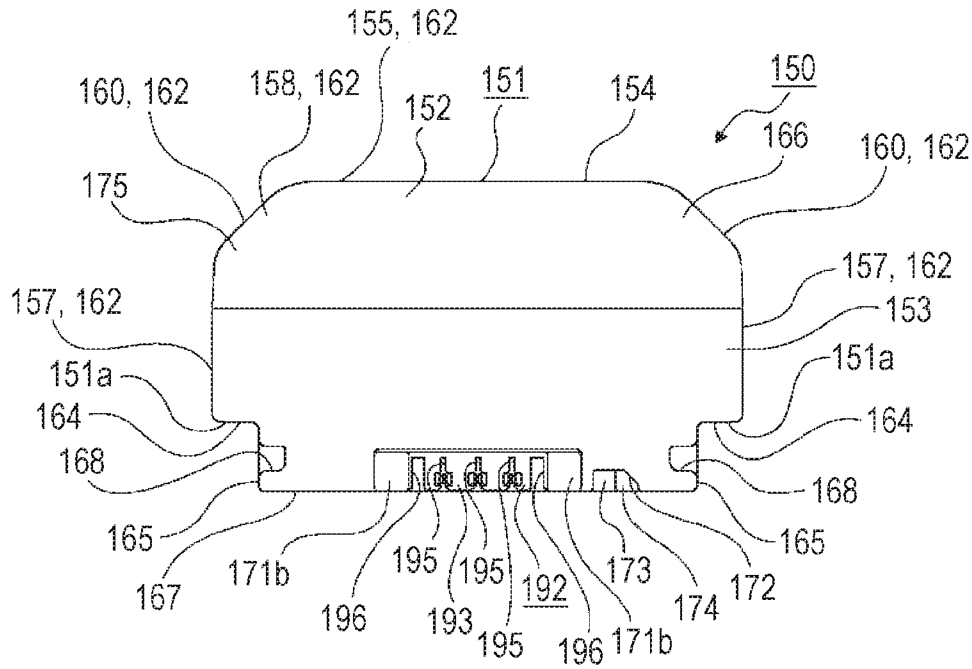
FIG. 75 is a front view of the adapter.
Figure 76:
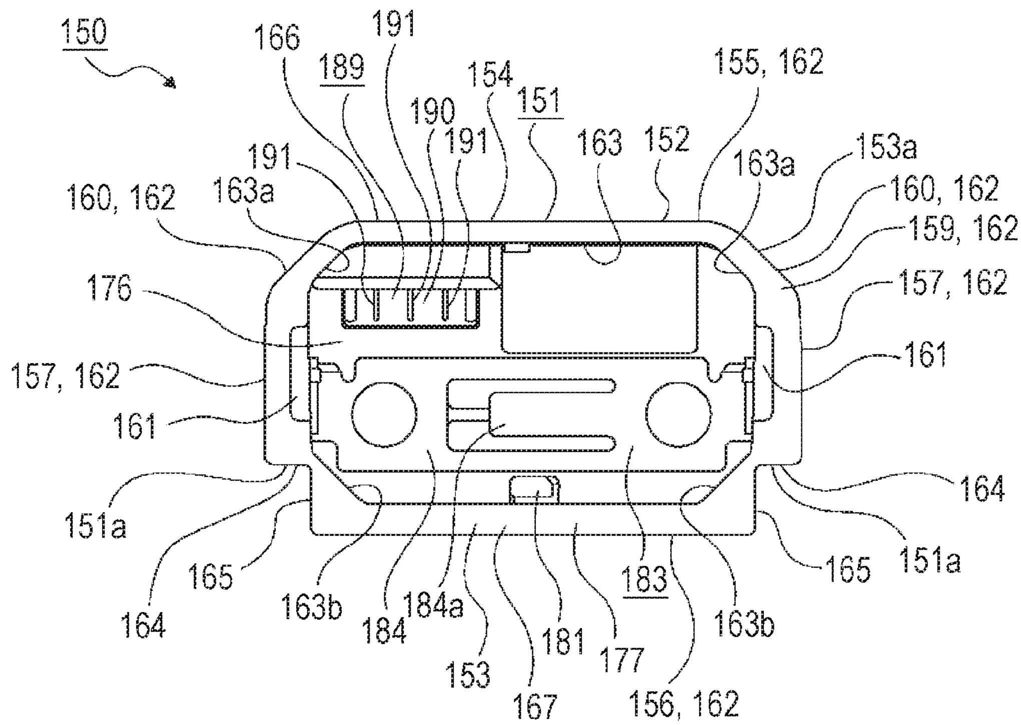
FIG. 76 is a rear view of the adapter.
Figure 77:
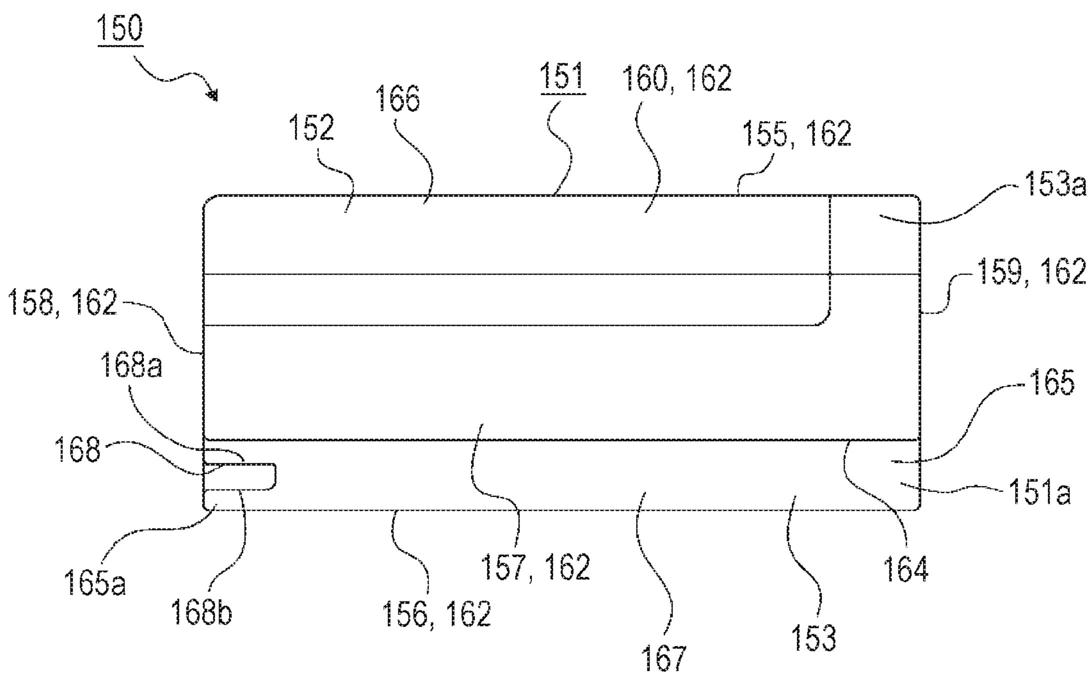
FIG. 77 is a side view of the adapter.

In the front end part of the bottom part 167, an identification groove 172 is formed on the side of the concave part forming face 171 (see FIGS. 71 and 74). The identification groove 172 has a role as a functional groove with a predetermined function, and for example, the identification groove 172 identifies a type of imaging apparatus or the like. Note that, the functional groove is not limited to the identification groove 172, and a groove having a function other than an identification function such as a positioning groove used for performing positioning with respect to an imaging apparatus or the like or a detection groove used for detecting a connection state or the like of an imaging apparatus or the like may be formed as the functional groove instead of the identification groove 172.

However, since the predetermined function is an identifying function for identifying a type of imaging apparatus or the like, a type of imaging apparatus or the like is identified through the functional groove, and it is possible to easily identify a type of imaging apparatus or the like to which the adapter is connected as the adapter is mounted in the imaging apparatus or the like or the adapter is not mounted in the imaging apparatus or the like.

Note that the predetermined function may be a function of identifying the type of adapter.

The identification groove 172 is formed by continuously forming a first identification part 173 and a second identification part 174 having different front/rear lengths in the horizontal direction.

The first identification part 173 and the second identification part 174 have roles as a first functional unit and a second functional unit, respectively.

Among faces forming the identification groove 172, a face which is positioned on the upper side and faces downward is formed as the inner bottom face 172*a*. The inner bottom face 172*a* is positioned on a further lower side than the middle portion 171*c* serving as a face of the concave part forming face 171 which is positioned on the upper side and faces downward. Therefore, a depth of the identification groove 172 in the vertical direction is smaller than a depth of the arrangement concave part 169 in the vertical direction. The inner bottom face 172*a* is positioned on a further lower side than the upper edge 168*a* of the guided groove 168 and the level difference face 164. Further, the inner bottom face 172*a* is positioned on a further upper side than the lower edge 168*b* of the guided groove 168. However, the inner bottom face 172*a* may be positioned on a further lower side than the lower edge 168*b* or may be positioned at the same height as the lower edge 168*b*.

Among the faces forming the identification groove 172, a face that is positioned on the rear side in the first identification part 173 and faces frontwards is formed as an inner bottom face 173*a*, and a face that is positioned on the rear side in the second identification part 174 and faces frontwards is formed as an inner bottom face 174*a*. The inner bottom face 173*a* is positioned on a further front side than a face that is positioned at the rearmost side in the base portion 171*a* and faces frontward among the concave part forming faces 171. The inner bottom faces 173*a* and 174*a* are positioned on a further front side than the rear end edge of the guided groove 168. However, the inner bottom faces 173*a* and 174*a* may be positioned on a further rear side than the rear end edge of the guided groove 168 or may be at the same position as the rear end edge of the guided groove 168 in the forward/backward direction.

The first identification part 173 has a front/rear length longer than the second identification part 174, the inner bottom face 173*a* is positioned on a slightly further rear side than the inner bottom face 174*a*, and the first identification part 173 is positioned on a further arrangement concave part 169 side than the second identification part 174. A width of the second identification part 174 in the horizontal direction is smaller than a width of the first identification part 173 in the horizontal direction.

Figure 78:
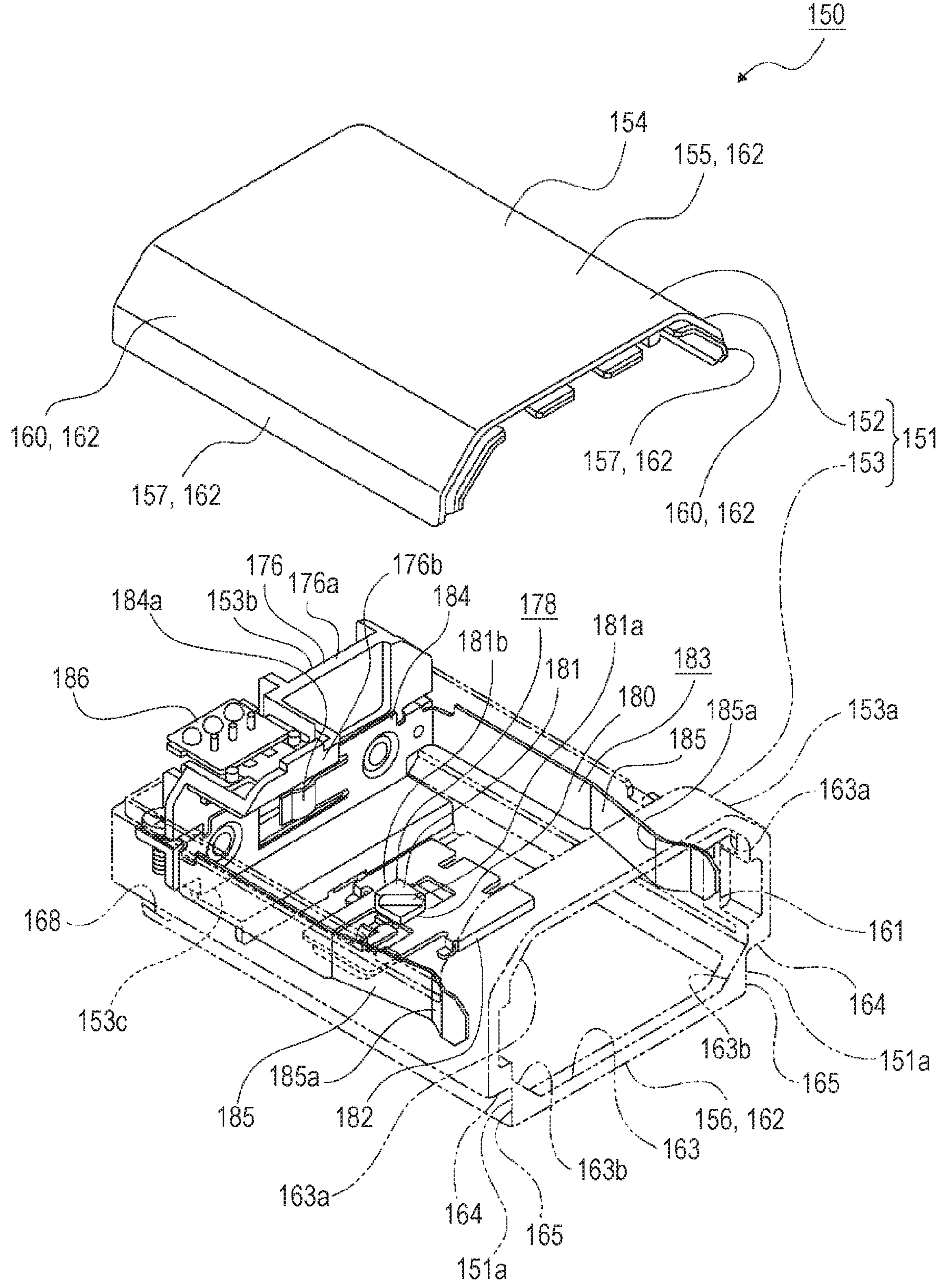
FIG. 78 is a perspective view illustrating an internal structure of the adapter.
Figure 79:
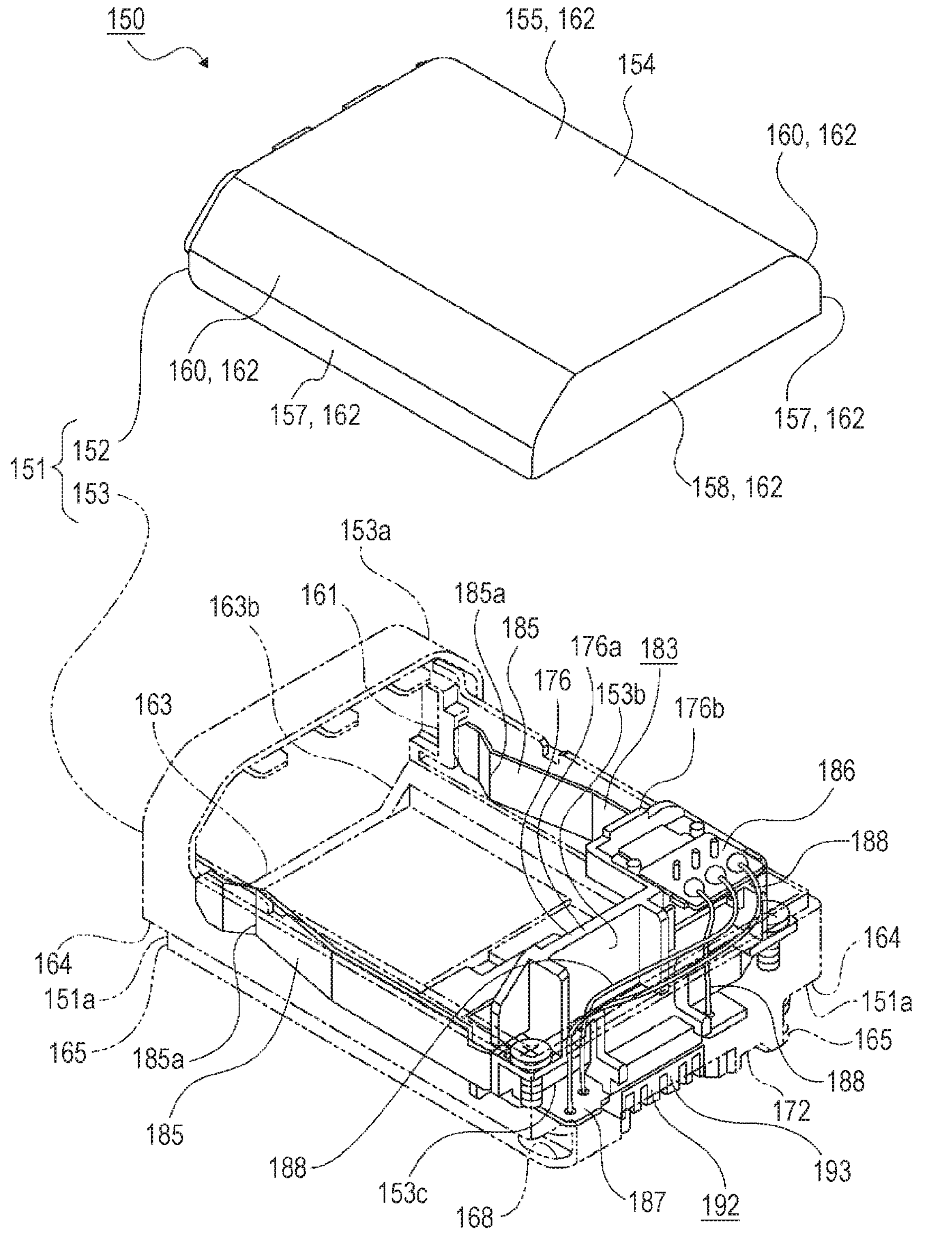
FIG. 79 is a perspective view illustrating the internal structure of the adapter in a state viewed in a direction different from that in FIG. 78.

In the housing case 153, an inner wall portion 176 is arranged immediately behind the front face plate portion 175 (see FIGS. 78 and 79). The inner wall portion 176 includes a cover portion 176*a* that faces substantially in the forward/backward direction and a substrate mounting portion 176*b* that protrudes rearward from a portion of the upper end portion at the cover portion 176*a*. Inside the housing case 153, a front space 153*b* is formed between the cover portion 176*a* and the front face 158. A lower space 153*c* is formed between the cover portion 176*a* and a bottom face plate portion 177.

On the bottom face plate portion 177 of the casing 151, a horizontally elongated support concave part 177*a* which is opened downward and a connection hole 177*b* which communicates with the support concave part 177*a* are formed (see FIGS. 71 and 74). The connection hole 177*b* communicates with a part of the support concave part 177*a* and is vertically penetrated.

On the bottom face plate portion 177, a lock lever 178 is movably supported in the horizontal direction. The lock lever 178 includes an operation plate portion 179 that faces in the vertical direction, a connection protruding portion 180 that protrudes upward from the operation plate portion 179, and a lock protruding portion 181 that protrudes upward from the connection protruding portion 180 (see FIGS. 71 and 78). The lock protruding portion 181 includes a sliding face 181*a* which is displaced sideward as it goes forwards and a locking face 181*b* which is continuous to the front end of the sliding face 181*a* and faces frontward.

The lock lever 178 is movable in the horizontal direction in a state in which the operation plate portion 179 is inserted into the support concave part 177*a* of the bottom face plate portion 177. The lower face of the operation plate portion 179 and the bottom face 156 are positioned on the same plane in a state in which the operation plate portion 179 does not protrude downward from the bottom face 156. Therefore, the height of the adapter 150 in the vertical direction is not large, and the size of the adapter 150 is reduced.

In the lock lever 178, the connection protruding portion 180 is inserted into the connection hole 177*b*, and the lock protruding portion 181 is positioned above the bottom face plate portion 177. The lock lever 178 is urged in one direction in the horizontal direction by a spring (not illustrated), and in the operation plate portion 179, one end edge in the horizontal direction is pressed against one opening edge of the support concave part 177*a* in the horizontal direction by biasing force of the spring, and thus movement thereof is restricted.

In the lock lever 178, the connection protruding portion 180 is coupled to a slide plate 182. The slide plate 182 is formed in a substantially flat plate shape facing in the vertical direction. The slide plate 182 is formed integrally with the lock lever 178 and movable in the horizontal direction with respect to the bottom face plate portion 177 and urged in the same direction as the lock lever 178 by the biasing force of the spring.

A pressing plate 183 is disposed inside the housing case 153 (see FIGS. 78 and 79). A part of the pressing plate 183 is mounted to the housing case 153 through screw fixing or the like. The pressing plate 183 includes a horizontally elongated receiving face portion 184 that faces in the forward/backward direction and pressing face portions 185 and 185 that protrude rearward from both left and right end portions of the receiving face portion 184.

At the center of the receiving face portion 184, a receiving piece portion 184*a* which is elastically deformable substantially in the forward/backward direction is arranged. The rear end parts of the pressing face portions 185 and 185 are supported in a displaceable state by the plate support portions 161 and 161 arranged on both side portions of the casing 151.

The pressing face portions 185 and 185 are provided with pressing portions 185*a* and 185*a* which are elastically deformable with respect to the receiving face portion 184 to be displaced laterally and protrude in a direction close to each other at a position near the rear end. In the substrate mounting portion 176*b* of the inner wall portion 176 arranged inside the casing 151, a first substrate 186 is mounted to the upper face. A second substrate 187 is arranged in the lower space 153*c* formed below the inner wall portion 176. For example, each of the first substrate 186 and the second substrate 187 includes three terminal parts, and the three terminal parts of the first substrate 186 are connected with the three terminal parts of the second substrate 187 via electric wires 188, 188, and 188. The electric wires 188, 188, and 188 are positioned in the front space 153*b* formed on the front side of the inner wall portion 176. Note that the three terminal parts of the first substrate 186 are connected with the three terminal parts of the second substrate 187 via a flexible printed circuit board. A relay connector 189 is mounted to the lower face of the substrate mounting portion 176*b* of the inner wall portion 176 (see FIGS. 73 and 76). The relay connector 189 is a part to which the internal connector 139 of the power supply 116 is connected and functions as a terminal part. The relay connector 189 includes a housing 190 formed of a non-conductive material and connection terminals 191, 191, and 191 formed of a conductive material. In the relay connector 189, one end portions of the connection terminals 191, 191, and 191 are connected to the terminal parts of the first substrate 186.

Note that, as the connection terminals 191 of the relay connector 189, two or four connection terminals may be arranged in accordance to the number of connection terminals 141 of the internal connector 139 in the power supply 116.

A connection connector 192 is arranged in the arrangement concave part 169 of the casing 151 (see FIGS. 71 and 74). The connection connector 192 is arranged at the center of the casing 151 in the horizontal direction. The connection connector 192 is a part which is connected to an electrode terminal of an imaging apparatus or the like and functions as a terminal part.

The connection connector 192 includes a housing 193 formed of a non-conductive material and connection terminals 194, 194, and 194 formed of a conductive material, and the connection terminals 194, 194, and 194 are held by the housing 193 in a state in which at least parts of the connection terminals 194, 194, and 194 are arranged in terminal arrangement grooves 195, 195, and 195 formed in the housing 193.

The connection terminal 194 includes a pair of contact parts in which one end portion of a metal piece is bifurcated to the left and the right from a predetermined portion, and the pair of contact parts has elasticity in a direction in which the tip end portions come into contact with each other and arranged in the terminal arrangement groove 195 in a state in which they come into contact with or are close to each other.

The connection terminals 194, 194, and 194 function as a positive electrode terminal, a negative electrode terminal, and an information terminal, respectively, and the positive electrode terminal, the information terminal, and the negative electrode terminal are arranged side by side in order in the horizontal direction, or the positive electrode terminal, the information terminal, and the negative electrode terminal are arranged side by side in order from the right side.

The terminal arrangement grooves 195, 195, and 195 are formed to be opened frontward and upward and are apart from each other laterally. In the housing 193, positioning grooves 196 and 196 which are opened frontward and upward respectively are formed outside the terminal arrangement grooves 195, 195, and 195 in the horizontal direction.

A face of the terminal arrangement groove 195 positioned to be closest to the top face 155 side and a face of the positioning groove 196 positioned to be closest to the top face 155 side are formed as inner bottom faces 195*a* and 196*a*, and positions of the inner bottom faces 195*a* and 196*a* in the vertical direction are substantially the same. The inner bottom faces 195*a* and 196*a* are positioned on a further lower side than the level difference face 164. Further, the inner bottom faces 195*a* and 196*a* are positioned on a further lower side than the upper edge 168*a* of the guided groove 168 and positioned on a further upper side than the lower edge 168*b* of the guided groove 168.

The connection terminal 194 is elastically deformable in the substantially horizontal direction and held by the housing 193 in a state in which it is inserted into the terminal arrangement groove 195.

Note that, as the connection terminals 194 of the connection connector 192, two or four connection terminals may be arranged in accordance with the number of connection terminals 191 of the relay connector 189. In a case where the two connection terminals 194 and 194 are arranged, the two connection terminals 194 and 194 function as the positive electrode terminal and the negative electrode terminal, respectively, and the positive electrode terminal and the negative electrode terminal are arranged side by side in order from the left side, or the positive electrode terminal and the negative electrode terminal are arranged side by side in order from the right side. Further, four terminal arrangement grooves 195, 195, . . . and four connection terminals 194, 194, . . . may be arranged in the connection connector 192. In a case where four connection terminals 194, 194, . . . are arranged, four connection terminals 194, 194, . . . function as the positive electrode terminal, the negative electrode terminal, the information terminal, and the communication terminal, respectively, and the positive electrode terminal, the information terminal, the communication terminal, and the negative electrode terminal are arranged side by side in order from the left side, the positive electrode terminal, the information terminal, the communication terminal, and the negative electrode terminal are arranged side by side in order from the right side, the positive electrode terminal, the communication terminal, the information terminal, and the negative electrode terminal are arranged side by side in order from the left side, or the positive electrode terminal, the communication terminal, the information terminal, and the negative electrode terminal are arranged side by side in order from the right side.

One end portions of the connection terminals 194, 194, and 194 are connected to the terminal parts of the second substrate 187. Therefore, the connection terminals 194, 194, and 194 of the connection connector 192 are connected to the connection terminals 191, 191, and 191 of the relay connector 189 via the second substrate 187, the electric wires 188, 188, and 188, and the first substrate 186.

As described above, in the adapter 150, the face forming the arrangement concave part 169 of the casing 151 is formed as the concave part forming face 171, and the middle portion 171*c* which is a part of the concave part forming face 171 exists between the front face 158 of the outer face 154 and the connection connector 192.

Therefore, since the connection connector 192 is positioned on the further inner side of the casing 151 than the front face 158 of the casing 151, it is possible to reduce the occurrence of damage or a scratch in the connection connector 192 at the time of falling or the like.

Particularly, since an impact force caused by a falling impact is hardly transmitted to the connection connector 192, crack of the solder used for connecting the connection terminal 194 to the circuit substrate hardly occurs, and the occurrence of an electrical connection defect can be reduced.

Further, since the occurrence of damage or a scratch of the connection connector 192 is reduced, the connection terminal 194 is hardly exposed from the housing 193, and a high quality of the connection connector 192 can be secured.

Note that, in the above description, the example in which the connection connector 192 is positioned on a further rear side than the front face 158 of the casing 151, but for example, the connection connector 192 may be positioned on a further upper side than the bottom face 156 of the casing 151.

Even in the case in which the connection connector 192 is positioned on a further upper side than the bottom face 156 of the casing 151 as described above, it is possible to further reduce the occurrence of damage or a scratching in the connection connector 192 at the time of falling or the like.

<Operation of Mounting/Removing Power Supply to/from Adapter>

The power supply 116 can be mounted in the battery mounting unit 101 formed in the imaging apparatus 100 of the type A as described above and can be used in a state in which it is mounted in the adapter 150 as well.

Figure 80:
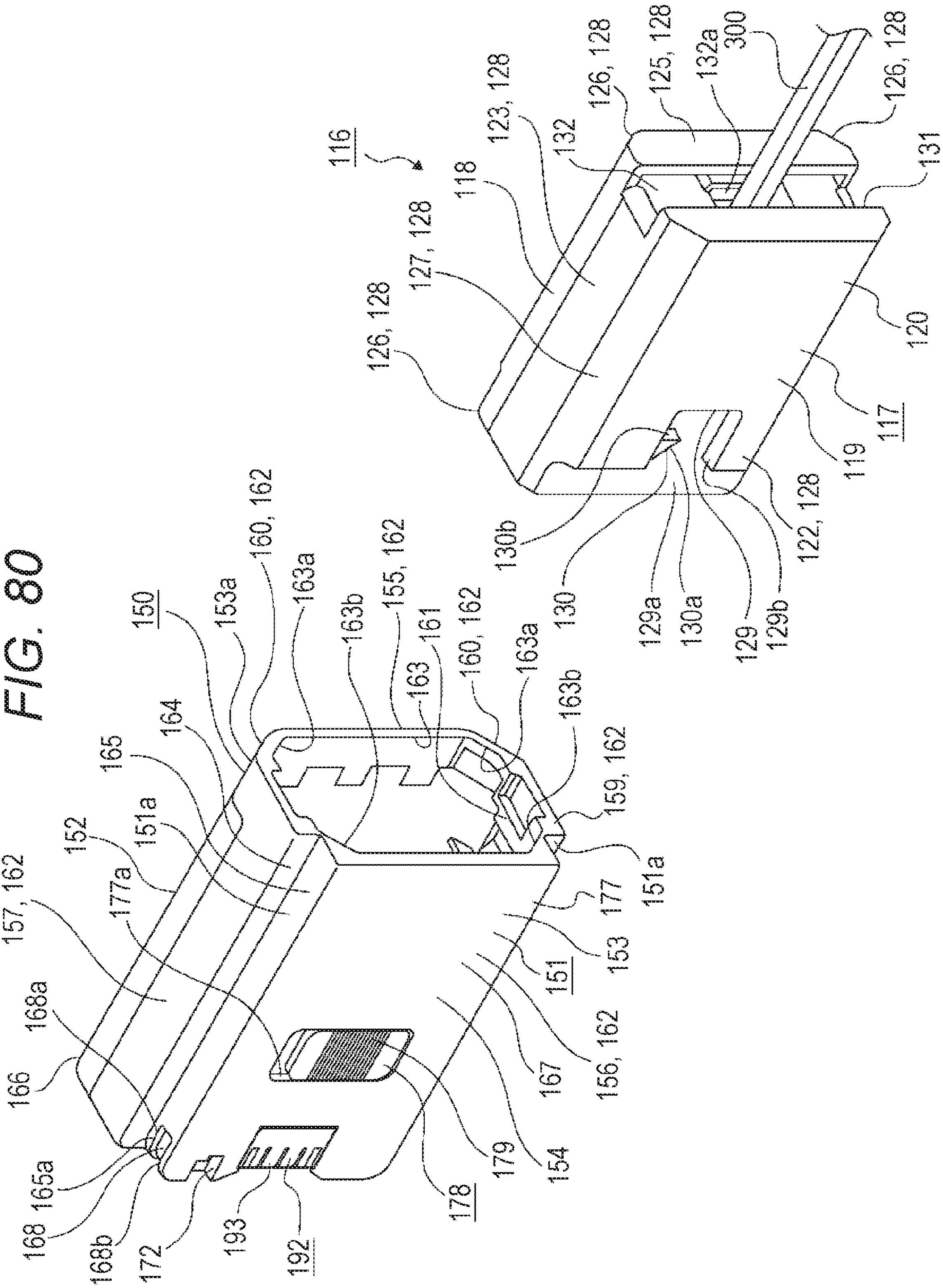
FIG. 80 is a perspective view illustrating the adapter and a power supply mounted in the adapter.
Figure 81:
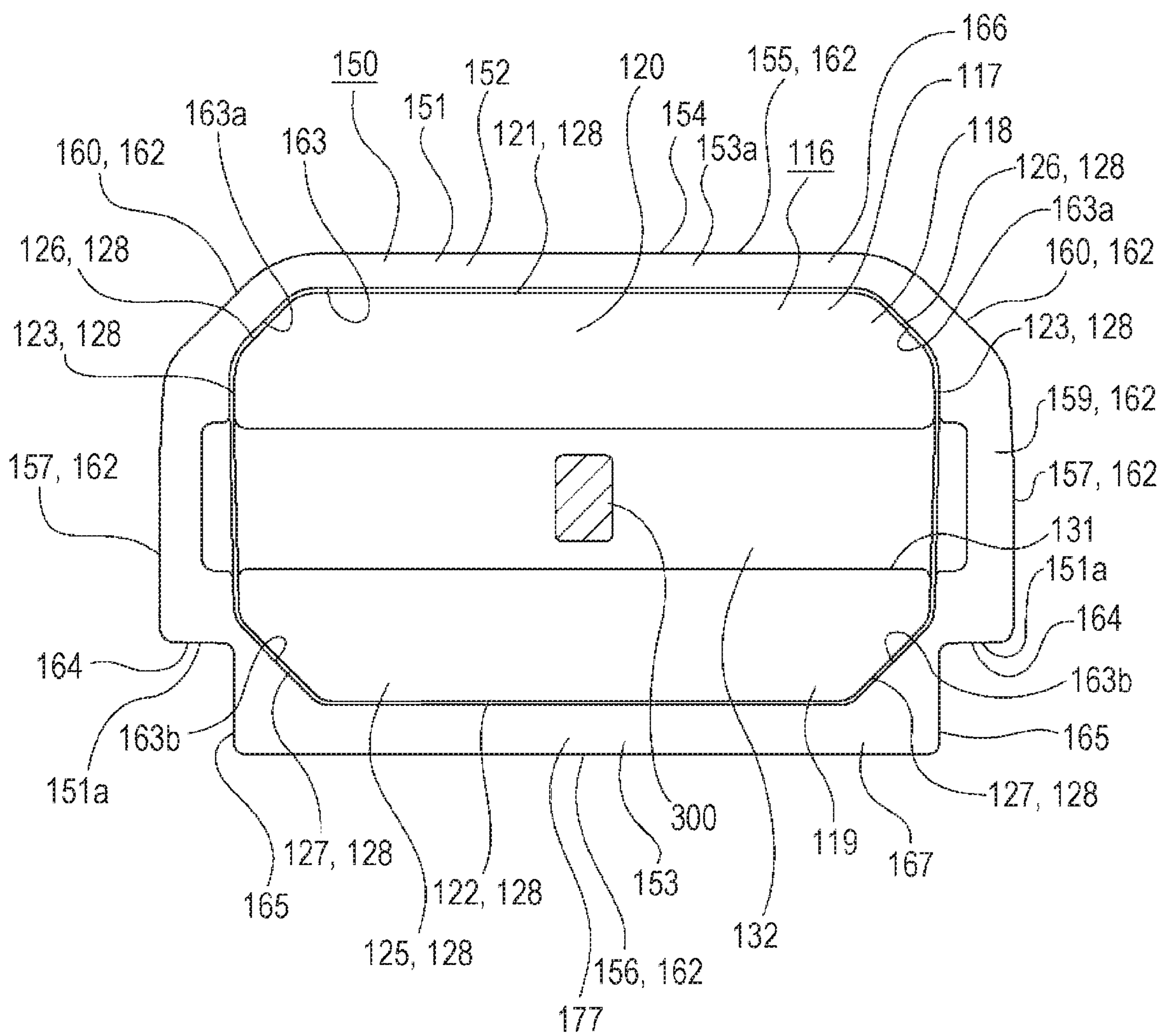
FIG. 81 is a rear view illustrating sizes of the adapter and the power supply.

The power supply 116 is inserted into the adapter 150 from the rear side (see FIGS. 62 and 80). At this time, all of the upper inclining edges 163*a* and 163*a* and the lower inclining edges 163*b* and 163*b* formed in the rear opening edge 163 of the casing 151 in the adapter 150 are linearly inclined, all of the upper inclining faces 126 and 126 and the lower inclining faces 127 and 127 of the power supply 116 are formed in a planar shape, and the upper inclining edges 163*a* and 163*a*, the upper inclining faces 126 and 126, the lower inclining edges 163*b* and 163*b*, and the lower inclining faces 127 and 127 do not interfere with each other (see FIG. 81). Therefore, the power supply 116 is smoothly inserted from the rear opening edge 163 of the adapter 150.

Figure 82:
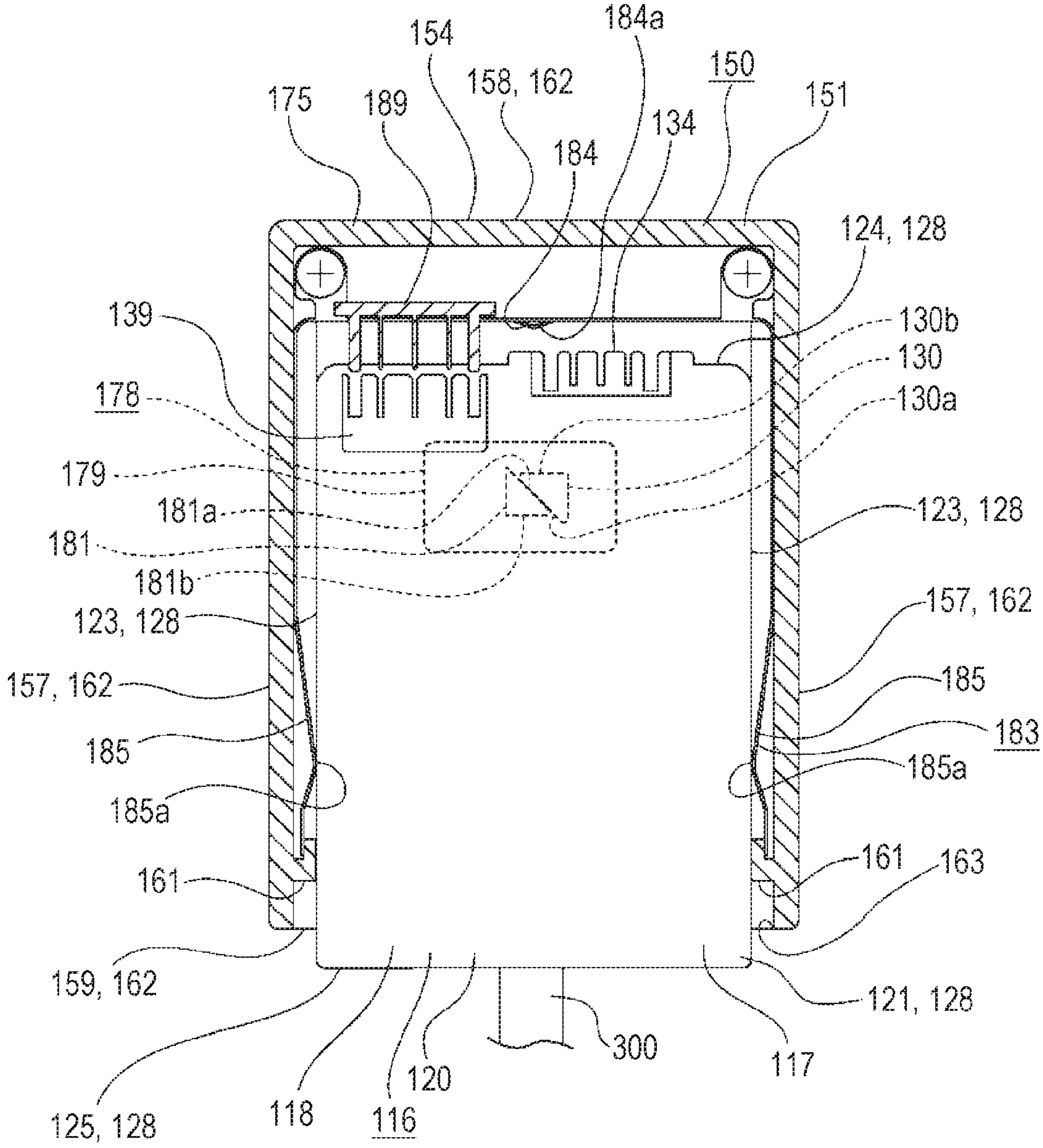
FIG. 82 is a conceptual diagram illustrating a state in which the power supply is being inserted into the adapter.

When the power supply 116 is inserted into the adapter 150, the side faces 123 and 123 are slid to the pressing portions 185*a* and 185*a* of the pressing plate 183 in the adapter 150, and the pressing face portions 185 and 185 are pushed to be wider in a direction in which they are apart from each other (see FIG. 82). Accordingly, the pressing face portions 185 and 185 are elastically deformed in the direction in which they are apart from each other.

At this time, the lock protruding portion 181 of the lock lever 178 in the adapter 150 is sequentially inserted relatively into the inserted part 129*b* from the introduction part 129*a* of the lock concave part 129 in the power supply 116, and the inclining face 130*a* of the locked claw 130 slides on the sliding face 181*a* of the lock protruding portion 181 in the lock lever 178, and the lock lever 178 and the slide plate 182 are laterally moved to one side as one body against the biasing force of the spring.

Figure 83:
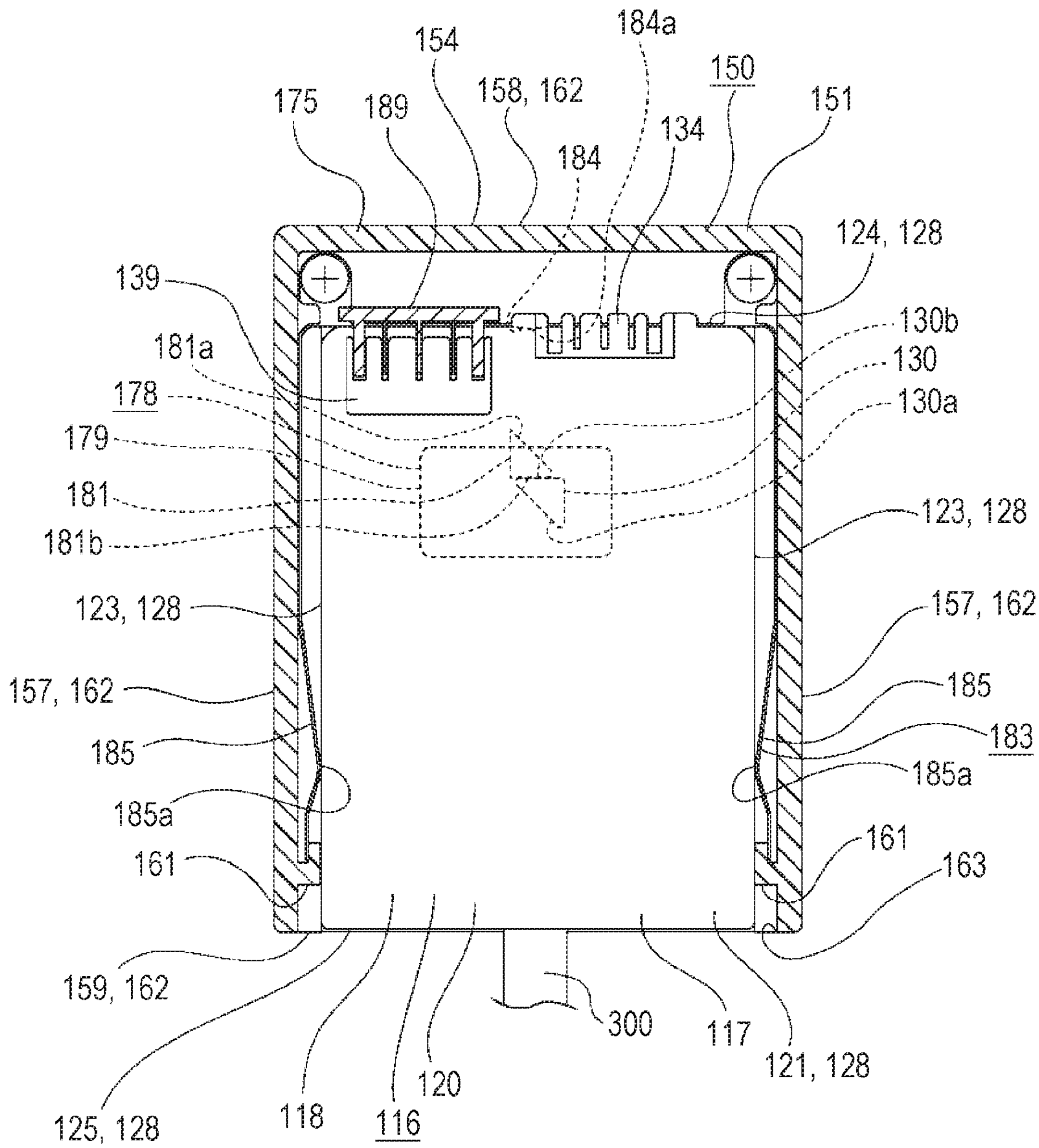
FIG. 83 is a conceptual diagram illustrating a state in which a power supply is inserted into the adapter and mounted.
Figure 84:
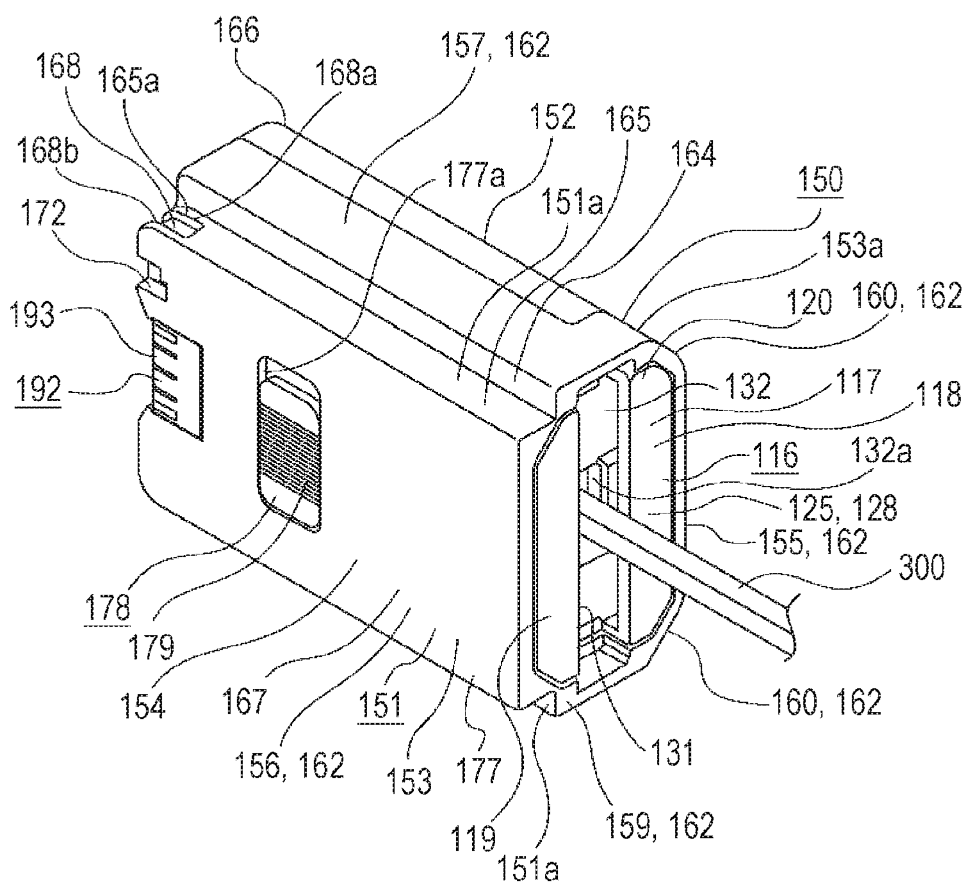
FIG. 84 is a perspective view illustrating a state in which the power supply is mounted in the adapter.

Further, when the power supply 116 is inserted into the back side of the adapter 150, and the inclining face 130*a* of the locked claw 130 goes over the sliding face 181*a* of the lock protruding portion 181, the lock lever 178 and the slide plate 182 are moved to the other side as one body by the biasing force of the spring, and the locking face 181*b* of the lock protruding portion 181 is engaged with the regulated face 130*b* of the locked claw 130 (see FIG. 83). Accordingly, the rearward movement of the power supply 116 with respect to the adapter 150 is regulated by the lock lever 178, and the power supply 116 is locked to the adapter 150 (see FIGS. 83 and 84).

In the state in which the power supply 116 is locked to the adapter 150, the front face 124 of the power supply 116 is pressed by the receiving piece portion 184*a* of the pressing plate 183 in the adapter 150, and the receiving piece portion 184*a* is elastically deformed (see FIG. 83). Further, in the pressing face portions 185 and 185, the pressing portions 185*a* and 185*a* are pressed in the state in which they are elastically deformed to the side faces 123 and 123 of the power supply 116. Therefore, the power supply 116 is pressed by the receiving piece portion 184*a* and the pressing portions 185*a* and 185*a* of the pressing plate 183 from the front and the side and is held and mounted on the adapter 150 in a stable state.

In the state in which the power supply 116 is mounted in the adapter 150 as described above, the connection terminals 141, 141, and 141 of the internal connector 139 in the power supply 116 are connected to the connection terminals 191, 191, and 191 of the relay connector 189 in the adapter 150. Accordingly, the connection terminals 141, 141, and 141 of the internal connector 139 are connected to the connection terminals 194, 194, and 194 of the connection connector 192 via the connection terminals 191, 191, and 191 of the relay connector 189, the first substrate 186, the electric wires 188, 188, and 188, and the second substrate 187.

Figure 85:
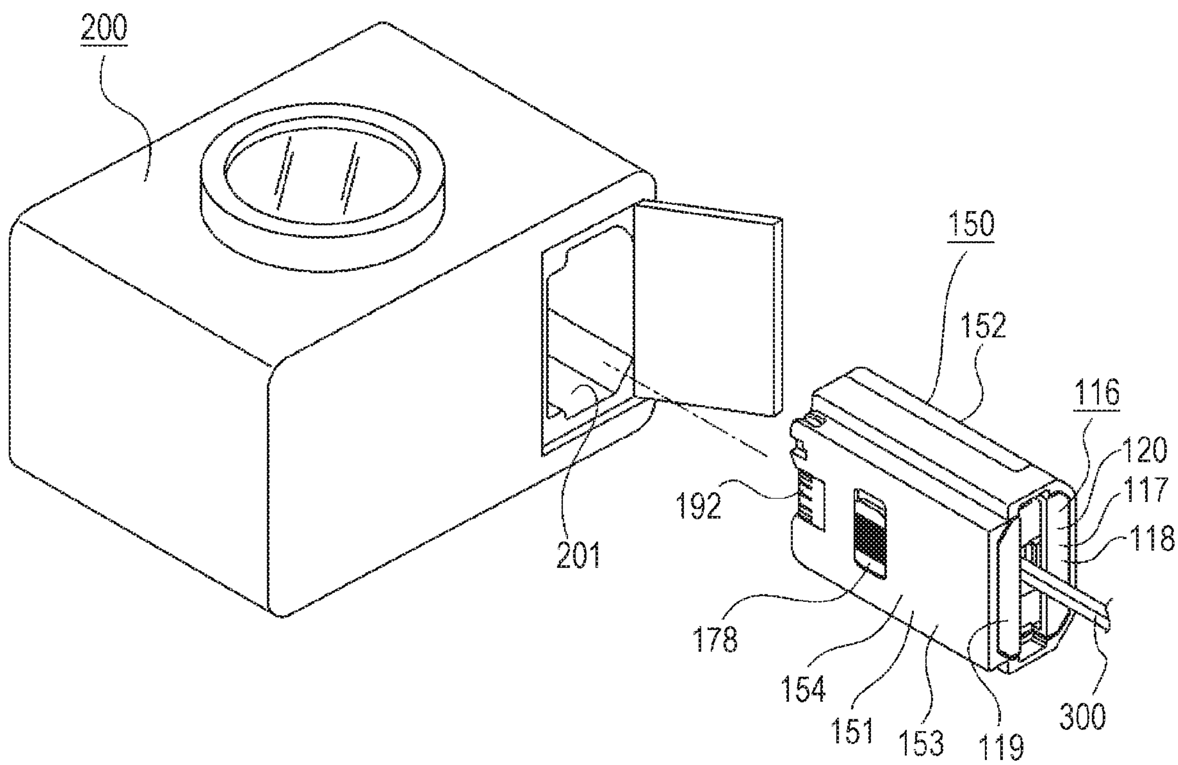
FIG. 85 is a perspective view illustrating an adapter in which a power supply is mounted and an imaging apparatus in which the adapter is mounted.

As described above, the adapter 150 in which the power supply 116 is mounted is inserted and mounted in a battery mounting unit 201 formed in an imaging apparatus 200 of a type B (see FIG. 85). The imaging apparatus 200 of the type B includes the imaging apparatus 50. Further, the imaging apparatus 200 corresponds to, for example, the middle-power camera (see FIG. 51).

The power supply 116 can be connected to a commercial power supply via the cable 300 and a connector (not illustrated), and in this case, electric power is supplied from the commercial power supply to the imaging apparatus 200 via the connector, the cable 300, the power supply 116, and the adapter 150.

Further, the power supply 116 can be mounted in the battery mounting unit 201 of the imaging apparatus 200 in a state in which the power supply 116 is connected to the charger 110 to which one or more batteries 1 (1A, 1B, and 1C) are mounted via the cable 300 and supply electric power of one or more batteries 1 (1A, 1B, and 1C) to the imaging apparatus 200. In a case where a plurality of batteries 1 (1A, 1B, and 1C) are mounted in the charger 110, it is possible to increase an amount and a time in which electric power is supplied to the imaging apparatus 200, and thus it is suitable for capturing an image or a moving image for a long time.

When the adapter 150 is mounted in the battery mounting unit 201 of the imaging apparatus 200 as described above, a guide protruding portion (not illustrated) of the battery mounting unit 201 is inserted into the guided grooves 168 and 168 of the adapter 150, and an identification protruding portion (not illustrated) of the battery mounting unit 201 is inserted into the identification groove 172 of the adapter 150.

As described above, in the adapter 150, the wall portions 171*b* and 171*b* are formed on the front side of the connection connector 192 as inclining faces which are apart from each other in the horizontal direction as they go forward.

Therefore, when the adapter 150 is inserted into the battery mounting unit 201 of the imaging apparatus 200, the connector arranged inside the imaging apparatus 200 is guided by the wall portions 171*b* and 171*b* to approach the connection connector 192.

As described above, since the wall portions 171*b* and 171*b* function as the guide faces when the adapter 150 is inserted into the battery mounting unit 201, the state in which the connection connector 192 is satisfactorily connected to the battery mounting unit 201 of the imaging apparatus 200 can be secured.

On the other hand, when the adapter 150 is desired to be mounted in the battery mounting unit 83 of the charger 80, since the identification groove 172 is formed only on the left side of the connection connector 192 in the adapter 150, the front face 158 of the casing 151 comes into contact with the identification protruding portion 90 arranged on the right side of the terminal connecting unit 93 in the battery mounting unit 83, and the mounting of the adapter 150 to the battery mounting unit 83 is restricted. Further, since no other guided groove or insertion groove is formed on the rear sides of the guided grooves 168 and 168 in the groove forming faces 165 and 165 in the adapter 150, the bottom face 156 of the casing 151 comes into contact with the second guide engaging parts 88 and 88 or the third guide engaging parts 89 and 89, and the mounting of the adapter 150 to the battery mounting unit 83 is restricted.

Therefore, the adapter 150 is unable to be mounted to the battery mounting unit 83 of the charger 80, and the adapter 150 is prevented from being erroneously mounted to the charger 80.

Further, in the casing 151 of the adapter 150, the notch 151*a* is formed by the level difference face 164 and the groove forming face 165 continuous to the bottom face 156, the guided groove 168 opened to the groove forming face 165 is formed, and the guided groove 168 is positioned on a further bottom face 156 side than the level difference face 164.

Therefore, since the guided groove 168 and the level difference face 164 are not continuously positioned, and a part of the groove forming face 165 is positioned between the guided groove 168 and the level difference face 164, the groove forming face 165 and the level difference face 164 are positioned on a further inner side of the casing 151 than the case where the guided groove 168 and the level difference face 164 are continuously positioned, and thus the size of the adapter 150 can be reduced.

Further, in the adapter 150, the identification groove 172 used for identifying the imaging apparatus or the like is formed in the casing 151, and the identification groove 172 is formed such that a plurality of identification parts having different lengths are continuously formed.

Therefore, since there is no part that divides the identification part among a plurality of identification parts having different lengths, the size of the identification groove 172 in the direction in which the identification parts are continuous is a sum of sizes of the plurality of identification parts, and it is possible to reduce the size of the adapter 150 while securing the high identification performance.

<Configuration of Another Battery>

Figure 86:
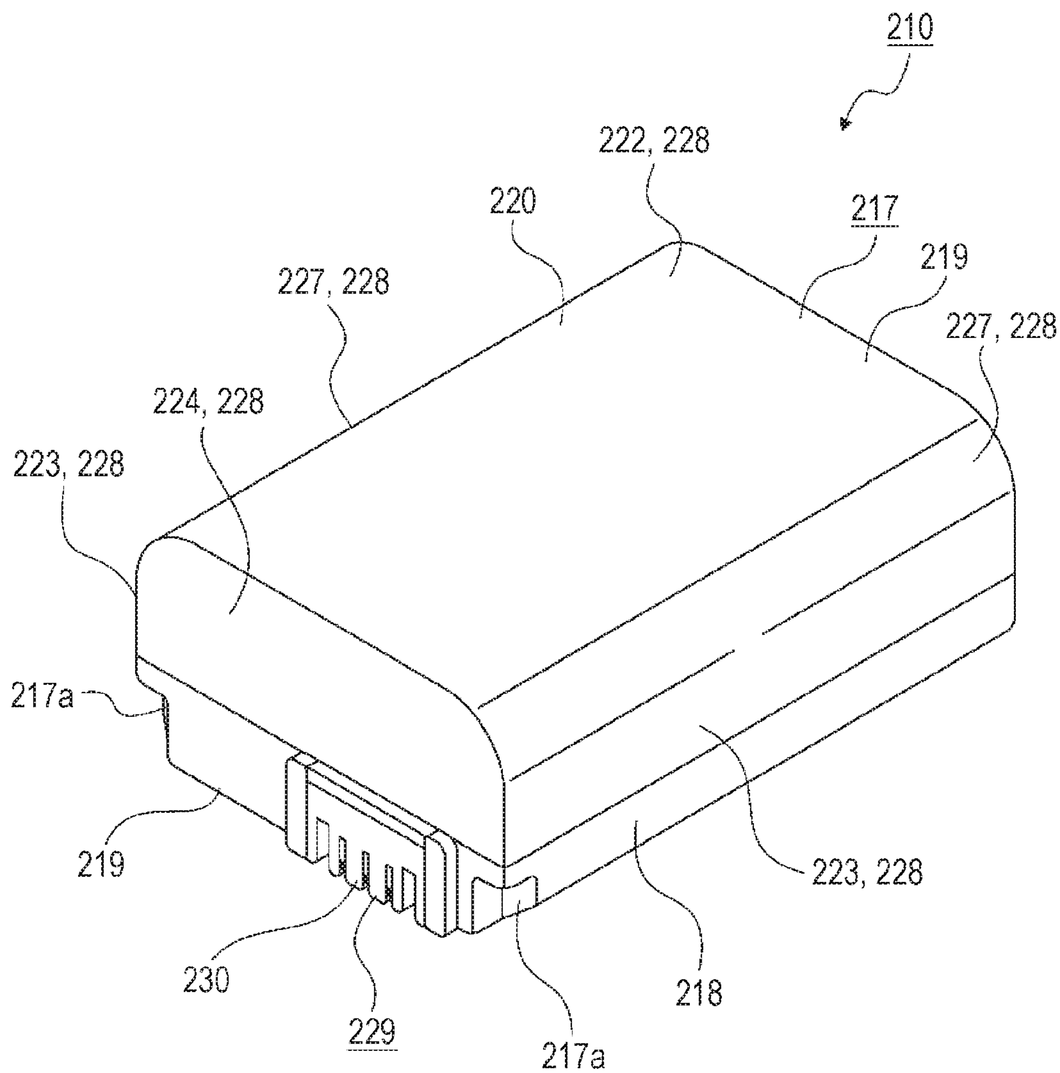
FIG. 86 is a perspective view of another battery.
Figure 87:
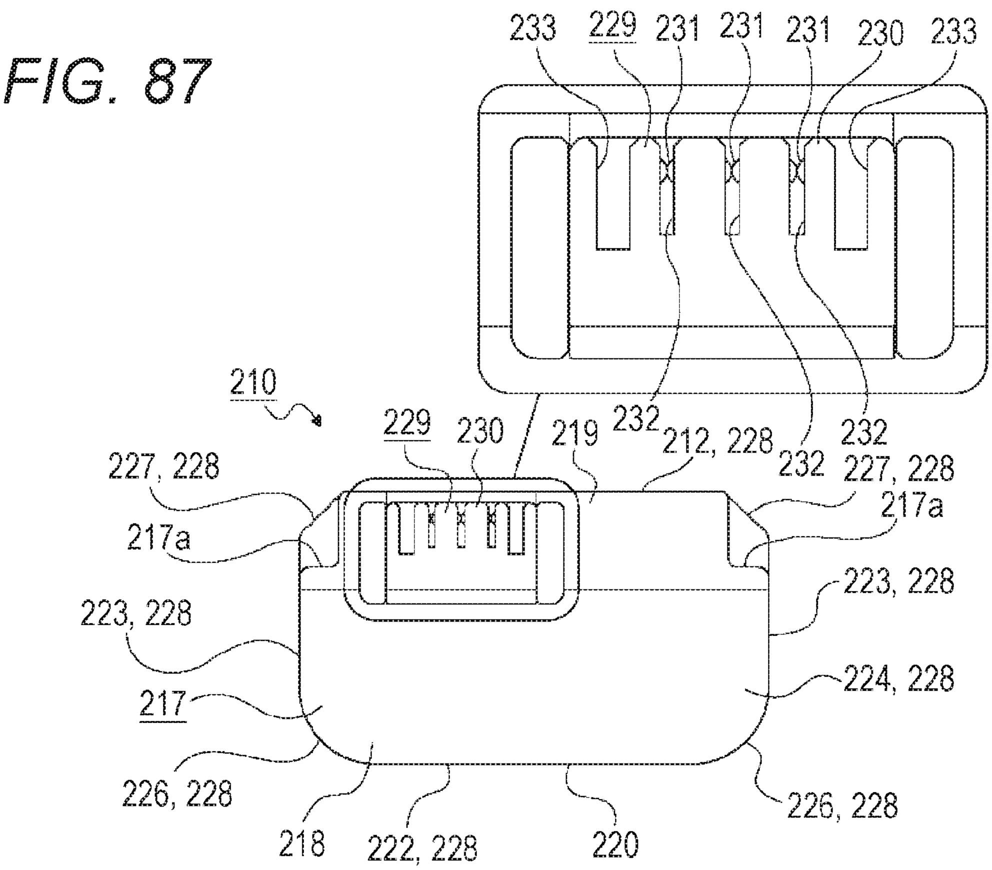
FIG. 87 is a front view of another battery.
Figure 88:
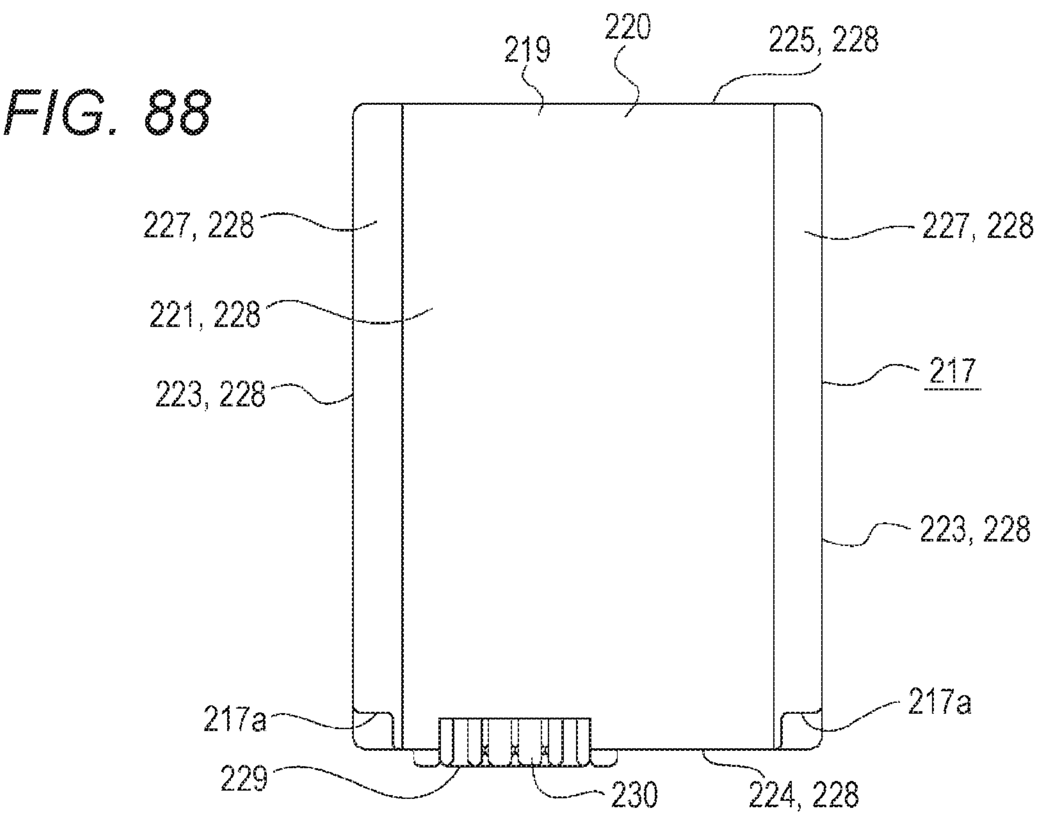
FIG. 88 is a plan view of another battery.

Next, a configuration of a battery 210 different from the batteries 1, 1A, 1B, and 1C will be described (see FIGS. 86 to 88). Further, the battery 210 corresponds to, for example, the small capacity type battery 1B (see FIG. 49). The battery 210 is configured such that necessary parts are arranged inside and outside a casing 217. An outer shape of the battery 210 is smaller than the outer shape of the batteries 1, 1A, 1B, 1C and is substantially the same size as the outer shape of the power supply 116. The casing 217 is formed in a substantially rectangular parallelepiped shape and configured such that a case cover (upper case) 218 is coupled with a housing case (lower case) 219 vertically. The case cover 218 is formed in a box shape which is opened downward. The housing case 219 is formed in a box shape which is opened upward. In the state in which the casing 217 is configured such that the case cover 218 is coupled with the housing case 219 vertically, an internal space of the casing 217 is formed as a housing space.

The casing 217 includes a top face 221, a bottom face 222, side faces 223 and 223, a front face 224, and a rear face 225 as outer faces 220, and the size in the forward/backward direction (longitudinal direction) is larger than the size in the horizontal direction (widthwise direction), and the size in the horizontal direction (widthwise direction) is larger than the size in the vertical direction (height direction). In the casing 217, upper inclining faces 226 and 226 are formed between the top face 221 and the side faces 223 and 223, respectively. The upper inclining faces 226 and 226 are displaced downward as they approach from the top face 221 to the side faces 223 and 223. In the casing 217, lower inclining faces 227 and 227 are formed between the bottom face 222 and the side faces 223 and 223, respectively. The lower inclining faces 227 and 227 are displaced upward as they approach from the bottom face 222 to the side faces 223 and 223. The upper inclining faces 226 and 226 are formed in a planar shape, and the lower inclining faces 227 and 227 are formed in a gently curved face shape which is convex outward.

All of the top face 221, the bottom face 222, the side faces 223 and 223, the front face 224, the rear face 225, the upper inclining faces 226 and 226, and the lower inclining faces 227 and 227 are formed as outer faces 228, 228, . . . .

In the front end part of the upper end part of the casing 217, insertion notches 217*a* and 217*a* are formed to be apart from each other laterally. The insertion notches 217*a* and 217*a* are formed at both left and right end portions of the casing 217. The insertion notches 217*a* and 217*a* are opened frontward, upwards, and outward in the horizontal direction.

In the front end part of the casing 217 in the upper end part, a connector 229 is arranged. The connector 229 is disposed in one of substantially left and right half portions of the casing 217. The connector 229 is a part which is connected to an electrode terminal of an imaging apparatus or the like, functions as a terminal part, and includes at least a positive electrode terminal and a negative electrode terminal.

The connector 229 includes a housing 230 formed of a non-conductive material and connection terminals 231, 231, and 231 formed of a conductive material, and the connection terminals 231, 231, and 231 are held by the housing 230 in a state in which at least parts of the connection terminals 231, 231, and 231 are arranged in terminal arrangement groove 232, 232, and 232 formed in the housing 230. The connection terminal 231 includes a pair of contact parts in which one end portion of a metal piece is bifurcated to the left and the right from a predetermined portion, and the pair of contact parts has elasticity in a direction in which the tip end portions come into contact with each other and arranged in the terminal arrangement groove 232 in a state in which they come into contact with or are close to each other.

The connection terminals 231, 231, and 231 function as a positive electrode terminal, a negative electrode terminal, and an information terminal, respectively, and the positive electrode terminal, the information terminal, and the negative electrode terminal are arranged side by side in order in the horizontal direction, or the positive electrode terminal, the information terminal, and the negative electrode terminal are arranged side by side in order from the right side.

The information terminal is used not only to enable the connection apparatus or the like to recognize the internal temperature of the battery 210 and but also to enable the connection apparatus or the like to recognize various types of information of the battery 210 such as a charge residual amount or degradation information of the battery 210.

Further, two terminal arrangement grooves 232, 232 and two connection terminals 231 and 231 may be arranged in the connector 229. In a case where the two connection terminals 231 and 231 are arranged, the two connection terminals 231 and 231 function as the positive electrode terminal and the negative electrode terminal, respectively, and the positive electrode terminal and the negative electrode terminal are arranged side by side in order from the left side, or the positive electrode terminal and the negative electrode terminal are arranged side by side in order from the right side. Further, four terminal arrangement grooves 232, 232, . . . and four connection terminals 231, 231, . . . may be arranged in the connector 229. In a case in which four connection terminals 231, 231, . . . are arranged, the four connection terminals 231, 231, . . . function as the positive electrode terminal, the negative electrode terminal, the information terminal, and the communication terminal, respectively, and the positive electrode terminal, the information terminal, the communication terminal, and the negative electrode terminal are arranged side by side in order from the left side, the positive electrode terminal, the information terminal, the communication terminal, and the negative electrode terminal are arranged side by side in order from the right side, the positive electrode terminal, the communication terminal, the information terminal, and the negative electrode terminal are arranged side by side in order from the left side, or the positive electrode terminal, the communication terminal, the information terminal, and the negative electrode terminal are arranged side by side in order from the right side. The communication terminal is used to enable the connection apparatus or the like to recognize various kinds of information of the battery 210 such as the charge residual amount or the degradation information of the battery 210, and in this case, the information terminal is used only to notify the imaging apparatus or the like of the temperature information.

The terminal arrangement grooves 232, 232, and 232 are formed to be opened frontward and upward and be apart from each other laterally. In the housing 230, positioning grooves 233 and 233 which are opened frontward and upward are formed outside the terminal arrangement grooves 232, 232, and 232 in the horizontal direction.

In the connector 229, one end portions of the connection terminals 231, 231, and 231 are connected to a circuit board (not illustrated) arranged inside the casing 217. The battery 210 having the above configuration is inserted and mounted in the battery mounting unit 101 formed in the imaging apparatus 100 of the type A. As described above, the power supply 116 can also be mounted in the battery mounting unit 101 formed in the imaging apparatus 100 of the type A, and the imaging apparatus 100 of the type A can be used using the power supply 116 or the battery 210.

Further, the battery 210 is charged by a charger (not illustrated) corresponding to the battery 210.

<Configuration of Another Adapter>

Next, a configuration of an adapter 250 will be described (see FIGS. 89 to 96).

The adapter 250 is configured such that necessary parts are arranged inside and outside a casing 251. The adapter 250 includes substantially the same outer shape as the outer shape of the adapter 250 and the batteries 1, 1A, 1B, and 1C described above.

The casing 251 is formed in a box shape which is opened rearward such that a case cover (upper case) 252 is coupled with a housing case (lower case) 253 vertically. The case cover 252 is formed in a box shape which is opened downward and rearward. In the housing case 253 a rear end part in which a part excluding the rear end part is formed in a box shape which is opened upward is formed as an annular portion 253*a* which is penetrated back and forth. The case cover 252 is coupled with an upward opened portion of the housing case 253 downward. An internal space of the casing 251 is formed as a housing space in a state in which the case cover 252 and the housing case 253 are coupled to constitute the casing 251. The casing 251 includes a top face 255, a bottom face 256, side faces 257 and 257, a front face 258, and a rear face 259 as outer faces 254, and a size in the forward/backward direction (longitudinal direction) is larger than a size in the horizontal direction (widthwise direction), and a size in the horizontal direction (widthwise direction) is larger than a size in the vertical direction (height direction). In the casing 251 inclining faces 260 and 260 are formed between the top face 255 and the side faces 257 and 257, respectively. The inclining faces 260 and 260 are displaced downward as they approach from the top face 255 to the side faces 257 and 257. An opening edge formed on the rear face 259 is formed as a rear opening edge 263.

All of the top face 255, the bottom face 256, the side faces 257 and 257, the front face 258, the rear face 259, and the inclining faces 260 and 260 are formed as outer faces 261, 261, . . . .

In the upper end part on the inner face side of the casing 251, insertion protruding portions 262 and 262 are arranged to be apart from each other laterally. The insertion protruding portions 262 and 262 are positioned on both left and right end portions of the front end part and protrude rearward.

In the upper end part of the rear opening edge 263 in the casing 251, upper inclining edges 263*a* and 263*a* are formed to be apart from each other laterally, and in the lower end portion of the rear opening edge 263, lower inclining edges 263*b* and 263*b* are formed to be apart from each other laterally. The upper inclining edges 263*a* and 263*a* are formed at both left and right end portions of the rear opening edge 263 and linearly inclined so that they are displaced upward as they approach each other. The lower inclining edges 263*b* and 263*b* are formed at both left and right end portions of the rear opening edge 263 and linearly inclined so that they are displaced downward as they approach each other.

Notches 251*a* and 251*a* are formed in both left and right side portions of the lower end portion of casing 251. The notch 251*a* is formed by a level difference face 264 which is opened sideward (leftward or rightward), downward, frontward, and rearward and faces downward and extends in the forward/backward direction and a groove forming face 265 that faces sideward and extends in the forward/backward direction. An outer edge of the level difference face 264 is continuous to a lower edge of the side face 257. In the groove forming face 265, an upper edge is continuous to an inner edge of the level difference face 264, and a lower edge is continuous to a side edge of the bottom face 256. The level difference face 264 and the groove forming face 265 are continuously formed from the front face 258 to the rear face 259, respectively.

The level difference face 264 and the bottom face 256 are formed as substantially parallel planes, and a portion of the groove forming face 265 excluding the front end part and the side face 257 are formed as substantially parallel planes. The front end parts of the groove forming faces 265 and 265 are formed as outwardly convex curved faces 265*a* and 265*a* which are displaced in a direction in which they approach each other as they approach the front face 258.

As described above, in the adapter 250, the front end parts of the groove forming faces 265 and 265 are formed as the curved faces 265*a* and 265*a*, and thus stress is hardly concentrated, and the front end parts hardly come into contact with the ground or the like at the time of falling or the like, and thus it is possible to reduce the occurrence of damage.

The casing 2 is configured with a main body part 266 which is a part above a virtual face including the level difference faces 264 and 264, and a bottom part 267 which is a part lower than the virtual face. The level difference faces 264 and 264 are included in the main body part 266. The bottom part 267 is smaller in a lateral width than the main body part 266, and the distance between the side faces 257 and 257 in the horizontal direction is larger than the distance between the groove forming faces 265 and 265.

In the both left and right side portions of the bottom part 267, first guided grooves 268 and 268, second guided grooves 269 and 269, and third guided grooves 270 and 270 are formed in order from the front side to be apart from each other. All of the first guided groove 268, the second guided groove 269, and the third guided groove 270 are opened to the groove forming face 265.

The first guided groove 268 is formed in the front end part of the bottom part 267 and is opened sideward and frontward. The second guided groove 269 extends frontward and backward and is opened sideward. The third guided groove 270 extends frontward and rearward and is opened sideward. Note that the third guided groove 270 may have a shape that is opened rearward.

In both left and right side portions of the bottom part 267, insertion grooves 271 and 271 and insertion grooves 272 and 272 are formed in order from the front side to be apart from each other. Both the insertion groove 271 and the insertion groove 272 are opened to the groove forming face 265. The insertion groove 271 is opened sideward, upward, and downward, and an upper opening communicates with substantially a front half of the second guided groove 269. The insertion groove 272 is opened sideward, upward, and downward, and an upper opening communicates with substantially the front half of the third guided groove 270.

Portions between lower edges 268*b* and 268*b* of the first guided grooves 268 and 268 and the bottom face 256 in the casing 251 are formed as first engagement claw parts 251*p* and 251*p*, respectively, portions between lower edges 269*b* and 269*b* of the second guided grooves 269 and 269 and the bottom face 256 in the casing 251 are formed as second engagement claw parts 251*q* and 251*q*, respectively, and portions between lower edges 270*b* and 270*b* of the third guided grooves 270 and 270 and the bottom face 256 in the casing 251 are formed as third engagement claw parts 251*r* and 251*r*, respectively. Both the first engagement claw part 251*p* and the second engagement claw part 251*q* are positioned on a further front face 258 side than the center of the casing 251 in the forward/backward direction, and the third engagement claw part 251*r* is positioned on a further rear face 259 side than the center of the casing 251 in the forward/backward direction.

An arrangement concave part 273 is formed in the front end part of the bottom part 267. The arrangement concave part 273 is formed substantially at the center in the horizontal direction and is opened frontward and downward. In the casing 251, an arrangement hole 274 that communicates with a portion excluding the front end part of the arrangement concave part 273 and is penetrated vertically is formed.

All of an upper edge 268*a* of the first guided groove 268, an upper edge 269*a* of the second guided groove 269, and an upper edge 270*a* of the third guided groove 270 are positioned on a further lower side than the level difference face 264, and a part of the groove forming face 265 exists between the first guided groove 268 and the level difference face 264, between the second guided groove 269 and the level difference face 264, and between third guided groove 270 and level difference face 264. Therefore, all of a distance from the lower end of the groove forming face 265 to the upper edge 268*a* of the first guided groove 268, a distance from the lower end of the groove forming face 265 to the upper edge 269*a* of the second guided groove 269, and a distance from the lower end of the groove forming face 265 to the upper edge 270*a* of the third guided groove 270 are smaller than a distance from the upper end to the lower end of the groove forming face 265. Further, a vertical distance (groove width) of the first guided groove 268, the second guided groove 269, and the third guided groove 270 may be larger or smaller than the distance from the upper end of the groove forming face 265 to the upper edges 268*a*, 269*a*, and 270*a*, and a vertical distance of the first guided groove 268, the second guided groove 269, and the third guided groove 270 may be equal to the distance from the upper end of the groove forming face 265 to the upper edges 268*a*, 269*a*, and 270*a*. All of the lower edge 268*b* of the first guided groove 268, the lower edge 269*b* of the second guided groove 269, and the lower edge 270*b* of the third guided groove 270 are positioned on a further upper side than the lower edge of the groove forming face 265 and positioned at the same position in the vertical direction.

Figure 96:
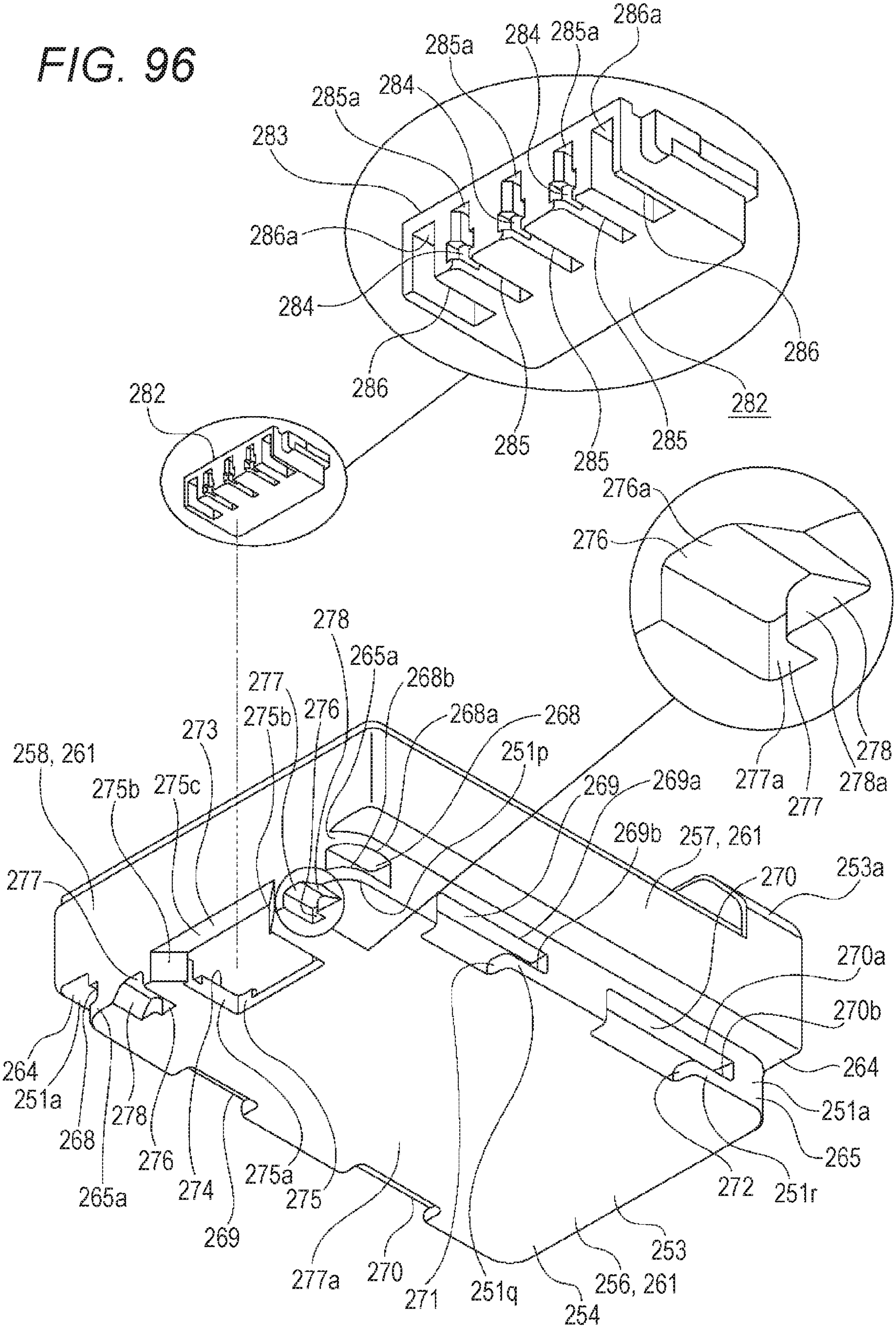
FIG. 96 is an exploded perspective view illustrating a housing case and a connector in another adapter.

The arrangement concave part 273 is formed by a concave part forming face 275 (see FIG. 96). The concave part forming face 275 is configured with a base portion 275*a*, wall portions 275*b* and 275*b*, and a middle portion 275*c*. The base portion 275*a* is formed in a laid letter "U" shape which is opened frontward and faces in the horizontal direction. The wall portions 275*b* and 275*b* are continuous to the front end of the base portion 275*a* and are formed as inclining faces which are apart from each other in the horizontal direction as they goes forwards. In other words, the left wall portion 275*b* is formed as an inclining face which approaches the left side face 257 as it goes forwards, and the right wall portion 275*b* is formed as an inclining face which approaches the right side face 257 as it goes forwards. Note that, in the wall portions 275*b* and 275*b*, one wall portion 275*b* may be formed as an inclining face, and the other wall portion 275*b* may be formed as a face that faces leftward or rightward without being inclined. The middle portion 275*c* faces downward and is formed between the upper edges of the wall portions 275*b* and 275*b*. The wall portions 275*b* and 275*b* are, for example, 45 degrees inclined with respect to a face that faces in the horizontal direction. The middle portion 275*c* is positioned on a further lower side than the level difference face 264 at substantially the same height as the upper edges 268*a*, 269*a*, and 270*a* of the first guided groove 268, the second guided groove 269, and the third guided groove 270 or at a position slightly lower than the upper edges 268*a*, 269*a*, and 270*a*. However, the middle portion 275*c* may be positioned on a further upper side than the upper edges 268*a*, 269*a*, and 270*a*.

Note that, similarly to the wall portion 29*d* (see FIGS. 57 and 58) arranged in the concave part forming face 29A described above, the wall portion 271*b* may be formed in a shape configured with a first inclining face, a middle face continuous to the first inclining face, and a second inclining face continuous to the middle face.

In the front end part of the bottom part 267, identification grooves 276 and 276 are formed to be apart from each other laterally. The identification groove 276 has a role as a functional groove with a predetermined function, and for example, the identification groove 276 identifies a type of imaging apparatus or the like. Note that the functional groove is not limited to the identification groove 276, and a groove having a function other than an identification function such as a positioning groove used for performing positioning with respect to an imaging apparatus or the like or a detection groove used for detecting a connection state or the like of an imaging apparatus or the like may be formed as the functional groove instead of the identification groove 276.

However, since the predetermined function is an identifying function for identifying a type of imaging apparatus or the like, a type of imaging apparatus or the like is identified through the functional groove, and it is possible to easily identify a type of imaging apparatus or the like to which the battery is connected as the battery is mounted in the imaging apparatus or the like or the battery is not mounted in the imaging apparatus or the like.

Note that the predetermined function may be a function of identifying the type of adapter.

The identification grooves 276 and 276 are formed on the opposite side with the arrangement concave part 273 interposed therebetween. The identification groove 276 is formed by continuously forming a first identification part 277 and a second identification part 278 having different front/rear lengths in the horizontal direction. The first identification part 277 and the second identification part 278 have roles as a first functional unit and a second functional unit, respectively.

Among faces forming the identification groove 276, a face which is positioned on the upper side and faces downward is formed as an inner bottom face 276*a*. The inner bottom face 276*a* is positioned on a further lower side than the middle portion 275*c* serving as a face of the concave part forming face 275 which is positioned on the upper side and faces downward. Therefore, a depth of the identification groove 276 in the vertical direction is smaller than a depth of the arrangement concave part 273 in the vertical direction. Further, the inner bottom face 276*a* is positioned on a further lower side than the upper edge 268*a*, 269*a*, and 270*a* of the first guided groove 268, the second guided groove 269, and the third guided groove 270 and the level difference face 264. Further, the inner bottom face 276*a* is positioned on a further upper side than the lower edges 268*b*, 269*b*, and 270*b* of the first guided groove 268, the second guided groove 269, and the third guided groove 270. However, the inner bottom face 276*a* may be positioned on a further lower side than the lower edges 268*b*, 269*b*, and 270*b* or may be positioned at the same height as the lower edges 268*b*, 269*b*, and 270*b*.

Among the faces forming the identification groove 276, a face that is positioned on the rear side in the first identification part 277 and faces frontwards is formed as an inner bottom face 277*a*, and a face that is positioned on the rear side in the second identification part 278 and faces frontwards is formed as an inner bottom face 278*a*. The inner bottom faces 277*a* and 278*a* are positioned on a further front side than a face which is positioned at the rearmost side in the base portion 275*a* and faces frontward among the concave part forming faces 275 and positioned on a further rear side than the front face of the connector 229. Further, the inner bottom faces 277*a* and 278*a* are positioned on a further front side than the rear end edge of the first guided groove 268. However, the inner bottom faces 277*a* and 278*a* may be positioned on a further rear side than the rear end edge of the first guided groove 268 or may be positioned at the same position as the rear end edge of the first guided groove 268 in the forward/backward direction.

The first identification part 277 has a front/rear length longer than the second identification part 278, the inner bottom face 277*a* is positioned on a slightly further rear side than the inner bottom face 278*a*, and the first identification part 277 is positioned on a further arrangement concave part 273 side than the second identification part 278. A width of the second identification part 278 in the horizontal direction is smaller than a width of the first identification part 277 in the horizontal direction.

Figure 89:
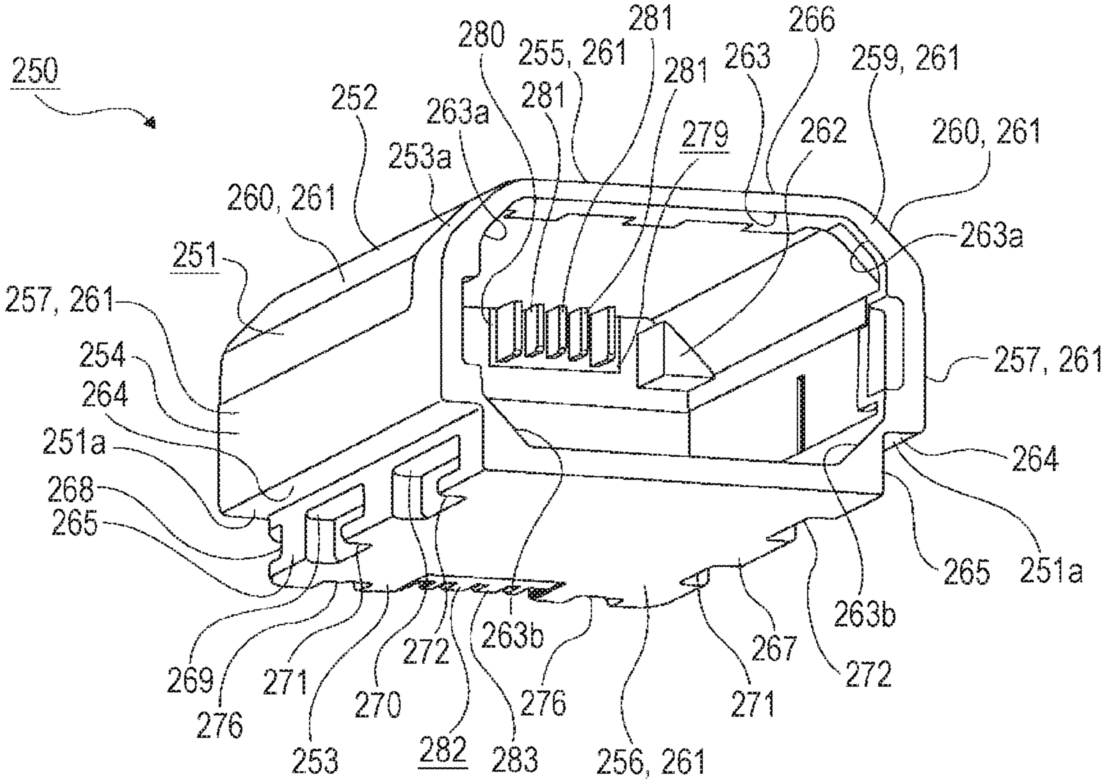
FIG. 89 is a perspective view of another adapter.
Figure 90:
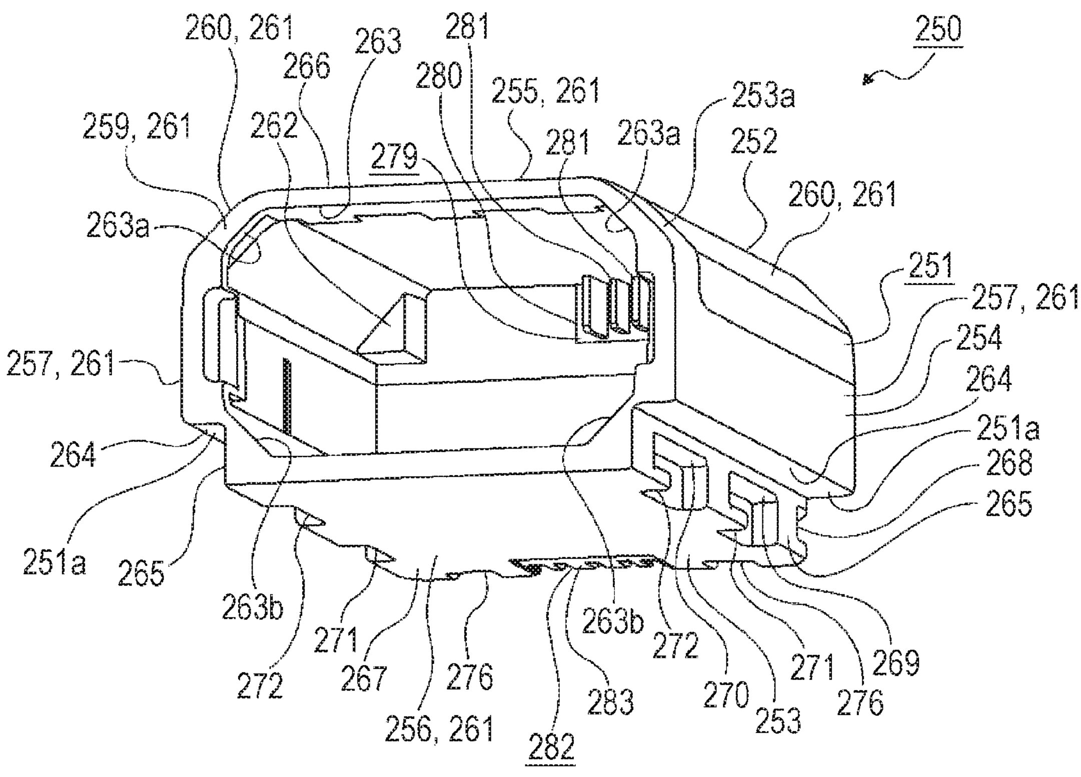
FIG. 90 is a perspective view illustrating another adapter in a state viewed in a direction different from that in FIG. 89.
Figure 91:
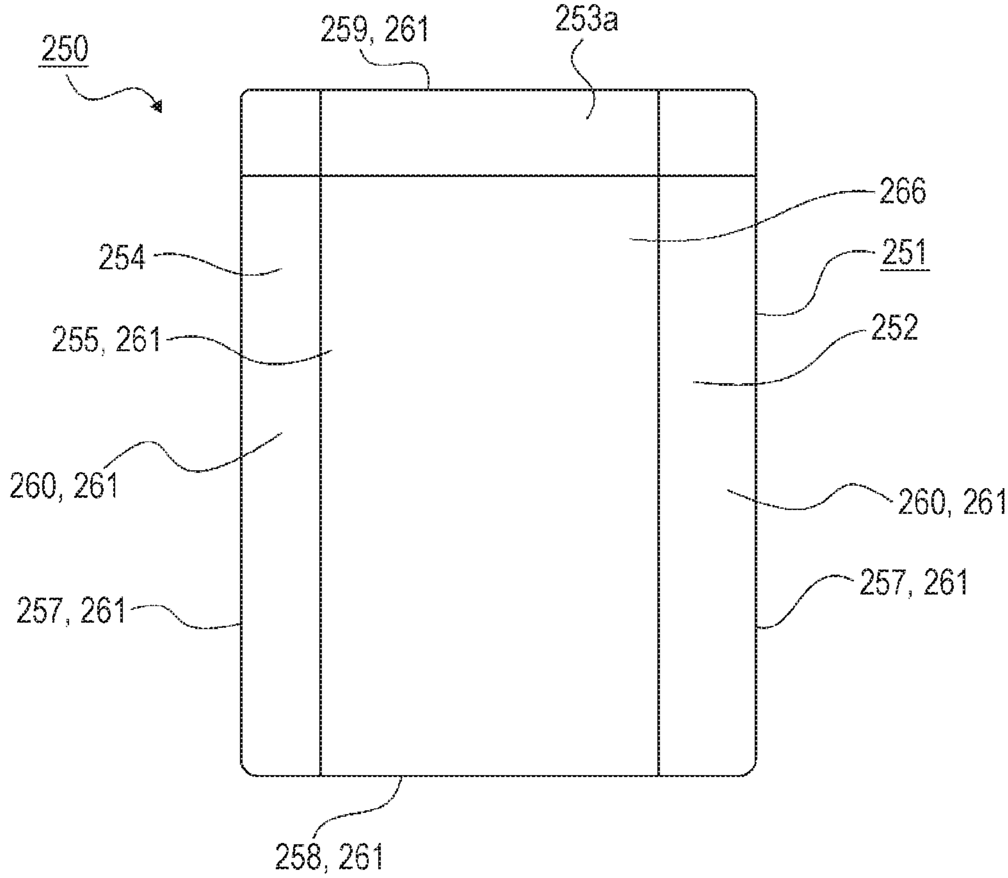
FIG. 91 is a plan view of another adapter.
Figure 92:
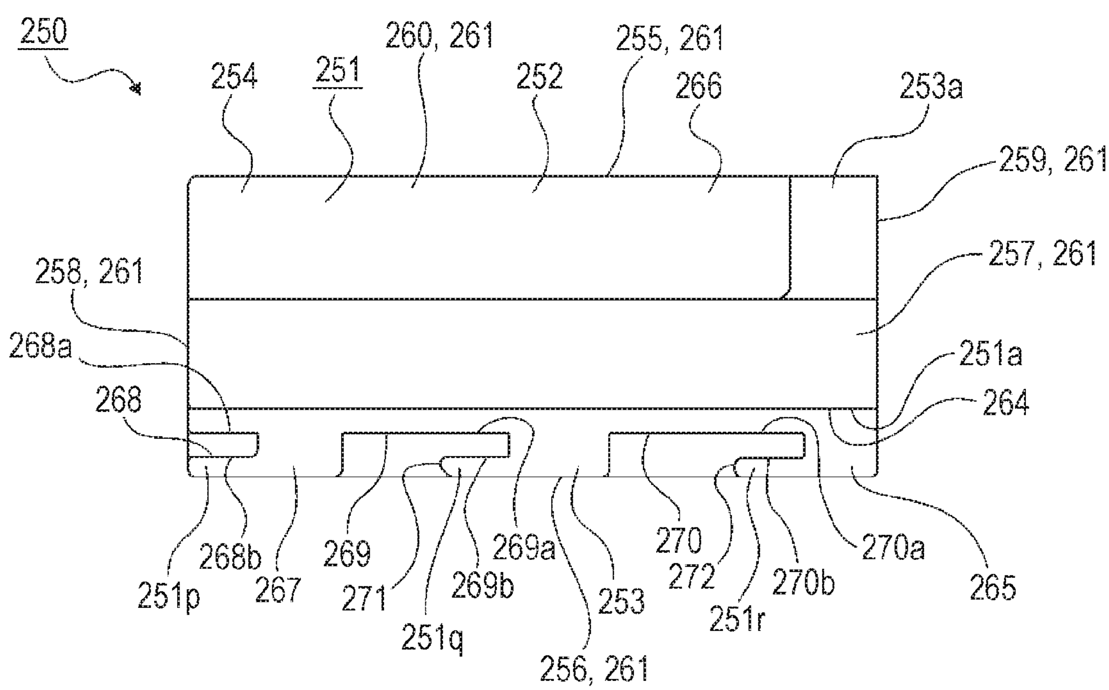
FIG. 92 is a side view of another adapter.
Figure 95:
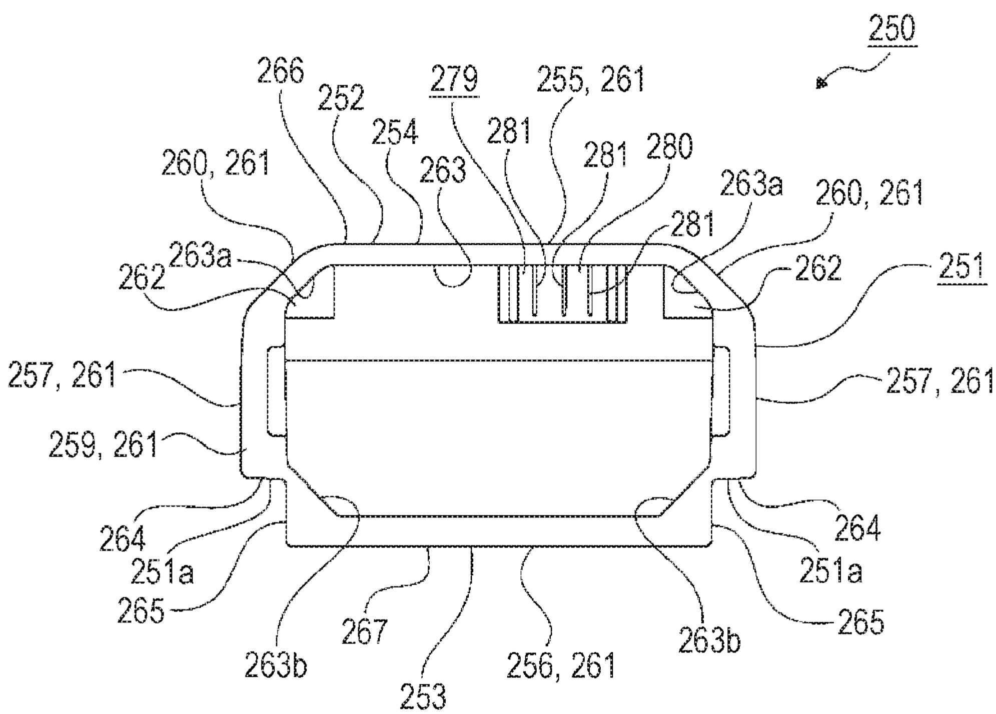
FIG. 95 is a rear view of another adapter.

A relay connector 279 is mounted to the front end part on the inner face side of the casing 251 (see FIGS. 89, 90 and 95). The relay connector 279 is a part which is arranged at a position near the upper end inside the casing 251 and connected with the connector 229 of the battery 210 and functions as a terminal part.

The relay connector 279 includes a housing 280 formed of a non-conductive material and connection terminals 281, 281, and 281 formed of a conductive material.

Note that, as the connection terminals 281 of the relay connector 279, two or four connection terminals may be arranged in accordance with the number of the connection terminals 231 of the connector 229 in the battery 210.

Figure 93:
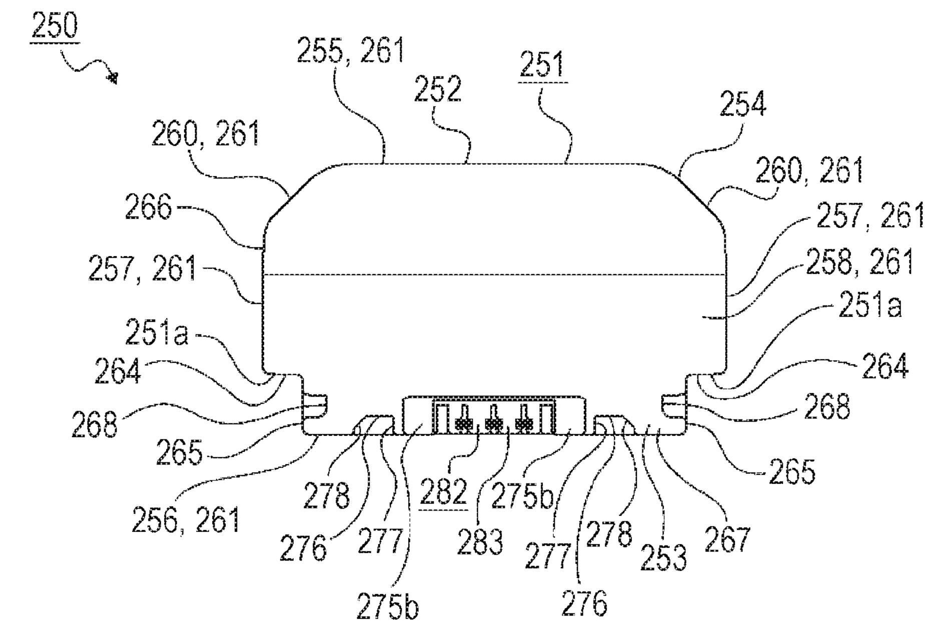
FIG. 93 is a front view of another adapter.
Figure 94:
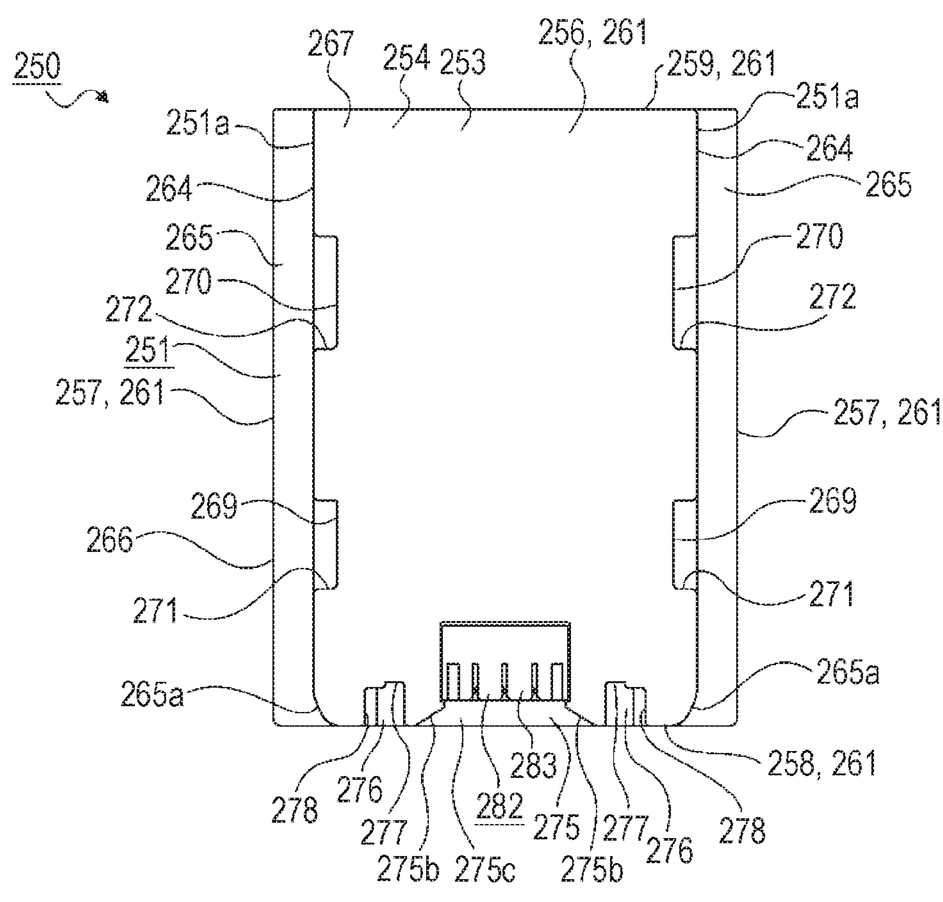
FIG. 94 is a bottom view of another adapter.

A connection connector 282 is arranged in the arrangement concave part 273 of the casing 251 (see FIGS. 93, 94, and 96). The connection connector 282 is a part connected to an electrode terminal of an imaging apparatus or the like, functions as a terminal part, and includes at least a positive electrode terminal and a negative electrode terminal.

The connection connector 282 includes a housing 283 formed of a non-conductive material and connection terminals 284, 284, and 284 formed of a conductive material, and the connection terminals 284, 284, and 284 are held by the housing 283 in a state in which at least parts of the connection terminals 284, 284, and 284 are arranged in terminal arrangement grooves 285, 285, and 285 formed in the housing 283. The connection terminal 284 includes a pair of contact parts in which one end portion of a metal piece is bifurcated to the left and the right from a predetermined portion, and the pair of contact parts has elasticity in a direction in which the tip end portions come into contact with each other and arranged in the terminal arrangement groove 285 in a state in which they come into contact with or are close to each other.

The connection terminals 284, 284, and 284 function as a positive electrode terminal, a negative electrode terminal, and an information terminal, respectively, and the positive electrode terminal, the information terminal, and the negative electrode terminal are arranged side by side in order from the left side, or the positive electrode terminal, the information terminal, and the negative electrode terminal are arranged side by side in order from the right side.

The terminal arrangement grooves 285, 285, and 285 are formed to be opened frontward and downward and spaced apart from each other laterally. In the housing 283, positioning grooves 286 and 286 which are opened frontward and downward are formed outside the terminal arrangement grooves 285, 285, and 285 in the horizontal direction.

A face of the terminal arrangement groove 285 positioned to be closest to the top face 255 side and a face of the positioning groove 286 positioned to be closest to the top face 255 side are formed as inner bottom faces 285*a* and 286*a*, and positions of the inner bottom faces 285*a* and 286*a* in the vertical direction are substantially the same. The inner bottom faces 285*a* and 286*a* are positioned on a further lower side than the level difference face 264. Further, the inner bottom faces 285*a* and 286*a* are positioned on a further lower side than the upper edge 268*a* of the guided groove 268 and positioned on a further upper side than the lower edge 268*b* of the guided groove 268.

The connection terminal 284 is elastically deformable in the substantially horizontal direction and held by the housing 283 in a state in which it is inserted into the terminal arrangement groove 285.

Figure 97:
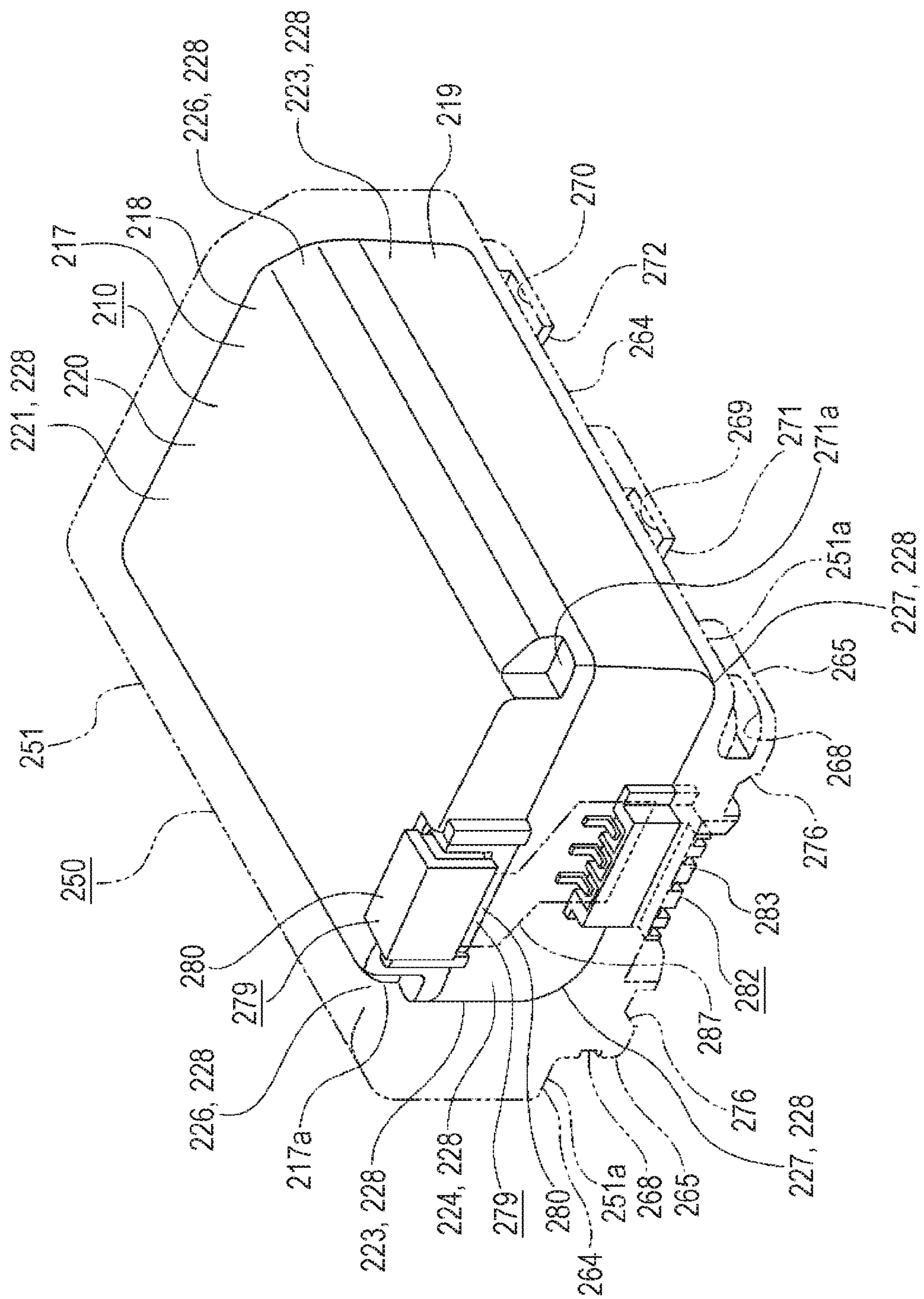
FIG. 97 is a perspective view illustrating a state in which a relay connector and a connection connector are connected by a flexible printed circuit board in another adapter.

Note that, as the connection terminals 284 of the connection connector 282, two or four connection terminals may be arranged in accordance with the number of connection terminals 281 of the relay connector 279. In a case where two connection terminals 284 and 284 are provided, the two connection terminals 284 and 284 function as the positive electrode terminal and the negative electrode terminal, respectively, and the positive electrode terminal and the negative electrode terminal are arranged side by side in order from the left side, or the positive electrode terminal and the negative electrode terminal are arranged side by side in order from the right side. Further, four terminal arrangement grooves 285, 285, . . . and four connection terminals 284, 284, . . . may be arranged in the connection connector 282. In a case where four connection terminals 284, 284, . . . are arranged, the four connection terminals 284, 284, . . . function as the positive electrode terminal, the negative electrode terminal, the information terminal, and the communication terminal, respectively, and the positive electrode terminal, the information terminal, the communication terminal, and the negative electrode terminal are arranged side by side in order from the left side, the positive electrode terminal, the information terminal, the communication terminal, and the negative electrode terminal are arranged side by side in order from the right side, the positive electrode terminal, the communication terminal, the information terminal, and the negative electrode terminal are arranged side by side in order from the left side, or the positive electrode terminal, the communication terminal, the information terminal, and the negative electrode terminal are arranged side by side in order from the right side. Note that the connection terminals 284, 284, and 284 of the connection connector 282 are connected with the connection terminals 281, 281, and 281 of the relay connector 279 via a flexible printed circuit board 287 (see FIG. 97). The connection terminals 284, 284, and 284 of the connection connector 282 are connected with the connection terminals 281, 281, and 281 of the relay connector 279 via a substrate, an electric wire, or the like.

<Operation of Mounting/Removing Battery to/from Adapter>

The battery 210 can be mounted in the battery mounting unit 101 formed in the imaging apparatus 100 of the type A as described above and can be used in a state in which it is mounted in the adapter 250 as well.

The battery 210 is inserted into the adapter 250 from the rear side. At this time, in a state in which the upper inclining edges 263*a* and 263*a* formed in the rear opening edge 263 of the casing 251 in the adapter 250 correspond to the upper inclining faces 226 and 226 of the battery 210, and the lower inclining edges 263*b* and 263*b* correspond to the lower inclining faces 227 and 227, the battery 210 is smoothly inserted from the rear opening edge 263 of the adapter 250.

When the battery 210 is inserted into the back side of the adapter 250, the insertion protruding portions 262 and 262 of the casing 251 are relatively inserted into the insertion notches 217*a* and 217*a* formed in the front end part of the casing 217 in the battery 210. Therefore, the insertion of the battery 210 into the adapter 250 is not restricted, and the battery 210 is held and mounted in the adapter 250.

In the state in which the battery 210 is mounted in the adapter 250 as described above, the connection terminals 231, 231, and 231 of the connector 229 in the battery 210 are connected to the connection terminals 281, 281, and 281 of the relay connector 279 in the adapter 250, respectively. Accordingly, the connection terminals 231, 231, and 231 of the connector 229 are connected to the connection terminals 284, 284, and 284 of the connection connector 282 through the connection terminals 281, 281, and 281 of the relay connector 279 and the flexible printed circuit board 287, respectively.

Figure 98:
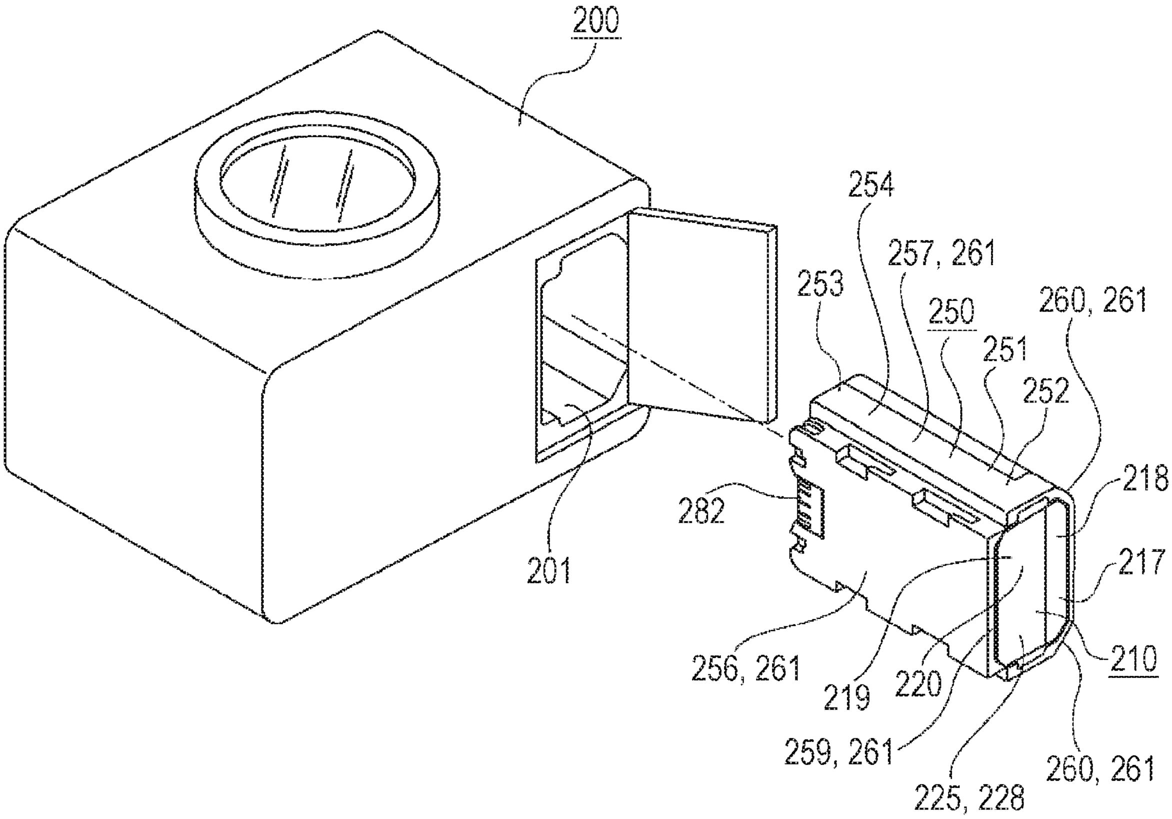
FIG. 98 is a perspective view illustrating another adapter in which another battery is mounted and an imaging apparatus in which another adapter is mounted.

As described above, the adapter 250 in which the battery 210 is mounted is inserted and mounted in the battery mounting unit 201 formed in the imaging apparatus 200 of the type B (see FIG. 98). The imaging apparatus 200 of the type B includes the imaging apparatus 50.

The battery 210 is mounted in the battery mounting unit 101 of the imaging apparatus 100 and supplies electric power to the imaging apparatus 100.

The adapter 250 in which the battery 210 is mounted is mounted in the battery mounting unit 201 of the imaging apparatus 200, and electric power is supplied from the battery 210 to the imaging apparatus 200 via the adapter 250.

When the adapter 250 is mounted in the battery mounting unit 201 of the imaging apparatus 200, a guide protruding portion (not illustrated) of the battery mounting unit 201 is inserted into the first guided grooves 268 and 268 of the adapter 250, and an identification protruding portion (not illustrated) of the battery mounting unit 201 is inserted into the identification grooves 276 and 276 of the adapter 250.

On the other hand, if the power supply 116 is inserted into the adapter 250, the notches corresponding to the insertion notches 217*a* and 217*a* formed in the battery 210 are not formed in the power supply 116, the front face 224 of the power supply 116 comes into contact with the insertion protruding portions 262 and 262, and the connection terminals 136, 136, and 136 of the external connector 134 do not come into contact with the connection terminals 281, 281, and 281 of the relay connector 279 in the adapter 250.

Therefore, the connection terminals 136, 136, and 136 are not connected to the connection terminals 281, 281, and 281, the power supply 116 is unable to be mounted in the adapter 250, and the power supply 116 is prevented from being erroneously mounted in the adapter 250.

Figure 99:
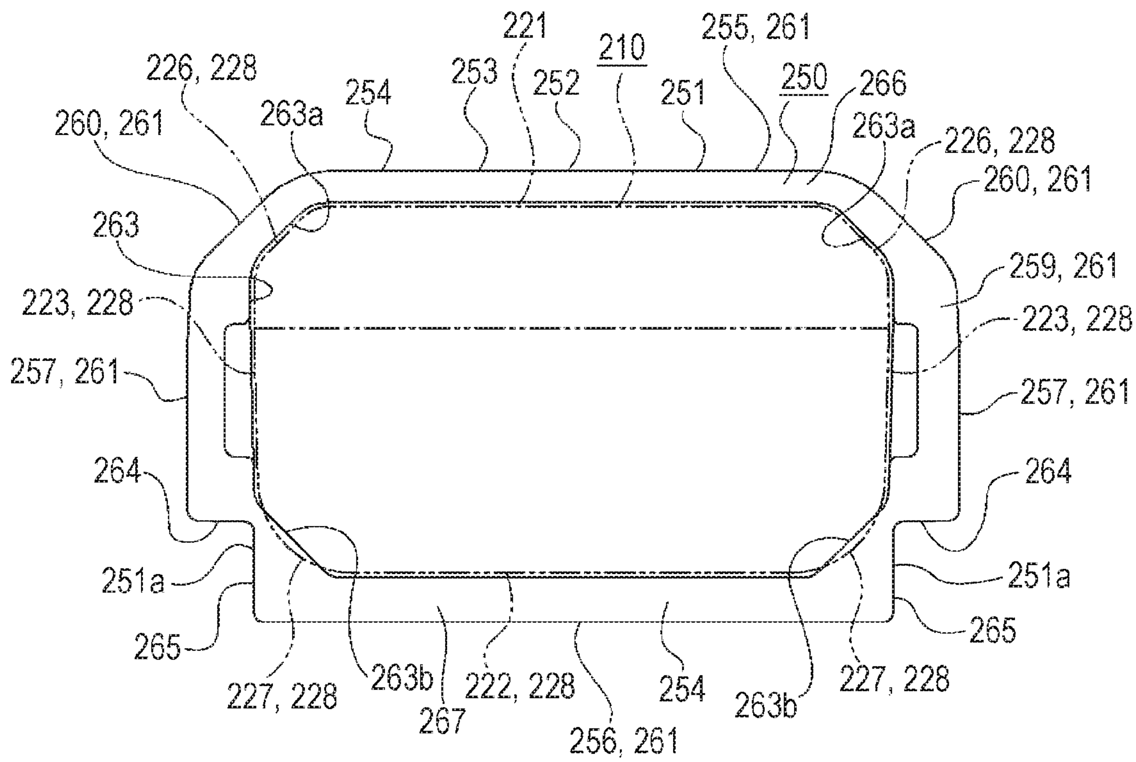
FIG. 99 is a rear view illustrating sizes of the adapter and another battery.

Further, when the battery 210 is desired to be inserted into the adapter 150, the lower inclining faces 227 and 227 of the battery 210 are formed in a gently curved face shape which protrudes outward, and the lower inclining edges 163*b* and 163*b* of the rear opening edge 163 in the adapter 150 are linearly formed, and thus the front ends of the lower inclining faces 227 and 227 interfere with the lower inclining edges 163*b* and 163*b* (see FIG. 99). Therefore, the battery 210 is not inserted into the adapter 150, and the battery 210 is prevented from being erroneously inserted in the adapter 150.

On the other hand, in the adapter 250, since the first guided grooves 268 and 268, the second guided grooves 269 and 269, and the third guided grooves 270 and 270 are formed in the bottom part 267, the adapter 250 can be mounted in the battery mounting unit 83 of the charger 80, similarly to the battery 1 or the like.

In the state in which the adapter 250 is mounted in the battery mounting unit 83, the opening edges of the first guided grooves 268 and 268 are engaged with the first guide engaging parts 87 and 87, the opening edges of the second guided grooves 269 and 269 are engaged with the second guide engaging parts 88 and 88, and the opening edges of the third guided grooves 270 and 270 are engaged with the engaging parts 89*a* and 89*a* of the third guide engaging parts 89 and 89. Therefore, the upper edge of the first engagement claw part 251*p* is engaged with at least a part of the lower edge of the first guide engaging part 87, the upper edge of the second engagement claw part 251*q* is engaged with at least a part of the lower edge of the second guide engaging part 88, and the upper edge of the third engagement claw part 251*r* is engaged with at least a part of the lower edge of the third guide engaging part 89.

Further, in the state in which the adapter 250 is mounted in the battery mounting unit 83, the connection terminals 284, 284, and 284 of the connection connector 282 are connected to the electrode terminals 95, 95, and 95 of the terminal connecting unit 93 arranged in the battery mounting unit 83, respectively.

Since the adapter 250 can be mounted in the battery mounting unit 83 of the charger 80 as described above, it is possible to charge the battery 210 mounted in the adapter 250 through the charger 80. The battery 210 is charged through the charger 80 via the terminal connecting unit 93 of the charger 80, the connection connector 282 of the adapter 250, the relay connector 279 of the adapter 250, and the connector 229 of the battery 210.

Figure 100:
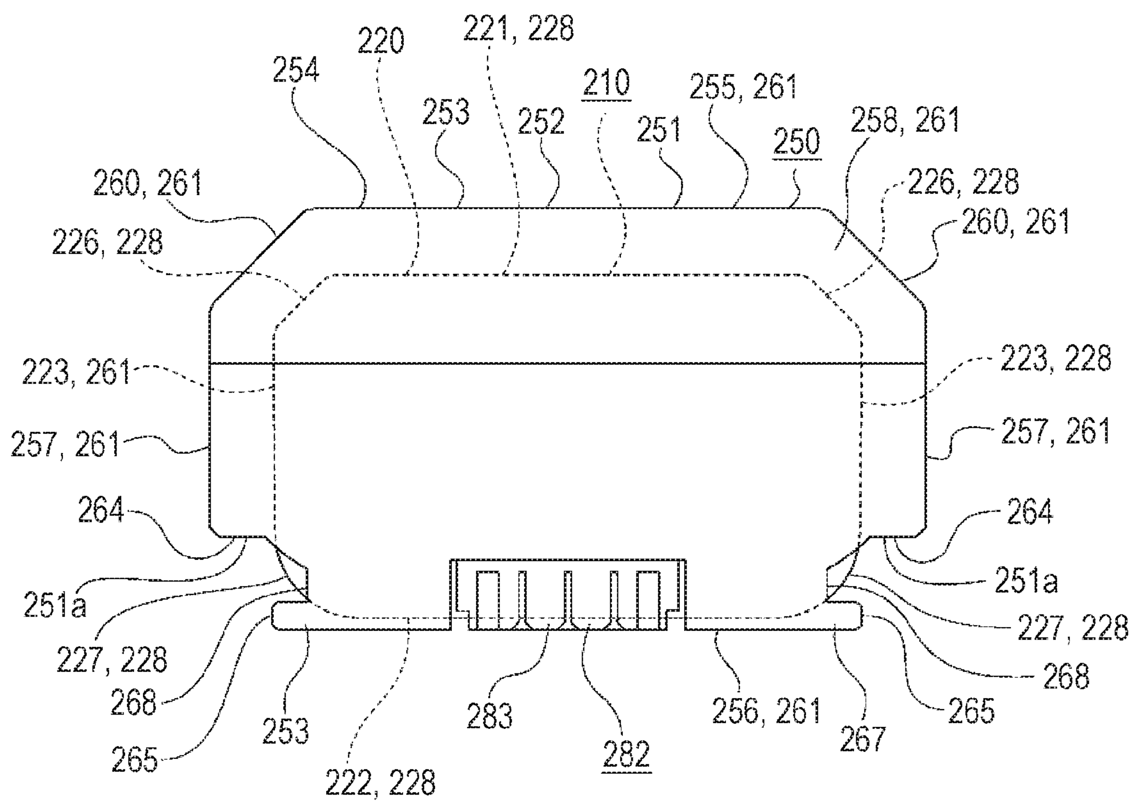
FIG. 100 is a rear view illustrating an example in which a size of a guided groove is increased in another adapter.

Note that, the adapter 250 may not be smoothly mounted in the charger 80 depending on the sizes of the first guide engaging parts 87 and 87, the second guide engaging parts 88 and 88, and the third guide engaging parts 89 and 89 of the charger 80, the sizes of the first guided grooves 268 and 268, the second guided grooves 269 and 269, and the third guided grooves 270 and 270 of the adapter 250. In this case, the adapter 250 can be smoothly mounted in the charger 80 by changing the sizes or the shapes of the first guided grooves 268 and 268, the second guided grooves 269 and 269, and the third guided grooves 270 and 270 of the adapter 250 as illustrated in FIG. 100. Further, since the usable battery 210 which is mounted in the adapter 250 is smaller than the battery 1 or the like and smaller in a maximum charging capacity than the battery 1 or the like, an amount of electric current supplied to the imaging apparatus 200 is likely to be insufficient.

Figure 101:
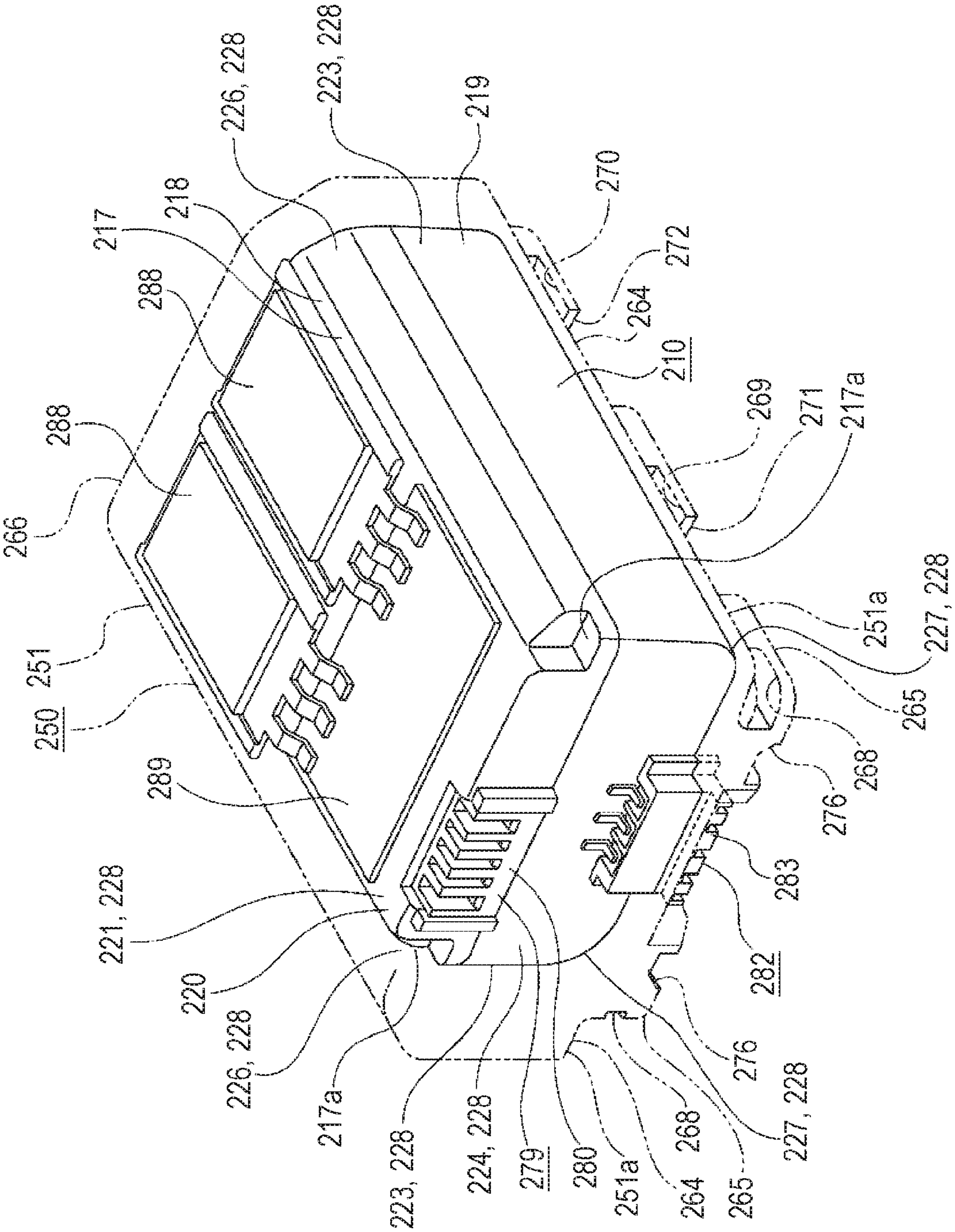
FIG. 101 is a perspective view illustrating an example in which a capacitor is arranged in another adapter.

In order to compensate for the shortage of the current amount, capacitors 288 and 288 may be arranged in the adapter 250 (see FIG. 101). For example, in the adapter 250, the capacitors 288 and 288 are arranged in the upper end part inside the casing 251 in a state in which the capacitors 288 and 288 are aligned laterally, and a substrate 289 connected to the capacitors 288 and 288 is arranged on a front side of the capacitors 288 and 288. The substrate 289 is connected to the relay connector 279. In the adapter 250 having the above configuration, when the adapter 250 in which the battery 210 is mounted is mounted in the imaging apparatus 200, the amount of electric current supplied to the imaging apparatus 200 is increased by the capacitors 288 and 288, and thus a sufficient current amount can be supplied to the imaging apparatus 200.

Further, in the casing 251 of the adapter 250, the notch 251*a* is formed by the level difference face 264 and the groove forming face 265 continuous to the bottom face 256, the first guided groove 268, the second guided groove 269, and the third guided groove 270 which are opened to the groove forming face 265 are formed, and the first guided groove 268, the second guided groove 269, and the third guided groove 270 are positioned on a further bottom face 256 side than the level difference face 264.

Therefore, since the first guided groove 268, the second guided groove 269, the third guided groove 270 and the level difference face 264 are not continuously positioned, and a part of the groove forming face 265 is positioned between each of the first guided groove 268, the second guided groove 269, and the third guided groove 270 and the level difference face 264, the groove forming face 265 and the level difference face 264 are positioned inside the casing 251, and the size of the adapter 250 can be reduced, compared to the case where the first guided groove 268, the second guided groove 269, the third guided groove 270, and the level difference face 264 are continuously positioned.

Further, in the adapter 250, the identification groove 276 used for identifying the imaging apparatus or the like is formed in the casing 251, and the identification groove 276 includes a plurality of identification parts having different lengths which are continuously formed. Therefore, since there is no part that divides the identification part between a plurality of identification parts having different lengths, the size of the identification groove 276 in the direction in which the identification parts are continuous is a sum of sizes of a plurality of identification parts, and thus it is possible to reduce the size of the adapter 250 while securing the high identification performance.

Note that, even in the adapter 250, similarly to the adapter 150, the wall portions formed as the inclining faces that are separated from each other in the horizontal direction as they go forward may be formed on the front side of the connection connector 282. Since the wall portions are formed, when the adapter 250 is inserted into the battery mounting unit 201 of the imaging apparatus 200, the connector arranged inside the imaging apparatus 200 is guided by the wall portions and approaches the connection connector 282, it is possible to secure the satisfactory connection state of the connection connector 282 with respect to the battery mounting unit 201 of the imaging apparatus 200.

Further, the connection connector 282 may be positioned on a further upper side than the bottom face 222 of the casing 217.

Furthermore, even in the adapter 250, similarly to the adapter 150, the pressing plate for pressing the battery 210 may be arranged inside the casing 217, or the lock lever for locking the battery 210 may be arranged.

<Mounting Possibility of Battery or the Like in Connection Apparatus or the Like>

Figure 102:
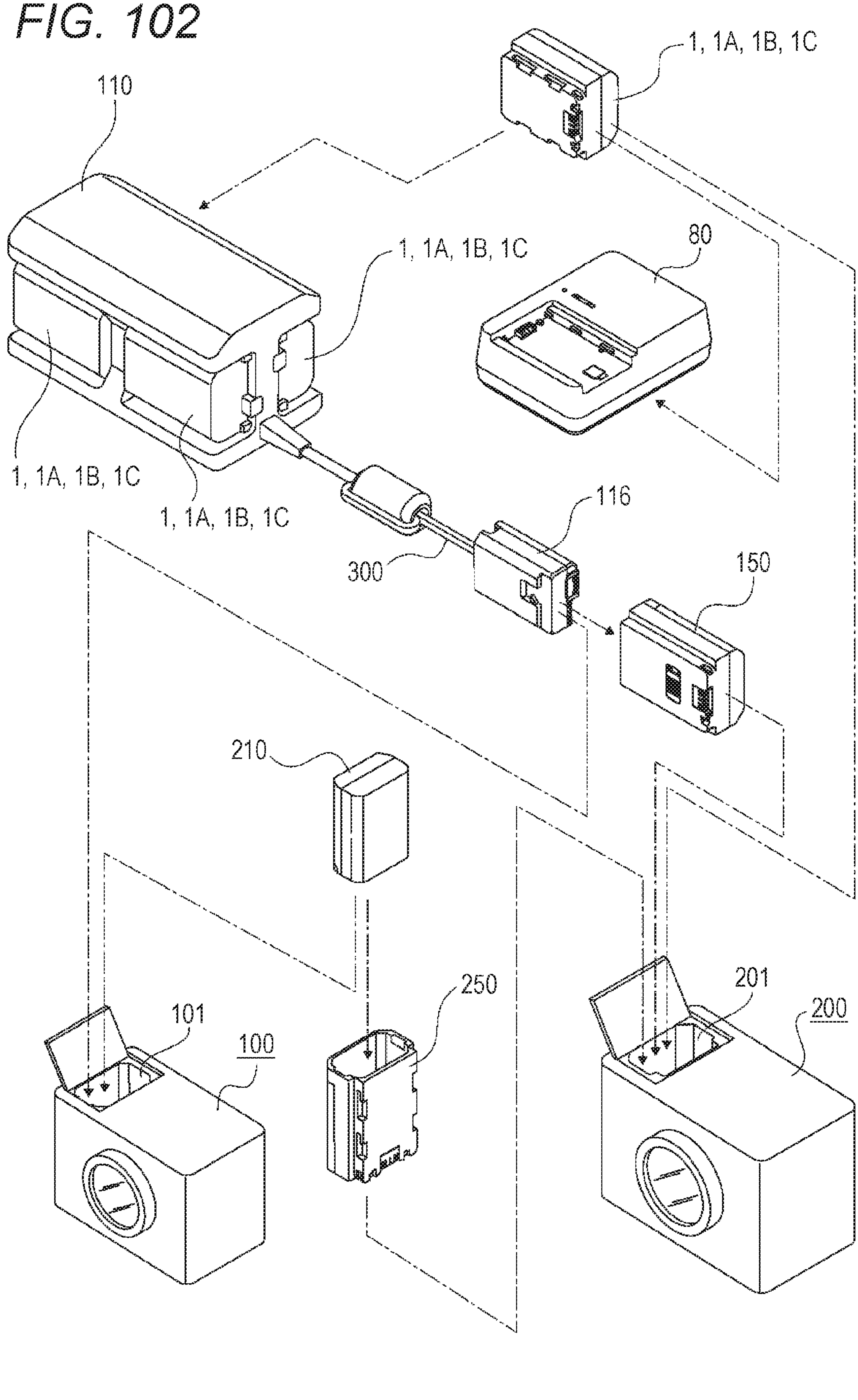

A mounting possibility of the charger 80 of the battery 1 or the like in the imaging apparatus 100 or the like will be described below (see FIG. 102).

The battery 1 (1A, 1B, ad 1C) can be mounted in the charger 80 and the charger 110. Further, the battery 1 (1A, 1B, and 1C) can be mounted in the imaging apparatus 200 of the type B (including the imaging apparatus 50). On the other hand, the battery 1 (1A, 1B, and 1C) is unable to be mounted in imaging apparatus 100 of the type A.

The power supply 116 connectable to the charger 110 via the cable 300 can be mounted in the imaging apparatus 100 of the type A. On the other hand, the power supply 116 is unable to be mounted in the charger 80 or the imaging apparatus 200 of the type B.

The power supply 116 can be mounted in the adapter 150, and the adapter 150 can be mounted in the imaging apparatus 200 of the type B. On the other hand, the adapter 150 is unable to be mounted in the chargers 80 and 110 or the imaging apparatus 100 of the type A.

The battery 210 can be mounted in a charger (not illustrated) corresponding to the battery 210. Further, the battery 210 can be mounted in the imaging apparatus 100 of the type A. On the other hand, the battery 210 is unable to be mounted in the chargers 80 and 110 or the imaging apparatus 200 of the type B.

The battery 210 can be mounted in the adapter 250, and the adapter 250 can be mounted in the imaging apparatus 200 of the type B. Further, the adapter 250 can be mounted in the chargers 80 and 110. On the other hand, the adapter 250 is unable to be mounted in the imaging apparatus 100 of the type A.

As described above, each of the power supply 116 and the battery 210 can be mounted in the imaging apparatus 100 alone or can be mounted in the imaging apparatus 200 using the adapter 150 or the adapter 250, and thus the usability for the power supply 116 and battery 210 can be improved.

<Present Technology>

The present technology may have the following configurations.

(1) A battery, including: a casing including cells housed therein; and a terminal part including a connection terminal connected to an electrode terminal of a connection apparatus, in which in the casing, a functional groove having a predetermined function in which a longitudinal direction coincides with a connection direction of the connection terminal and the electrode terminal is formed, and the functional groove includes a plurality of functional units having different lengths which are continuously formed.

(2) The battery described in (1) described above, in which a first functional unit and a second functional unit are formed as the functional unit.

(3) The battery described in (1) or (2) described above, in which the plurality of functional units are formed continuously in a widthwise direction.

(4) The battery described in (3) described above, in which widths of the plurality of functional units decrease in an ascending order of lengths.

(5) The battery described in (1) or (2) described above, in which the plurality of functional units are continuously formed in a depth direction.

(6) The battery described in (5) described above, in which depths of the plurality of functional units decrease in an ascending order of lengths.

(7) The battery according to any one of (1) to (6) described above, in which the functional groove is formed on both sides of the terminal part in a widthwise direction.

(8) The battery described in any one of (1) to (7) described above, in which the casing includes a front face and a rear face which are positioned on opposite sides in the longitudinal direction and a top face and a bottom face which are positioned between the front face and the rear face in a height direction orthogonal to the longitudinal direction, an arrangement concave part which is opened to at least the front face is formed in the casing, a connector arranged in the arrangement concave part is formed as the terminal part, and a face positioned to be closest to the top face side among faces forming the functional groove is positioned on a further bottom face side than a face positioned to be closest to the top face side among faces forming the arrangement concave part.

(9) The battery described in any one of (1) to (8) described above, in which the casing includes a top face and a bottom face which are positioned on opposite sides in a height direction, a terminal arrangement groove in which the connection terminal is arranged is formed in the casing, and a face positioned to be closest to the top face side among faces forming the functional groove is positioned on a further bottom face side than a face positioned to be closest to the top face side among faces forming the terminal arrangement groove.

(10) The battery described in any one of (1) to (9) described above, in which the casing includes two side faces which are positioned on opposite sides in a widthwise direction and a top face and a bottom face which are positioned between the two side faces in a height direction orthogonal to a widthwise direction, a notch is formed in the casing by a level difference face which is continuous to the side face and a groove forming face which is continuous to the bottom face, and the face positioned to be closest to the top face side among faces forming the functional groove is positioned on a further bottom face side than the level difference face.

(11) The battery described in (10) described above, in which a guided groove which is opened to the groove forming face is formed in the casing, and the face positioned to be closest to the top face side among faces forming the functional groove is positioned on a further bottom face side than an end edge of the guided groove which is positioned to be closest to the top face side.

(12) The battery described in (10) or (11) described above, in which a guided groove which is opened to the groove forming face is formed in the casing, and the face positioned to be closest to the top face side among faces forming the functional groove is positioned on a further top face side than an end edge of the guided groove which is positioned to be closest to the bottom face side.

(13) The battery described in any one of (1) to (12) described above, in which the casing includes a front face and a rear face which are positioned on opposite sides in the longitudinal direction, an arrangement concave part which is opened to at least the front face is formed in the casing, a connector arranged in the arrangement concave part is formed as the terminal part, and a face positioned to be closest to the rear face side among faces forming the functional groove is positioned on a further front face side than a face positioned to be closest to the rear face side among faces forming the arrangement concave part.

(14) The battery described in (13) described above, in which a face positioned to be closest to the rear face side among faces forming the functional groove is positioned on a further rear face side than a face of the connector which is positioned to be closest to the front face side.

(15) The battery described in any one of (1) to (12) described above, in which the casing includes a front face and a rear face which are positioned on opposite sides in the longitudinal direction, a terminal arrangement groove in which the connection terminal is arranged is formed in the casing, and a face positioned to be closest to the rear face side among faces forming the functional groove is positioned on a further front face side than a face positioned to be closest to the rear face side among faces forming the terminal arrangement groove.

(16) The battery described in any one of (1) to (15) described above, in which the casing includes a front face and a rear face which are positioned on opposite sides in the longitudinal direction, two side faces which are positioned between the front face and the rear face in a widthwise direction orthogonal to the longitudinal direction, and a top face and a bottom face which are positioned between the front face and the rear face and between the two side faces in a height direction orthogonal to both the longitudinal direction and the widthwise direction, a notch is formed in the casing by a level difference face which is continuous to the side face and a groove forming face which is continuous to the bottom face, a guided groove which is opened to the groove forming face and the front face is formed in the casing, and a face positioned to be closest to the rear face side among faces forming the functional groove is positioned on a further front face side than a face of the guided groove which is positioned to be closest to the rear face side.

(17) The battery described in (2) described above, in which the casing includes two side faces which are positioned between the front face and the rear face in a widthwise direction orthogonal to the longitudinal direction and a top face and a bottom face which are positioned between the front face and the rear face and between the two side faces in a height direction orthogonal to both the longitudinal direction and the widthwise direction, the first functional unit and the second functional unit are continuously formed in a widthwise direction, and the first functional unit is positioned on a further center side in the widthwise direction than the second functional unit, and a face of the second functional unit continuous to the first functional unit in the widthwise direction is formed as an inclining face which is displaced to the bottom face side as the face approaches the side face positioned on an opposite side to the first functional unit.

(18) The battery described in any one of (1) to (17) described above, in which the predetermined function is an identifying function for identifying a type of the connection apparatus.

(19) A connection apparatus, including a portion in which a battery including a casing including cells housed therein and a terminal part including a connection terminal connected to an electrode terminal of the connection apparatus is mountable, in which a functional groove having a predetermined function in which a longitudinal direction coincides with a connection direction of the connection terminal and the electrode terminal is formed in the casing of the battery, and the functional groove includes a plurality of functional units having different lengths which are continuously formed.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 Battery
2 Casing
6 Cell
30 Identification groove
31 First identification part
32 Second identification part
33 Connector
35 Connection terminal
50 Imaging apparatus (connection apparatus)
61 Electrode terminal
80 Charger (connection apparatus)
95 Electrode terminal
80A Charger (connection apparatus)
80B Charger (connection apparatus)
1A Battery
1B Battery
33A Connector
1C Battery
2C Casing
16 Power supply
17 Casing
34 External connector
36 Connection terminal
39 Internal connector
41 Connection terminal
100 Imaging apparatus (connection apparatus)
50 Adapter
51 Casing
72 Identification groove
73 First identification part
74 Second identification part
89 Relay connector
91 Connection terminal
92 Connection connector
94 Connection terminal
200 Imaging apparatus (connection apparatus)
10 Battery
17 Casing

29 Connector
31 Connection terminal
50 Adapter
51 Casing
76 Identification groove
77 First identification part
78 Second identification part
79 Relay connector
81 Connection terminal
82 Connection connector
84 Connection terminal

The invention claimed is:

1. A battery, comprising:

a casing configured to house at least one battery cell, the casing including a front surface and a rear surface spaced apart along a longitudinal direction, a first side surface and a second side surface spaced apart along a widthwise direction orthogonal to the longitudinal direction, and a bottom surface and a top surface spaced apart along a height direction orthogonal to the longitudinal and widthwise direction;

wherein the casing includes a concave portion having an opening defined by a first wall portion and a second wall portion, the first wall portion extending towards the first side surface, the second wall portion extending towards the second side surface; and a terminal part including a connection terminal configured to connect to an electrode terminal of a connection apparatus, the connection terminal including a front face proximate the front surface of the casing, the first wall portion and the second wall portion respectively extending from the front surface to the terminal part without extending past the terminal part in the longitudinal direction, such that the opening of the concave portion extends from the terminal part to an edge of the front surface and is wider at the edge of the front surface than at the terminal part, with the terminal part positioned between the first wall portion and the second wall portion, wherein the casing includes a first functional groove and a second functional groove, the first functional groove is located between the first side surface and the first wall portion and the second functional groove is located between the second side surface and the second wall portion, the first functional groove includes a first inner bottom face extending in the widthwise direction, the concave portion includes a middle portion face extending between the first wall portion and the second wall portion in the widthwise direction, and the first inner bottom face is closer to the bottom surface of the casing than is the middle portion face of the concave portion.

2. The battery according to claim 1, wherein the second functional groove includes a second inner bottom face extending in the widthwise direction, and the second inner bottom face is closer to the bottom surface of the casing than is the middle portion face of the concave portion.

3. The battery according to claim 2, wherein the first inner bottom face and the second inner bottom face are a same distance from the bottom surface of the casing.

4. The battery according to claim 1, wherein a notch is formed in the casing by a first level difference face which extends continuously along the first side surface along the longitudinal direction and substantially parallel to the bottom surface, and the first inner bottom face is closer to the bottom surface of the casing than is the first level difference face.

5. The battery according to claim 4, wherein a notch is formed in the casing by a second level difference face which extends continuously along the second side surface along the longitudinal direction and substantially parallel to the bottom surface, and the second inner bottom face is closer to the bottom surface of the casing than is the second level difference face.

6. The battery according to claim 5, wherein the first level difference face and the second level difference face are a same distance from the bottom surface.

7. The battery according to claim 1, wherein a notch is formed in the casing by a first level difference face which extends continuously along the first side surface along the longitudinal direction and substantially parallel to the bottom surface, the first inner bottom face is closer to the bottom surface of the casing than is the first level difference face, and the middle portion face of the concave portion is closer to the bottom surface of the casing than is the first level difference face.

* * * * *